US009418570B2

(12) United States Patent
Tunogai

(10) Patent No.: US 9,418,570 B2
(45) Date of Patent: Aug. 16, 2016

(54) GUITAR TEACHING DATA CREATION DEVICE, GUITAR TEACHING SYSTEM, GUITAR TEACHING DATA CREATION METHOD, AND COMPUTER-READABLE STORAGE MEDIUM STORING GUITAR TEACHING DATA

(71) Applicant: Tomohide Tunogai, Shizuoka (JP)

(72) Inventor: Tomohide Tunogai, Shizuoka (JP)

( * ) Notice: Subject to any disclaimer, the term of this patent is extended or adjusted under 35 U.S.C. 154(b) by 0 days.

(21) Appl. No.: 14/753,489

(22) Filed: Jun. 29, 2015

(65) Prior Publication Data

US 2015/0302758 A1 Oct. 22, 2015

Related U.S. Application Data

(63) Continuation-in-part of application No. PCT/JP2013/007688, filed on Dec. 27, 2013.

(30) Foreign Application Priority Data

Dec. 29, 2012 (JP) ................................ 2012-289220

(51) Int. Cl.
*G10H 1/38* (2006.01)
*G10H 7/00* (2006.01)
*G09B 15/00* (2006.01)
(Continued)

(52) U.S. Cl.
CPC ............. *G09B 15/00* (2013.01); *G09B 15/002* (2013.01); *G10G 1/02* (2013.01); *G10H 1/342* (2013.01); *G10H 1/38* (2013.01); *G10H 2220/241* (2013.01); *G10H 2220/301* (2013.01)

(58) Field of Classification Search
CPC .......... G10H 1/0016; G10H 2220/051; G10H 2220/061; G09B 15/003
USPC ........................................................... 84/613
See application file for complete search history.

(56) References Cited

U.S. PATENT DOCUMENTS 5,040,447 A 8/1991 Murata et al.
5,214,231 A * 5/1993 Ernst ................... G09B 15/003
84/478

(Continued)

FOREIGN PATENT DOCUMENTS

JP 10-319946 A 12/1998
JP 2001-134268 A 5/2001

(Continued)

OTHER PUBLICATIONS

English translation of the International Preliminary Report on Patentability in corresponding International Application No. PCT/JP2013/007688, mailed Jul. 9, 2015.

*Primary Examiner* — Jeffrey Donels
(74) *Attorney, Agent, or Firm* — Young Basile Hanlon & MacFarlane, P.C.

(57) ABSTRACT

A guitar teaching data creation device includes a central processing unit (CPU) having: a distribution map creating module for collating respective sounds of chords with addresses of sounds on a fingerboard of a teaching-oriented guitar, and creating a distribution map of the respective sounds of the chords; a sequence creating module for creating sequences from the distribution map; a numerical diagram creating module for creating numerical diagrams of combinations from the sequences; a graphic converting module for converting the numerical diagrams into graphics; and a display module for prioritizing the graphics and transmitting a signal to arrange and display the graphics.

5 Claims, 123 Drawing Sheets

(51) Int. Cl.
*G10G 1/02* (2006.01)
*G10H 1/34* (2006.01)

(56) References Cited

U.S. PATENT DOCUMENTS

| | | | | | |
|---|---|---|---|---|---|
| 5,266,735 | A * | 11/1993 | Shaffer | G09B 15/003 | 84/464 A |
| 5,408,914 | A * | 4/1995 | Breitweiser, Jr. | G09B 15/003 | 84/455 |
| 6,452,081 | B1 * | 9/2002 | Ravagni | G09B 15/023 | 84/464 A |
| 7,223,913 | B2 * | 5/2007 | Knapp | G09B 5/065 | 84/462 |
| 7,381,878 | B2 * | 6/2008 | Cook | G09B 15/003 | 84/314 R |
| 8,525,011 | B2 * | 9/2013 | Ihara | G09B 15/08 | 84/464 R |
| 2006/0236850 | A1 * | 10/2006 | Shaffer | G10H 3/125 | 84/724 |
| 2007/0051226 | A1 * | 3/2007 | Diaz | G09B 15/02 | 84/477 R |
| 2007/0234878 | A1 * | 10/2007 | Worrall | G10H 1/0016 | 84/485 R |
| 2010/0137049 | A1 * | 6/2010 | Epstein | A63F 13/06 | 463/7 |

FOREIGN PATENT DOCUMENTS

| | | | |
|---|---|---|---|
| JP | 2004-163446 | A | 6/2004 |
| JP | 4186353 | B | 9/2008 |
| JP | 2010-122616 | A | 6/2010 |

* cited by examiner

FIG. 9

| | | | | | | | | | | | | | | | | | | | | | | | | | | |
|---|---|---|---|---|---|---|---|---|---|---|---|---|---|---|---|---|---|---|---|---|---|---|---|---|---|---|
| A | 1 | 7 | 13 | 19 | 25 | 31 | 37 | 43 | 49 | 55 | 61 | 67 | 73 | 79 | 85 | 91 | 97 | 103 | 109 | 115 | 121 | 127 | 133 | 139 | 145 | 151 |
| B | 2 | 8 | 14 | 20 | 26 | 32 | 38 | 44 | 50 | 56 | 62 | 68 | 74 | 80 | 86 | 92 | 98 | 104 | 110 | 116 | 122 | 128 | 134 | 140 | 146 | 152 |
| C | 3 | 9 | 15 | 21 | 27 | 33 | 39 | 45 | 51 | 57 | 63 | 69 | 75 | 81 | 87 | 93 | 99 | 105 | 111 | 117 | 123 | 129 | 135 | 141 | 147 | 153 |
| D | 4 | 10 | 16 | 22 | 28 | 34 | 40 | 46 | 52 | 58 | 64 | 70 | 76 | 82 | 88 | 94 | 100 | 106 | 112 | 118 | 124 | 130 | 136 | 142 | 148 | 154 |
| E | 5 | 11 | 17 | 23 | 29 | 35 | 41 | 47 | 53 | 59 | 65 | 71 | 77 | 83 | 89 | 95 | 101 | 107 | 113 | 119 | 125 | 131 | 137 | 143 | 149 | 155 |
| F | 6 | 12 | 18 | 24 | 30 | 36 | 42 | 48 | 54 | 60 | 66 | 72 | 78 | 84 | 90 | 96 | 102 | 108 | 114 | 120 | 126 | 132 | 138 | 144 | 150 | 156 |

FIG. 21A

| | |
|---|---|
| 36 | 16 |
| 36 | 47 |

FIG. 21B

| | | |
|---|---|---|
| 36 | 16 | 8 |
| 36 | 16 | 33 |
| 36 | 16 | 95 |

FIG. 21C

| | | |
|---|---|---|
| 36 | 47 | 8 |
| 36 | 47 | 33 |
| 36 | 47 | 64 |

FIG. 21D

| | | | | |
|---|---|---|---|---|
| A | 36 | 16 | 8 | 31 |
| B | 36 | 16 | 8 | 87 |
| C | 36 | 16 | 8 | 149 |
| D | 36 | 16 | 33 | 31 |
| E | 36 | 16 | 33 | 62 |
| F | 36 | 16 | 33 | 149 |
| G | 36 | 16 | 95 | 31 |
| H | 36 | 16 | 95 | 62 |
| I | 36 | 16 | 95 | 87 |

FIG. 21E

| | | | | |
|---|---|---|---|---|
| J | 36 | 47 | 8 | 31 |
| K | 36 | 47 | 8 | 87 |
| L | 36 | 47 | 8 | 118 |
| M | 36 | 47 | 33 | 31 |
| N | 36 | 47 | 33 | 62 |
| O | 36 | 47 | 64 | 31 |
| P | 36 | 47 | 64 | 62 |
| Q | 36 | 47 | 64 | 87 |

(A) 36 – 16 – 8 – 31
(B) 36 – 16 – 8 – 87
(C) 36 – 16 – 8 – 149
(D) 36 – 16 – 33 – 31
(E) 36 – 16 – 33 – 62
(F) 36 – 16 – 33 – 149
(G) 36 – 16 – 95 – 31
(H) 36 – 16 – 95 – 62
(I) 36 – 16 – 95 – 87

(J) 36 – 47 – 8 – 31
(K) 36 – 47 – 8 – 87
(L) 36 – 47 – 8 – 118
(M) 36 – 47 – 33 – 31
(N) 36 – 47 – 33 – 62
(O) 36 – 47 – 64 – 31
(P) 36 – 47 – 64 – 62
(Q) 36 – 47 – 64 – 87

MAJOR 3RD
MAJOR 3RD
MAJOR 3RD

MINOR 3RD
MAJOR 3RD
MAJOR 3RD

MAJOR 3RD
MINOR 3RD
MAJOR 3RD

MINOR 3RD
MINOR 3RD
MAJOR 3RD

MAJOR 3RD
MAJOR 3RD
MINOR 3RD

MINOR 3RD
MAJOR 3RD
MINOR 3RD

MAJOR 3RD
MINOR 3RD
MINOR 3RD

MINOR 3RD
MINOR 3RD
MINOR 3RD

| KEY | A | D | G | C | F | B♭ | E♭ |
|---|---|---|---|---|---|---|---|
| CHORD NUMBER | IV | I | V | II | VI | III | VII |

FIG. 79
$D_1$
3 3 3
| B | T | A | S |
|---|---|---|---|
| 4 | | | |
| 35 | 28 | 21 | 20 |
| | | | 14 |
| | | 15 | 14 |
| | | | 8 |
| | 22 | 15 | 14 |
| | | | 8 |
| | | 9 | 8 |
| | | | 2 |
| 66 | 59 | 52 | 45 |
| | | | 39 |
| | | 46 | 39 |
| | | | 33 |
| | 53 | 46 | 39 |
| | | | 33 |
| | | 40 | 33 |
| | | | 27 |
$D\#_1 = E\flat_1$
3 3 3
| B | T | A | S |
|---|---|---|---|
| 10 | | | |
| 41 | 34 | 27 | 26 |
| | | | 20 |
| | | 21 | 20 |
| | | | 14 |
| | 28 | 21 | 20 |
| | | | 14 |
| | | 15 | 14 |
| | | | 8 |
| 72 | 65 | 58 | 51 |
| | | | 45 |
| | | 52 | 45 |
| | | | 39 |
| | 59 | 52 | 45 |
| | | | 39 |
| | | 46 | 39 |
| | | | 33 |
$E\flat_1 (D\#_1)$
3 3 3
| B | T | A | S |
|---|---|---|---|
| 10 | | | |
| 41 | 34 | 27 | 26 |
| | | | 20 |
| | | 21 | 20 |
| | | | 14 |
| | 28 | 21 | 20 |
| | | | 14 |
| | | 15 | 14 |
| | | | 8 |
| 72 | 65 | 58 | 51 |
| | | | 45 |
| | | 52 | 45 |
| | | | 39 |
| | 59 | 52 | 45 |
| | | | 39 |
| | | 46 | 39 |
| | | | 33 |
$E_2$
3 3 3
| B | T | A | S |
|---|---|---|---|
| 16 | 9 | 8 | 1 |
| | | | |
| | | 2 | |
| | | | |
| | 3 | 2 | |
| | | | |
| | | | |
| | | | |
| 47 | 40 | 33 | 32 |
| | | | 26 |
| | | 27 | 26 |
| | | | 20 |
| | 34 | 27 | 26 |
| | | | 20 |
| | | 21 | 20 |
| | | | 14 |
| 78 | 71 | 64 | 57 |
| | | | 51 |
| | | 58 | 51 |
| | | | 45 |
| | 65 | 58 | 51 |
| | | | 45 |
| | | 52 | 45 |
| | | | 39 |
$F_2$
3 3 3
| B | T | A | S |
|---|---|---|---|
| 22 | 15 | 14 | 7 |
| | | | 1 |
| | | 8 | 1 |
| | | | |
| | 9 | 8 | 1 |
| | | | |
| | | 2 | |
| | | | |
| 53 | 46 | 39 | 38 |
| | | | 32 |
| | | 33 | 32 |
| | | | 26 |
| | 40 | 33 | 32 |
| | | | 26 |
| | | 27 | 26 |
| | | | 20 |
| 84 | 77 | 70 | 63 |
| | | | 57 |
| | | 64 | 57 |
| | | | 51 |
| | 71 | 64 | 57 |
| | | | 51 |
| | | 58 | 51 |
| | | | 45 |
$F\#_2 (G\flat_2)$
3 3 3
| B | T | A | S |
|---|---|---|---|
| 28 | 21 | 20 | 13 |
| | | | 7 |
| | | 14 | 7 |
| | | | 1 |
| | 15 | 14 | 7 |
| | | | 1 |
| | | 8 | 1 |
| | | | |
| 59 | 52 | 45 | 44 |
| | | | 38 |
| | | 39 | 38 |
| | | | 32 |
| | 46 | 39 | 38 |
| | | | 32 |
| | | 33 | 32 |
| | | | 26 |
| 90 | 83 | 76 | 69 |
| | | | 63 |
| | | 70 | 63 |
| | | | 57 |
| | 77 | 70 | 63 |
| | | | 57 |
| | | 64 | 57 |
| | | | 51 |
$G\flat_2$
3 3 3
| B | T | A | S |
|---|---|---|---|
| 28 | 21 | 20 | 13 |
| | | | 7 |
| | | 14 | 7 |
| | | | 1 |
| | 15 | 14 | 7 |
| | | | 1 |
| | | 8 | 1 |
| | | | |
| 59 | 52 | 45 | 44 |
| | | | 38 |
| | | 39 | 38 |
| | | | 32 |
| | 46 | 39 | 38 |
| | | | 32 |
| | | 33 | 32 |
| | | | 26 |
| 90 | 83 | 76 | 69 |
| | | | 63 |
| | | 70 | 63 |
| | | | 57 |
| | 77 | 70 | 63 |
| | | | 57 |
| | | 64 | 57 |
| | | | 51 |

FIG. 83

| | ♭ | ♮ | ♯ | ♭ | ♮ | ♯ | ♭ | ♮ | ♮ | ♯ | ♭ | ♮ | ♯ | ♭ | ♮ | ♯ | ♭ | ♮ |
|---|---|---|---|---|---|---|---|---|---|---|---|---|---|---|---|---|---|---|
| C | | I | | | II | | | III | IV | | | V | | | VI | | | VII |
| F | | V | | | VI | | | VII | I | | | II | | | | | IV | |
| B♭ | | IVII | | | III | | IV | | V | | | VI | | | | | I | |
| E♭ | | IVI | | | VII | | I | | II | | | III | | IV | | | V | |
| A♭ | | VIII | | IV | | | V | | VI | | | VII | | I | | | II | |
| D♭ | | IIVII | | I | | | II | | III | | IV | | | V | | | VI | |
| [G♭] | IV | VI | | V | | | VI | | VII | | I | | | II | | | III | |
| [F♯] | | | V | | | VI | | | | I | | | II | | | III | | IV |
| B | | III | II | | | III | | IV | | V | | | VI | | | VII | | I |
| E | | VII | VI | | | VII | | I | | II | | | III | | IV | | | V |
| A | | IV | III | | IV | | | V | | VI | | | VII | | I | | | II |
| D | | I | VII | | I | | | II | | III | | IV | | | V | | | VI |
| G | | IV | | | V | | | VI | | VII | | I | | | II | | | III |
| C | | I | | | II | | | III | IV | | | V | | | VI | | | VII |
| F | | V | | | VI | | | VII | I | | | II | | | III | | IV | |
| B♭ | | II | | | III | | IV | | V | | | VI | | | VII | | I | |
| E♭ | | VI | | | VII | | I | | II | | | III | | IV | | | V | |
| A♭ | | III | | IV | | | V | | VI | | | VII | | I | | | II | |
| D♭ | | VII | | I | | | II | | III | | IV | | | V | | | VI | |
| [G♭] | | | | V | | | VI | | VII | | I | | | II | | | III | |
| [F♯] | | | V | | | VI | | | | I | | | II | | | III | | IV |
| B | | | II | | | III | | | | V | | | VI | | | VII | | I |
| E | | | VI | | | VII | | | | II | | | III | | IV | | | V |
| A | | | III | | | | | | | VI | | | VII | | I | | | II |
| D | | | VII | | | | | | | III | | | | | V | | | VI |
| G | | IV | | | | | | | | VII | | | | | II | | | III |

FIG. 93

| | |
|---|---|
| THREE VOICE PARTS | DISPLAY GRAPHICS IN ORDER OF THREE-STRING ROOT, FOUR-STRING ROOT, FIFTH-STRING ROOT AND SIXTH-STRING ROOT |
| FOUR VOICE PARTS | DISPLAY GRAPHICS IN ORDER OF FIFTH-STRING ROOT, SIXTH-STRING ROOT AND FOUR-STRING ROOT |
| FIVE VOICE PARTS | DISPLAY GRAPHICS IN ORDER OF FIFTH-STRING ROOT AND SIXTH-STRING ROOT |
| SIX VOICE PARTS | DISPLAY GRAPHICS OF SIXTH-STRING ROOT |

FIG. 98

| | | | | | | | | | | | | | | | | | | | | | | | | | | |
|---|---|---|---|---|---|---|---|---|---|---|---|---|---|---|---|---|---|---|---|---|---|---|---|---|---|---|
| A | 1 | 7 | 13 | 19 | 25 | 31 | 37 | 43 | 49 | 55 | 61 | 67 | 73 | 79 | 85 | 91 | 97 | 103 | 109 | 115 | 121 | 127 | 133 | 139 | 145 | 151 |
| B | 2 | 8 | 14 | 20 | 26 | 32 | 38 | 44 | 50 | 56 | 62 | 68 | 74 | 80 | 86 | 92 | 98 | 104 | 110 | 116 | 122 | 128 | 134 | 140 | 146 | 152 |
| C | 3 | 9 | 15 | 21 | 27 | 33 | 39 | 45 | 51 | 57 | 63 | 69 | 75 | 81 | 87 | 93 | 99 | 105 | 111 | 117 | 123 | 129 | 135 | 141 | 147 | 153 |
| D | 4 | 10 | 16 | 22 | 28 | 34 | 40 | 46 | 52 | 58 | 64 | 70 | 76 | 82 | 88 | 94 | 100 | 106 | 112 | 118 | 124 | 130 | 136 | 142 | 148 | 154 |
| E | 5 | 11 | 17 | 23 | 29 | 35 | 41 | 47 | 53 | 59 | 65 | 71 | 77 | 83 | 89 | 95 | 101 | 107 | 113 | 119 | 125 | 131 | 137 | 143 | 149 | 155 |
| F | 6 | 12 | 18 | 24 | 30 | 36 | 42 | 48 | 54 | 60 | 66 | 72 | 78 | 84 | 90 | 96 | 102 | 108 | 114 | 120 | 126 | 132 | 138 | 144 | 150 | 156 |

FIG. 100A
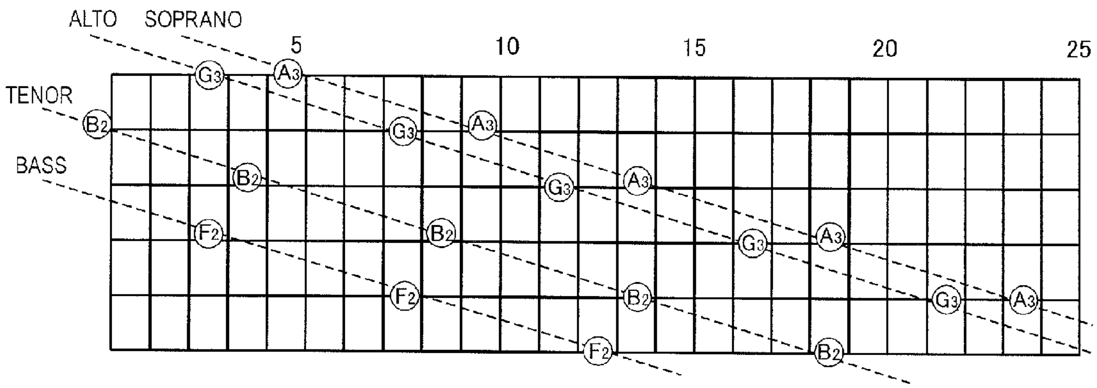
FIG. 100B
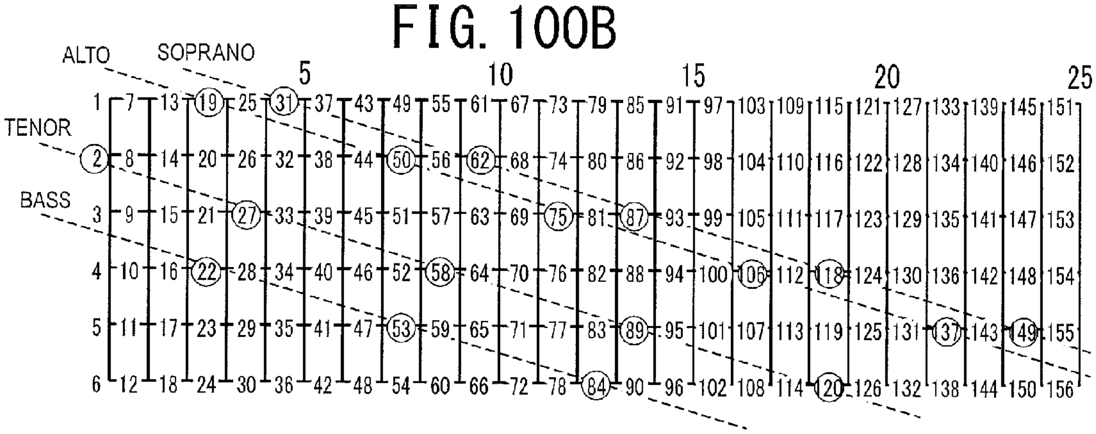
FIG. 100C
| | | | | | | | | | | | | | | | | | | | | | | | | | | |
|---|---|---|---|---|---|---|---|---|---|---|---|---|---|---|---|---|---|---|---|---|---|---|---|---|---|---|
| A | 1 | 7 | 13 | 19 | 25 | 31 | 37 | 43 | 49 | 55 | 61 | 67 | 73 | 79 | 85 | 91 | 97 | 103 | 109 | 115 | 121 | 127 | 133 | 139 | 145 | 151 |
| B | 2 | 8 | 14 | 20 | 26 | 32 | 38 | 44 | 50 | 56 | 62 | 68 | 74 | 80 | 86 | 92 | 98 | 104 | 110 | 116 | 122 | 128 | 134 | 140 | 146 | 152 |
| C | 3 | 9 | 15 | 21 | 27 | 33 | 39 | 45 | 51 | 57 | 63 | 69 | 75 | 81 | 87 | 93 | 99 | 105 | 111 | 117 | 123 | 129 | 135 | 141 | 147 | 153 |
| D | 4 | 10 | 16 | 22 | 28 | 34 | 40 | 46 | 52 | 58 | 64 | 70 | 76 | 82 | 88 | 94 | 100 | 106 | 112 | 118 | 124 | 130 | 136 | 142 | 148 | 154 |
| E | 5 | 11 | 17 | 23 | 29 | 35 | 41 | 47 | 53 | 59 | 65 | 71 | 77 | 83 | 89 | 95 | 101 | 107 | 113 | 119 | 125 | 131 | 137 | 143 | 149 | 155 |
| F | 6 | 12 | 18 | 24 | 30 | 36 | 42 | 48 | 54 | 60 | 66 | 72 | 78 | 84 | 90 | 96 | 102 | 108 | 114 | 120 | 126 | 132 | 138 | 144 | 150 | 156 |

(1)

(2)

(3)

(4)

(5)

(6)

(7)

(8)

(9)

(10)

(11)

(12)

(13)

(14)

(15)

(16)

(17)

(18)

(19)

(20)

(41)

(42)

(43)

(44)

(45)

(46)

(47)

(48)

(49)

(50)

(51)

(52)

(53)

(54)

(55)

(56)

(57)

(58)

(59)

(60)

(61)

(62)

(63)

(64)

(65)

(66)

(67)

(68)

(69)

(70)

(71)

(72)

(73)

(74)

(75)

(76)

(77)

(78)

(79)

(80)

(81)

(82)

(83)

(84)

(85)

(86)

(87)

(88)

(89)

(90)

(91)

(92)

(93)

(94)

(95)

(96)

(97)

(98)

(99)

(100)

(11)

(12)

(13)

(14)

(15)

(16)

(17)

(18)

(19)

(20)

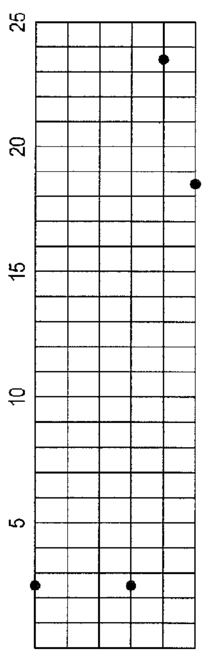
(21) FIG. 114A
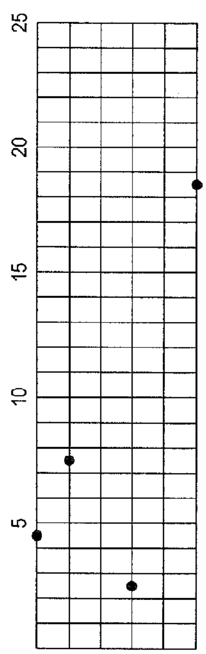
(22) FIG. 114B
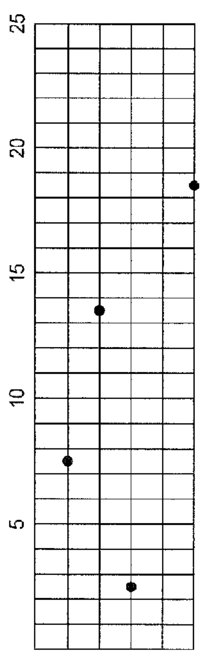
(23) FIG. 114C
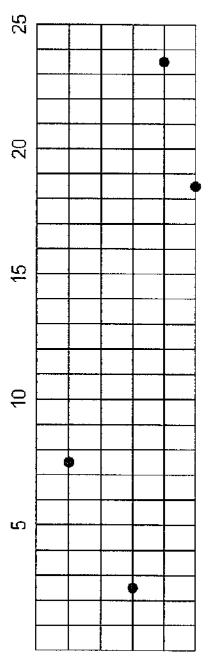
(24) FIG. 114D
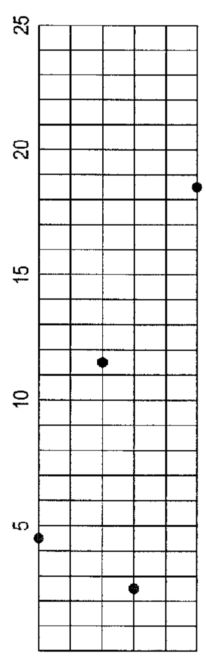
(25) FIG. 114E
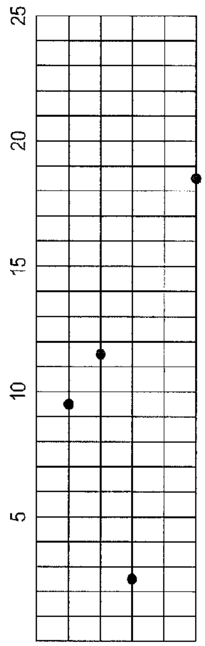
(26) FIG. 114F
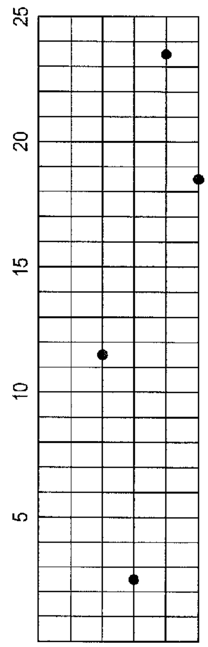
(27) FIG. 114G
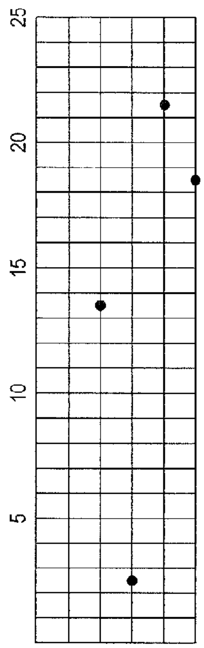
(28) FIG. 114H
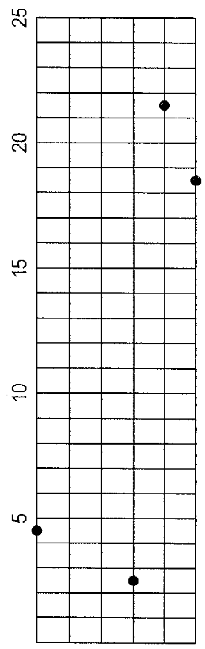
(29) FIG. 114I
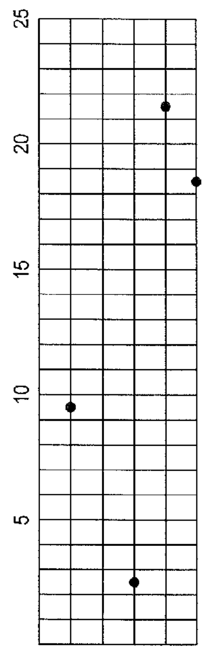
(30) FIG. 114J (31)

(32)

(33)

(34)

(35)

(36)

(37)

(38)

(39)

(40)

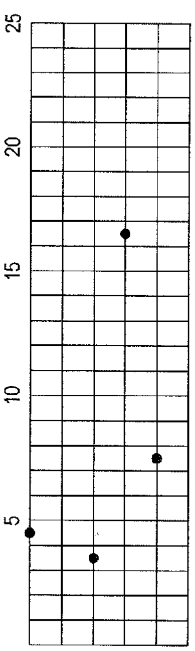
(41) FIG. 116A
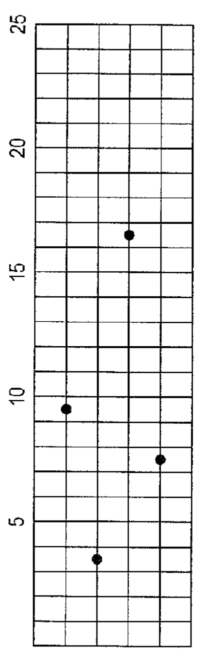
(42) FIG. 116B
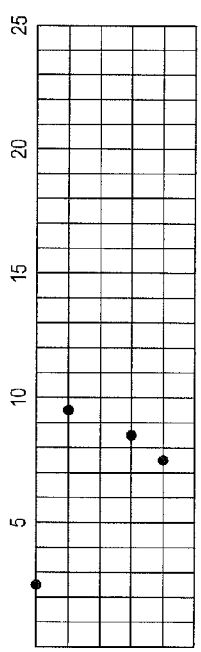
(43) FIG. 116C
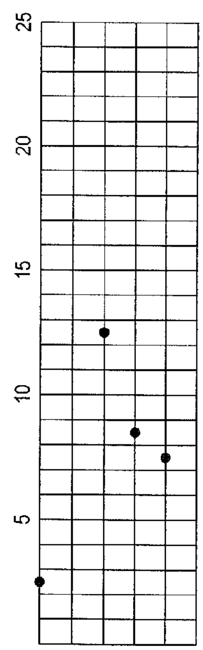
(44) FIG. 116D
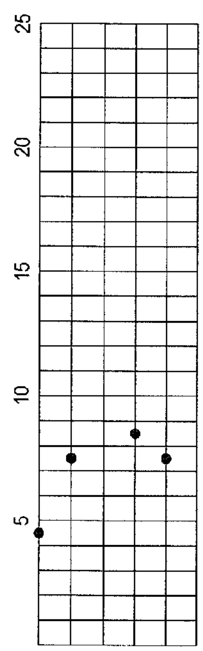
(45) FIG. 116E
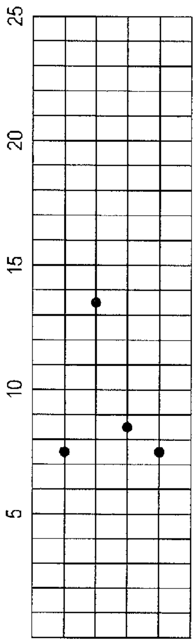
(46) FIG. 116F
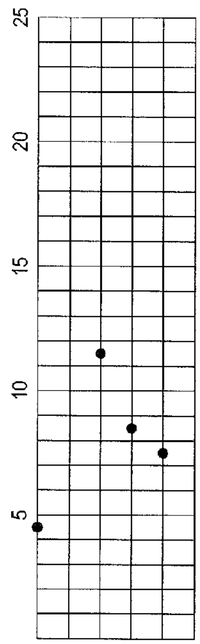
(47) FIG. 116G
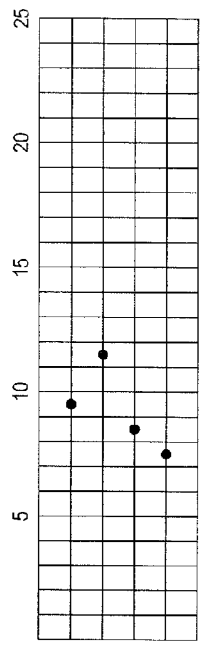
(48) FIG. 116H
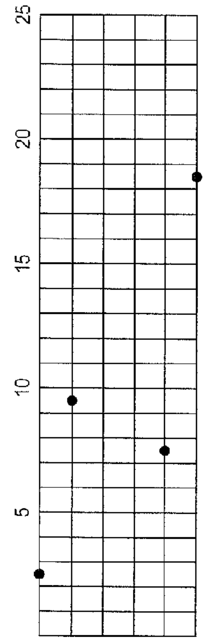
(49) FIG. 116I
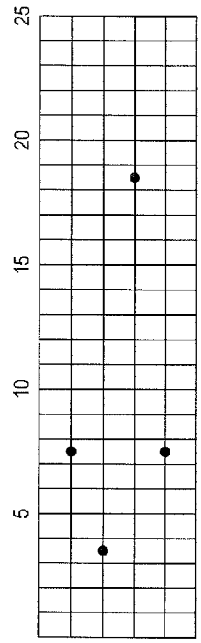
(50) FIG. 116J (61)

(62)

(63)

(64)

(65)

(66)

(67)

(68)

(69)

(70)

(71)

(72)

(73)

(74)

(75)

(76)

(77)

(78)

(79)

(80)

(91)

(92)

(93)

(94)

(95)

(96)

(97)

(98)

(99)

(100)

(101)

(102)

(103)

(104)

(105)

(106)

(107)

(108)

(109)

GUITAR TEACHING DATA CREATION DEVICE, GUITAR TEACHING SYSTEM, GUITAR TEACHING DATA CREATION METHOD, AND COMPUTER-READABLE STORAGE MEDIUM STORING GUITAR TEACHING DATA

CROSS-REFERENCE TO RELATED APPLICATIONS

This application is a continuation-in-part of International Application No. PCT/JP2013/007688, filed Dec. 27, 2013, which claims priority to Japanese Patent Application No. 2012-289220, filed Dec. 29, 2012. The contents of each of these applications are incorporated herein by reference in their entirety.

BACKGROUND

The present invention relates to a guitar teaching data creation device that creates teaching data, which is for displaying data necessary for basic training for playing guitar, and for assisting such teaching (training) of guitar, to a guitar teaching system including the guitar teaching data creation device, to a guitar teaching data creation method using the guitar teaching data creation device, to a guitar teaching data creation program for actuating the guitar teaching data creation device and to a computer-readable storage medium storing guitar teaching data.

With regard to a musical instrument such as a guitar, which is played by human fingers, it is one of the important teaching methods (training methods) to visually confirm an actual state of the fingers at a teaching time (training time) thereof. As this teaching method (training method), there are a method of actually watching a play of a teacher and learning a method of the play, a method of watching a video regarding fingering of the teacher, which is recorded by a video camera and the like, or a video formed by animating the video, and learning a play method therein, and the like.

Guitar is used in a variety of genres such as classical music, jazz, pop, rock'n'roll, flamenco, and modern music, and a musical instrument, technology and methodology thereof differ depending on the genres. Since the 1970's, in the U.S.A., an orientation toward new sounds has been enhanced from the scenes of jazz and rock'n'roll, and jazz guitarists who crossover the respective genres have appeared. However, contemporary basic technique and theory have not been able to be established due to a problem of a sound range of guitar and a problem of a mechanism on a fingerboard. In particular, though guitar has a difficult-to-understand mechanism on the fingerboard, a methodology for grasping the fingerboard arithmetically from bird's eyes has not been established, and accordingly, data for teaching, which is used for learning harmony and the mechanism, has been deficient, and a guitar training method using appropriate data for teaching has been undeveloped.

World-level skills required for the modern guitarists are four elements, which are score reading ability, playing ability, improvisation ability, and music composition ability. These four elements are elements common to all of jazz, classical music, modern music, rock'n'roll, pop and the like, and as a premise of these four elements, there is a "grasping ability for a musical instrument". It is conceived that the grasping force for the musical instrument is composed of four skills, which are learning of the chord technique, listening, acquisition of the mechanism on the fingerboard, and the score reading ability. The listening includes chord listening, counterpoint listening, and single melody listening; however, a listening technique for guitarist is not established. As an item of making it difficult to develop the guitarist's score reading ability, a conversion ability to shift the chord onto the fingerboard is regarded as a problem. By learning the above-described four skills, the world-level skills required for the modern guitarists are established. Hence, in guitar training software, it is necessary that the basic technique and the basic theory, which serve for training all of these techniques with high accuracy, be established while getting crossover of the genres.

Moreover, the conventional music production software is determined on the premise of positions of sounds on a piano keyboard, and accordingly, music production software that takes such a complicated mechanism on the guitar fingerboard into consideration is not proposed. That is to say, in a case of an electronic piano that is based on the piano keyboard, for example, there is proposed a guitar teaching data creation device that inputs finger information, which indicates which finger is to be used for each of musical notes for the purpose of playing, to guitar teaching data including information indicating a musical note sequence composing a musical composition. For example, there is proposed a guitar teaching data creation device including: input operators in which correspondences to the fingers are preset; storage means for storing guitar teaching data of an electronic piano; sound emitting means for reading out the guitar teaching data stored in the storage means, and emitting sounds of the electronic piano, which are based on respective musical notes of a musical note sequence concerned with the guitar teaching data; and finger information writing means for writing finger information indicating fingers, which correspond to input operators operated while the sounds are emitted by the sound emitting means, as finger information corresponding to musical notes concerned with the sound emission into the guitar teaching data stored in the storage means (refer to Japanese Patent No. 4186353).

However, on the piano keyboard, the position of each sound is single, and is displayed as a number in a form of tab score display. In the tab score display, input of the chord is an input of numbers, and there has been a problem that not only it can never be said that the tab score display concerned is easy to understand, but also the tab score display concerned is not proper to such display for enhancing the skills of the guitarist.

As described above, there has been a problem that the conventional music production software using the positions on the sounds on the piano keyboard as a lower structure is not software incorporating therein a program for assisting the enhancement of the ability to convert the harmony onto the guitar fingerboard, the conversion being most difficult for the guitarists.

In consideration of the above-described circumstances, it is an object of the present invention to provide a guitar teaching data creation device capable of mathematically grasping the difficult-to-understand mechanism on the fingerboard from bird's eyes and creating the data for teaching, which is necessary to enhance the skill for the conversion of the harmony onto the fingerboard, the conversion being the most difficult for the guitarists, and moreover, to provide a guitar teaching system including the guitar teaching data creation device, a guitar teaching data creation method using the guitar teaching data creation device, and a guitar teaching data creation program for actuating the guitar teaching data creation device.

BRIEF SUMMARY

In order to achieve the foregoing object, a first aspect of the present invention is summarized to be a guitar teaching data creation device including: a central processing unit including: (a) chord inputting means for executing processing for receiving chords; (b) distribution map creating means for collating respective sounds of the chords, which are received by the chord inputting means, with addresses of sounds on a fingerboard of a teaching-oriented guitar, and creating a distribution map of the respective sounds; (c) sequence creating means for creating sequences from the distribution map created by the distribution map creating means; (d) numerical diagram creating means for creating numerical diagrams from the sequences created by the sequence creating means; (e) graphic converting means for converting the numerical diagrams, which are created by the numerical diagram creating means, into graphics; and (f) display means for prioritizing all of the graphics, which are converted by the graphic converting means, and transmitting a signal to arrange and display the graphics.

A second aspect of the present invention relates to a guitar teaching system including a teaching-oriented guitar in which a light emitting source composed of a dot matrix is embedded in a finger board and including a central processing unit connected to the teaching-oriented guitar. Then, the second aspect of the present invention is summarized in that the central processing unit for use in the guitar teaching system according to the second aspect of the present invention includes: (a) chord inputting means for executing processing for receiving chords; (b) distribution map creating means for collating respective sounds of the chords, which are received by the chord inputting means, with addresses of sounds on a fingerboard of a teaching-oriented guitar, and creating a distribution map of the respective sounds; (c) sequence creating means for creating sequences from the distribution map created by the distribution map creating means; (d) numerical diagram creating means for creating numerical diagrams from the sequences created by the sequence creating means; (e) graphic converting means for converting the numerical diagrams, which are created by the numerical diagram creating means, into graphics; and (f) display means for prioritizing all of the graphics, which are converted by the graphic converting means, and transmitting a signal to arrange and display the graphics on the dot matrix.

A third aspect of the present invention is summarized to be a guitar teaching data creation method including: (a) a step of causing chord inputting means of a central processing unit to execute processing for receiving chords; (b) a step of causing distribution map creating means of the central processing unit to collate respective sounds of the chords, which are received by the chord inputting means, with addresses of sounds on a fingerboard of a teaching-oriented guitar, and to create a distribution map of the respective sounds; (c) a step of causing sequence creating means of the central processing unit to create sequences from the distribution map created by the distribution map creating means; (d) a step of causing numerical diagram creating means of the central processing unit to create numerical diagrams from the sequences created by the sequence creating means; (e) a step of causing graphic converting means of the central processing unit to convert the numerical diagrams, which are created by the numerical diagram creating means, into graphics; and (f) a step of causing display means of the central processing unit to prioritize all of the graphics, which are converted by the graphic converting means, and to transmit a signal to arrange and display the graphics, wherein the central processing unit creates guitar teaching data.

A program for realizing the guitar teaching data creation method mentioned in the third aspect of the present invention is stored in a computer-readable recording medium, causes a computer system to read the recording medium, and causes a central processing unit to execute a series of processing for creating guitar teaching data, and can thereby execute the guitar teaching data creation method of the present invention. That is to say, a fourth aspect of the present invention is summarized to be a computer-readable storage medium storing a guitar teaching data creation program for causing a computer to execute a process for creating guitar teaching data, the process including: (a) a step of executing processing for receiving chords; (b) a step of collating respective sounds of the received chords with addresses of sounds on a fingerboard of a teaching-oriented guitar, and creating a distribution map of the respective sounds; (c) creating sequences from the created distribution map; (d) creating numerical diagrams from the created sequences; (e) converting the created numerical diagrams into graphics; and (f) prioritizing all of the converted graphics, and transmitting a signal to arrange and display the graphics. As a recording medium that records the guitar teaching data creation program according to the fourth aspect of the present invention, for example, there is employable a medium capable of recording a program such as an external memory device of a computer, a semiconductor memory, a magnetic disk, an optical disk, a magneto-optical disk, a magnetic tape, or the like.

BRIEF DESCRIPTION OF THE DRAWINGS

FIG. 9 is a diagram illustrating data in which the integer value data in FIG. 7 and FIG. 8B are listed into lateral six sequences of A, B, C, D, E and F from the above.

FIGS. 21A to 21E are diagrams explaining examples of sequences created by sequence creating means from the distribution map of the respective sounds, which are illustrated in FIG. 20, in the guitar teaching data creation method according to the first embodiment.

FIG. 79 is a diagram for explaining the guitar teaching data creation method according to the third embodiment, illustrating a number table, which is based on Definition I, for each of seven sounds of $D_1$ to $Gb_2$ arrayed in a lateral direction.

FIG. 83 is a diagram for explaining the guitar teaching data creation method according to the third embodiment, illustrating relationships between changes of respective sounds on diatonic scales while taking C as a keynote in terms of score writing and substantial changes of the respective sounds in cases of major keys.

FIG. 93 is a diagram illustrating a definition of order of displaying diagrams for each three-part bodies to six-part bodies.

FIG. 98 is a diagram illustrating data in which the integer value data of 1 to 156 are listed into lateral sequences.

FIG. 100A is a distribution map created by distribution map creating means.

FIG. 100B is a diagram illustrating data in which the positions of the sounds on the fingerboard, which correspond to are the distribution map illustrated in FIG. 100A, are converted into integer values of 1 to 156.

FIG. 100C is a diagram illustrating data in which the integer value data in FIG. 100B are listed into lateral sequences of A, B, C, D, E and F.

FIGS. 104A to 104J are diagrams illustrating 31st to 40th numerical diagrams which the numerical diagram creating means create so as to correspond to sequences of 31st to 40th sequences.

FIGS. 105A to 105J are diagrams illustrating 41st to 50th numerical diagrams which the numerical diagram creating means create so as to correspond to sequences of 41st to 50th sequences.

FIGS. 106A to 106J are diagrams illustrating 51st to 60th numerical diagrams which the numerical diagram creating means create so as to correspond to sequences of 51st to 60th sequences.

FIGS. 107A to 107J are diagrams illustrating 61st to 70th numerical diagrams which the numerical diagram creating means create so as to correspond to sequences of 61st to 70th sequences.

FIGS. 108A to 108J are diagrams illustrating 71st to 80th numerical diagrams which the numerical diagram creating means create so as to correspond to sequences of 71st to 80th sequences.

FIGS. 109A to 109J are diagrams illustrating 81st to 90th numerical diagrams which the numerical diagram creating means create so as to correspond to sequences of 81st to 90th sequences.

FIGS. 110A to 110J are diagrams illustrating 91st to 100th numerical diagrams which the numerical diagram creating means create so as to correspond to sequences of 91st to 100th sequences.

FIGS. 111A to 111I are diagrams illustrating 101st to 109th numerical diagrams which the numerical diagram creating means create so as to correspond to sequences of 101st to 109th sequences.

FIGS. 112A to 112J are diagrams illustrating diagrams in which graphic converting means express the first to tenth numerical diagrams, which are illustrated in FIGS. 101A to 101J, by arrays of dots.

FIGS. 113A to 113J are diagrams illustrating diagrams in which the graphic converting means express the 11th to 20th numerical diagrams, which are illustrated in FIGS. 102A to 102J, by arrays of dots.

FIGS. 114A to 114J are diagrams illustrating diagrams in which the graphic converting means express the 21st to 30th numerical diagrams, which are illustrated in FIGS. 103A to 103J, by arrays of dots.

FIGS. 115A to 115J are diagrams illustrating diagrams in which the graphic converting means express the 31st to 40th numerical diagrams, which are illustrated in FIGS. 104A to 104J, by arrays of dots.

FIGS. 116A to 116J are diagrams illustrating diagrams in which the graphic converting means express the 41st to 50th numerical diagrams, which are illustrated in FIGS. 105A to 105J, by arrays of dots.

FIGS. 117A to 117J are diagrams illustrating diagrams in which the graphic converting means express the 51st to 60th numerical diagrams, which are illustrated in FIGS. 106A to 106J, by arrays of dots.

FIGS. 118A to 118J are diagrams illustrating diagrams in which the graphic converting means express the 61st to 70th numerical diagrams, which are illustrated in FIGS. 107A to 107J, by arrays of dots.

FIGS. 119A to 119J are diagrams illustrating diagrams in which the graphic converting means express the 71st to 80th numerical diagrams, which are illustrated in FIGS. 108A to 108J, by arrays of dots.

FIGS. 120A to 120J are diagrams illustrating diagrams in which the graphic converting means express the 81st to 90th numerical diagrams, which are illustrated in FIG. 109A to 109J, by arrays of dots.

FIGS. 121A to 121J are diagrams illustrating diagrams in which the graphic converting means express the 91st to 100th numerical diagrams, which are illustrated in FIGS. 110A to 110J, by arrays of dots.

FIGS. 122A to 122I are diagrams illustrating diagrams in which the graphic converting means express the 101 to 109th numerical diagrams, which are illustrated in FIGS. 111A to 111I, by arrays of dots.

Figure 123A:
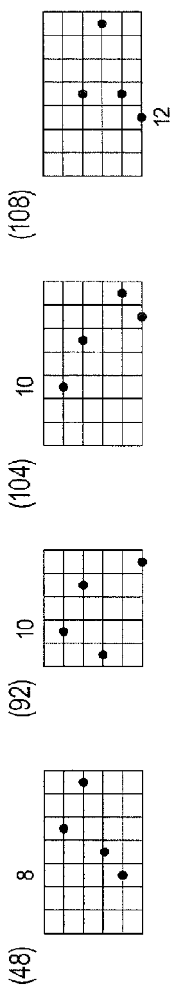
Figure 123B:
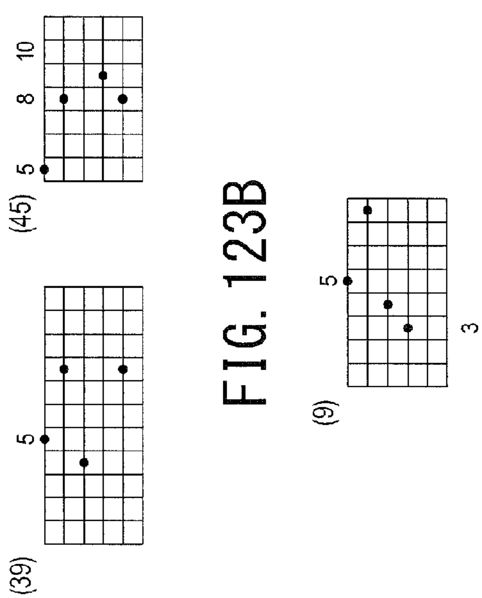
Figure 123C:
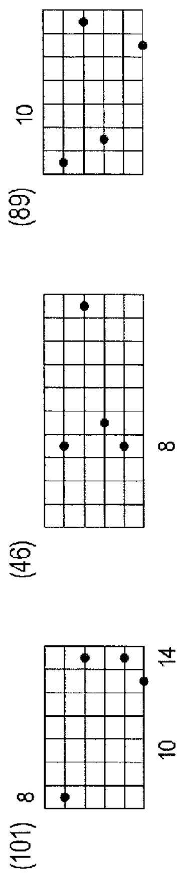
Figure 123D:
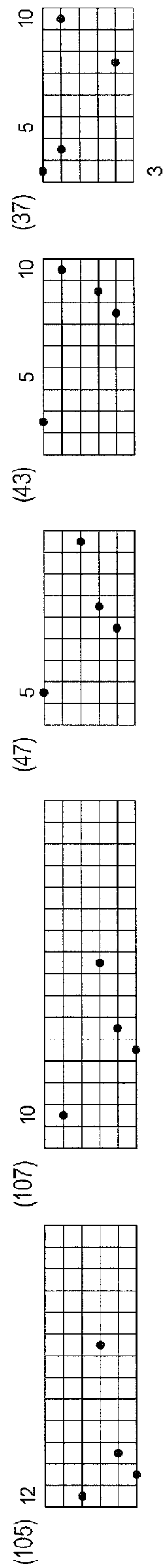

FIG. 123A is a diagram illustrating a diagram (graphics) extending over 5 frets, FIG. 123B is a diagram illustrating a diagram extending over 6 frets, FIG. 123C is a diagram illustrating diagrams extending over 7 frets, and FIG. 123D is a diagram illustrating diagrams extending over 8 frets.

Figure 124A:
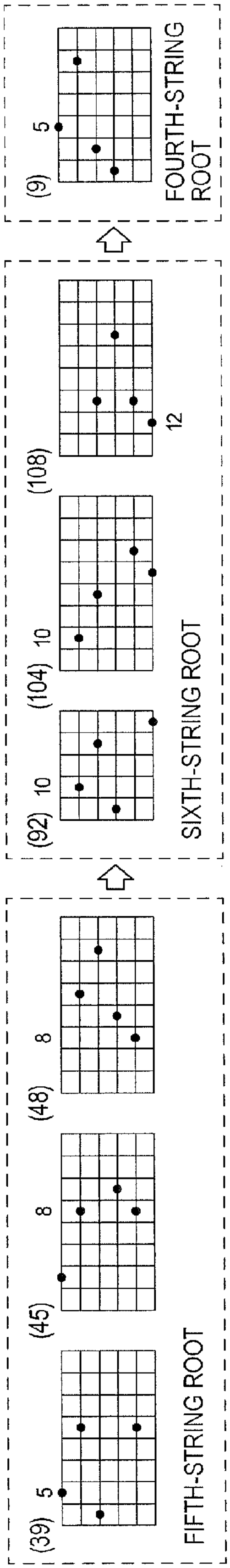
Figure 124B:
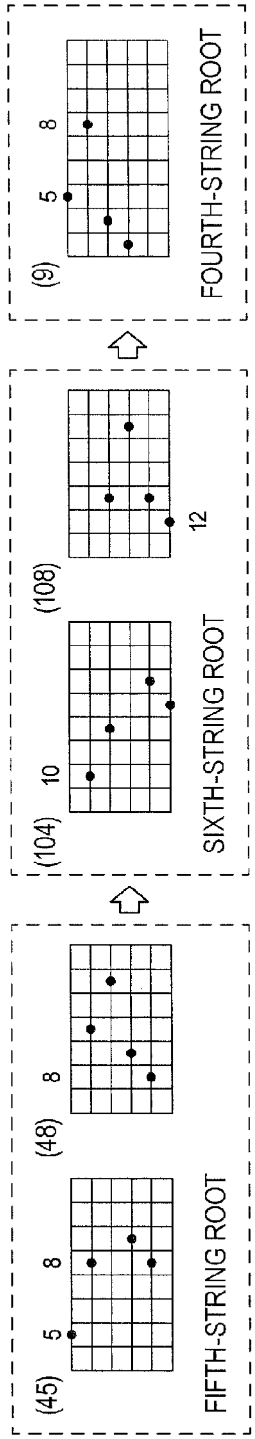
Figure 124C:
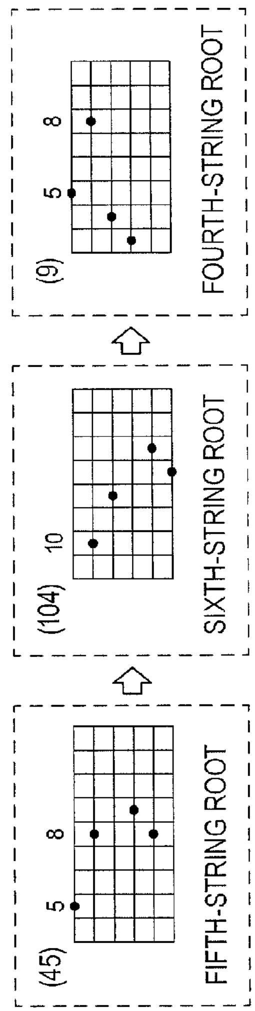

FIG. 124A is a diagram illustrating diagrams within 5 frets arranged in order of fifth-string root, sixth-string root and four-string root, FIG. 124B is a diagram illustrating diagrams prioritized for each fifth-string root, sixth-string root and four-string root, and FIG. 124C is a diagram illustrating highest-priority diagrams arranged in order of fifth-string root, sixth-string root and four-string root.

Figure 125A:
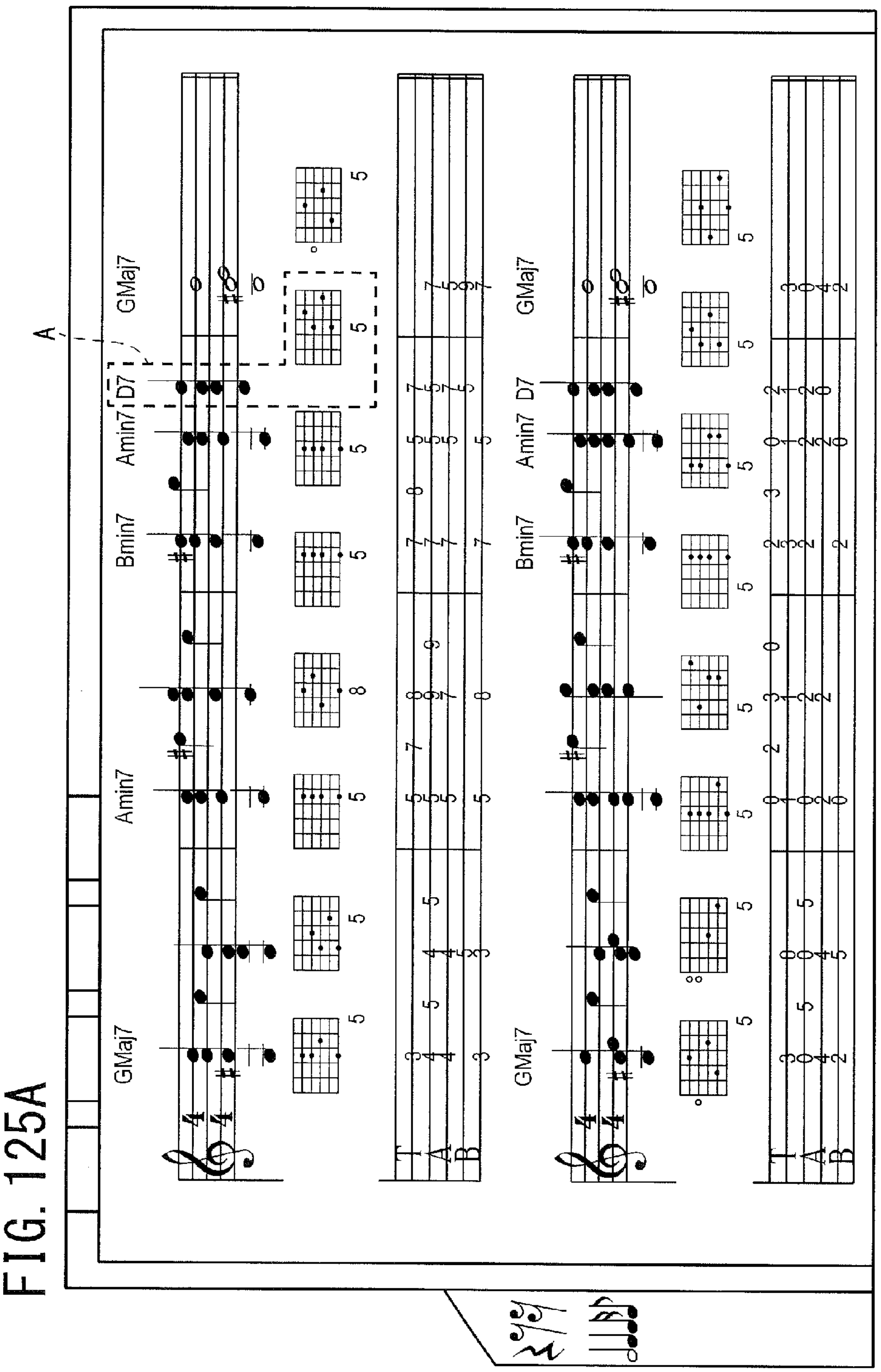

FIG. 125A is a diagram explaining a musical score, diagrams, a tab score displayed on a monitor (display device).

Figure 125B:
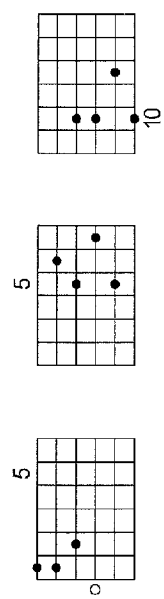

FIG. 125B is a diagram illustrating diagrams sequentially displayed by clicking the diagram illustrated in FIG. 125A.

Figure 126:
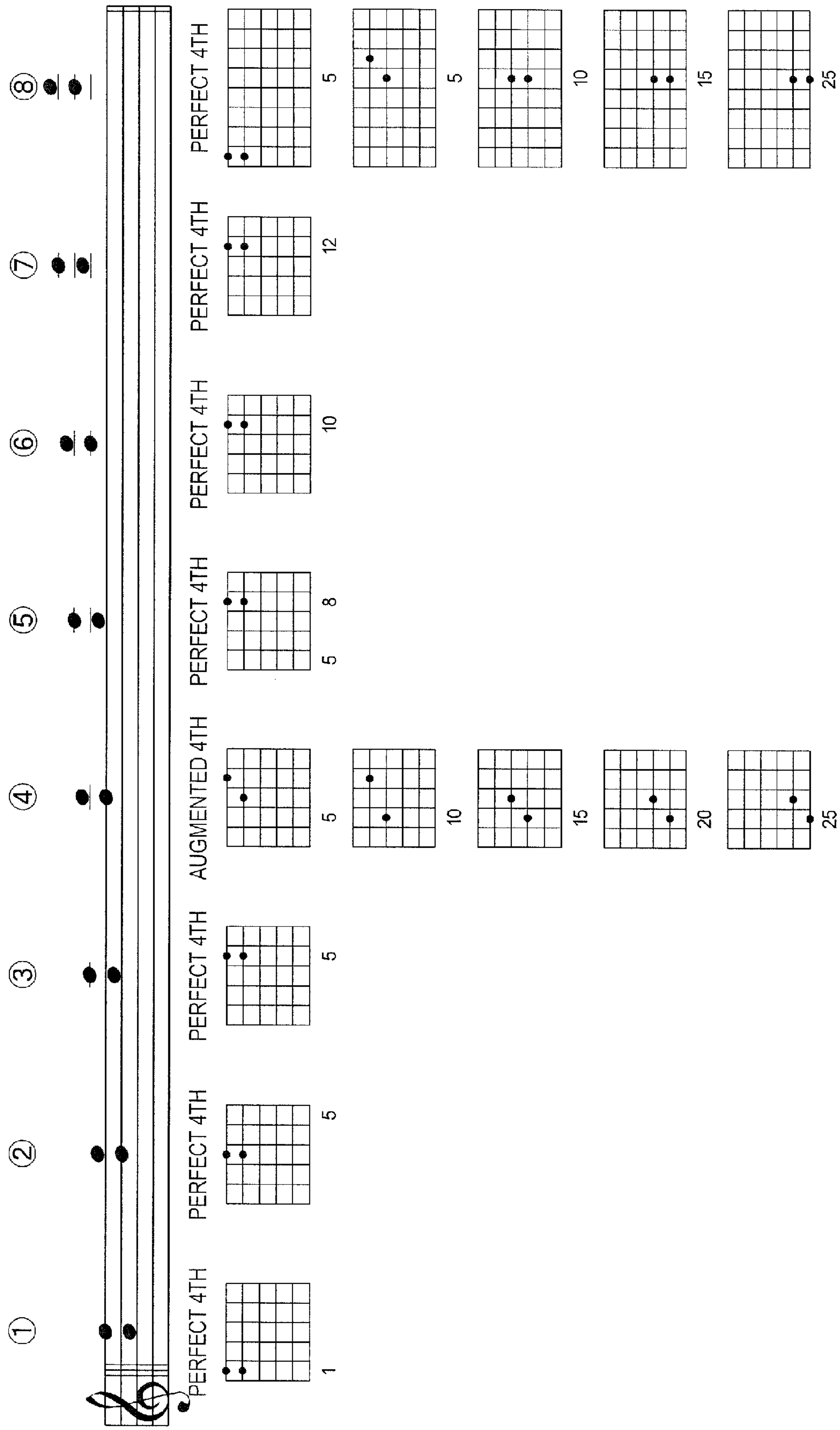

FIG. 126 is a diagram illustrating a definition of addresses of 4th interval with a whole key signature.

Figure 127A:
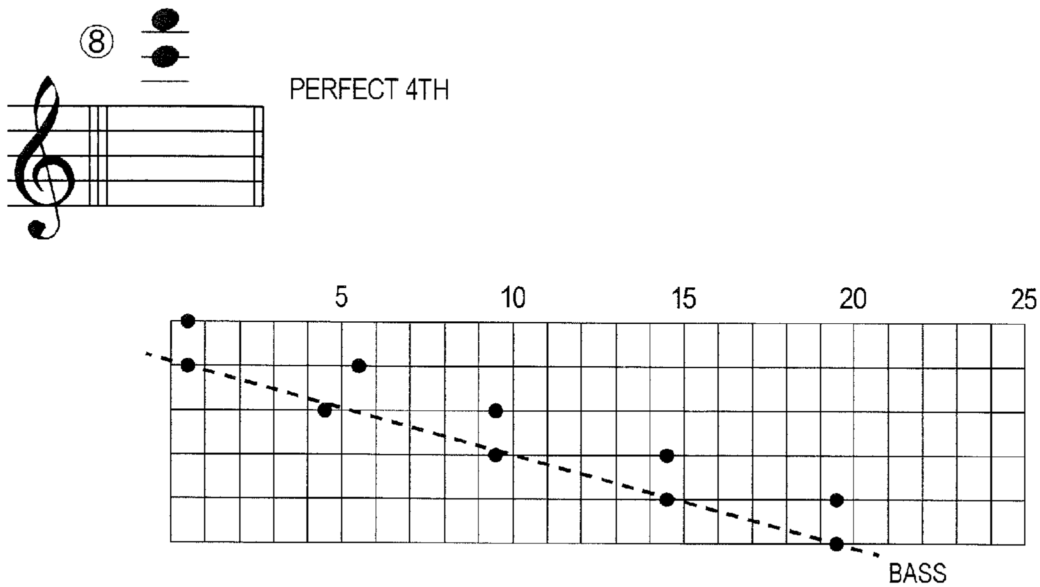
Figure 127B:
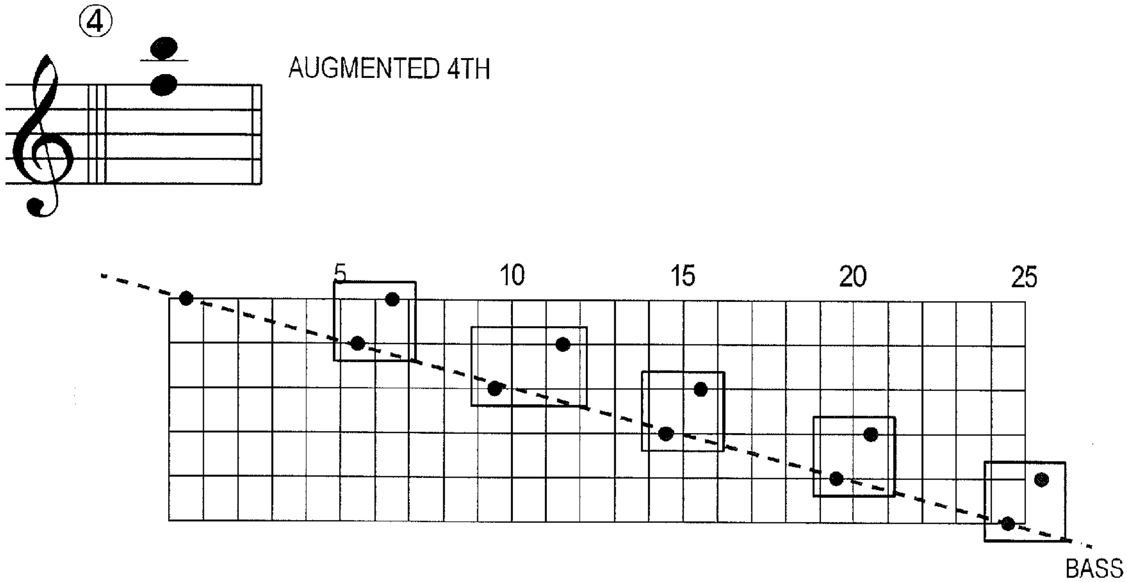

FIG. 127A is a diagram illustrating a definition of addresses on the fingerboard corresponding to a perfect 4th interval of 8th scale illustrated in FIG. 126, and FIG. 127B is a diagram illustrating a definition of addresses on the fingerboard corresponding to a perfect 4th interval of 4th scale illustrated in FIG. 126.

Figure 128:
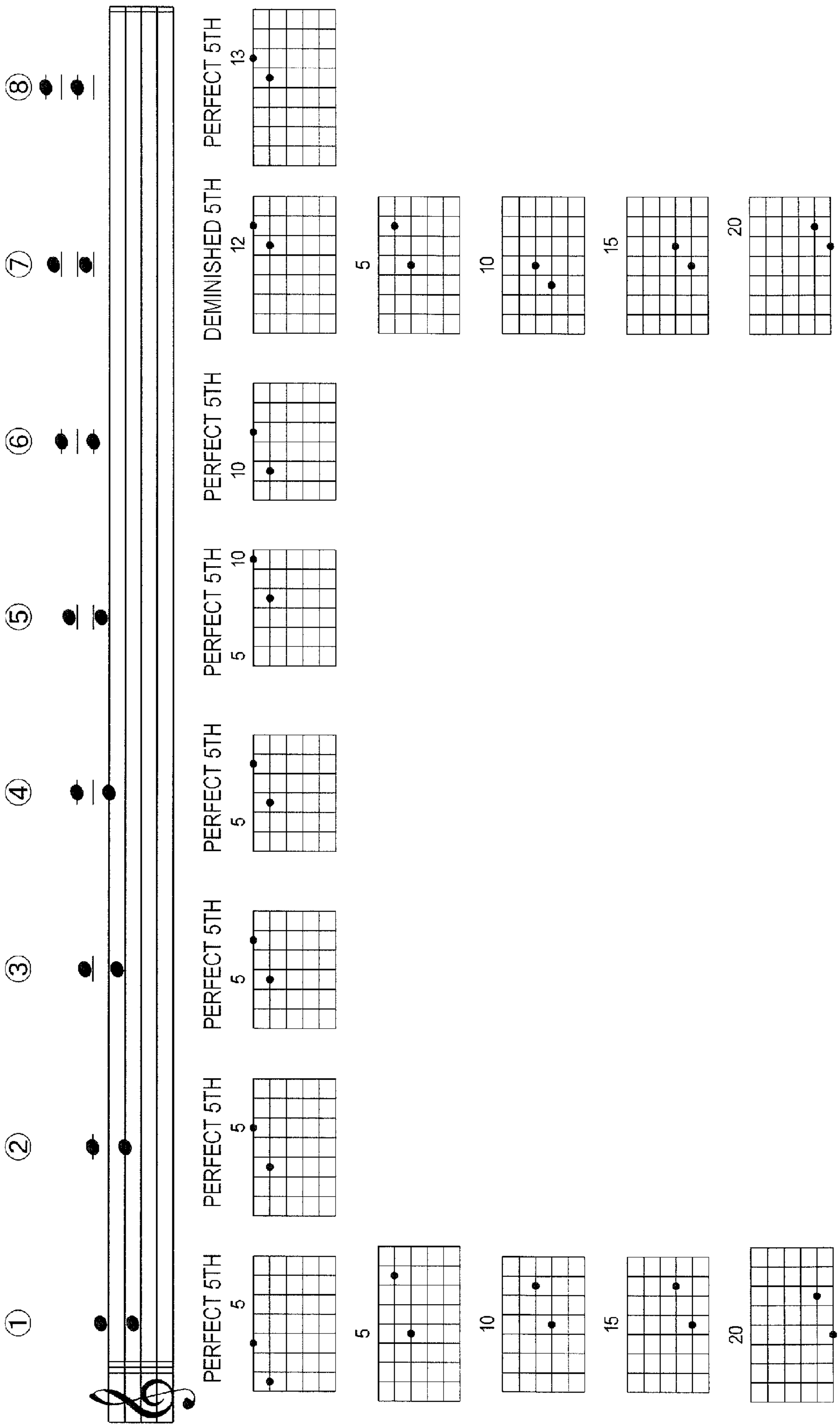

FIG. 128 is a diagram illustrating a definition of addresses of 5th interval with the whole key signature.

Figure 129A:
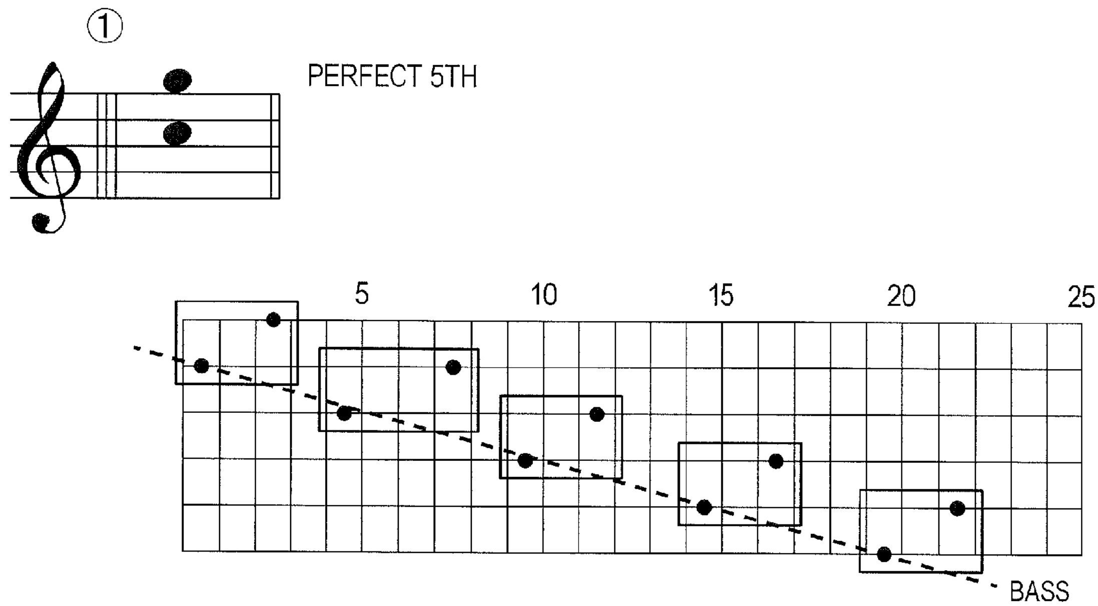
Figure 129B:
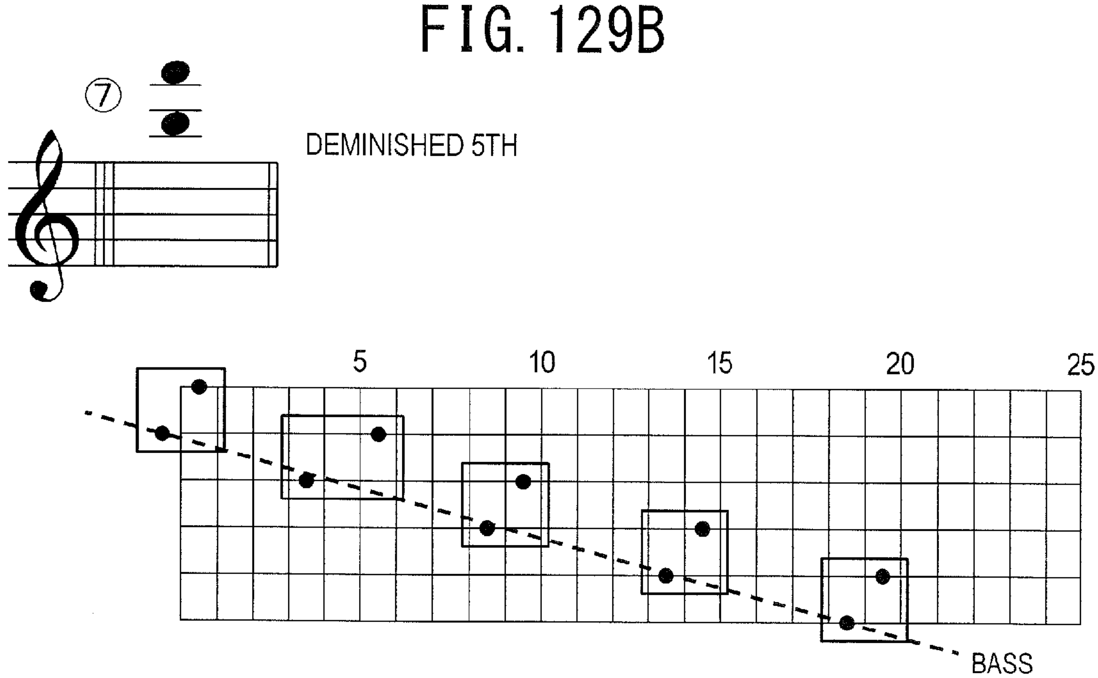

FIG. 129A is a diagram illustrating a definition of addresses on the fingerboard corresponding to a perfect 5th interval of first scale illustrated in FIG. 128, and FIG. 129B is a diagram illustrating a definition of addresses on the fingerboard corresponding to a diminished 5th interval of 7th scale illustrated in FIG. 128.

Figure 130:
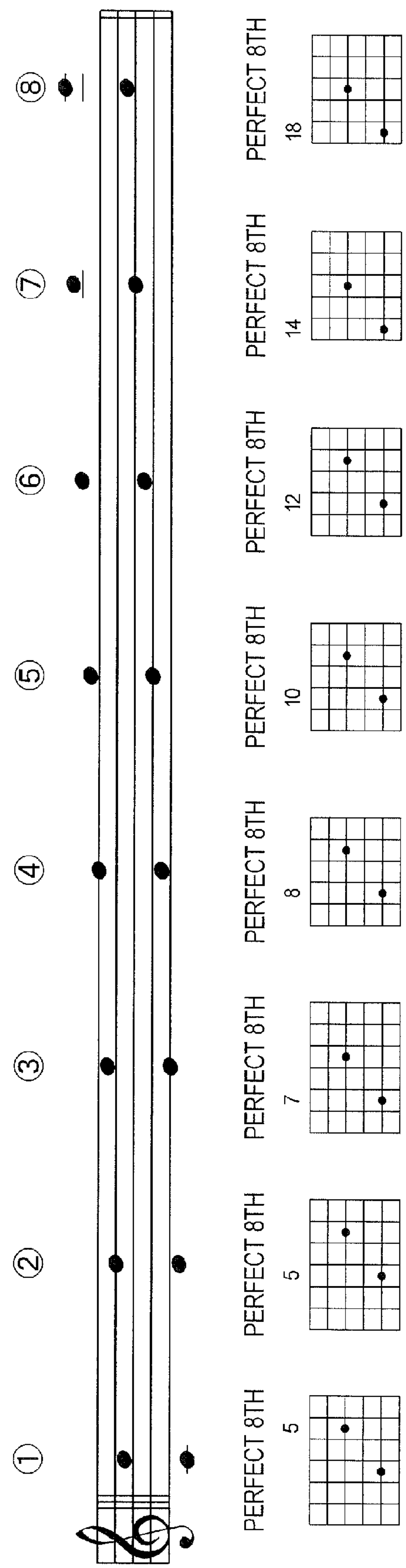

FIG. 130 is a diagram illustrating a definition of addresses of 8th interval with the whole key signature.

Figure 131A:
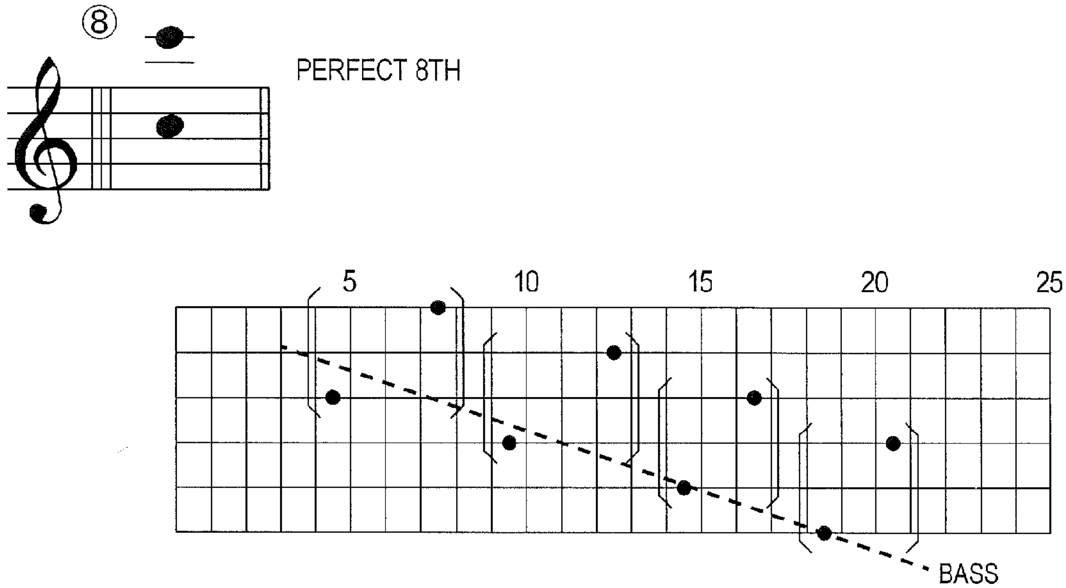
Figure 131B:
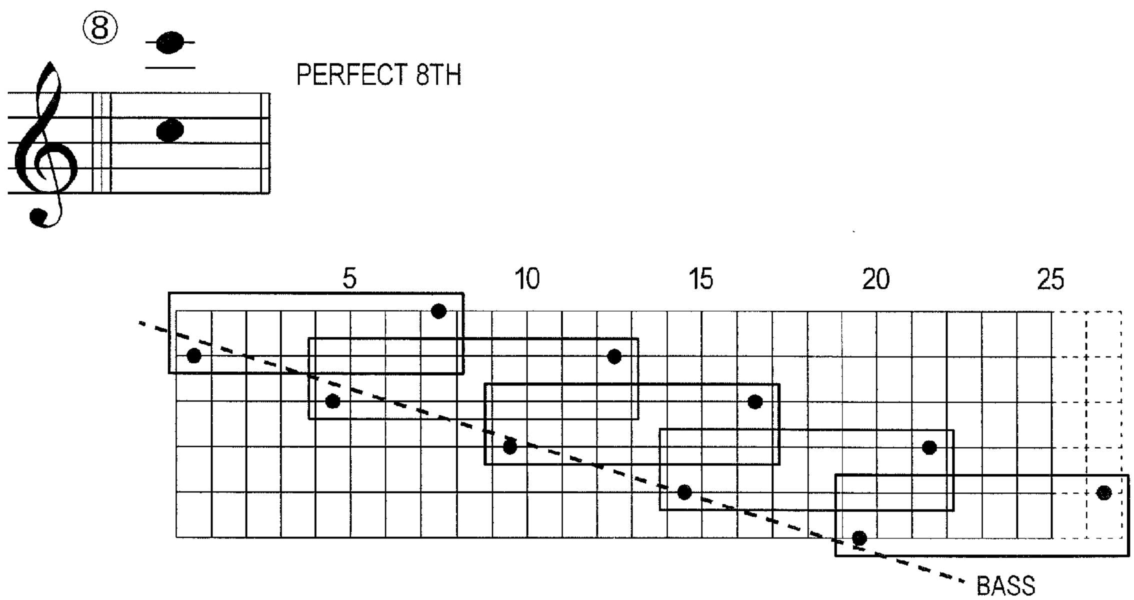

FIG. 131A is a diagram illustrating a definition of highest-priority addresses on the fingerboard corresponding to a perfect 8th interval of 8th scale illustrated in FIG. 130, and FIG. 131B is a diagram illustrating a definition of second priority addresses on the fingerboard corresponding to a diminished 8th interval of 8th scale illustrated in FIG. 130.

Figure 132:
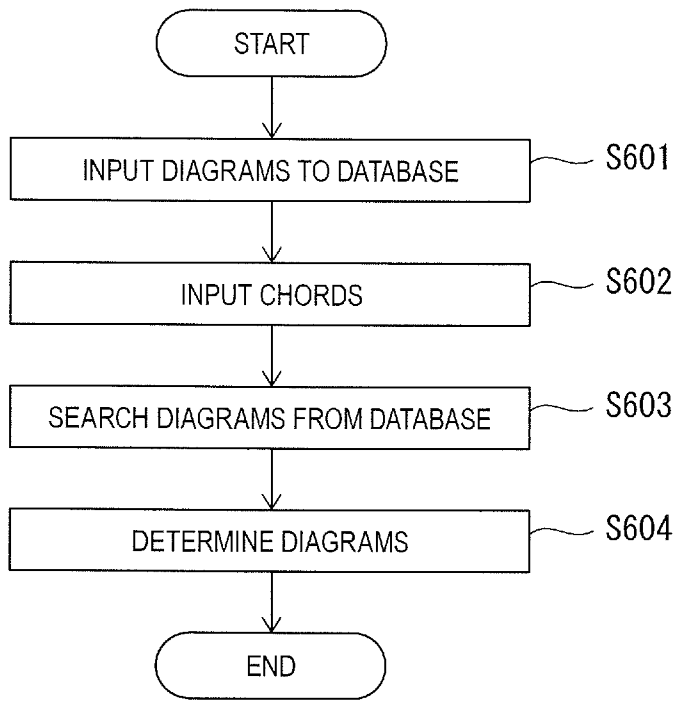

FIG. 132 is a flowchart explaining a part of a principal portion of a guitar teaching data creation method according to another embodiment of the present invention.

Figure 133A:
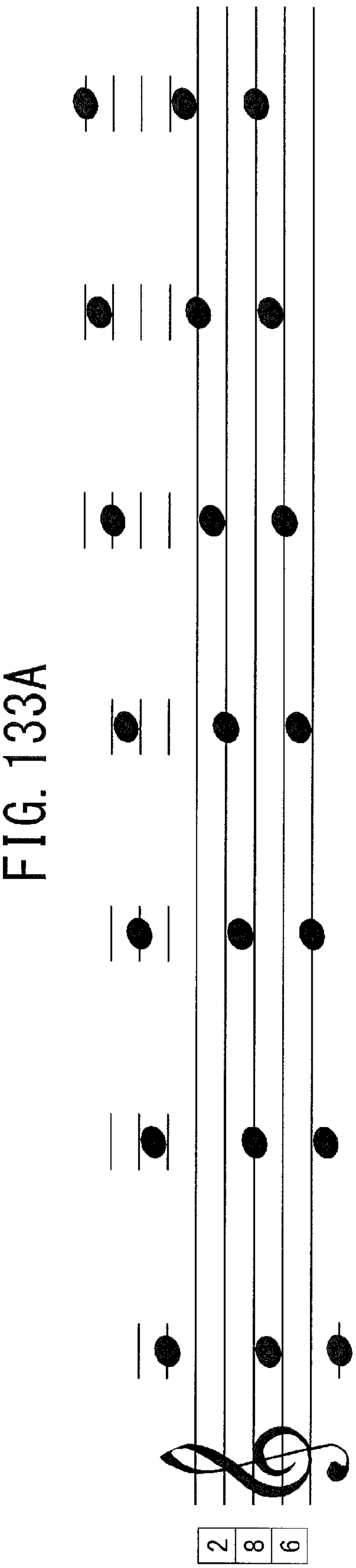
Figure 133B:
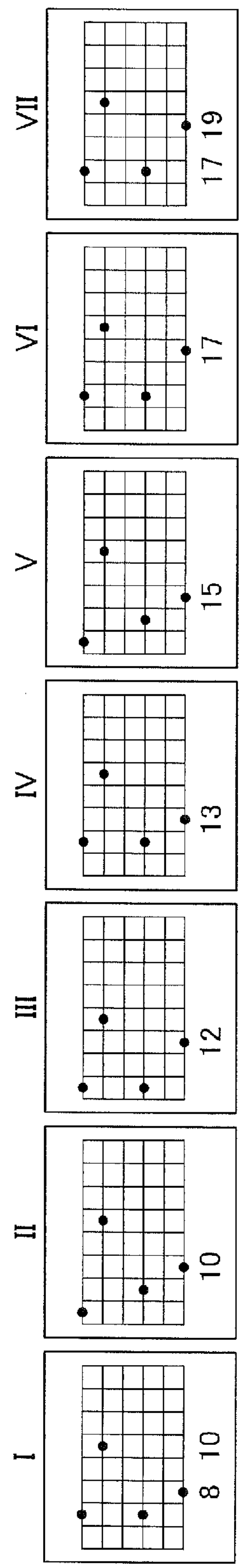

FIG. 133B is examples of diagrams inputted to a database in advance in the guitar teaching data creation method illustrated in the flowchart illustrated in FIG. 132, and FIG. 133A is a diagram illustrating chords inputted to the database together with the diagrams in response to FIG. 133B (No. 1).

Figure 134A:
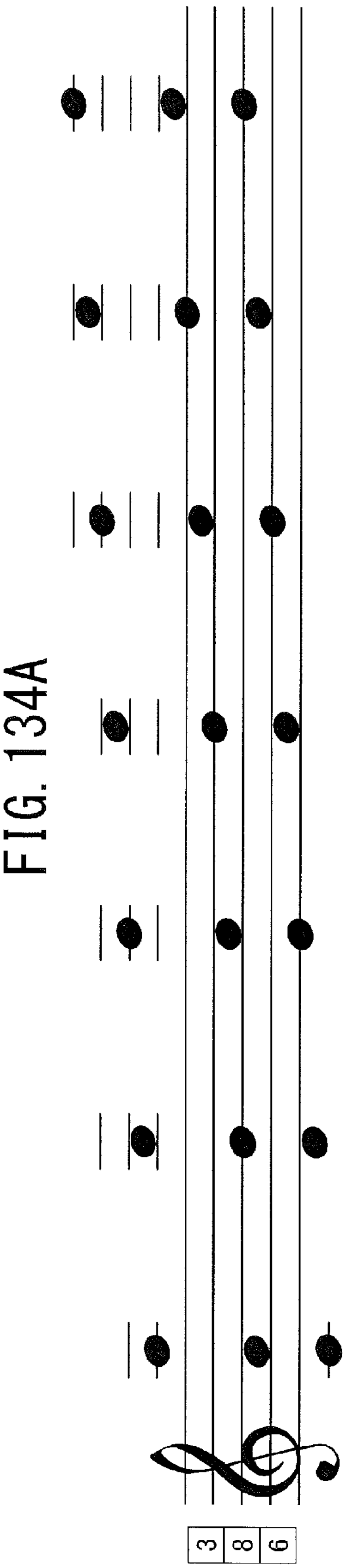
Figure 134B:
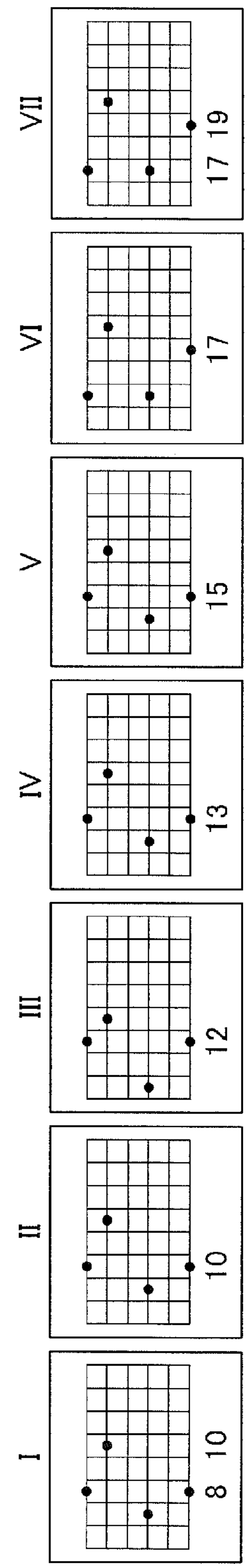

FIG. 134B is examples of diagrams inputted to a database in advance in the guitar teaching data creation method illustrated in the flowchart illustrated in FIG. 132, and FIG. 134A is a diagram illustrating chords inputted to the database together with the diagrams in response to FIG. 134B (No. 2).

Figure 135A:
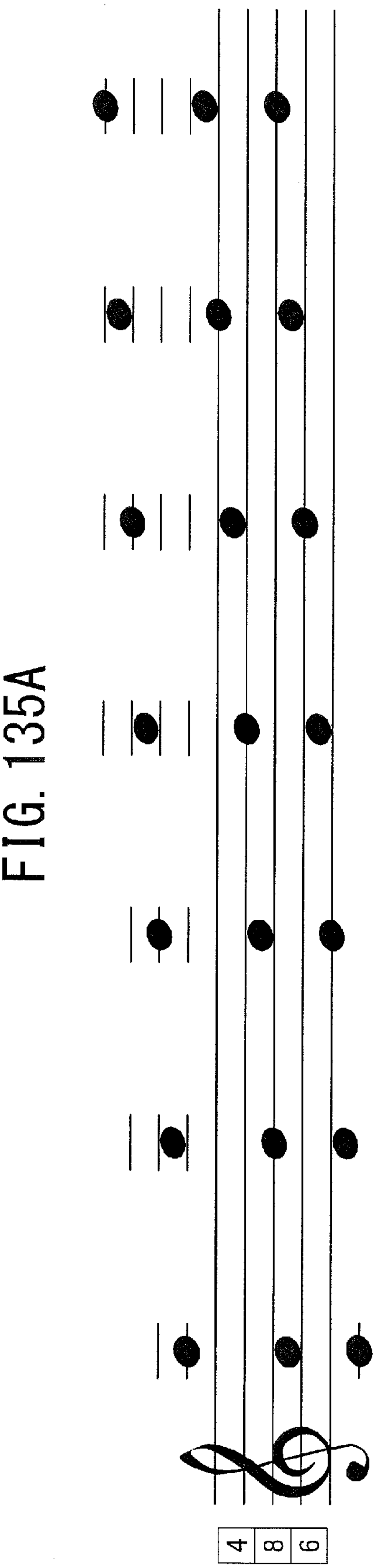
Figure 135B:
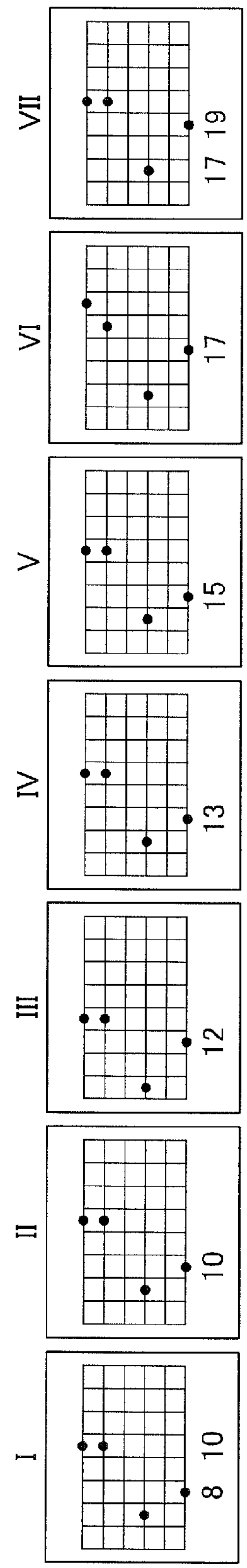

FIG. 135B is examples of diagrams inputted to a database in advance in the guitar teaching data creation method illustrated in the flowchart illustrated in FIG. 132, and FIG. 135A is a diagram illustrating chords inputted to the database together with the diagrams in response to FIG. 135B (No. 3).

Figure 136A:
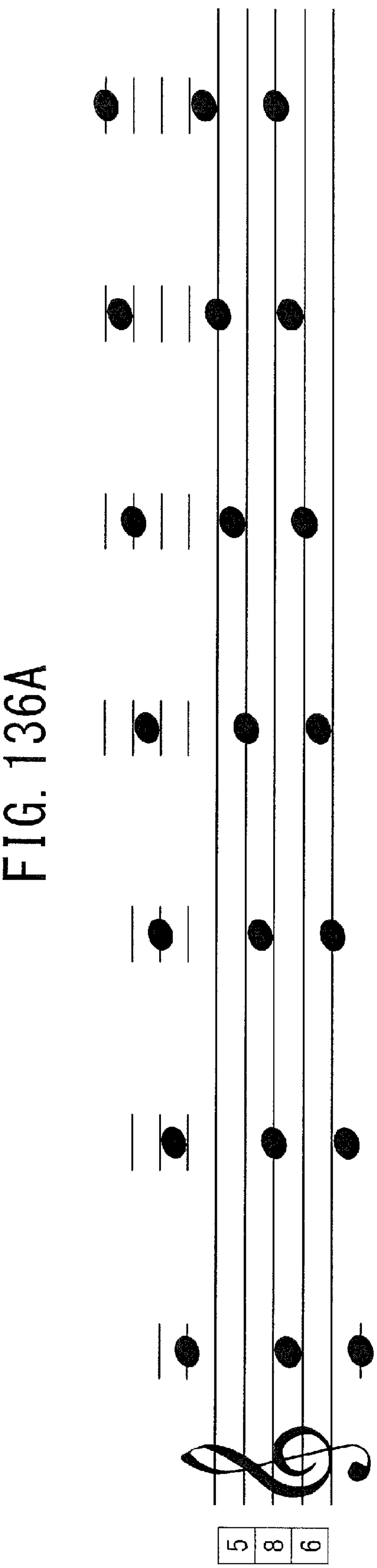
Figure 136B:
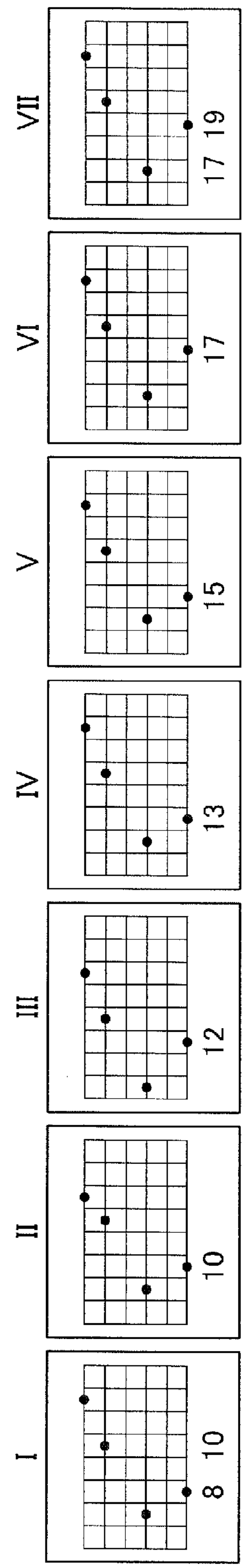

FIG. 136B is examples of diagrams inputted to a database in advance in the guitar teaching data creation method illustrated in the flowchart illustrated in FIG. 132, and FIG. 136A is a diagram illustrating chords inputted to the database together with the diagrams in response to FIG. 136B (No. 4).

Figure 137A:
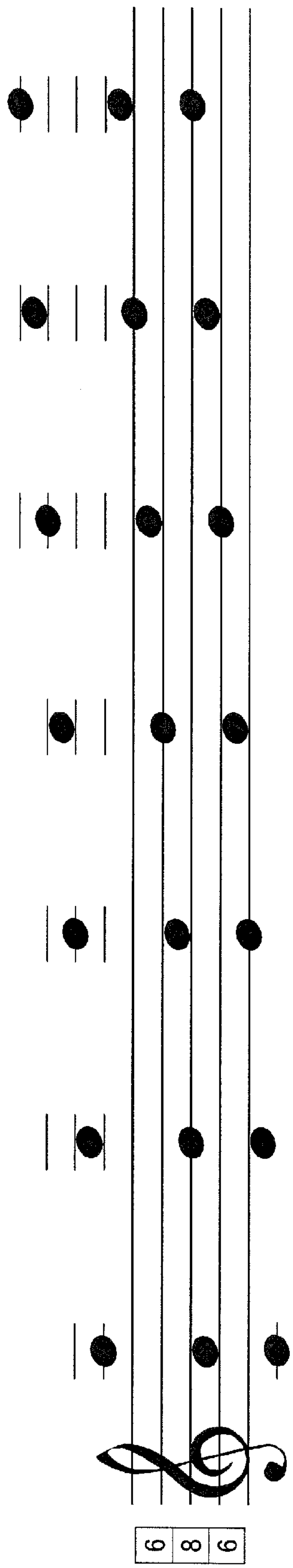
Figure 137B:
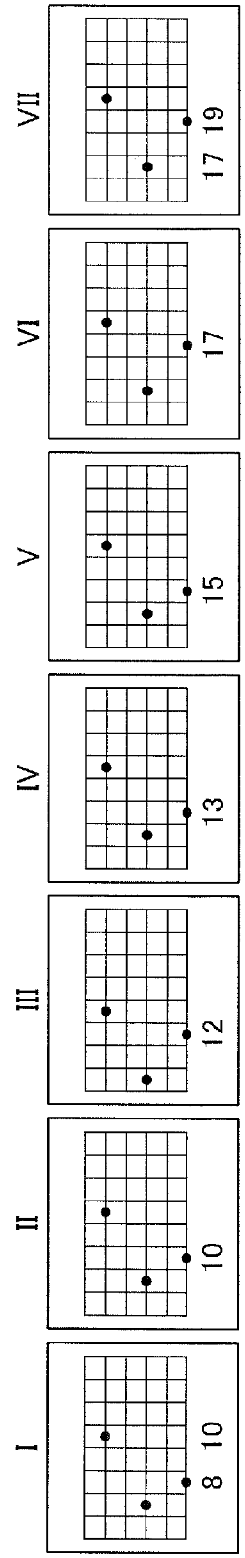

FIG. 137B is examples of diagrams inputted to a database in advance in the guitar teaching data creation method illustrated in the flowchart illustrated in FIG. 132, and FIG. 137A is a diagram illustrating chords inputted to the database together with the diagrams in response to FIG. 137B (No. 5).

DETAILED DESCRIPTION

Next, a description is made of first to fourth embodiments of the present invention with reference to the drawings. In the following description referring to the drawings, the same or similar numerals are assigned to the same or similar portions. However, the drawings are schematic, and as a matter of course, portions different in mutual dimensional relationships and ratios are incorporated also among the drawings. Moreover, the first to fourth embodiments described below are those which exemplify devices and methods for embodying the technical idea of the present invention, and the technical idea of the present invention does not specify exemplified chords, shapes of constituent components, structure, arrangement, number of strings, number of frets, and the like of a guitar for teaching to those described below. In particular, with regard to musical notes displayed on the respective drawings, the musical notes concerned should be originally written as whole notes; however, include those written as quarter notes without tails in order to facilitate the understanding. The technical idea of the present invention can be modified in various ways within the technical scope described in the claims.

(First Embodiment)

Figure 1:
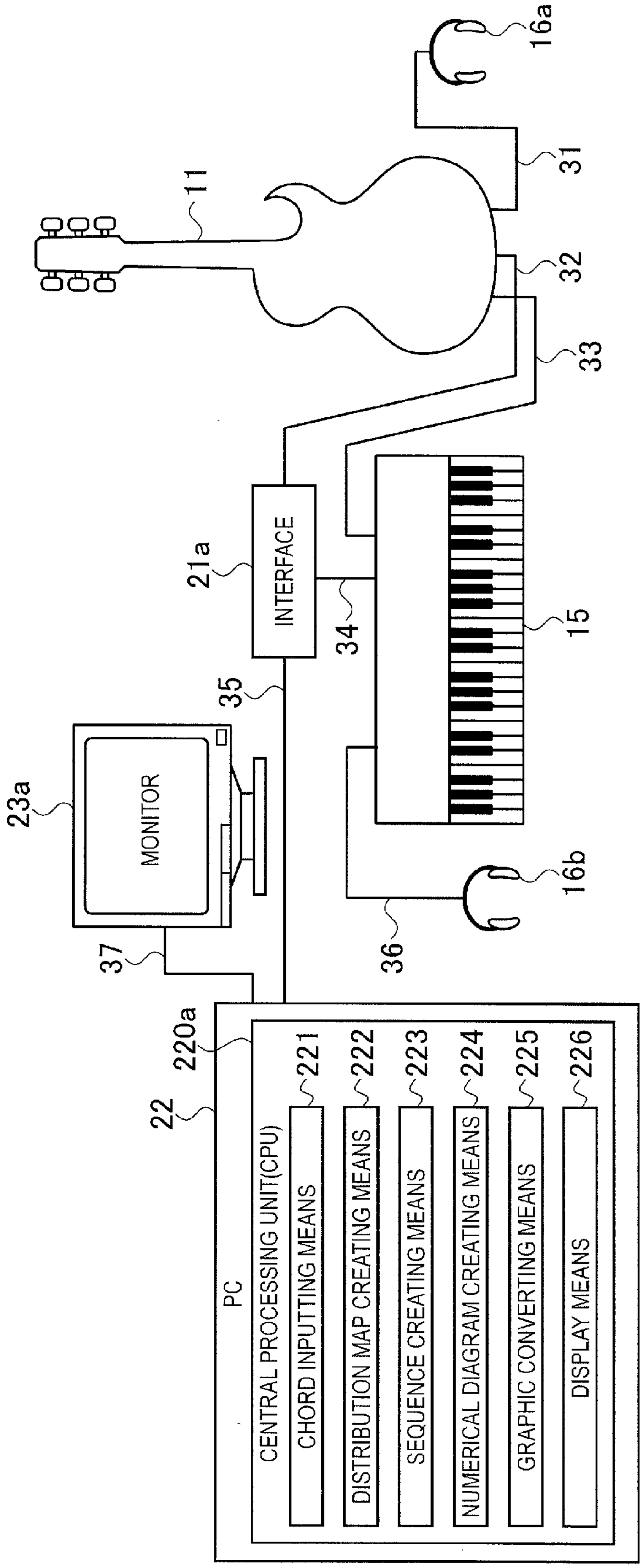
FIG. 1 is a schematic block diagram illustrating a schematic configuration of principal portions of a guitar teaching system according to a first embodiment of the present invention.

As illustrated in FIG. 1, a guitar teaching system according to the first embodiment of the present invention includes: a guitar for teaching (teaching-oriented guitar: training guitar) 11; an interface 21*a* connected to the teaching-oriented guitar 11 via a wire 32; a guitar teaching data creation device 22 connected to the interface 21*a* via a wire 35; a monitor (display device) 23*a* connected to the guitar teaching data creation device 22 via a wire 37; and a piano keyboard-type keyboard 15 such as a MIDI keyboard connected to the interface 21*a* via a wire 34. The teaching-oriented guitar 11 and the piano keyboard-type keyboard 15 are connected to each other via a wire 33. Moreover, a headphone 16*a* is connected to the teaching-oriented guitar 11 via a wire 31, and a headphone 16*b* is connected to the piano keyboard-type keyboard 15 via a wire 36.

As illustrated in FIG. 1, the guitar teaching data creation device 22 is a processor including a central processing unit (CPU) 220*a* having: chord inputting means 221 for executing processing for receiving chords; distribution map creating means 222 for creating a distribution map of respective sounds of the chords, which are received by the chord inputting means 221, by collating the respective sounds with sound addresses on a fingerboard of the teaching-oriented guitar 11; sequence creating means 223 for creating sequences from the distribution map created by the distribution map creating means 222; numerical diagram creating means 224 for creating numerical diagrams of respective combinations from the sequences created by the sequence creating means 223; graphic converting means 225 for converting the numerical diagrams, which are created by the numerical diagram creating means 224, into graphics; and display means 226 for prioritizing all of the graphics of the numerical diagrams converted by the graphic converting means 225, and transmitting a signal to display the graphics while arranging the graphics. For example, the guitar teaching data creation device 22 can be realized by a computer system such as a personal computer (PC); however, it may be realized by a form of a monolithic IC such as a semiconductor chip and a form of a hybrid IC or module. In a case where the guitar teaching data creation device 22 is composed of a PC, the monitor 23*a* may be built in the guitar teaching data creation device 22, or may be composed integrally with the guitar teaching data creation device 22. Meanwhile, in a case where the guitar teaching data creation device 22 is composed of a hybrid IC or module, it is also possible to package the guitar teaching data creation device 22 in an inside of the monitor 23*a*, or to package the guitar teaching data creation device 22 in an inside of the teaching-oriented guitar 11.

Figure 5:
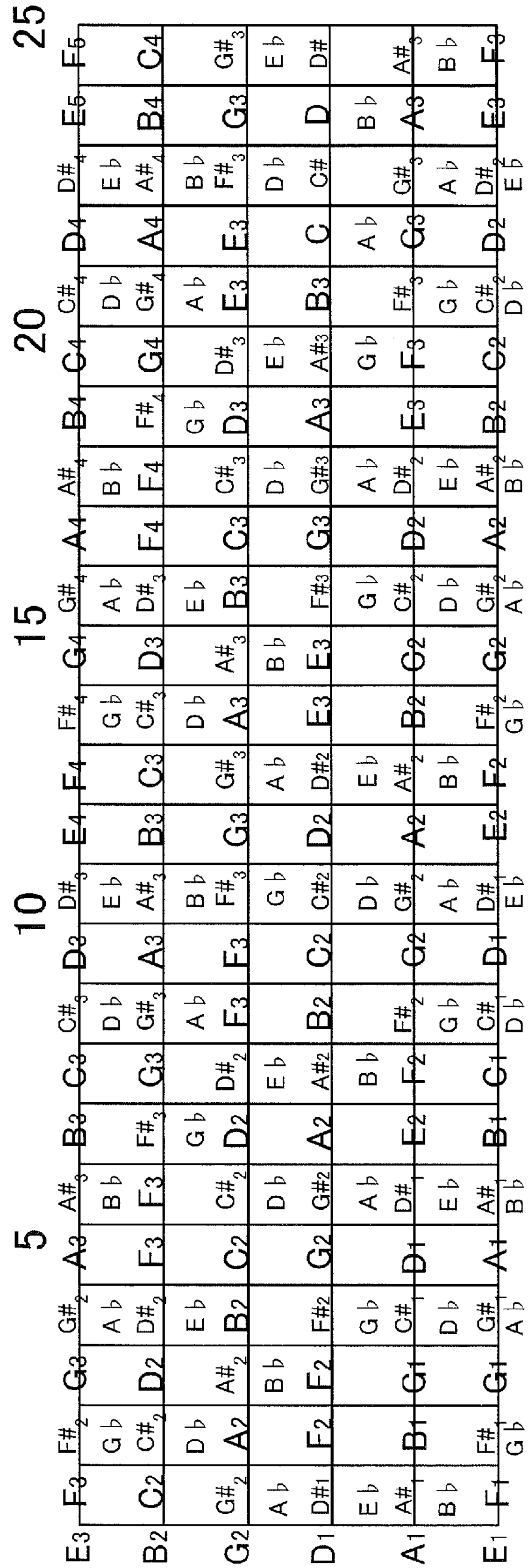
FIG. 5 is a diagram illustrating, by English letter display, data which indicate positions of sounds on a fingerboard of a six-string guitar having 25 frets.
Figure 6A:
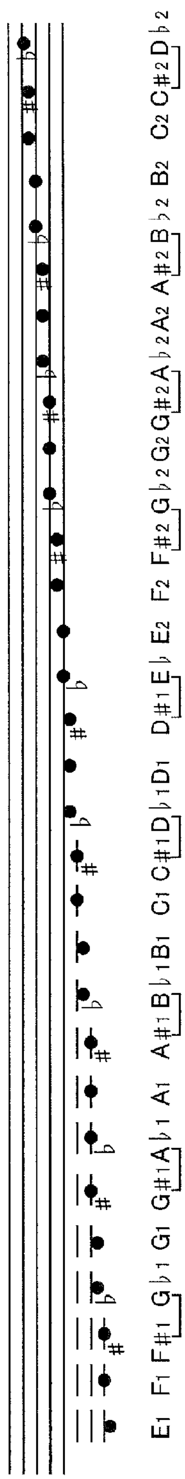
FIGS. 6A to 6C are diagrams illustrating data which indicate positions of sounds on a staff notation, which correspond to those in FIG. 5.
Figure 6B:
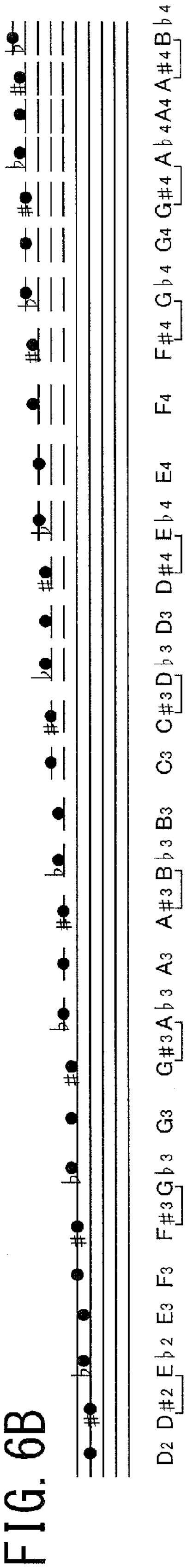
Figure 6C:
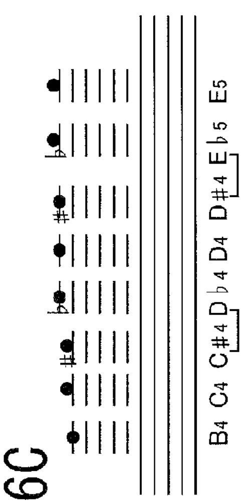
Figure 7:
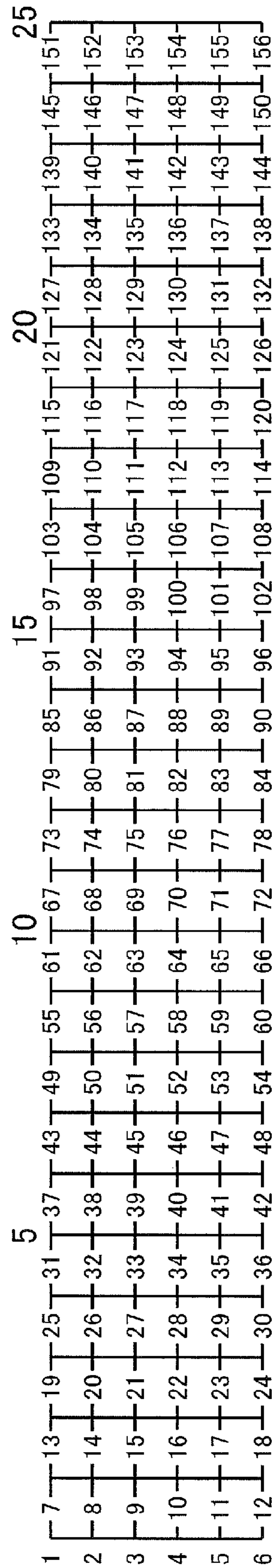
FIG. 7 is a diagram illustrating data in which the positions of the sounds on the fingerboard, which are illustrated in FIG. 5, are converted into integer values of 1 to 156.
Figure 8A:
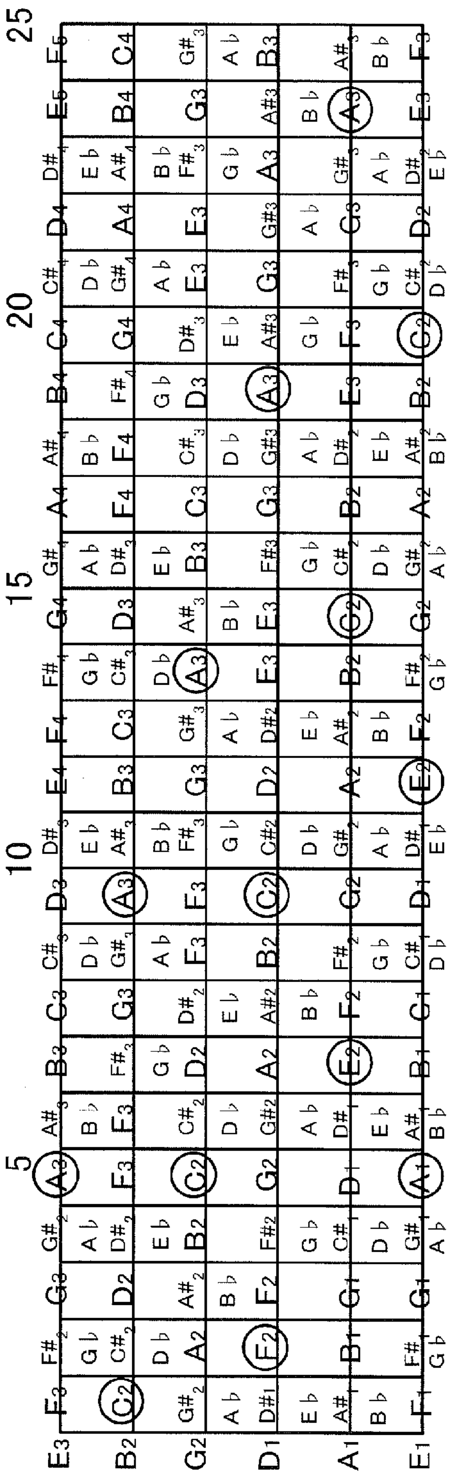
FIG. 8A is a diagram illustrating data displayed by English letters, the data illustrating, while encircling, English letters indicating positions of sounds on the fingerboard, which are: SOPRANO $A_3$=31, 62, 87, 118, 149; ALTO $C_2$=8, 33, 64, 95, 126; TENOR $E_2$=16, 47, 78; and BASS $A_1$=36.
Figure 8B:
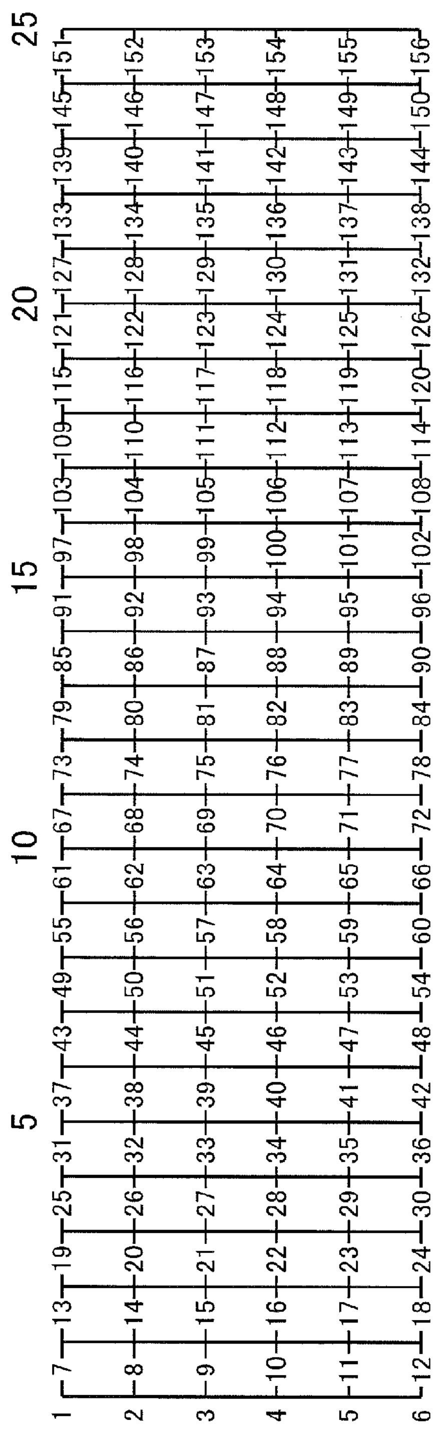
FIG. 8B is a diagram illustrating integer value data corresponding to those in FIG. 8A.
Figure 10:
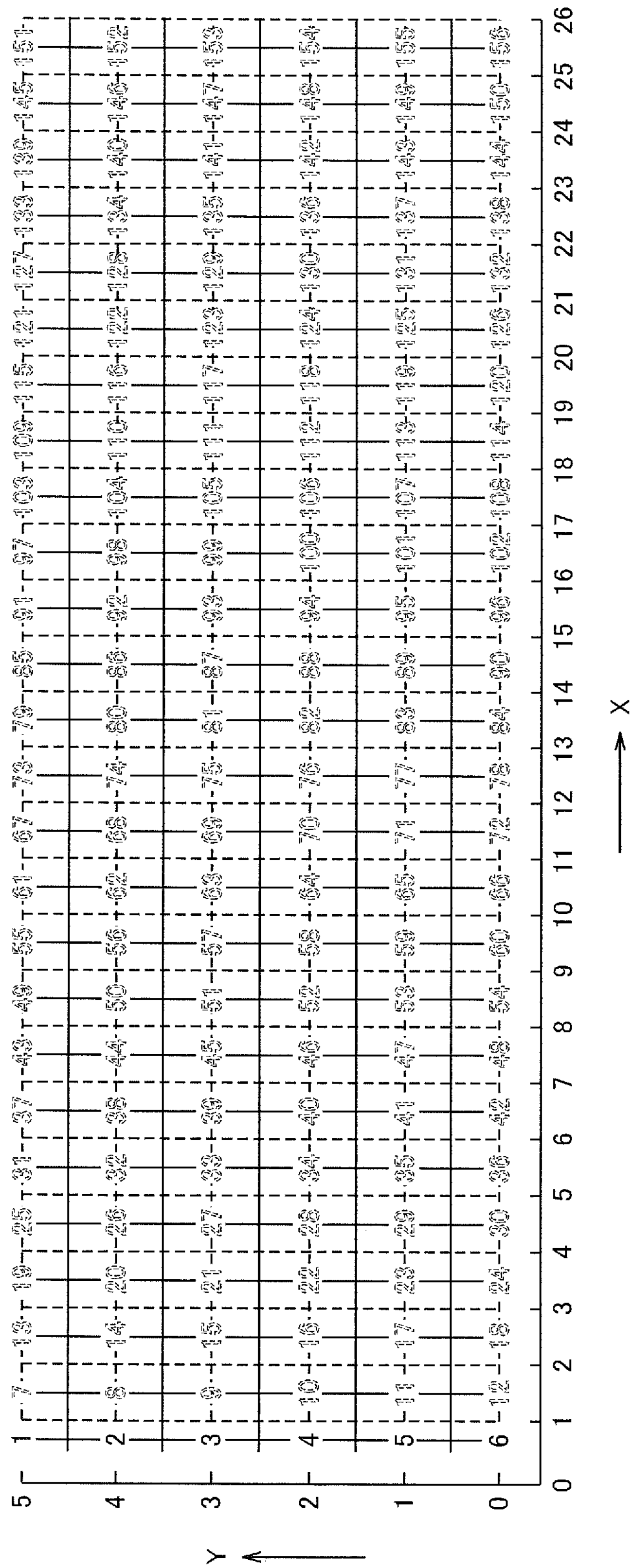
FIG. 10 is a diagram illustrating data in which a numerical diagram indicating the positions of the sounds on the fingerboard is converted into an X-Y coordinate.

Though not illustrated, in a similar way to a usual computer system, a program storage device and a data storage device are connected to or built in the guitar teaching data creation device 22 according to the first embodiment of the present invention. The program storage device and data storage device can be composed of semiconductor memories, magnetic disks, optical disks, magneto-optical disks, magnetic tapes, and the like. Hence, a guitar teaching data creation program for drive-controlling the chord inputting means 221, the distribution map creating means 222, the sequence creating means 223, the numerical diagram creating means 224, the graphic converting means 225 and the display means 226, which are illustrated in FIG. 1, and causing these means to create guitar teaching data for use in the guitar teaching system according to the first embodiment just needs to be stored in the program storage device of a computer system that composes the guitar teaching data creation device 22. Meanwhile, varieties of input/output data and parameters, which are necessary for guitar teaching data creation, data under computation, and the like, can be stored in the data storage device. In the data storage device, there are also stored: data as illustrated in FIG. 5 and FIG. 8A, which indicates positions of sounds on the fingerboard by English letter display; data as illustrated in FIGS. 6A to 6C, which indicates such sound positions on staff notations, the sound positions corresponding to the data of FIG. 5 and FIG. 8A; data as illustrated in FIG. 7 and FIG. 8B, in which the sound positions on the fingerboard are converted into integer values of 1 to 156; data as illustrated in FIG. 9, in which the data converted into the integer values are listed to lateral sequences; data as illustrated in FIG. 10, in which respective positions of a numeric diagram are converted into X-Y coordinates; and the like.

For example, the guitar teaching data creation program according to the first embodiment of the present invention is stored in a computer-readable external recording medium, and the program storage device of the guitar teaching data creation device 22 is caused to read a content recorded in the external recording medium, whereby the guitar teaching data creation program concerned can execute a series of processing of the guitar teaching data creation of the present invention. Here, the "computer-readable external recording medium" stands for such a medium that can record a program, the computer-readable external recording medium including, for example, an external memory device of a computer, a semiconductor memory, a magnetic disk, an optical disk, a magneto-optical disk, a magnetic tape, and the like. Specifically, a flexible disk, a CD-ROM, a magneto-optical (MO) disk, a cassette tape, an open-reel tape and the like are included in the "computer-readable external recording medium". For example, a main body of the guitar teaching data creation device 22 can be configured to build therein a flexible disk device (e.g., a flexible disk drive) and an optical disk device (e.g., an optical disk drive) or to cause the flexible disk device and the optical disk device to be externally connected thereto. The flexible disk is inserted into the flexible disk drive from an insertion slot thereof, and the CD-ROM is inserted into the optical disk drive from an insertion slot thereof, and both of them are subjected to a predetermined reading operation, whereby the programs stored in these external recording mediums can be installed into the program storage device that composes the guitar teaching data creation device 22. Moreover, a predetermined drive device is connected to the guitar teaching data creation device 22, whereby, for example, the read-only memory (ROM) and the cassette tape as a magnetic tape device can be used as external recording mediums. Furthermore, it is possible to store the guitar teaching data creation program in the program storage device via an information processing network such as the Internet in place of using the external recording medium.

The guitar teaching data creation device 22 according to the first embodiment of the present invention is configurable of the computer system such as the PC, and accordingly, illustration thereof is omitted. However, the guitar teaching data creation device 22 may further include input devices such as a PC keyboard, a mouse, and a light pen. Specifically, the mouse is clicked for the staff notation displayed on the monitor 23*a*, whereby musical notes can be inputted. Moreover, as an output device, a printer device or the like may be provided as well as the monitor 23*a* illustrated in FIG. 1.

Figure 2:
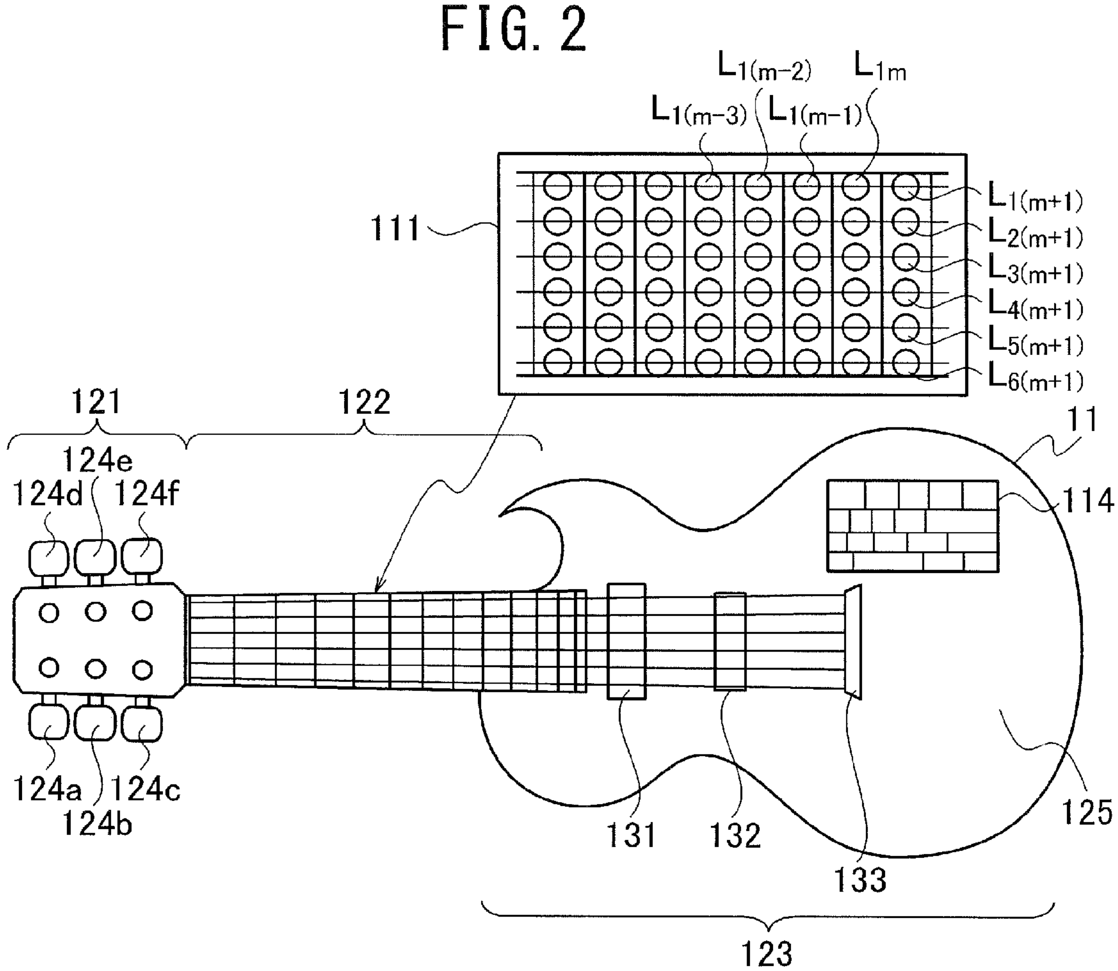
FIG. 2 is a schematic plan view illustrating a schematic configuration of principal portions of a guitar for teaching, which composes the guitar teaching system according to the first embodiment, which is illustrated in FIG. 1.

As illustrated in FIG. 2, the teaching-oriented guitar 11 of the guitar teaching system according to the first embodiment includes: a body 123; a neck 122, which is connected to a left side of the body 123 via a neck joint (neck heel), and has a fingerboard on an upper surface thereof; and a head stock (head) 121 connected to a left-side tip end of the neck 122. As illustrated in FIG. 2, the teaching-oriented guitar 11 of the guitar teaching system according to the first embodiment is a six-string guitar, and accordingly, six pegs 124*a*, 124*b* . . . and 124*f* are provided on the head stock 121. On a neck 122-side position of a top plate (top) 125 of the body 123, there is provided a pickup 131 that converts vibrations of strings into electrical signals, and a bridge 132 that supports the strings and transmits the vibrations of the strings to the body 123 is provided separately from the pickup 131. Moreover, a tail piece 133 that fixes the strings to the body 123 is provided separately from the bridge 132. Then, as illustrated in FIG. 2, on a region located on an upper right of the top plate 125, a touch panel (touch board) 114 is embedded in a window portion of the top plate 125 so that a top surface of the touch panel 114 can be exposed. For the touch panel 114, there are employable pointing devices (input devices) of a variety of systems such as a matrix switching system, a resistance film system, a surface acoustic wave system, an infrared system, an electromagnetic induction system, and an electrostatic capacitance system. The resistance film system and the electrostatic capacitance system are mainly mounted on a small/middle-sized instrument such as a cellular phone, a personal digital assistant (PDA) and a car navigation system, the electromagnetic induction system is oriented for a tablet PC using a dedicated pen, and the ultrasonic surface acoustic wave system and the infrared scanning system are employed for a business instrument such as a point of sale (POS) and an automatic teller machine (ATM), and an industrial large-sized instrument such as an FA instrument, and the pointing device of any thereof is usable as the touch panel 114. Moreover, the touch panel 114 may have a function of a multi-touch display capable of making an input by receiving simultaneous touches of a plurality of points thereof.

On an upper surface of the neck 122, the fingerboard made of wood such as maple, rosewood and ebony or of fiber-reinforced plastics is provided, and on a top surface of the fingerboard, thin sticks made of metal such as nickel silver and brass are provided as frets in a direction perpendicular to the strings. The frets are embedded in the top surface of the fingerboard at positions on the fingerboard, where the strings are touched, so as to become hard protrusions attached perpendicularly to the strings, and intervals are determined by string length changes between the frets and the bridge 132. For sake of convenience, the following description is made while taking a case where 25 frets are provided on the fingerboard; however, it should be noted that the number of frets is not limited to 25, and differs, for example, in a range of 22 to 30 depending on a type of the guitar, and accordingly, the number of frets is merely an example. As illustrated in FIG. 2, into respective rectangular regions among the frets of the fingerboard on the upper surface of the neck 122, luminous bodies such as light emitting diodes (LEDs), labeled $L_{1(m-3)}$, $L_{1(m-2)}$, $L_{1(m-1)}$, $L_{1m}$, $L_{1(m+1)}$, . . . , $L_{2(m+1)}$, . . . , $L_{3(m+1)}$, . . . , $L_{4(m+1)}$, . . . , $L_{5(m+1)}$, . . . , $L_{6(m+1)}$, are embedded in a matrix, whereby a light emitting source 111 is composed. In a case of the six-string guitar, if there are 25 frets, then luminous bodies $L_{ij}$ (i=integers of 1 to 6; j=integers of 1 to 26) are embedded six by six in the respective rectangular regions, of which number is 25+1=26, and accordingly, the luminous bodies $L_{ij}$, of which number is 6×16=156, are embedded in a matrix. The luminous bodies $L_{ij}$ are embedded in a matrix whereby, in the teaching-oriented guitar 11 of the guitar teaching system according to the first embodiment, the luminous bodies $L_{ij}$ are lighted at predetermined positions. In this way, desired guitar teaching data can be displayed.

Figure 3:
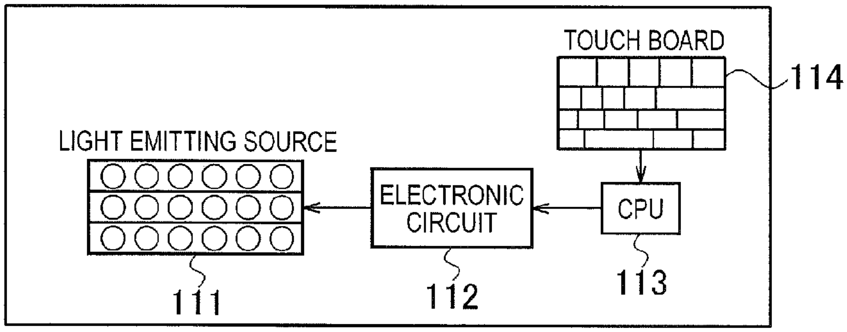
FIG. 3 is a schematic block diagram explaining outlines of a touch panel of the guitar for teaching, which is illustrated in FIG. 2, and of a circuit configuration connected to the touch panel.

As illustrated in FIG. 3, in an inside of the body 123, there are built: a CPU 113 connected to the touch board or panel 114; and an electronic circuit 112 such as a shift register connected to the CPU 113. At a predetermined position, the electronic circuit 112 as an LED drive circuit selectively lights arbitrary luminous bodies $L_{ij}$ in an LED dot matrix of the light emitting source 111, which is composed of the luminous bodies $L_{ij}$ embedded in a matrix. A variety of circuits known in public are employable as the electronic circuit 112 depending on a drive method of the LED dot matrix. The CPU 113 includes a storage device, and a training menu is stored in the storage device of the CPU 113. For example, the training menu is divided into scales, chords, intervals (melodious intervals), and the like. A program is selected by using the touch panel 114, and the training menu stored in the storage device of the CPU 113 can be read out. The interface 21*a* illustrated in FIG. 1 functions to synchronize a training program for selectively lighting, at the predetermined positions, the arbitrary luminous bodies $L_{ij}$ in the LED dot matrix provided in the CPU 113 built in the body 123 of the teaching-oriented guitar 11, the CPU 113 being illustrated in FIG. 3, and the guitar teaching data creation program for actuating the guitar teaching data creation device 22, which is illustrated in FIG. 1, with each other.

Figure 11:
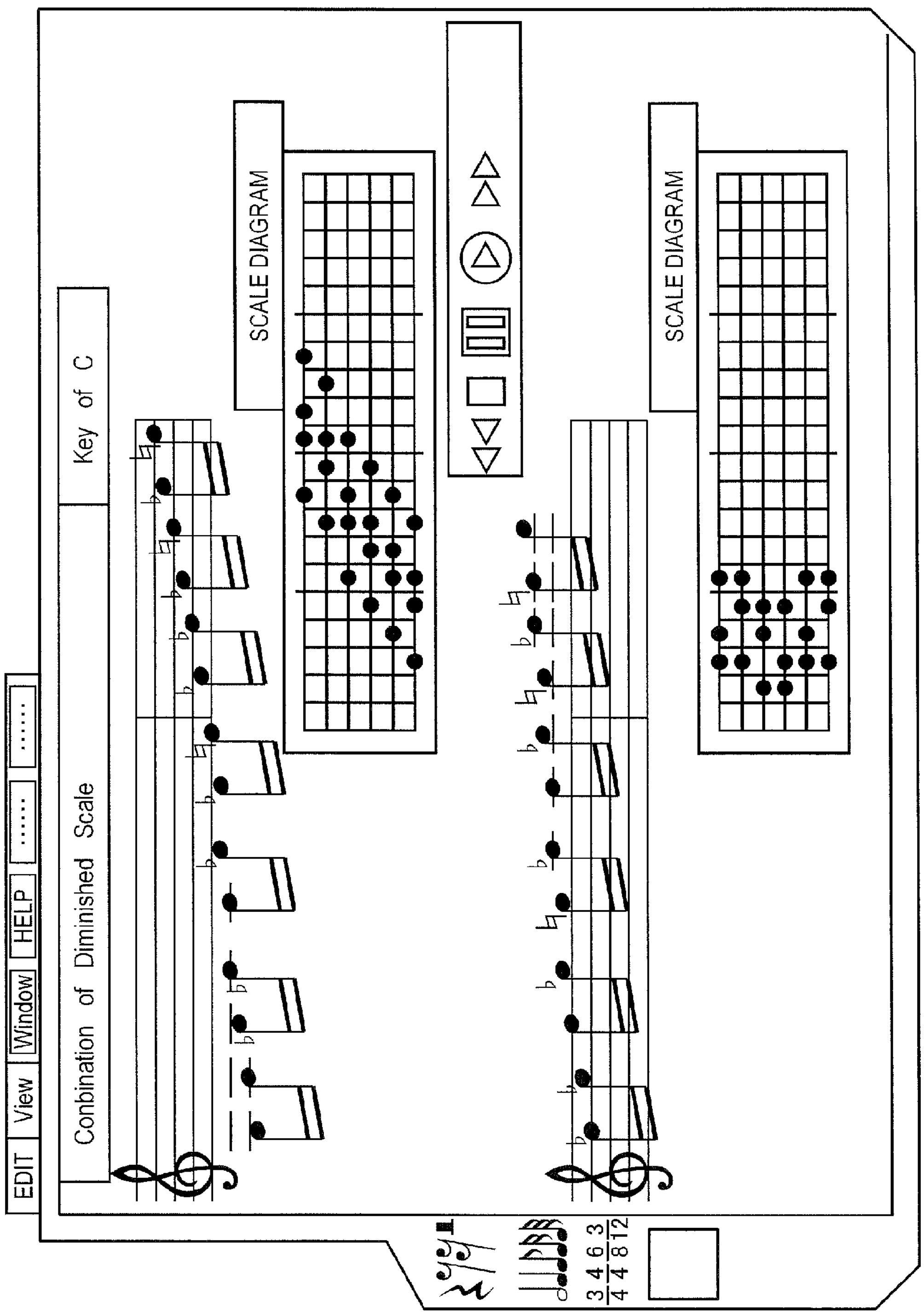
FIG. 11 is a diagram schematically explaining examples of scores and scale diagrams, which are displayed on a monitor (display device) screen in a case of selecting a program of scale training.
Figure 12:
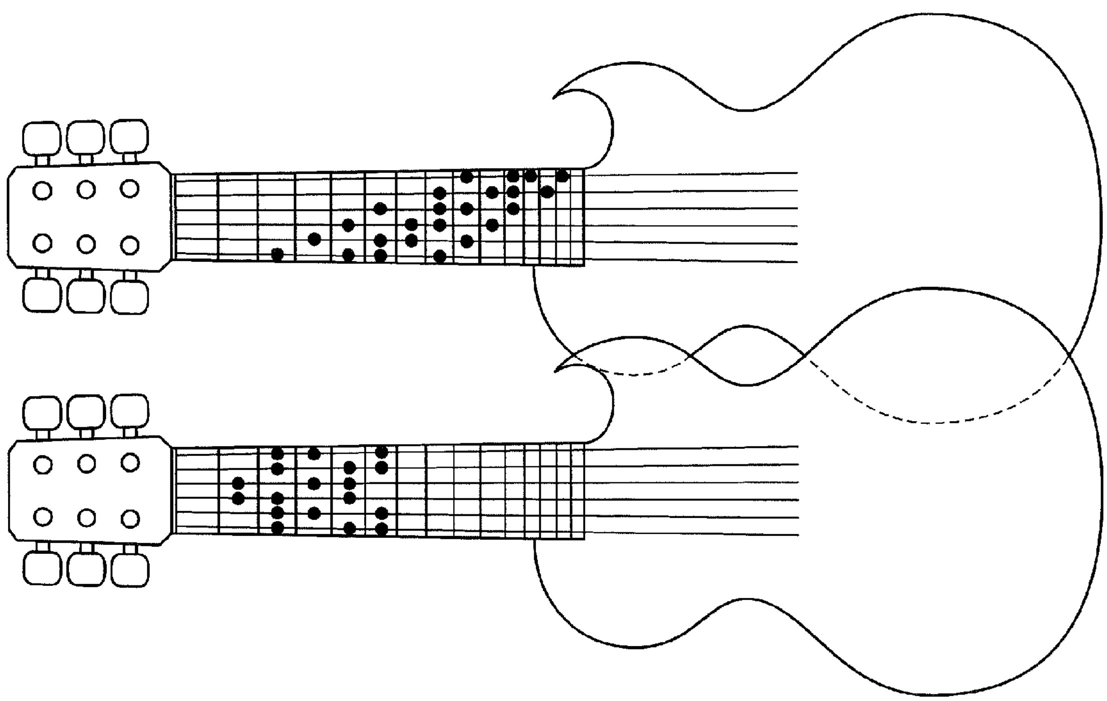
FIG. 12 is a diagram schematically explaining a state where a scale diagram is displayed on the fingerboard simultaneously with FIG. 11 in response to FIG. 11.

For example, in a case of selecting a program of a scale training by using the touch panel 114, a diagram is displayed on the screen of the monitor (display device) 23*a* illustrated in FIG. 1 together with a score illustrated in FIG. 11, and this diagram is displayed on the fingerboard as illustrated simultaneously in FIG. 12. That is to say, by using the touch panel 114, the electronic circuit 112 can be driven to light the luminous bodies $L_{ij}$ at the predetermined positions, and as illustrated in FIG. 12, the diagram can be displayed on the fingerboard by the electronic circuit 112 in accordance with sound addresses of such a desired training menu.

Figure 13:
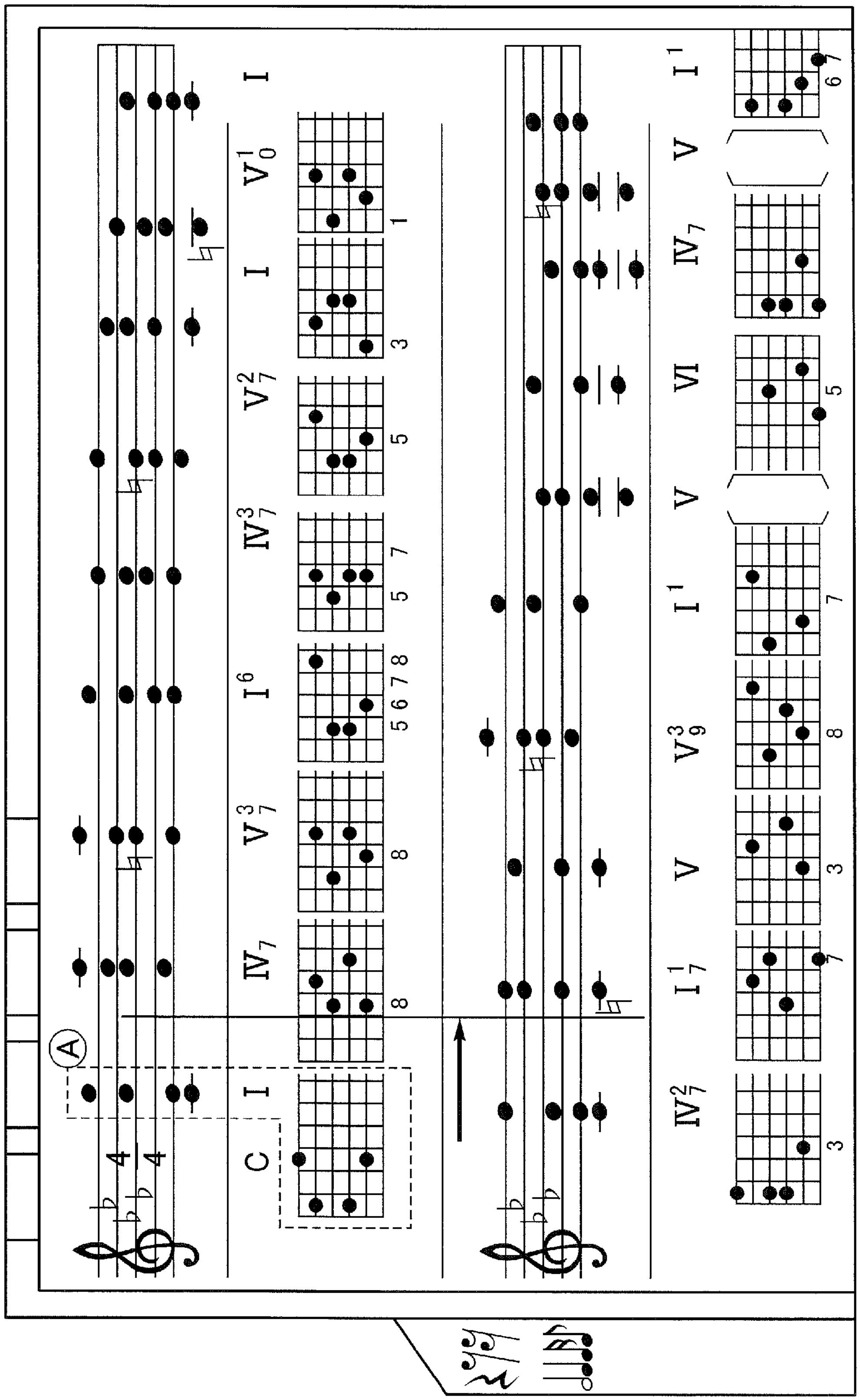
FIG. 13 is a diagram schematically explaining examples of a score and scale diagrams, which are displayed on the screen of the monitor (display device) in a case of selecting a training program of concords (chords) of Western classical music.
Figure 14:
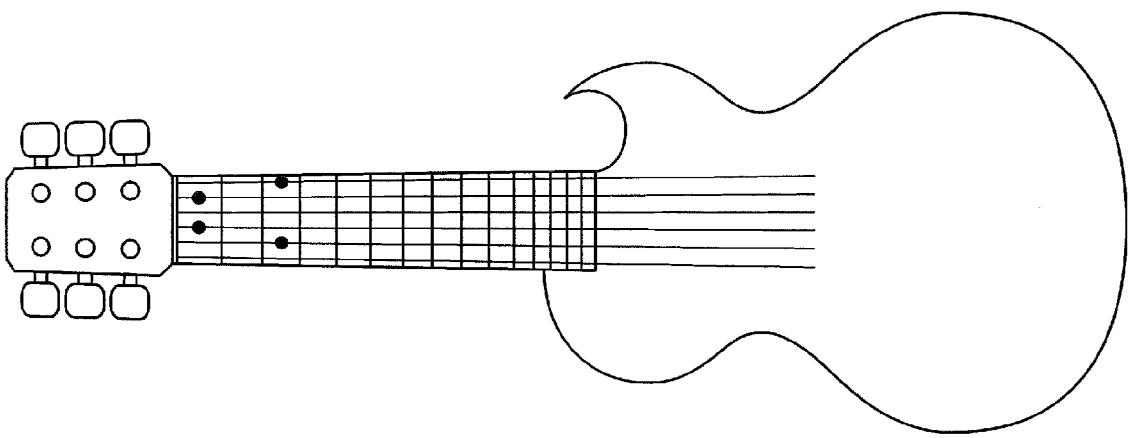
FIG. 14 is a diagram schematically explaining a state where a diagram of a chord of a chord symbol I is displayed on the fingerboard simultaneously with FIG. 13 in response to FIG. 13.

Moreover, for example, in a case of selecting a training program of concords (chords) of Western classical music by using the touch panel 114, diagrams are displayed below an upper-stage score illustrated in FIG. 13 in a one-to-one correspondence on the screen of the monitor (display device) 23*a* illustrated in FIG. 1. FIG. 13 illustrates chords by chord symbols in accordance with display of a usual musical theory. In each of the chord symbols, an interval to a keynote is represented by Roman numeral, and accordingly, a triad having an interval i as a root is represented as I, and a triad having an interval ii as a root is represented as II, and in a case of a seventh chord, 7 is added as a subscript to a lower right of the Roman numeral, and a triad is represented as $V_7$. There are two ways of writing an inverted interval, and in FIG. 13, an inversion index is added as a superscript to an upper right in accordance with a way of writing, which is general in Japan at present, and a triad is represented as $IV^2$. A rightward arrow illustrated at a middle-stage position on a left side of FIG. 13 indicates an elapse (timing) in time series. That is to say, a vertical line, which is perpendicular to the rightward arrow in FIG. 13 so as to be in contact with a tip end of the arrow stands for an elapse (timing) in time series in the training program of the concords (chords). A diagram of the chord of the chord symbol I, which is surrounded by a wavy line added with Symbol A at an upper left (left-end) position of FIG. 13, is displayed at a headstock 121-side position on the fingerboard as illustrated in FIG. 14 at the timing of the arrow in FIG. 13. That is to say, by using the touch panel 114, the electronic circuit 112 can be driven to light the luminous bodies $L_{ij}$ at the predetermined positions, and as illustrated in FIG. 14, the diagram of the chord of the chord symbol I can be displayed on the fingerboard by the electronic circuit 112 in accordance with sound addresses of the desired training menu.

Figure 15:
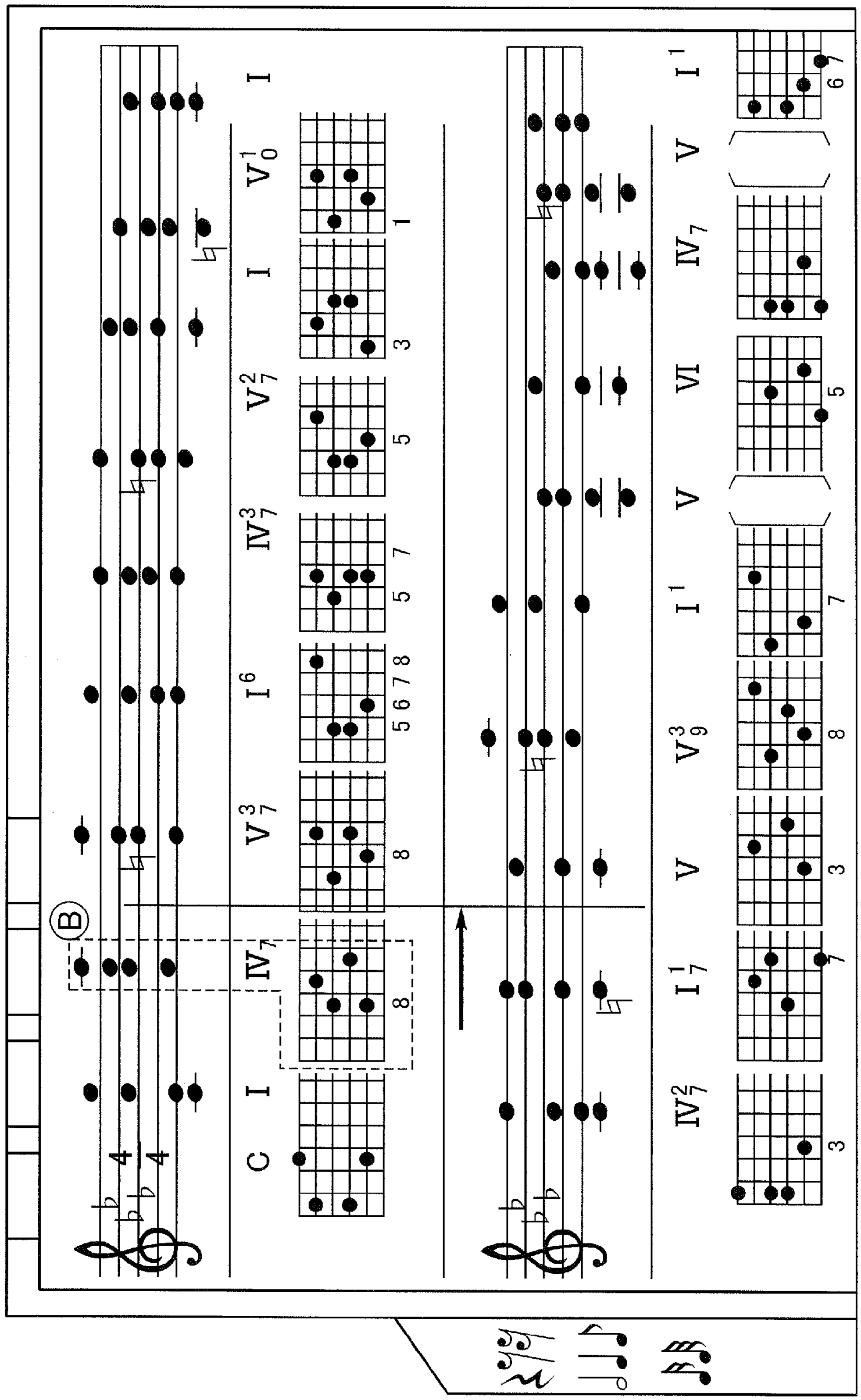
FIG. 15 is a diagram explaining a state where the score and the diagrams in the training program of the concords (chords) are displayed on the screen of the monitor (display device) in a situation progressed from FIG. 13 in terms of timing.
Figure 16:
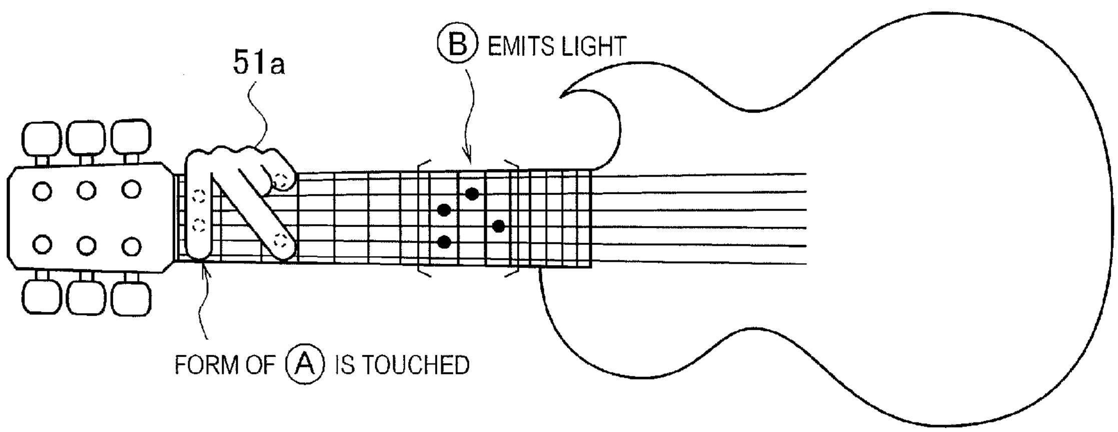
FIG. 16 is a diagram schematically explaining a state where the diagram is displayed on the fingerboard simultaneously with FIG. 15 in response to FIG. 15, explaining that a diagram of a chord of a chord symbol $IV_7$ is further additionally displayed in a state where the fingers touch the chord (form) of the chord symbol I.

Moreover, a rightward arrow illustrated at a middle-stage position close to the left side of FIG. 15 progresses to the right more than the rightward arrow of FIG. 13. That is to say, as the elapse (timing) in time series is illustrated by the vertical line perpendicular to the arrow so as to be in contact with the tip end of the rightward arrow, FIG. 15 schematically illustrates a situation that progresses more than in FIG. 13 in terms of timing. Except for the timing, such a content displayed in FIG. 15 is substantially the same as that in FIG. 13. In a similar way to FIG. 13, a score is illustrated on the upper stage, and diagrams corresponding thereto are displayed in a one-to-one correspondence below the upper-stage score. Note that a diagram of a chord of a chord symbol $IV_7$, which is surrounded by a wavy line added with Symbol B, the diagram being second from the upper left of FIG. 15, is additionally displayed on a body 123-side position on the fingerboard as illustrated in FIG. 16. That is to say, in a state where the chord (form) of the chord symbol I surrounded by the wavy line added with Symbol A on the upper left of FIG. 13 is touched by fingers 51*a*, the diagram of the chord of the chord symbol $IV_7$ is further additionally displayed on the fingerboard as illustrated in FIG. 16. That is to say, subsequently to the chord of the chord symbol I, the chord of the chord symbol $IV_7$ is additionally displayed on the fingerboard by the electronic circuit 112 as time progresses.

Figure 17:
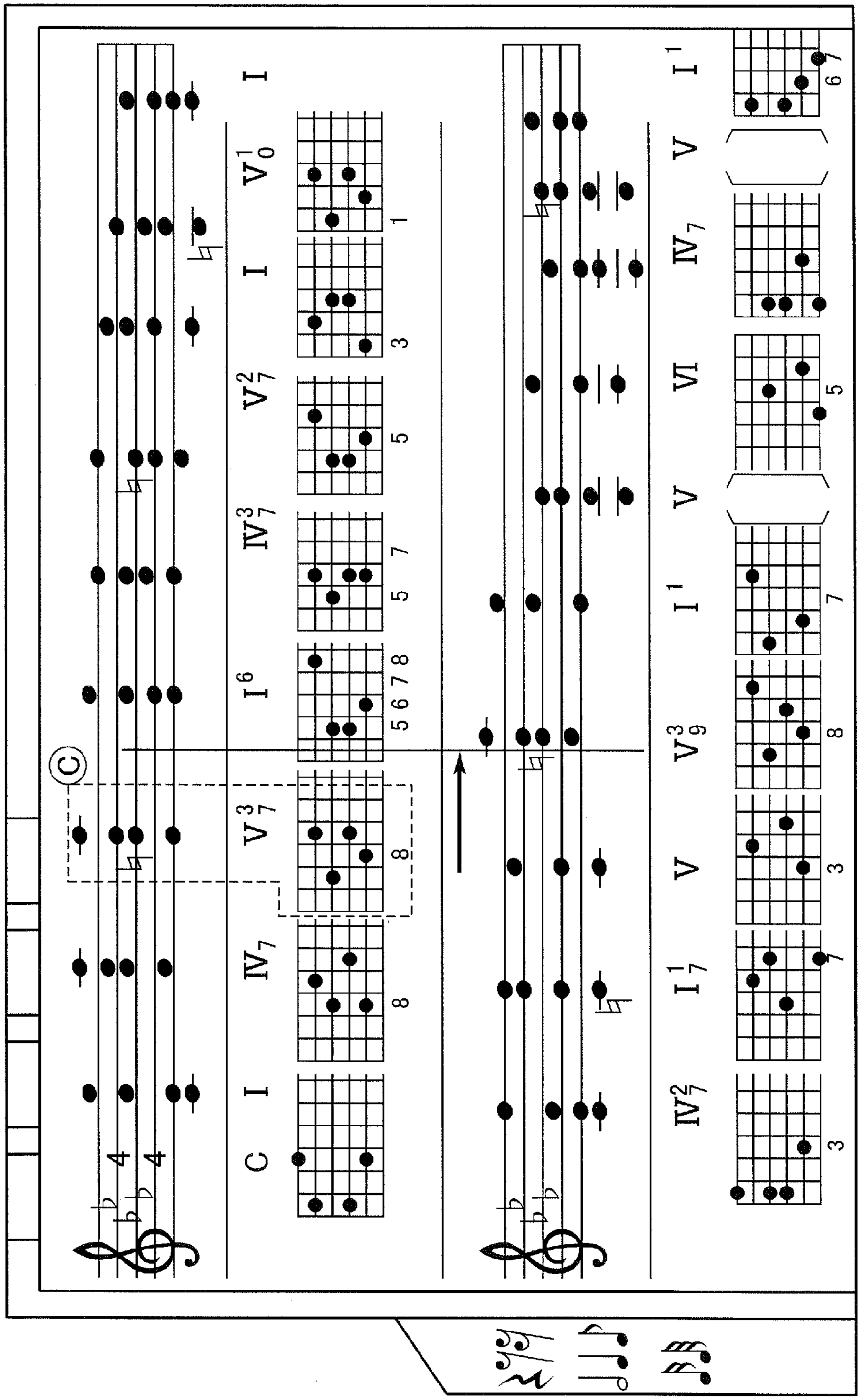
FIG. 17 is a diagram explaining a state where the score and the diagrams in the training program of the concords (chords) are displayed on the screen of the monitor (display device) in a situation progressed from FIG. 15 in terms of timing.
Figure 18:
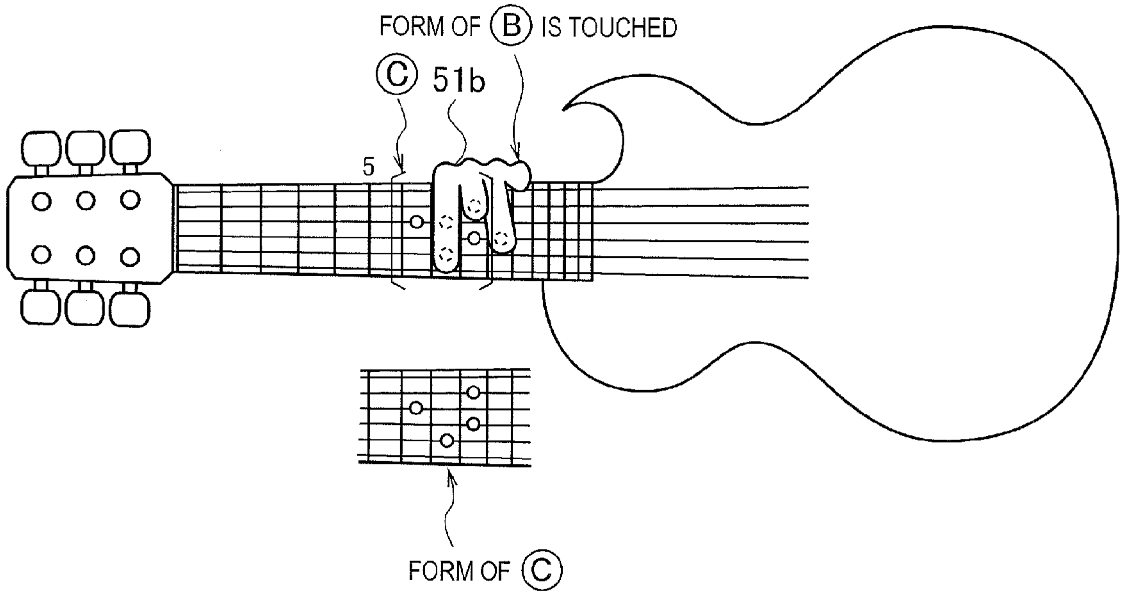
FIG. 18 is a diagram schematically explaining a state where the diagram is displayed on the fingerboard simultaneously with FIG. 17 in response to FIG. 17, explaining such an operation where a chord of a chord symbol $V_7^3$ is additionally displayed with progress of the time subsequently to the chord of the chord symbol $IV_7$, and the diagram of the chord of the chord symbol I displayed in FIG. 14 disappears.

Moreover, a rightward arrow illustrated at a middle-stage position in FIG. 17 further progresses to the right direction more than the rightward arrow of FIG. 15. That is to say, as the elapse (timing) in time series is illustrated by the vertical line perpendicular to the arrow so as to be in contact with the tip end of the rightward arrow, FIG. 17 schematically illustrates a situation that progresses more than in FIG. 15 in terms of timing. Except for the timing, such a content displayed in FIG. 17 is substantially the same as those in FIG. 13 and FIG. 15. In a similar way to FIG. 13 and FIG. 15, a score is illustrated on the upper stage, and diagrams corresponding thereto are displayed in a one-to-one correspondence below the upper-stage score. Note that a diagram of a chord of a chord symbol $IV_7^3$, which is surrounded by a wavy line added with Symbol C, the diagram being third from the upper left of FIG. 17, is additionally displayed on the fingerboard as illustrated in FIG. 18. At a time-series stage illustrated in FIG. 18, the diagram of the chord of the chord symbol I, which is displayed at the headstock 121-side position on the fingerboard in FIG. 13 and FIG. 15, disappears. That is to say, at such time-series timing illustrated in FIG. 18, in a state where the chord (form) of the chord symbol $IV_7$ surrounded by the wavy line added with Symbol B on the upper left of FIG. 15 is touched by fingers 51*b*, the diagram of the chord of the chord symbol $IV_7^3$ is further additionally displayed on the fingerboard as illustrated in FIG. 18. That is to say, the electronic circuit 112 operates to additionally display the chord of the chord symbol $IV_7^3$ on the fingerboard as the time progresses subsequently to the chord of the chord symbol $IV_7$, and to erase the diagram of the chord of the chord symbol I. As seen from FIG. 18, in the state where the chord (form) of the chord symbol $IV_7$ added with Symbol B is touched, a part of the diagram of the chord of the chord symbol $V_7^3$ is hidden by the fingers 51*b*. Accordingly, in this case, it is preferable to confirm the diagram of the chord of the chord symbol $V_7^3$, which is added with Symbol C, not on the fingerboard but on the screen of the monitor 23*a* illustrated in FIG. 1.

<Guitar Teaching Data Creation Method>

A description is made of a guitar teaching data creation method according to the first embodiment of the present invention by using a flowchart of FIG. 4, FIG. 5 to FIG. 10 and FIGS. 19A and 19B to FIGS. 27A and 27B. Note that the guitar teaching data creation method to be described below is merely an example, and as a matter of course, is realizable by a variety of creation methods other than this method, the variety of creation methods including modification examples of this method.

Figure 19B:
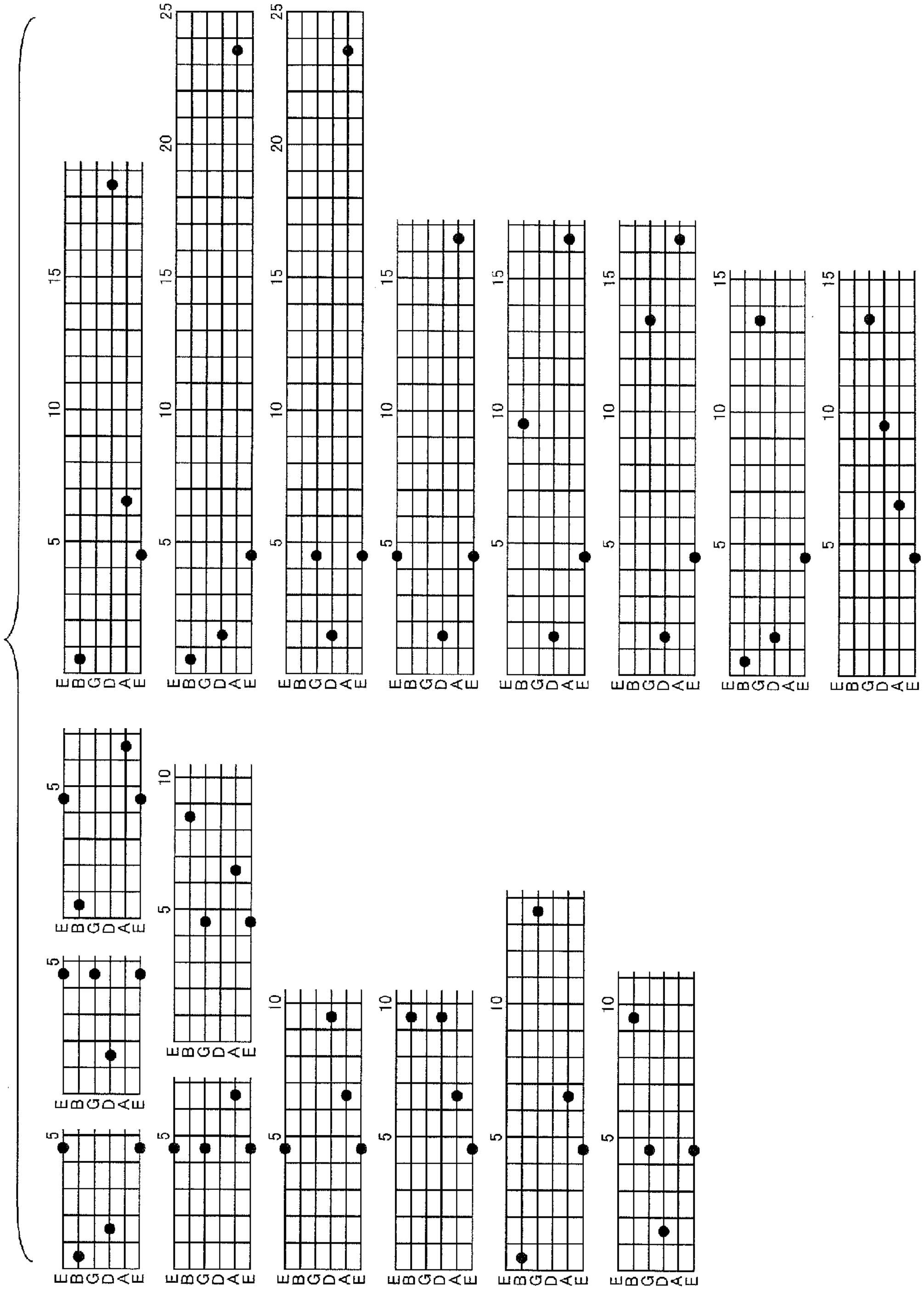
FIGS. 19A and 19B are diagrams explaining an example of a chord, which chord inputting means inputs onto the staff notation displayed on the screen of the monitor, in order to explain the guitar teaching data creation method according to the first embodiment of the present invention.
Figure 19A:
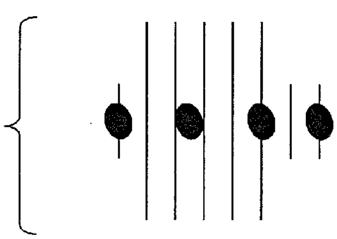

(A) First, the guitar teaching data creation program stored in the program storage device connected to the guitar teaching data creation device 22 illustrated in FIG. 1 is started. Then, the guitar teaching data creation program drives the chord inputting means 221 of the CPU 220*a* that composes the guitar teaching data creation device 22 illustrated in FIG. 1, and receives the chord in Step S101. Here, in the guitar teaching data creation program stored in the program storage device, an application program that displays a staff notation similar to that in usual music production software is included. Hence, the staff notation is displayed on the screen of the monitor (display device) 23*a*, which is illustrated in FIG. 1, by using the guitar teaching data creation program, and the guitar teaching data creation program causes the chord inputting means 221 to sequentially receive the chords as illustrated in FIGS. 19A and 19B by using electrical signals generated by clicking the mouse to the staff notation on the screen of the monitor 23*a*. The chords received by the chord inputting means 221 are stored in the data storage device connected to the guitar teaching data creation device 22.

Figure 20:
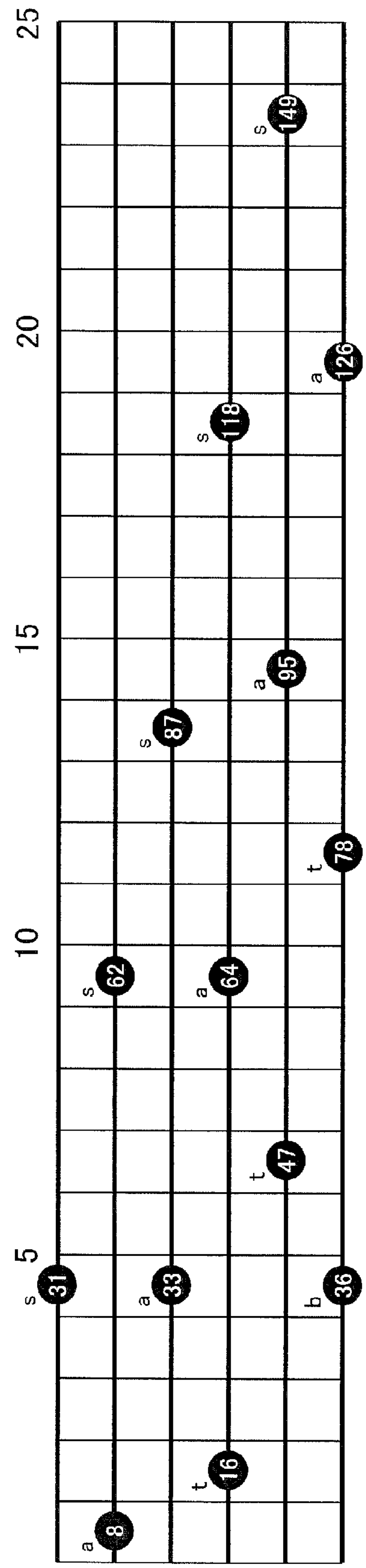
FIG. 20 is a diagram illustrating positions of the sounds which are: SOPRANO $A_3$=31, 62, 87, 118, 149; ALTO $C_2$=8, 33, 64, 95, 126; TENOR $E_2$=16, 47, 78; and BASS $A_1$=36, the diagram being created by distribution map creating means as a distribution map of respective sounds corresponding to the chord illustrated in FIG. 19.

(B) Next, in Step S102, the guitar teaching data creation program causes the distribution map creating means 222 of the CPU 220*a* illustrated in FIG. 1 to read out, from the data storage device, the data as illustrated in FIG. 5 and indicating the sound positions on the fingerboard by the English letter display, the data as illustrated in FIGS. 6A to 6C and indicating the sound positions on the staff notation, the data as illustrated in FIG. 7, in which the sound positions on the fingerboard are converted into the integer values of 1 to 156, and the chords received in Step S101. Here, FIG. 5 illustrates the sound positions on the fingerboard of the six-string guitar in the case where the number of frets is 25. In a 12th fret to a 23rd fret, an array of a 0th fret to an 11th fret is repeated, and in 24th and 25 frets, an array of 0th and 1st frets is repeated. FIGS. 6A to 6C illustrate sound positions on the staff notation, which correspond to those of FIG. 5. That is to say, FIGS. 6A to 6C can be caused to correspond to arrays in which scales are raised by a halftone fret by fret: FIG. 6A can be caused to correspond to the 0th fret (lowest sound) to a 21st fret in the sixth string of FIG. 5; FIG. 6B can be caused to correspond to a 3rd fret to the 23rd fret in the second string of FIG. 5; and FIG. 6C can be caused to correspond to a 19th fret to the 24th fret in the first string of FIG. 5. Then, from a correspondence relationship of the data of the addresses of the respective sounds between FIG. 5 and FIGS. 6A to 6C, and from numeric value data of FIG. 7, a distribution map of the respective sounds, which is as illustrated in FIG. 20, is created by collating the addresses concerned with the addresses of the sounds on the fingerboard on the teaching-oriented guitar 11. Here, FIG. 7 illustrates the data in which the sound positions on the fingerboard, which are illustrated in FIG. 5, are converted into the integer values of 1 to 156. In FIG. 20, as the distribution map of the respective sounds, SOPRANO 31, 62, 87, 118, 149, ALTO 8, 33, 64, 95, 126, TENOR 16, 47, 78, and BASS 36 are illustrated. The distribution map as illustrated in FIG. 20, which is created by the distribution map creating means 222, is stored in the data storage device connected to the guitar teaching data creation device 22.

(C) Then, in Step S103, the guitar teaching data creation program causes the sequence creating means 223 of the CPU 220*a* to read out, from the data storage device, the data as illustrated in FIG. 8A and indicating the sound positions on the fingerboard by the English letter display, the data as illustrated in FIG. 8B, in which the sound positions on the fingerboard are converted into the integer values of 1 to 156, the data as illustrated in FIG. 9 in which the data converted into the integer values are listed to the lateral sequences, and the distribution map created in Step S102. Then, by using the conversion data illustrated in FIG. 8A, FIG. 8B and FIG. 9, sequences of integer values are created from the distribution map created by the distribution map creating means 222. FIG. 8A repeatedly illustrates the sound positions on the fingerboard, which are illustrated in FIG. 5, in which sound positions of SOPRANO $A_3$, ALTO $C_2$, TENOR $E_2$ and BASS $A_1$ are illustrated while being encircled. FIG. 8B illustrates the data in which the sound positions on the fingerboard, which are illustrated in FIG. 8A, are converted into the integer values of 1 to 156. FIG. 9 illustrates data in which FIG. 8B is listed into lateral sequences. In FIG. 9, a list of six sequences of A, B, C, D, E, F is illustrated. Examples are described below.

(a) While taking, as a root, BASS 36 ($A_1$=36 of 5th fret) of the distribution map of FIG. 20, TENOR 16, 47, 78 are searched (selected). Note that a term "root" appears below; however, strictly, it should be described as "BASS". However, for sake of convenience, the term "root" is used in this description. From such lateral sequence lists of FIG. 9, TENOR 78 is on the sequence list of F in the same way as BASS 36, and is arrayed on the same string as that of BASS 36, and accordingly, it is impossible to touch TENOR 78. Hence, TENOR 78 is deleted, and as illustrated in FIG. 21A, TENOR 16, 47 are extracted with respect to BASS 36. TENOR 16, 47 extracted as illustrated in FIG. 21A are stored in the data storage device connected to the guitar teaching data creation device 22.

(b) From TENOR 16 of the distribution map of FIG. 20, ALTO 8, 33, 64, 95, 126 are searched. From the lateral sequence lists of FIG. 9, ALTO 64 is on the sequence list of D in the same way as TENOR 16, and is arrayed on the same string as that of TENOR 16, and accordingly, it is impossible to touch ALTO 64. Hence, ALTO 64 is deleted, and it is also impossible to touch SOPRANO 118 on the sequence list of D, and SOPRANO 118 is deleted. Moreover, ALTO 126 is on the sequence list of F in the same way as TENOR 78, and it is impossible to touch ALTO 126, and accordingly, ALTO 126 is deleted. As illustrated in FIG. 21B, ALTO 8, 33, 95 are extracted with respect to TENOR 16. ALTO 8, 33, 95 extracted as illustrated in FIG. 21B are stored in the data storage device connected to the guitar teaching data creation device 22.

(c) In a similar way, from TENOR 47 of the distribution map of FIG. 20, ALTO 8, 33, 64, 95, 126 are searched. From the lateral sequence lists of FIG. 9, ALTO 95 is on the sequence list of E in the same way as TENOR 47, and it is impossible to touch ALTO 95, and accordingly, ALTO 95 is deleted. SOPRANO 149 on the sequence list E is also deleted. Moreover, ALTO 126 is on the sequence list of F in the same way as TENOR 78, and it is impossible to touch ALTO 126, and accordingly, ALTO 126 is deleted. As illustrated in FIG. 21C, ALTO 8, 33, 64 are extracted with respect to TENOR 47. ALTO 8, 33, 64 extracted as illustrated in FIG. 21C are stored in the data storage device connected to the guitar teaching data creation device 22.

(d) From ALTO 8 of the distribution map of FIG. 20, SOPRANO 31, 62, 87, 118, 149 are searched. From the lateral sequence lists of FIG. 9, SOPRANO 62 is on the sequence list of B in the same way as ALTO 8, and it is impossible to touch SOPRANO 62, and accordingly, SOPRANO 62 is deleted (SOPRANO 118 that was on the sequence list of D is already deleted). Then, as illustrated in FIG. 21D, SOPRANO 31, 87, 149 are extracted with respect to ALTO 8. SOPRANO 31, 87, 149 extracted as illustrated in FIG. 21D are stored in the data storage device connected to the guitar teaching data creation device 22. In a similar way, from ALTO 33 of the distribution map of FIG. 20, SOPRANO 31, 62, 87, 118, 149 are searched. From the lateral sequence lists of FIG. 9, SOPRANO 87 is on the sequence list of C in the same way as ALTO 33, and it is impossible to touch SOPRANO 87, and accordingly, SOPRANO 87 is deleted (SOPRANO 118 that was on the sequence list of D is already deleted). Then, as illustrated in FIG. 21D, SOPRANO 31, 62, 149 are extracted with respect to ALTO 33. SOPRANO 31, 62, 149 extracted as illustrated in FIG. 21D are stored in the data storage device connected to the guitar teaching data creation device 22.

In a similar way, from ALTO 95 of the distribution map of FIG. 20, SOPRANO 31, 62, 87, 118, 149 are searched. From the lateral sequence lists of FIG. 9, SOPRANO 149 is on the sequence list of E in the same way as ALTO 95, and it is impossible to touch SOPRANO 149, and accordingly, SOPRANO 149 is deleted (SOPRANO 118 that was on the sequence list of D is already deleted). Then, as illustrated in FIG. 21D, SOPRANO 31, 62, 87 are extracted with respect to ALTO 95. SOPRANO 31, 62, 87 extracted as illustrated in FIG. 21D are stored in the data storage device connected to the guitar teaching data creation device 22.

(e) In a similar way, in a case where ALTO 8, 33, 64 are extracted with respect to TENOR 47 in FIG. 21C, SOPRANO 31, 62, 87, 118, 149 are searched from ALTO 8 of the distribution map of FIG. 20. From the lateral sequence lists of FIG. 9, SOPRANO 62 is on the sequence list of B in the same way as ALTO 8, and it is impossible to touch SOPRANO 62, and accordingly, SOPRANO 62 is deleted (SOPRANO 149 that was on the sequence list of E is already deleted). Then, as illustrated in FIG. 21E, SOPRANO 31, 87, 118 are extracted with respect to ALTO 8. SOPRANO 31, 87, 118 extracted as illustrated in FIG. 21E are stored in the data storage device connected to the guitar teaching data creation device 22. In a similar way, from ALTO 33 of the distribution map of FIG. 20, SOPRANO 31, 62, 87, 118, 149 are searched. From the lateral sequence lists of FIG. 9, SOPRANO 87 is on the sequence list of C in the same way as ALTO 33, and it is impossible to touch SOPRANO 87, and accordingly, SOPRANO 87 is deleted (SOPRANO 149 that was on the sequence list of E is already deleted.) Moreover, SOPRANO 118 on the sequence list of D in the same way as ALTO 64 is also deleted. Then, as illustrated in FIG. 21E, SOPRANO 31, 62 are extracted with respect to ALTO 33. SOPRANO 31, 62 extracted as illustrated in FIG. 21E are stored in the data storage device connected to the guitar teaching data creation device 22. In a similar way, from ALTO 64 of the distribution map of FIG. 20, SOPRANO 31, 62, 87, 118, 149 are searched. From the lateral sequence lists of FIG. 9, SOPRANO 118 is on the sequence list of D in the same way as ALTO 64, and it is impossible to touch SOPRANO 118, and accordingly, SOPRANO 118 is deleted (SOPRANO 149 that was on the sequence list of E is already deleted). Then, as illustrated in FIG. 21E, SOPRANO 31, 62, 87 are extracted with respect to ALTO 64. SOPRANO 31, 62, 87 extracted as illustrated in FIG. 21E are stored in the data storage device connected to the guitar teaching data creation device 22.

Figures 22A, 22B:
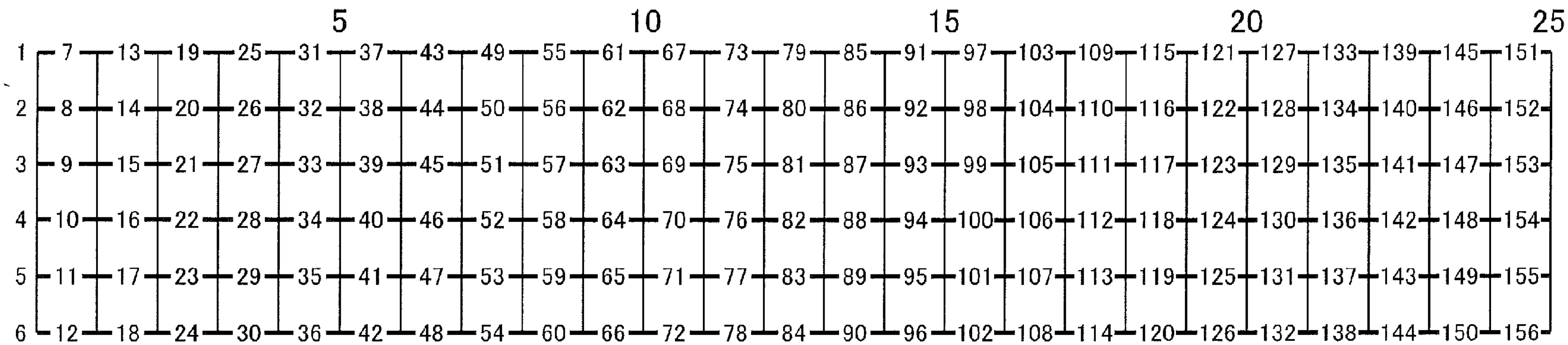
FIGS. 22A and 22B are diagrams explaining that 17 sequences of (A) to (Q) are listed by summarizing FIG. 21D and FIG. 21E.

From FIG. 21D and FIG. 21E, it is understood that 17 sequences of (A) to (Q) illustrated in FIG. 22B are listed. The 17 sequences of (A) to (Q), which are created by the sequence creating means 223, are stored in the data storage device connected to the guitar teaching data creation device 22.

(D) Moreover, in Step S104, the guitar teaching data creation program causes the numerical diagram creating means 224 of the CPU 220*a* to read out the 17 sequences of (A) to (Q), which are created in Step S103, from the data storage device, and individually creates 17 numerical diagrams, which are sequentially illustrated in FIGS. 23A to 23I and FIGS. 24J to 24Q, from the 17 sequences, which are created by the sequence creating means 223, by using the data of the integer values of 1 to 156 of FIG. 8B. That is to say, the sequence of (A) illustrated in FIG. 22B corresponds to the numerical diagram of FIG. 23A, the sequence of (B) illustrated in FIG. 22B corresponds to the numerical diagram of FIG. 23B, the sequence of (C) illustrated in FIG. 22B corresponds to the numerical diagram of FIG. 23C, the sequence of (D) illustrated in FIG. 22B corresponds to the numerical diagram of FIG. 23D, the sequence of (E) illustrated in FIG. 22B corresponds to the numerical diagram of FIG. 23E, the sequence of (F) illustrated in FIG. 22B corresponds to the numerical diagram of FIG. 23F, the sequence of (G) illustrated in FIG. 22B corresponds to the numerical diagram of FIG. 23G, the sequence of (H) illustrated in FIG. 22B corresponds to the numerical diagram of FIG. 23H, the sequence of (I) illustrated in FIG. 22B corresponds to the numerical diagram of FIG. 23I, the sequence of (J) illustrated in FIG. 22B corresponds to the numerical diagram of FIG. 23J, the sequence of (K) illustrated in FIG. 22B corresponds to the numerical diagram of FIG. 24K, the sequence of (L) illustrated in FIG. 22B corresponds to the numerical diagram of FIG. 24L, the sequence of (M) illustrated in FIG. 22B corresponds to the numerical diagram of FIG. 24M, the sequence of (N) illustrated in FIG. 22B corresponds to the numerical diagram of FIG. 24N, the sequence of (O) illustrated in FIG. 22B corresponds to the numerical diagram of FIG. 24O, the sequence of (P) illustrated in FIG. 22B corresponds to the numerical diagram of FIG. 24P, and the sequence of (Q) illustrated in FIG. 22B corresponds to the numerical diagram of FIG. 24Q. The 17 numerical diagrams created by the numerical diagram creating means 224 are stored in the data storage device connected to the guitar teaching data creation device 22.

Figure 23A:
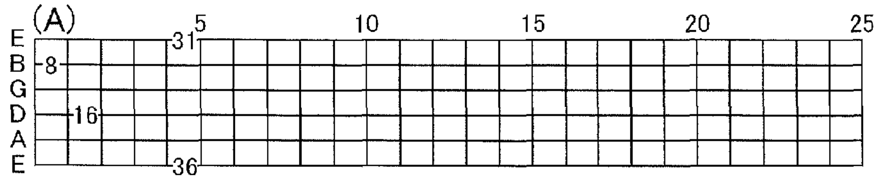
FIGS. 23A to 23I are diagrams illustrating nine numerical diagrams in which numerical diagram creating means create so as to correspond to nine sequences of (A) to (I) among the 17 sequences illustrated in FIG. 22 in the guitar teaching data creation method according to the first embodiment.
Figure 23B:
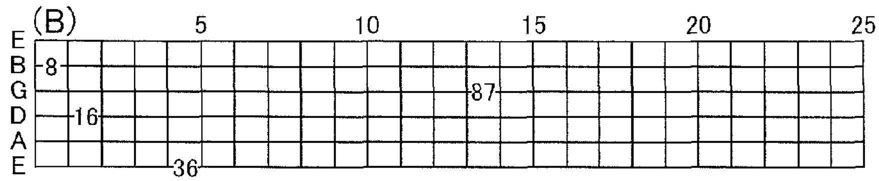
Figure 23C:
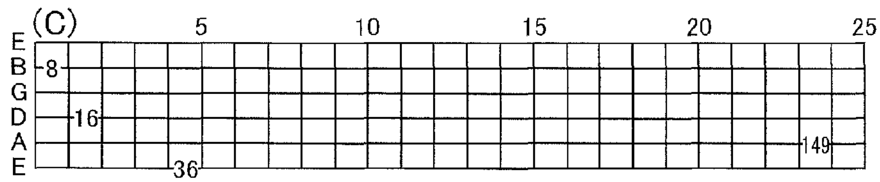
Figure 23D:
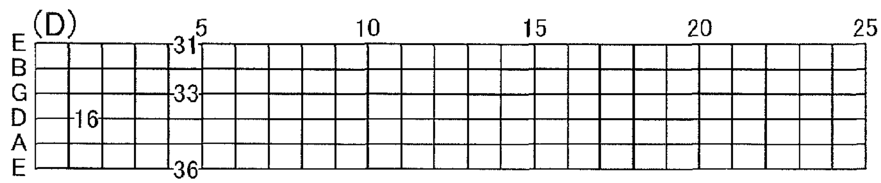
Figure 23E:
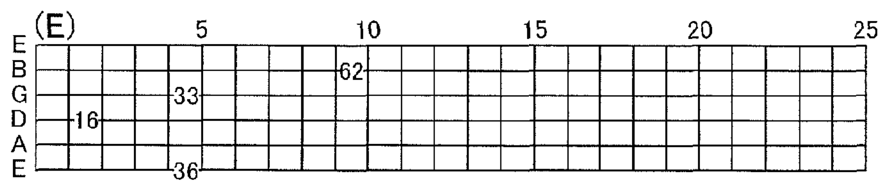
Figure 23F:
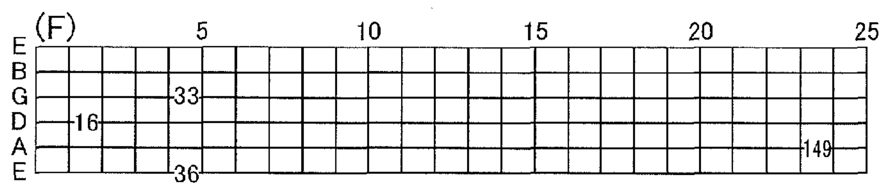
Figure 23G:
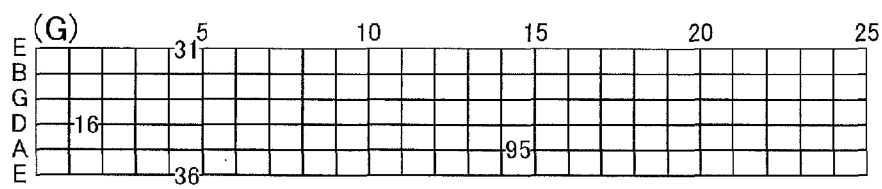
Figure 23H:
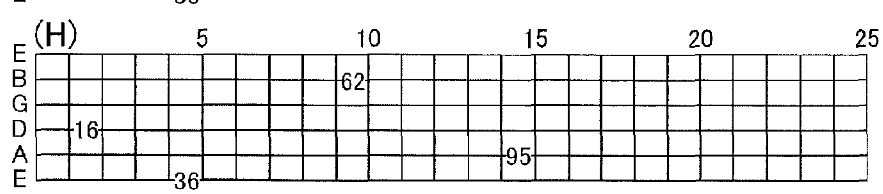
Figure 23I:
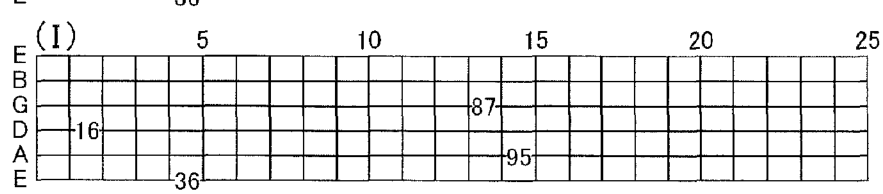
Figure 24J:
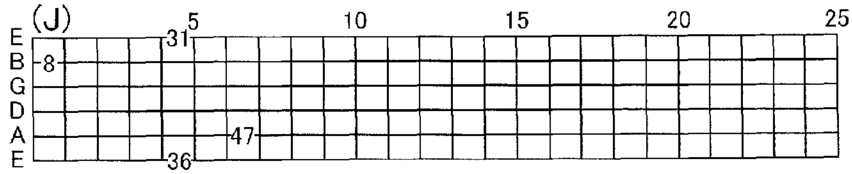
FIGS. 24J to 24Q are diagrams illustrating eight numerical diagrams in which the numerical diagram creating means create so as to correspond to remaining eight sequences of (J) to (Q) among the 17 sequences illustrated in FIGS. 22A and 22B in the guitar teaching data creation method according to the first embodiment.
Figure 24K:
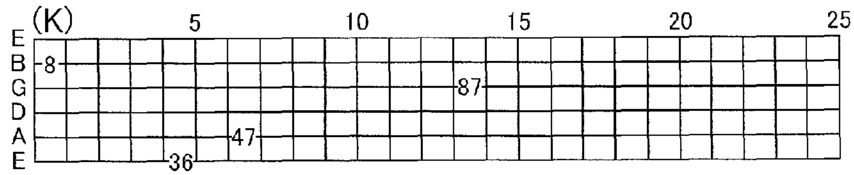
Figure 24L:
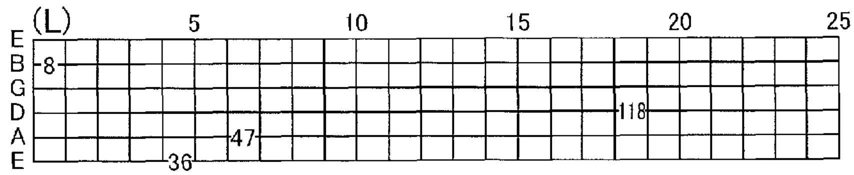
Figure 24M:
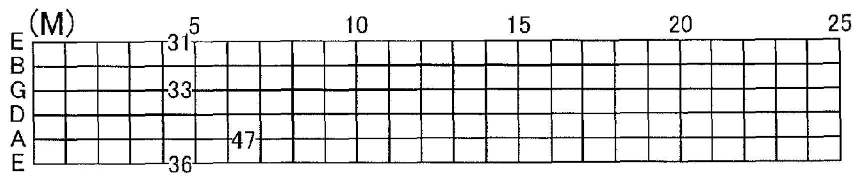
Figure 24N:
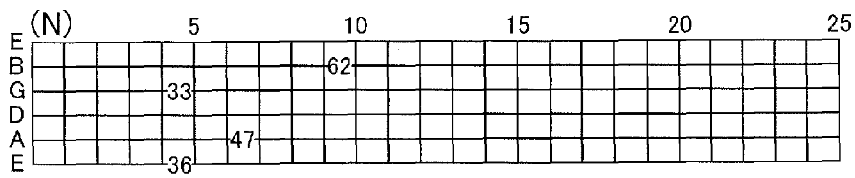
Figure 24O:
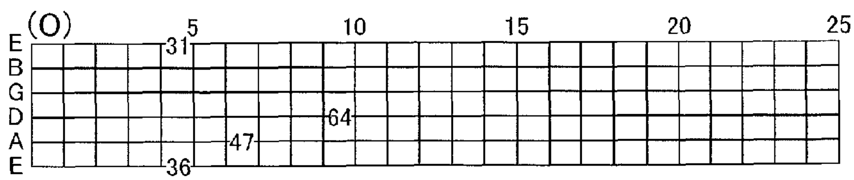
Figure 24P:
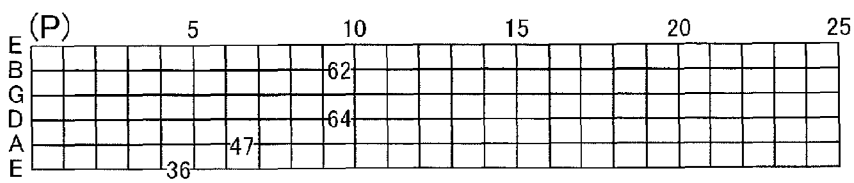
Figure 24Q:
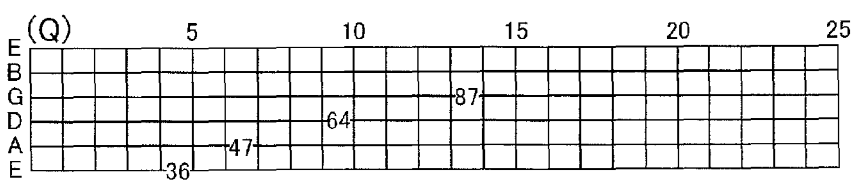
Figure 25A:
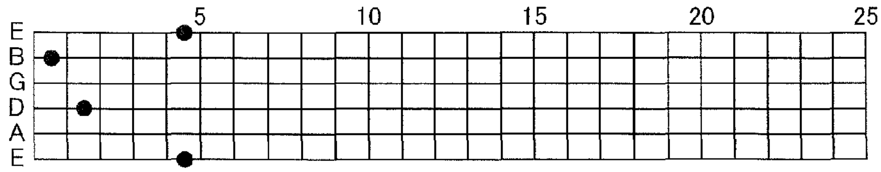
FIGS. 25A to 25I are diagrams illustrating diagrams in which graphic converting means expresses the nine numerical diagrams of (A) to (I), which are illustrated in FIGS. 23A to 23I, by arrays of dots in the guitar teaching data creation method according to the first embodiment.
Figure 25B:
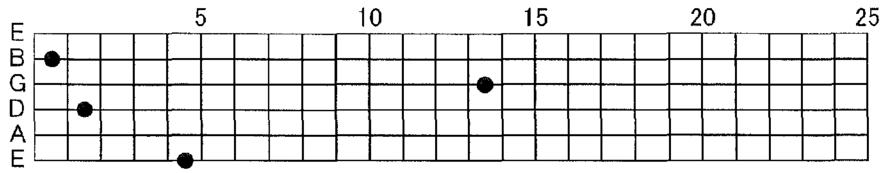
Figure 25C:
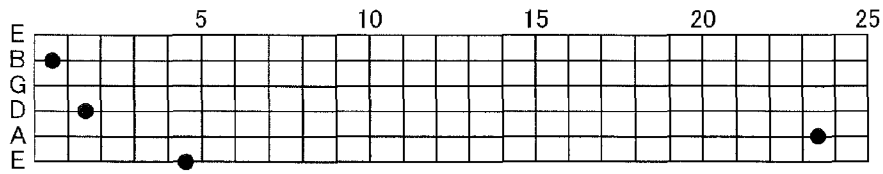
Figure 25D:
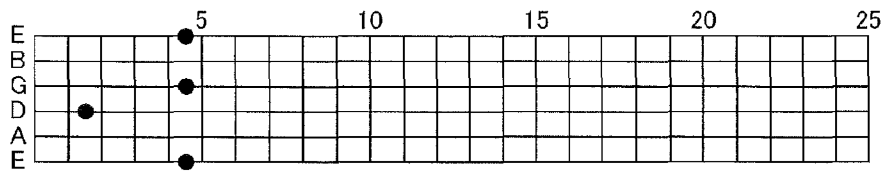
Figure 25E:
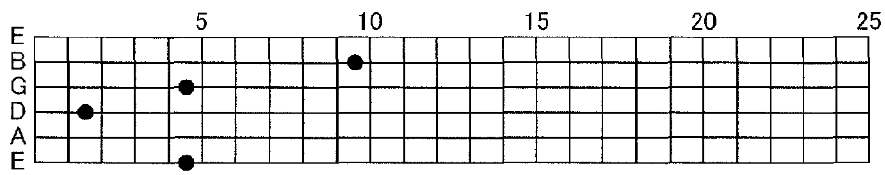
Figure 25F:
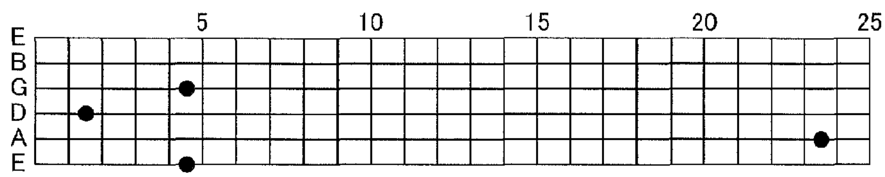
Figure 25G:
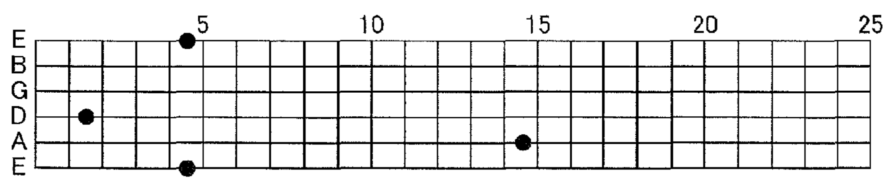
Figure 25H:
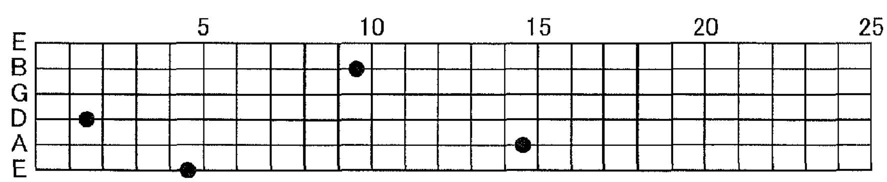
Figure 25I:
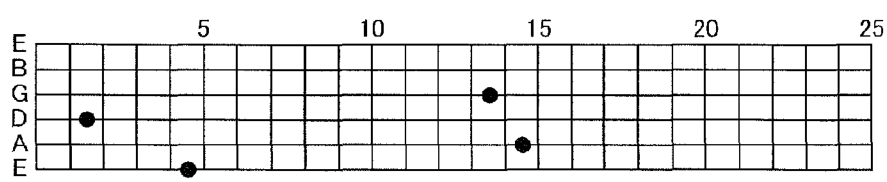
Figure 26J:
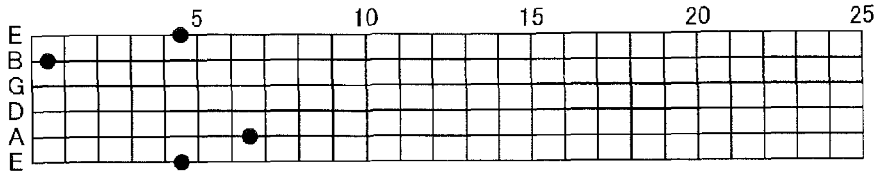
FIGS. 26J to 26Q are diagrams illustrating diagrams in which the graphic converting means expresses the eight numerical diagrams of (J) to (Q), which are illustrated in FIGS. 24J to 24Q, by arrays of dots in the guitar teaching data creation method according to the first embodiment.
Figure 26K:
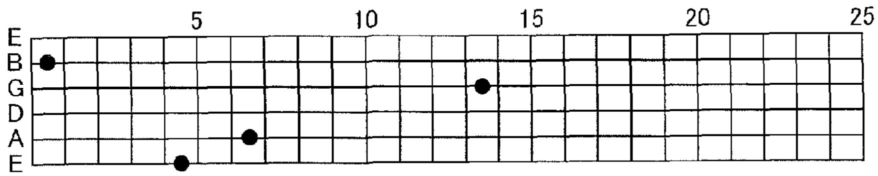
Figure 26L:
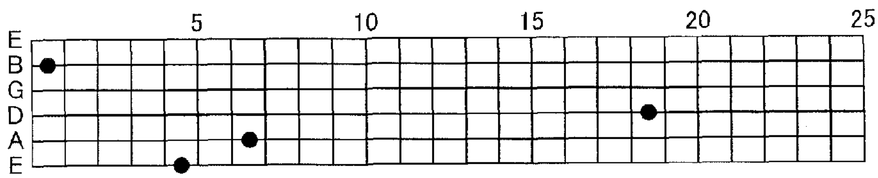
Figure 26M:
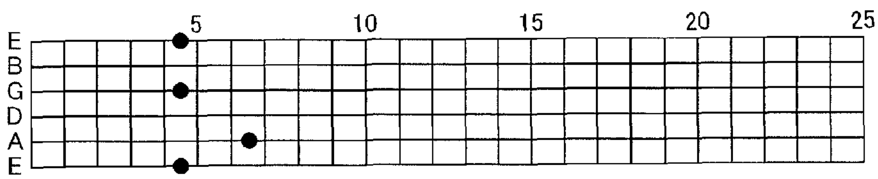
Figure 26N:
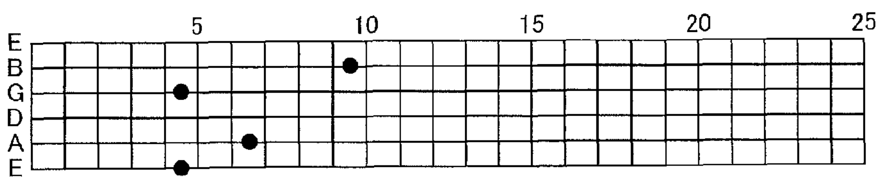
Figure 26O:
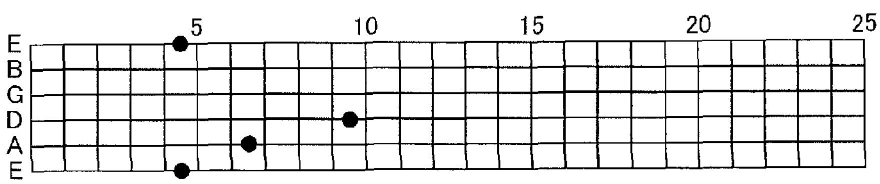
Figure 26P:
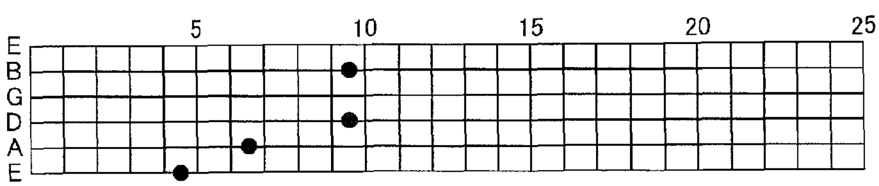
Figure 26Q:
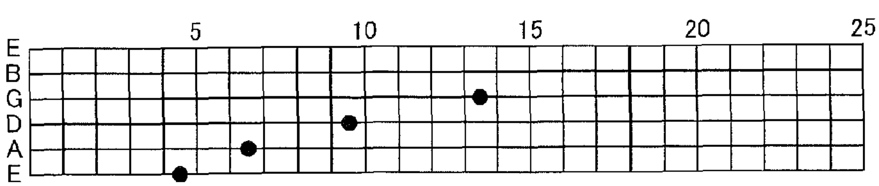

(E) Moreover, in Step S105, the guitar teaching data creation program causes the graphic converting means 225 of the central processing unit 220*a* to read out data for converting the respective positions of the numerical diagram into X-Y coordinates, which are illustrated in FIG. 10, and the 17 numerical diagrams, which are created in Step S104, from the data storage device. Then, by using the data for converting the numerical diagrams indicating the sound positions on the fingerboard into the X-Y coordinates, which are illustrated in FIG. 10, the graphic converting means 225 converts the 17 numerical diagrams, which are created by the numerical diagram creating means 224, into 17 graphics in FIGS. 25A to 25I and FIGS. 26J to 26Q. When the X-Y coordinate conversion data illustrated in FIG. 10 is used, X-Y coordinates illustrated in FIG. 22A are obtained, which are 36=(5.5, 0.0), 16=(2.5, 2.0), 8=(1.5,4.0), 33=(5.5,3.0), 95=(15.5,1.0), 31=(5.5,5.0), 62=(10.5,4.0), 87=(14.5,3.0), 149=(24.5,1.0), 47=(7.5,1.0), 64=(10.5,2.0), and 118=(19.5,2.0). Accordingly, values of the X-Y coordinates=(a,b) of the respective numerals expressed on the 17 numerical diagrams illustrated in FIGS. 23A to 23I and FIGS. 24J to 24Q are assigned to an inequality of circle:

$$(X-a)^2+(Y-b)^2 \leq r^2 \tag{1}$$

and dot shapes obtained by filling circles are formed in regions defined by Expression (1). Then, diagrams are drawn using arrays of these dots, and are converted into the 17 graphics in FIGS. 25A to 25I and FIGS. 26J to 26Q. In an event of drawing the dots obtained by filling the circles, a size of a square with a side length equal to 1, the square being defined by being surrounded by the frets and the strings on the fingerboard illustrated in FIG. 2, is taken into consideration. That is to say, in order that a circle (dot) with a radius equal to a size of ¼ of one square on the fingerboard can be obtained, a value of r=0.25 is used in Expression (1). That is to say, the graphic of the diagram of FIG. 25A corresponds to a graphic in which the respective numerals of the numerical diagram of FIG. 23A are displayed by an array of dots obtained by filling such circles with r=0.25, the graphic of the diagram of FIG. 25B corresponds to a graphic in which the respective numerals of the numerical diagram of FIG. 23B are displayed by such an array of the dots, the graphic of the diagram of FIG. 25C corresponds to a graphic in which the respective numerals of the numerical diagram of FIG. 23C are displayed by such an array of the dots, the graphic of the diagram of FIG. 25D corresponds to a graphic in which the respective numerals of the numerical diagram of FIG. 23D are displayed by such an array of the dots, the graphic of the diagram of FIG. 25E corresponds to a graphic in which the respective numerals of the numerical diagram of FIG. 23E are displayed by such an array of the dots, the graphic of the diagram of FIG. 25F corresponds to a graphic in which the respective numerals of the numerical diagram of FIG. 23F are displayed by such an array of the dots, the graphic of the diagram of FIG. 25G corresponds to a graphic in which the respective numerals of the numerical diagram of FIG. 23G are displayed by such an array of the dots, the graphic of the diagram of FIG. 25H corresponds to a graphic in which the respective numerals of the numerical diagram of FIG. 23H are displayed by such an array of the dots, the graphic of the diagram of FIG. 25I corresponds to a graphic in which the respective numerals of the numerical diagram of FIG. 23I are displayed by such an array of the dots, the graphic of the diagram of FIG. 26J corresponds to a graphic in which the respective numerals of the numerical diagram of FIG. 24J are displayed by such an array of the dots, the graphic of the diagram of FIG. 26K corresponds to a graphic in which the respective numerals of the numerical diagram of FIG. 24K are displayed by such an array of the dots, the graphic of the diagram of FIG. 26L corresponds to a graphic in which the respective numerals of the numerical diagram of FIG. 24L are displayed by such an array of the dots, the graphic of the diagram of FIG. 26M corresponds to a graphic in which the respective numerals of the numerical diagram of FIG. 24M are displayed by such an array of the dots, the graphic of the diagram of FIG. 26N corresponds to a graphic in which the respective numerals of the numerical diagram of FIG. 24N are displayed by such an array of the dots, the graphic of the diagram of FIG. 26O corresponds to a graphic in which the respective numerals of the numerical diagram of FIG. 24O are displayed by such an array of the dots, the graphic of the diagram of FIG. 26P corresponds to a graphic in which the respective numerals of the numerical diagram of FIG. 24P are displayed by such an array of the dots, and the graphic of the diagram of FIG. 26Q corresponds to a graphic in which the respective numerals of the numerical diagram of FIG. 24Q are displayed by such an array of the dots. The graphics of the 17 diagrams, which are converted by the graphic converting means 225, are stored in the data storage device connected to the guitar teaching data creation device 22.

Figure 27B:
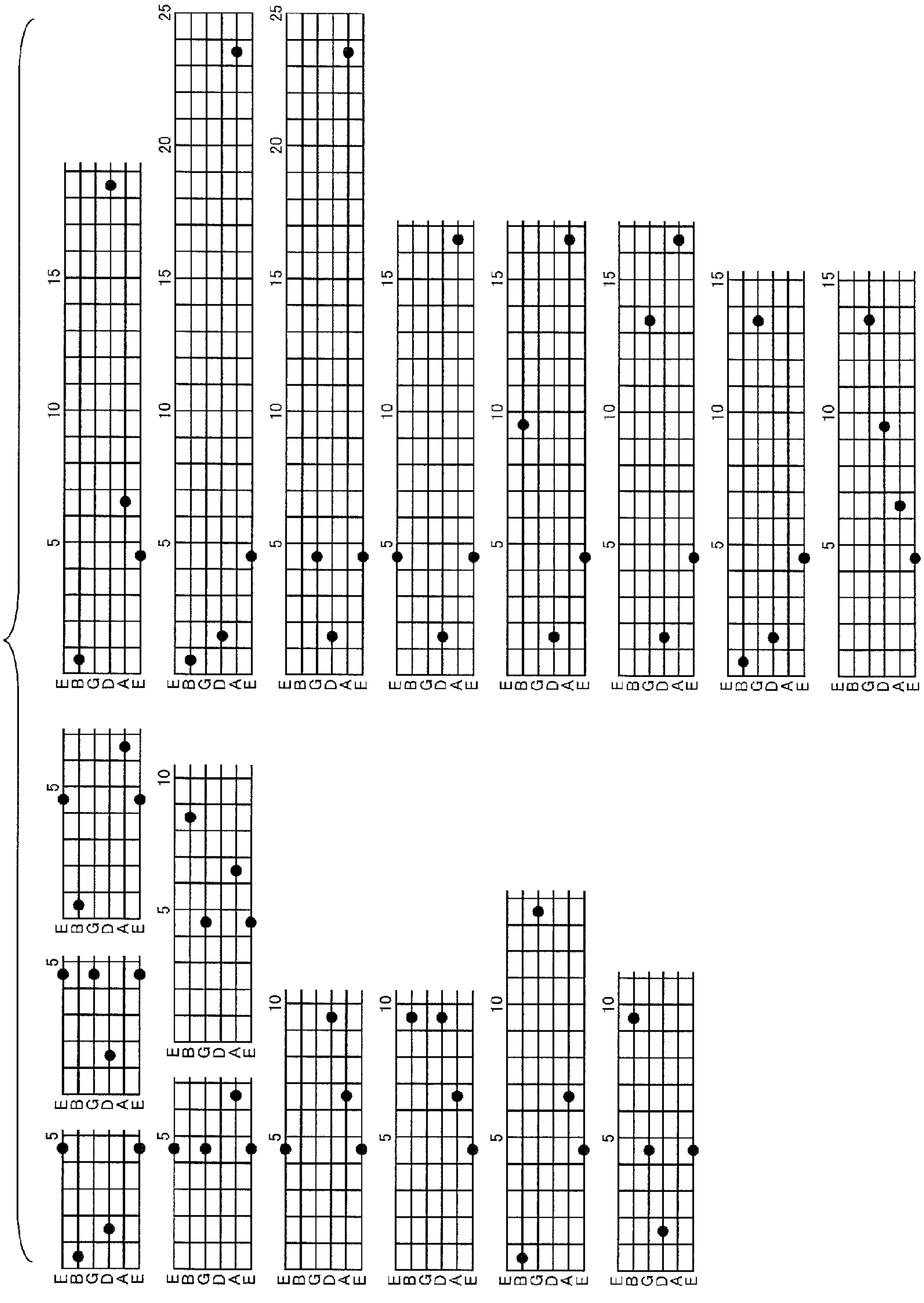
FIGS. 27A and 27B are diagrams illustrating 17 diagrams displayed on the screen of the monitor and the fingerboard in such a manner that display means prioritizes the diagrams illustrated in FIGS. 23A to 23I and FIGS. 24J to 24Q and arranges the diagrams in accordance with orders of such priority in the guitar teaching data creation method according to the first embodiment.
Figure 27A:
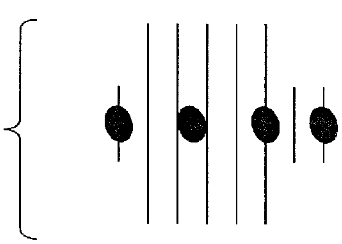

(F) Then, in Step S106, the guitar teaching data creation program causes the display means 226 of the central processing unit 220*a* to read out the graphics of the 17 diagrams, which are displayed by the arrays of the dots obtained by filling the circles with r=0.25, the circles being are converted in Step S105, from the data storage device, and prioritizes all of the graphics (diagrams) converted by the graphic converting means 225. Such prioritization is given in order of forms by which it is possible to touch the 17 graphics (diagrams) of FIGS. 25A to 25I and 26J to 26Q. Moreover, one of the graphics (diagrams) of the forms, which is given highest priority, is selected. In Step S106, in accordance with such orders of priority, the graphics are arranged as illustrated in FIGS. 27A and 27B, and the signal to display the graphics of the diagrams on the screen of the monitor 23*a* and the fingerboard on the upper surface of the neck 122 is transmitted. As a result, in Step S106, the graphics of the 17 diagrams, which are as illustrated in FIGS. 27A and 27B and are individually displayed by the arrays of the dots, are displayed on the screen of the monitor 23*a* and the fingerboard sequentially in order of the forms by which it is possible to touch the strings. Note that, in FIG. 27B, the dots are displayed as black circles for the sake of illustration convenience for such a monochrome drawing, and the diagrams are illustrated by the arrays of the black circles; however, it is not necessary that the actual diagrams be displayed by black circles. For example, if the two-dimensional matrix of the luminous bodies $L_{ij}$ illustrated in FIG. 2 is composed of an array of red LEDs, then the actual diagrams are displayed by red dots, if the two-dimensional matrix of the luminous bodies $L_{ij}$ is composed of an array of green LEDs, then the actual diagrams are displayed by green dots, and if the two-dimensional matrix of the luminous bodies $L_{ij}$ is composed of an array of yellow LEDs, then the actual diagrams are displayed by yellow dots. In such a way, it is possible to express the diagrams by arrays of dots with a variety of colors. In a similar way, also on the screen of the monitor 23*a*, it is possible to illustrate the diagrams by selecting dots with an arbitrary color.

<Guitar Teaching Data Creation Program>

Figure 4:
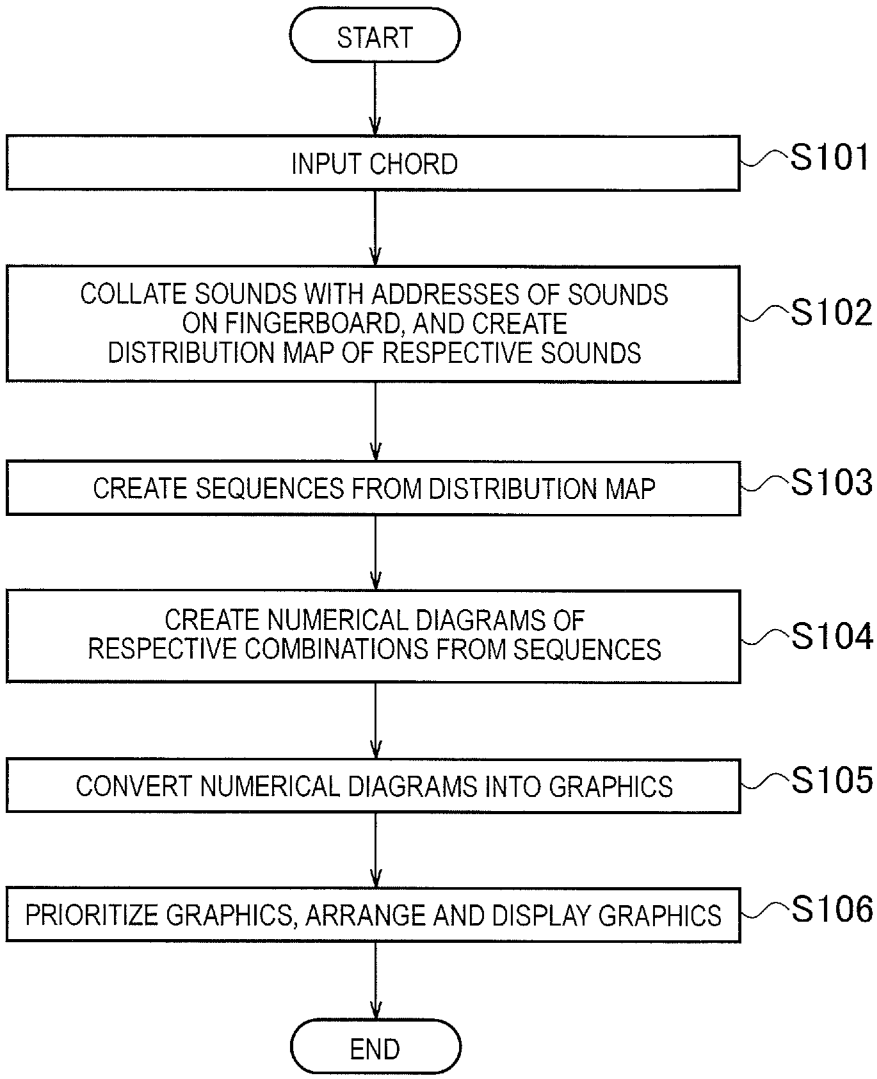
FIG. 4 is a flowchart explaining a guitar teaching data creation method according to the first embodiment of the present invention.

Such operations of a series of the guitar teaching data creation method illustrated in FIG. 4 can be executed by controlling the CPU 220*a*, which is illustrated in FIG. 1, by the guitar teaching data creation program with an algorithm equivalent to that of FIG. 4. As already mentioned, this guitar teaching data creation program just needs to be stored in the program storage device of the computer system that composes the CPU 220*a* according to the first embodiment. Moreover, this program is stored in the computer-readable recording medium, and the program storage device of the CPU 220*a* is caused to read this recording medium, whereby a series of the processing of the guitar teaching data creation method according to the first embodiment can be executed. Here, the "computer-readable recording medium" stands for such a medium that can record a program, the computer-readable external recording medium including, for example, an external memory device of a computer, a semiconductor memory, a magnetic disk, an optical disk, a magneto-optical disk, a magnetic tape, and the like. For example, a main body of the CPU 220*a* can be configured to build therein a flexible disk device (e.g., a flexible disk drive) and an optical disk device (e.g., an optical disk drive) or to cause the flexible disk device and the optical disk device to be externally connected thereto. The flexible disk is inserted into the flexible disk drive from an insertion slot thereof, and the CD-ROM is inserted into the optical disk drive from an insertion slot thereof, and both of them are subjected to a predetermined reading operation, whereby the guitar teaching data creation programs stored in these external recording mediums can be installed into the program storage device that composes the CPU 220*a*. Moreover, a predetermined drive device is connected to the guitar teaching data creation device 22, whereby, for example, the ROM, the magnetic tape device and the like can also be used. Furthermore, it is possible to store the guitar teaching data creation program according to the first embodiment in the program storage device via an information processing network such as the Internet.

As described above, in accordance with the guitar teaching data creation device 22 according to the first embodiment, the difficult-to-understand mechanism on the fingerboard can be grasped mathematically from bird's eyes, and such teaching-oriented data, which is necessary to enhance the skill for the fingering on the fingerboard, the fingering being the most difficult for the guitarists, can be created. In such a way, there can be further provided: the guitar teaching system including the guitar teaching data creation device 22 according to the first embodiment; the guitar teaching data creation method using the guitar teaching data creation device 22 according to the first embodiment; and the guitar teaching data creation program for actuating the guitar teaching data creation device 22 according to the first embodiment.

(Modification Example of First Embodiment)

In a similar way to the configuration illustrated in FIG. 1, a guitar teaching system according to a modification example of the first embodiment of the present invention includes: a guitar for teaching (teaching-oriented guitar: training guitar) 11; an interface 21*a* connected to the teaching-oriented guitar 11 via a wire 32; a guitar teaching data creation device 22 connected to the interface 21*a* via a wire 35; a monitor (display device) 23*a* connected to the guitar teaching data creation device 22 via a wire 37; and a piano keyboard-type keyboard 15 such as a MIDI keyboard connected to the interface 21*a* via a wire 34. The teaching-oriented guitar 11 and the piano keyboard-type keyboard 15 are connected to each other via a wire 33. Moreover, a headphone 16*a* is connected to the teaching-oriented guitar 11 via a wire 31, and a headphone 16*b* is connected to the piano keyboard-type keyboard 15 via a wire 36.

Figure 30B:
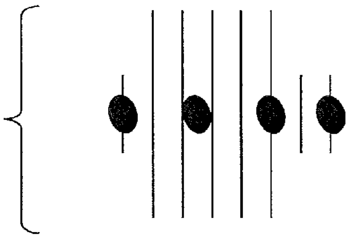
FIGS. 30A and 30B are diagrams explaining that diagrams illustrated in FIG. 30A are converted into musical notes as illustrated in FIG. 30B by the guitar teaching data creation method according to the modification example of the first embodiment.
Figure 30A:
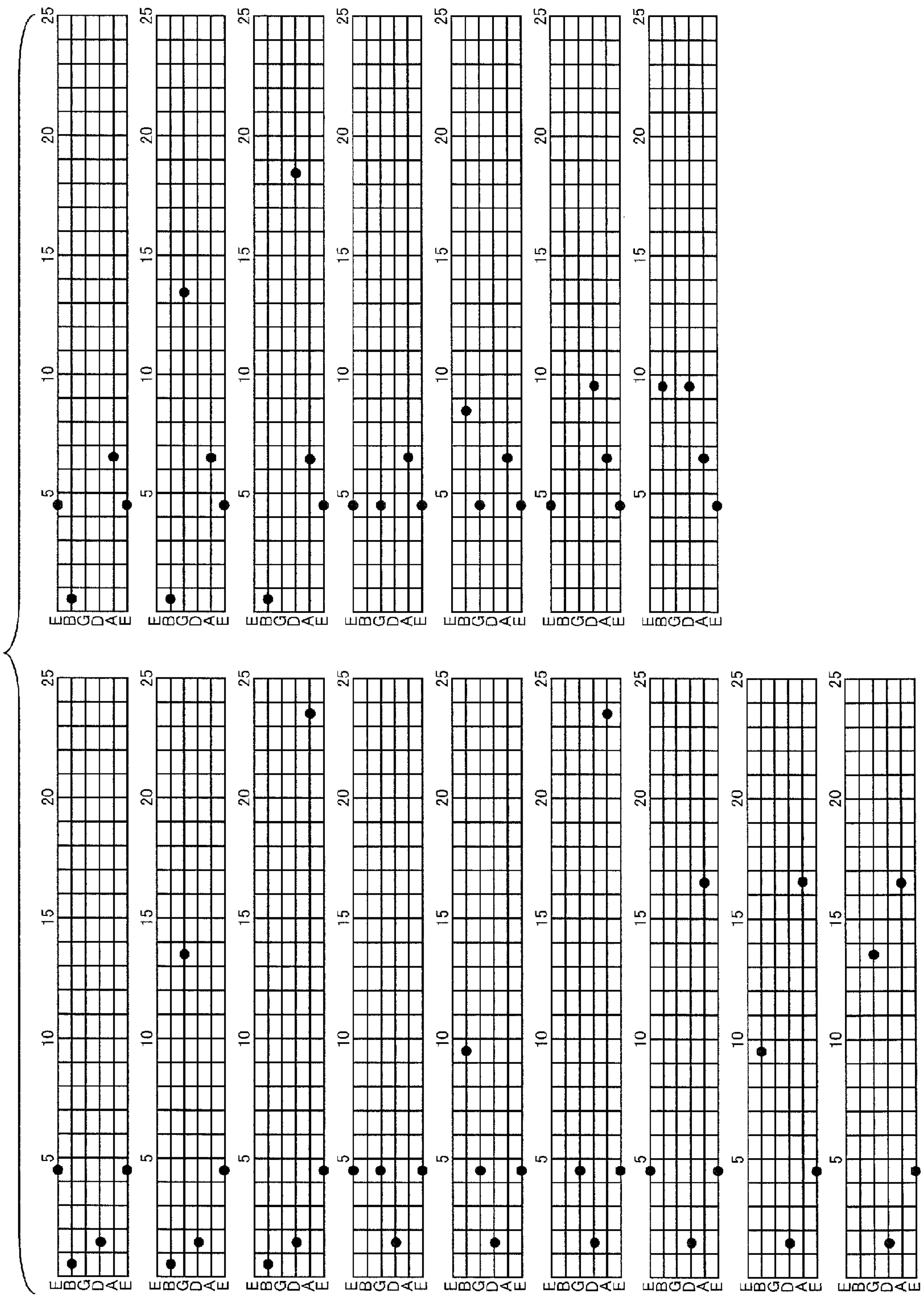

However, in addition to the CPU 220*a* having: the chord inputting means 221 for executing processing for receive chords; the distribution map creating means 222 for creating a distribution map of respective sounds of the chords by collating the respective sounds with sound addresses on a fingerboard of the teaching-oriented guitar 11; sequence creating means 223 for creating sequences from the distribution map created by the distribution map creating means 222; numerical diagram creating means 224 for creating numerical diagrams of respective combinations from the sequences created by the sequence creating means 223, graphic converting means 225 for converting the numerical diagrams, which are created by the numerical diagram creating means 224, into graphics; and display means 226 for prioritizing all of the graphics of the numerical diagrams converted by the graphic converting means 225, and transmitting a signal to display the graphics while arranging the graphics, all of the means being illustrated in FIG. 1, the guitar teaching system according to the modification example further includes a score-deriving central processing unit (CPU) 220*b*, and can convert diagrams as illustrated in FIG. 30A into musical notes as illustrated in FIG. 30B.

Figure 28:
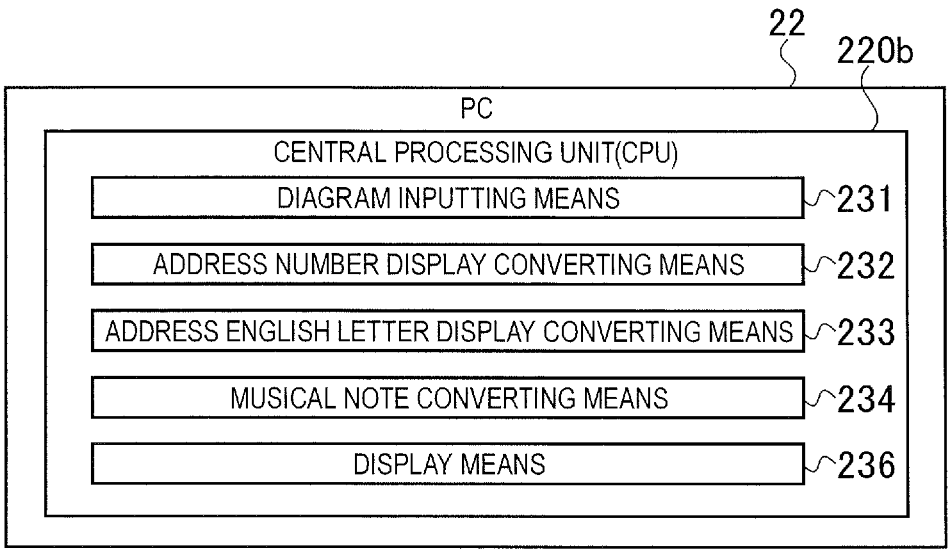
FIG. 28 is a block diagram explaining a logical configuration of hardware resources of a guitar teaching data creation device that composes a guitar teaching system according to a modification example of the first embodiment of the present invention.

As illustrated in FIG. 28, the score-deriving CPU 220*b* is a processor including: diagram inputting means 231 for receiving the diagrams, which are as illustrated in FIG. 30A and are created by the CPU 220*a;* address number display converting means 232 for converting position coordinates of respective dots of the diagrams, which are received by the diagram inputting means 231, individually into numerical (integer value) display of addresses; address English letter display converting means 233 for further converting the numerical display of the addresses, which are converted by the address number display converting means 232, into English display of the addresses; musical note converting means 234 for converting the English letter display, which is converted by the address English letter display converting means 233, into the musical notes as illustrated in FIG. 30B; and display means 236 for transmitting a signal to display the musical notes converted by the musical note converting means 234. The diagram inputting means 231, the address number display converting means 232, the address English letter display converting means 233, the musical note converting means 234 and the display means 236, which are illustrated in FIG. 28, are also drive-controlled by the guitar teaching data creation program stored in the program storage device, and the guitar teaching data for use in the guitar teaching system according to the modification example of the first embodiment is created.

<Score Derivation Method>

Figure 29:
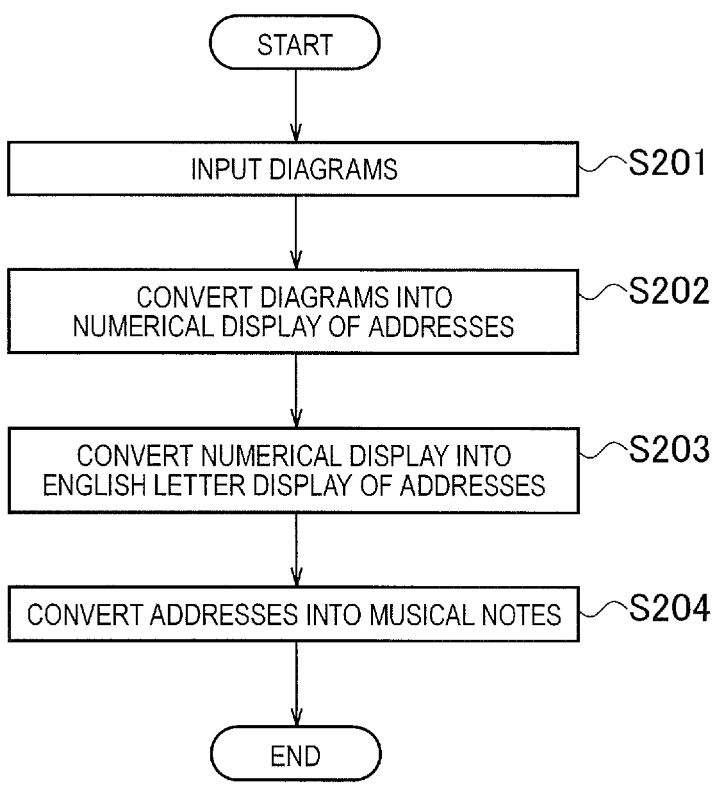
FIG. 29 is a flowchart explaining a score derivation method serving as a guitar teaching data creation method according to the modification example of the first embodiment.

A description is made of a score derivation method according to the modification example of the first embodiment of the present invention by using a flowchart of FIG. 29, and using FIGS. 30A and 30B to FIGS. 34A and 34B. Note that the score derivation method to be described below is merely an example, and as a matter of course, is realizable by a variety of creation methods other than this method, the variety of creation methods including modification examples of this method.

(A) First, the guitar teaching data creation program stored in the program storage device (not illustrated) connected to the guitar teaching data creation device 22 illustrated in FIG. 28 is started. Then, the guitar teaching data creation program drives the diagram inputting means 231 of the score-deriving CPU 220*b* that composes the guitar teaching data creation device 22 illustrated in FIG. 28, and receives the diagrams, which are created by the CPU 220*a*, in Step S201. The diagrams received by the diagram inputting means 231 are stored in the data storage device connected to the guitar teaching data creation device 22.

Figure 31A:
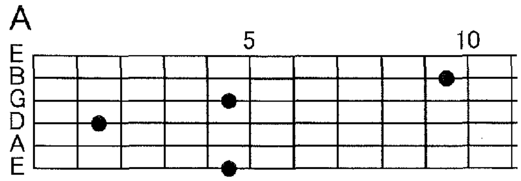
FIGS. 31A and 31B are diagrams illustrating that position coordinates of respective dots of the diagram illustrated in FIG. 31A are converted into numerical display of addresses as illustrated in FIG. 31B for explaining the guitar teaching data creation method according to the modification example of the first embodiment.
Figure 31B:
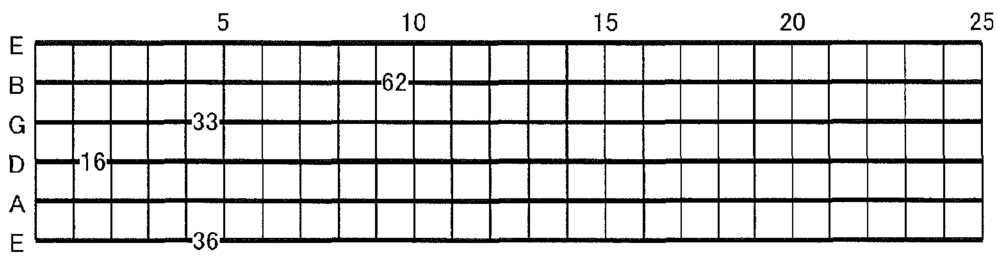
Figure 32A:
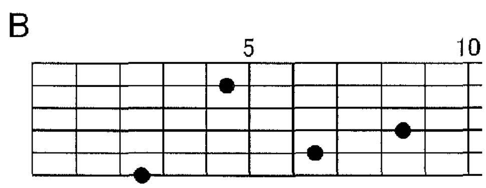
FIGS. 32A and 32B are diagrams illustrating that position coordinates of respective dots of the diagram illustrated in FIG. 32A are converted into numerical display of addresses as illustrated in FIG. 32B for explaining the guitar teaching data creation method according to the modification example of the first embodiment.
Figure 32B:
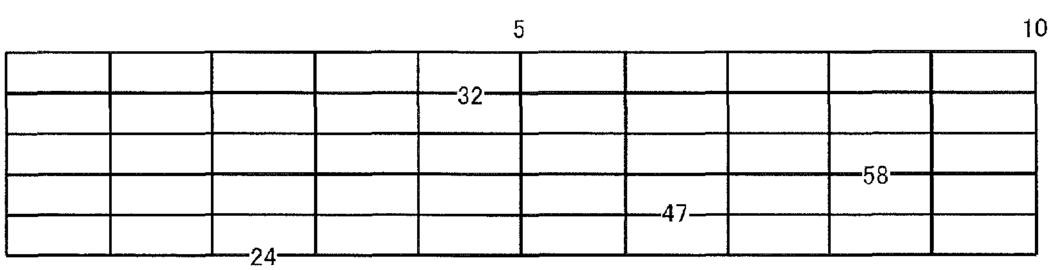

(B) Next, in Step S202, the guitar teaching data creation program causes the address number display converting means 232 of the score-deriving CPU 220*b* illustrated in FIG. 28 to read out the diagrams, which are received in Step S201, from the data storage device, and by using the data in which position coordinates of the sounds on the fingerboard, which are illustrated in FIG. 7, are caused to correspond to the integer values of 1 to 156, converts position coordinates of respective dots of the diagrams, which are illustrated in FIG. 31A, individually into numerical display of addresses, as illustrated in FIG. 31B, and converts position coordinates of respective dots of the diagrams, which are illustrated in FIG. 32A, individually into numerical display of addresses, as illustrated in FIG. 32B. Such numerical displays of the addresses, which are as illustrated in FIG. 31B and FIG. 32B and are created by the address number display converting means 232, are stored in the data storage device connected to the guitar teaching data creation device 22.

Figure 33A:
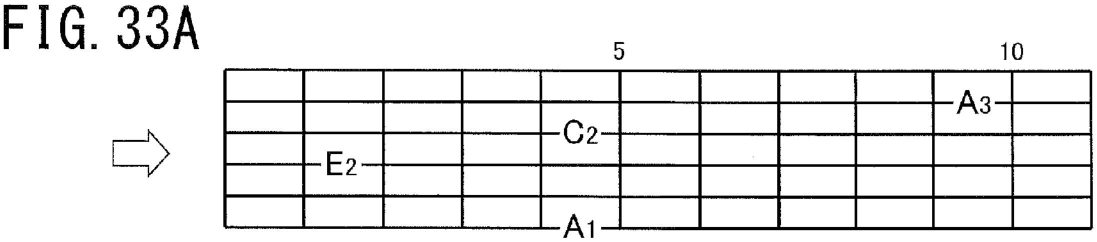
FIGS. 33A and 33B are diagrams explaining, as an explanation of the guitar teaching data creation method according to the modification example of the first embodiment, that address English letter display converting means converts the numerical display of the addresses illustrated in FIG. 31B into English letter display of addresses illustrated in FIG. 33A, and converts the numerical display of the addresses illustrated in FIG. 32B into English letter display of addresses illustrated in FIG. 33B.
Figure 33B:
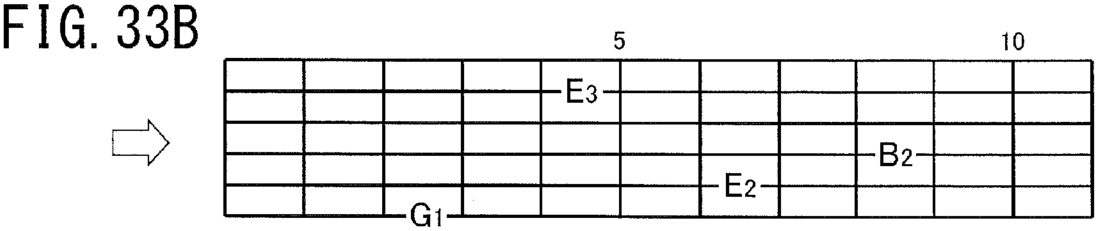

(C) Then, in Step S203, the guitar teaching data creation program causes the address English letter display converting means 233 of the score-deriving CPU 220*b* to read out the numerical display of the addresses, which is converted in Step S202, from the data storage device, and causes the data of the English letter display of the sound addresses on the fingerboard, which are illustrated in FIG. 5, and the data, in which the sound position coordinates illustrated in FIG. 7 are caused to correspond to the integer values, to correspond to each other, and makes conversion from the numerical display of the addresses, which is converted by the address number display converting means 232, into the English letter display of the addresses. FIG. 5 illustrates, by the English letter display, the sound positions on the fingerboard of the six-string guitar in the case where the number of frets is 25. The address English letter display converting means 233 converts the numerical display of the addresses, which is illustrated in FIG. 31B, into the English letter display of the addresses, which is illustrated in FIG. 33A, and converts the numerical display of the addresses, which is illustrated in FIG. 32B, into the English letter display of the addresses, which is illustrated in FIG. 33B. The data of the English letter display of the sound addresses on the fingerboard as illustrated in FIG. 33A and FIG. 33B, which are converted by the address English letter display converting means 233, are stored in the data storage device connected to the guitar teaching data creation device 22.

Figure 34A:
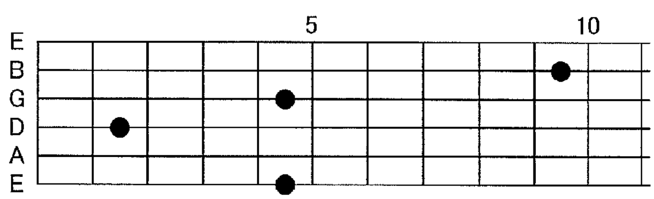
FIGS. 34A and 34B are diagrams explaining, as an explanation of the guitar teaching data creation method according to the modification example of the first embodiment, that musical note converting means converts data of English letter display of sound addresses illustrated in FIG. 34A into musical notes of FIG. 34B.
Figure 34B:
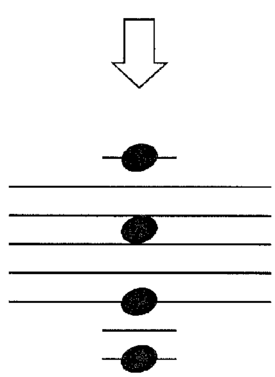
Figure 35A:
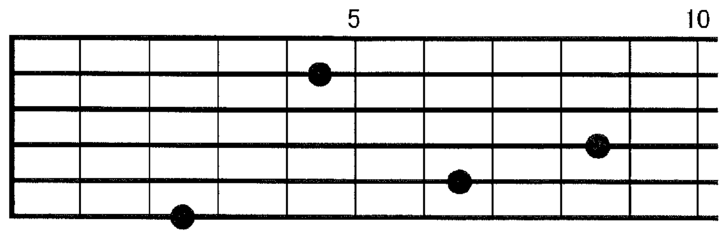
FIGS. 35A and 35B are diagrams explaining, as an explanation of the guitar teaching data creation method according to the modification example of the first embodiment, that the musical note converting means converts data of English letter display of sound addresses illustrated in FIG. 35A into musical notes of FIG. 35B.
Figure 35B:
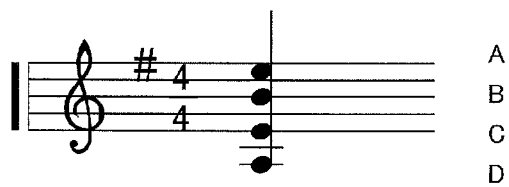

(D) Moreover, in Step S204, the guitar teaching data creation program causes the musical note converting means 234 of the score-deriving CPU 220*b* to read out the data of the English letter display of the addresses, as illustrated in FIG. 33A and FIG. 33B, and converts the readout data individually into musical notes, as illustrated in FIG. 35A and FIG. 35B, based on a correspondence relationship between the data of the English letter display of the sound addresses on the fingerboard, which are illustrated in FIG. 5, and the sound positions on the staff notation, which are illustrated in FIG. 6. As a result, the data of the English letter display of the sound addresses, which are illustrated in FIG. 34A, is converted into musical notes of FIG. 34B, and the data of the English letter display of the sound addresses, which are illustrated in FIG. 35A, is converted into musical notes of FIG. 35B. The musical notes converted by the musical note converting means 234 are stored in the data storage device connected to the guitar teaching data creation device 22.

(E) Though not illustrated in the flowchart of FIG. 29, the guitar teaching data creation program subsequently causes the display means 236 of the score-deriving CPU 220*b* to read out the musical notes, which are converted in Step S204, from the data storage device, and transmits a signal to display the graphics of the diagrams on the screen of the monitor 23*a.* As a result, the musical notes as illustrated in FIG. 34B and FIG. 35B are displayed on the screen of the monitor 23*a.*

<Guitar Teaching Data Creation Program>

Such a series of the processing for executing the score derivation method according to the modification example of the first embodiment, which is illustrated in FIG. 29, can derive the score if the CPU 220*a* illustrated in FIG. 1 is controlled by the guitar teaching data creation program with an algorithm equivalent to that of FIG. 29. As already mentioned, this guitar teaching data creation program just needs to be stored in the program storage device of the computer system that composes the CPU 220*b* according to the modification example of the first embodiment. Moreover, this program is stored in the computer-readable recording medium, and the program storage device of the CPU 220*b* is caused to read this recording medium, whereby a series of the processing of the guitar teaching data creation method according to the score derivation method can be executed. Furthermore, it is possible to store the guitar teaching data creation program according to the score derivation method in the program storage device via an information processing network such as the Internet.

(Second Embodiment)

Though the entire system is not illustrated again, in a substantially similar way to the configuration illustrated in FIG. 1, a guitar teaching system according to a second embodiment of the present invention includes: a guitar for teaching (teaching-oriented guitar: training guitar) 11; an interface 21*a* connected to the teaching-oriented guitar 11 via a wire 32; a guitar teaching data creation device 22 connected to the interface 21*a* via a wire 35; a monitor (display device) 23*a* connected to the guitar teaching data creation device 22 via a wire 37; and a piano keyboard-type keyboard 15 such as a MIDI keyboard connected to the interface 21*a* via a wire 34. The teaching-oriented guitar 11 and the piano keyboard-type keyboard 15 are connected to each other via a wire 33. Moreover, a headphone 16*a* is connected to the teaching-oriented guitar 11 via a wire 31, and a headphone 16*b* is connected to the piano keyboard-type keyboard 15 via a wire 36.

Figure 38:
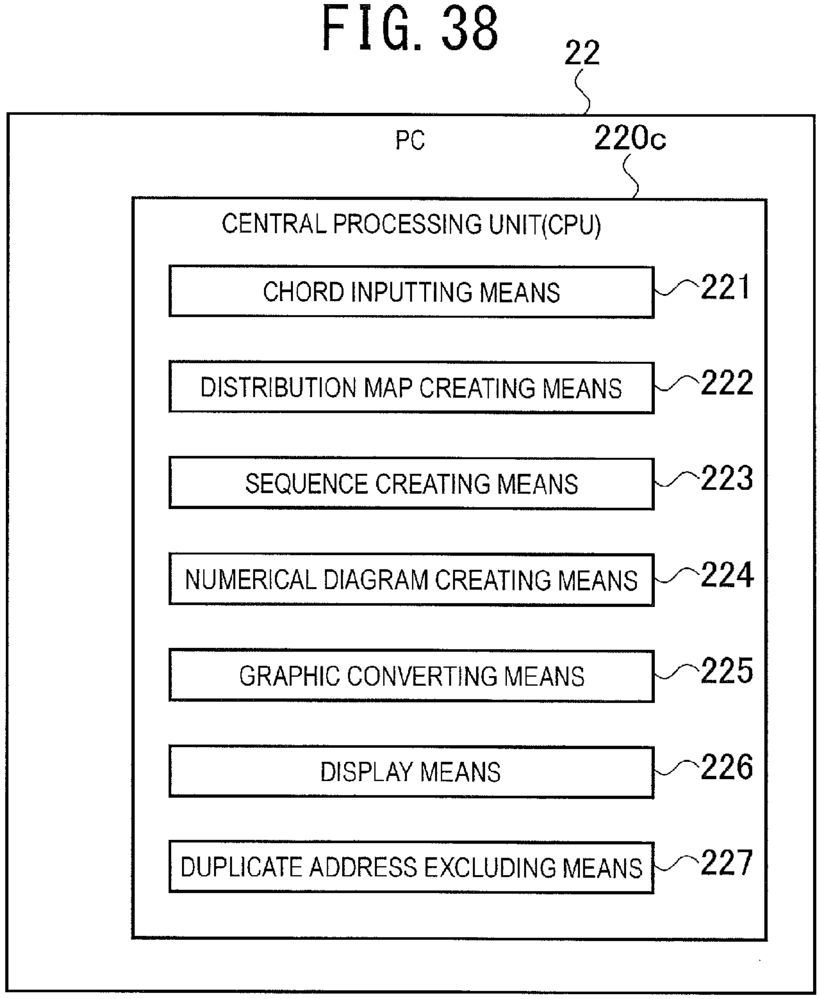
FIG. 38 is a block diagram explaining a logical configuration of hardware resources of a guitar teaching data creation device that composes a guitar teaching system according to a second embodiment of the present invention.

As illustrated in FIG. 38, the guitar teaching data creation device 22 is a processor including a central processing unit (CPU) 220*c* having: chord inputting means 221 for executing processing for receiving chords; distribution map creating means 222 for creating a distribution map of respective sounds of the chords, which are received by the chord inputting means 221, by collating the respective sounds with sound addresses on a fingerboard of the teaching-oriented guitar 11; sequence creating means 223 for creating sequences (combinations) from the distribution map created by the distribution map creating means 222; numerical diagram creating means 224 for creating numerical diagrams (address diagrams) of respective combinations from the sequences created by the sequence creating means 223; graphic converting means 225 for converting the numerical diagrams, which are created by the numerical diagram creating means 224, into graphics; display means 226 for giving a definition to prioritize all of the numerical diagrams converted into the graphics by the graphic converting means 225, determining highest-priority diagrams, and transmitting a signal to display the highest-priority diagrams while arranging the highest-priority diagrams; and duplicate address excluding means 227 for extracting data while excluding data of a sound of a duplicate address in a case where an address of a sound of a voice part located above when viewed from BASS is on the same string, and storing the extracted data of the address. Here, the duplicate address excluding means 227 may be a hardware resource as an internal structure of the sequence creating means 223, or may be a hardware resource that operates in cooperation with the sequence creating means 223, the hardware resource serving as a hardware resource as an external structure of the sequence creating means 223. In a case where the duplicate address excluding means 227 functions as an internal structure of the sequence creating means 223, the CPU 220*c* according to the second embodiment is substantially equal to the CPU 220*a* of the guitar teaching system according to the first embodiment.

In a similar way to the guitar teaching system according to the first embodiment, the guitar teaching data creation device 22 according to the second embodiment can be realized by a computer system such as a PC. In a case where the guitar teaching data creation device 22 is composed of a PC, the monitor 23*a* illustrated in FIG. 1 may be built in the guitar teaching data creation device 22, or may be composed integrally with the guitar teaching data creation device 22. Moreover, though not illustrated, in a similar way to the guitar teaching system according to the first embodiment, a program storage device and a data storage device are connected to or built in the guitar teaching data creation device 22 according to the second embodiment of the present invention. Hence, a guitar teaching data creation program for drive-controlling the chord inputting means 221, the distribution map creating means 222, the sequence creating means 223, the numerical diagram creating means 224, the graphic converting means 225, the display means 226 and the duplicate address excluding means 227, which are illustrated in FIG. 38, and causing these means to create guitar teaching data for use in the guitar teaching system according to the second embodiment just needs to be stored in a program storage device of a computer system that composes the guitar teaching data creation device 22.

Figure 41A:
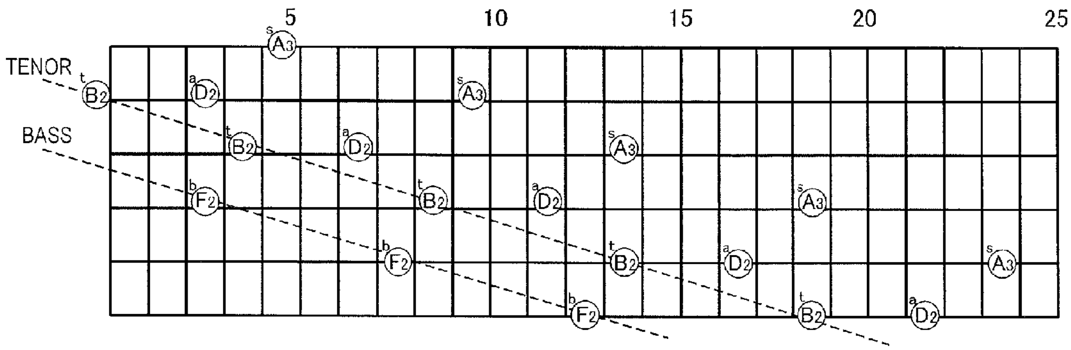
FIG. 41A is, as a distribution map of respective sounds corresponding to the chord illustrated in FIG. 40, a diagram illustrating the data indicated by English letter display of: SOPRANO $A_3$=31, 62, 87, 118, 149; ALTO $D_2$=20, 45, 76, 107, 138; TENOR $B_2$=2, 27, 58, 89, 120; and BASS $F_2$=22, 53, 84, the data being created by the distribution map creating means, while focusing on TENOR $B_2$=2, 27, 58, 89, 120.
Figure 41B:
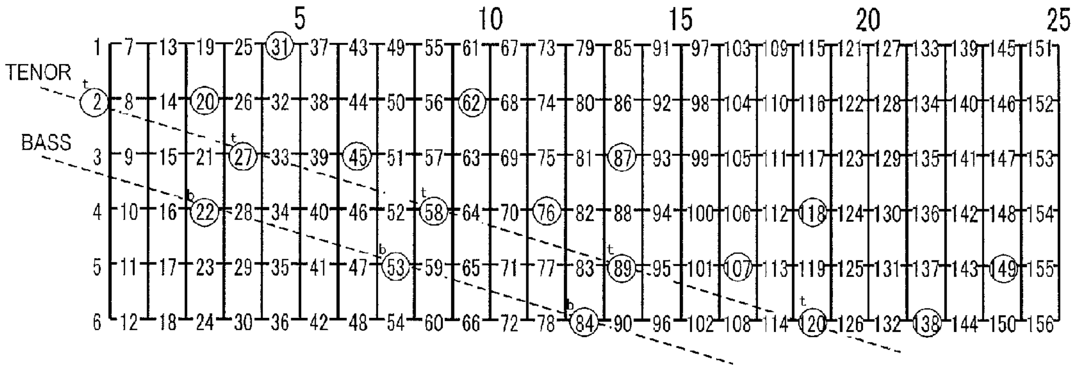
FIG. 41B is a diagram illustrating data indicating positions of sounds on the fingerboard, which correspond to those of FIG. 41A, by converting the positions concerned into the integer values of 1 to 156.
Figure 41C:
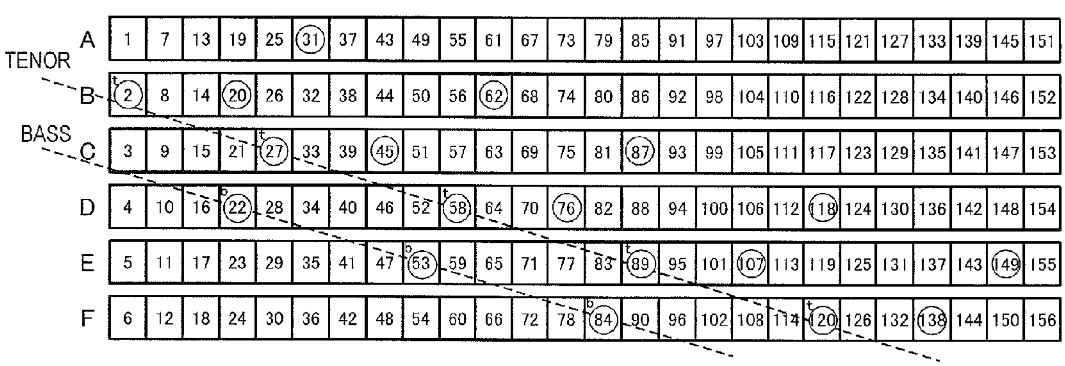
FIG. 41C is a diagram illustrating data in which such integer value data of FIG. 41B is listed into the lateral sequences of A, B, C, D, E and F.
Figure 42A:
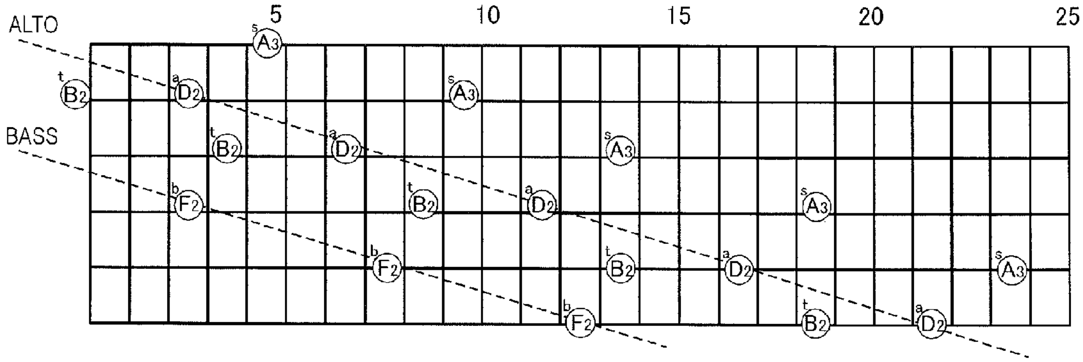
FIG. 42A is, as a distribution map of the respective sounds corresponding to the chord illustrated in FIG. 40, a diagram illustrating the data indicated by the English letter display of: SOPRANO $A_3$=31, 62, 87, 118, 149; ALTO $D_2$=20, 45, 76, 107, 138; TENOR $B_2$=2, 27, 58, 89, 120; and BASS $F_2$=22, 53, 84, the data being created by the distribution map creating means, while focusing on ALTO $D_2$=20, 45, 76, 107, 138.
Figure 42B:
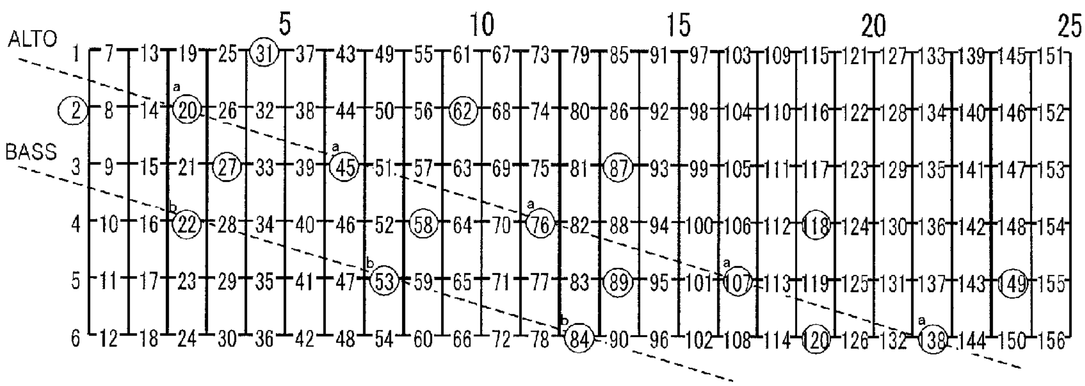
FIG. 42B is a diagram illustrating data indicating positions of sounds on the fingerboard, which correspond to those of FIG. 42A, by converting the positions concerned into the integer values of 1 to 156.
Figure 42C:
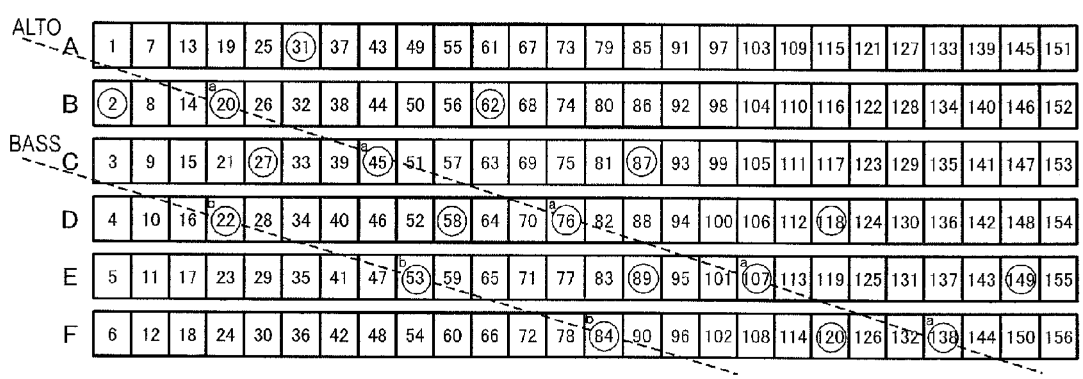
FIG. 42C is a diagram illustrating data in which such integer value data of FIG. 42B is listed into the lateral sequences of A, B, C, D, E and F.
Figure 43A:
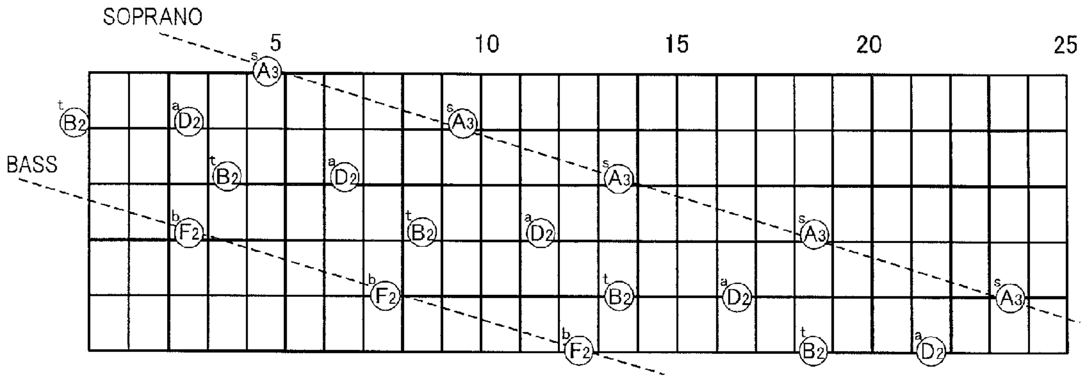
FIG. 43A is, as a distribution map of the respective sounds corresponding to the chord illustrated in FIG. 40, a diagram illustrating the data indicated by the English letter display of: SOPRANO $A_3$=31, 62, 87, 118, 149; ALTO $D_2$=20, 45, 76, 107, 138; TENOR $B_2$=2, 27, 58, 89, 120; and BASS $F_2$=22, 53, 84, the data being created by the distribution map creating means, while focusing on SOPRANO $A_3$=31, 62, 87, 118, 149.
Figure 43B:
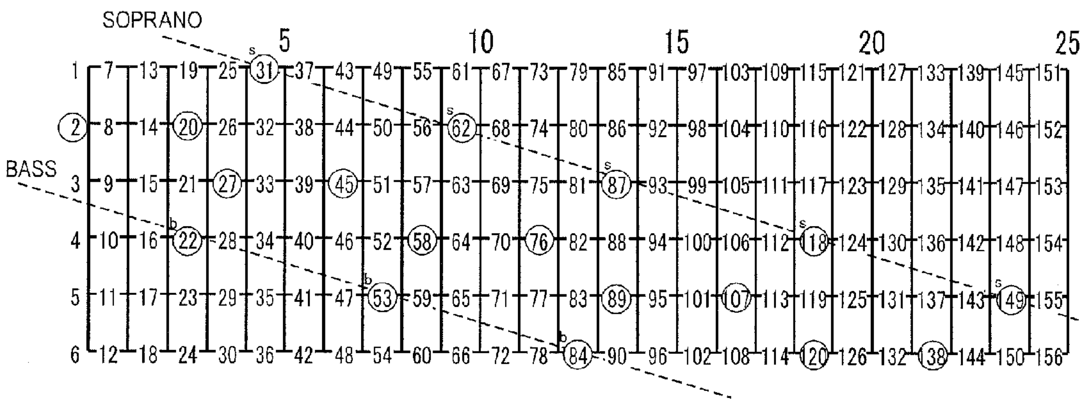
FIG. 43B is a diagram illustrating data indicating positions of sounds on the fingerboard, which correspond to those of FIG. 43A, by converting the positions concerned into the integer values of 1 to 156.
Figure 43C:
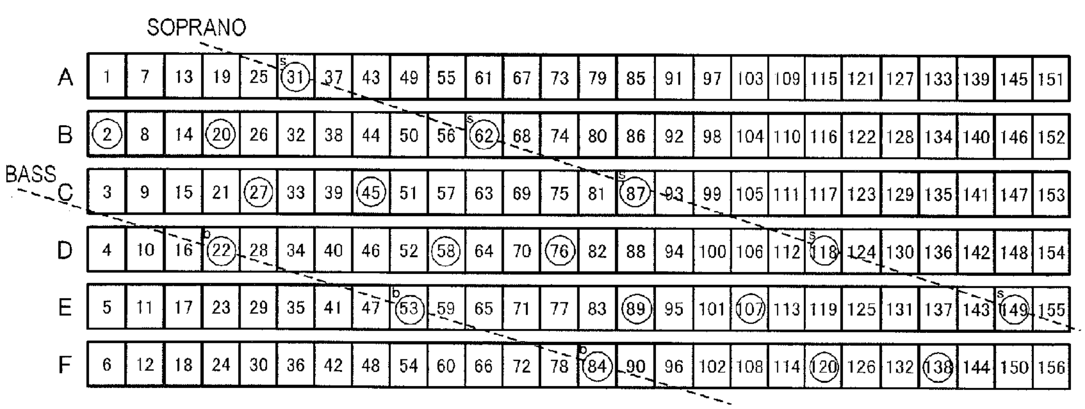
FIG. 43C is a diagram illustrating data in which such integer value data of FIG. 43B is listed into lateral sequences of A, B, C, D, E and F.
Figure 44A:
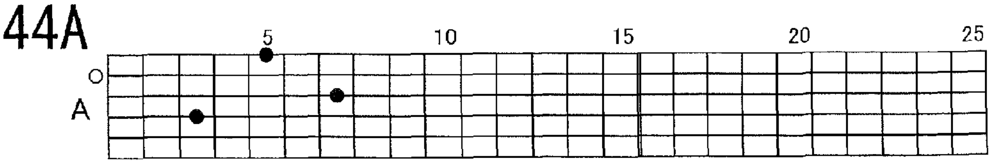
FIGS. 44A to 44J are diagrams illustrating 10 graphics corresponding to 10 sequences of A to J in a case of setting a third-fret $F_2$=22 to a root among 94 diagrams created by the graphic converting means in Step S306 in accordance with the flowchart illustrated in FIG. 39.
Figure 44B:
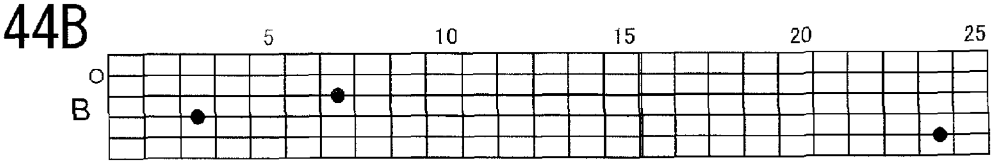
Figure 44C:
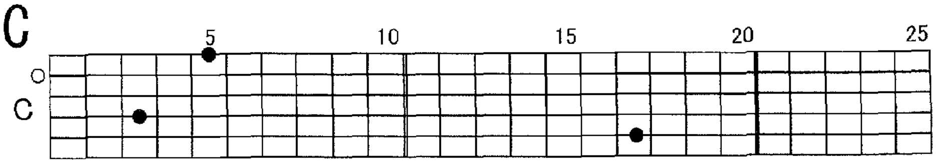
Figure 44D:
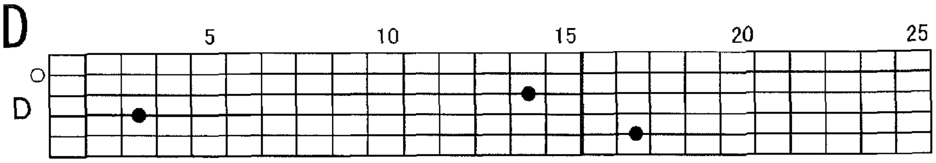
Figure 44E:
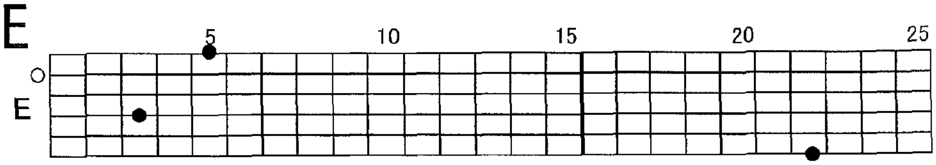
Figure 44F:
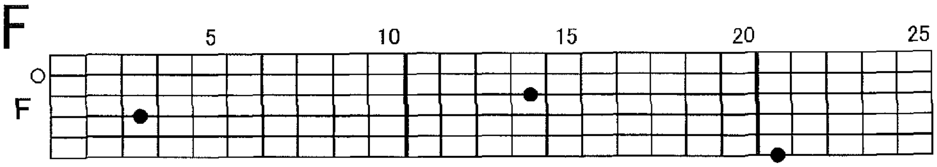
Figure 44G:
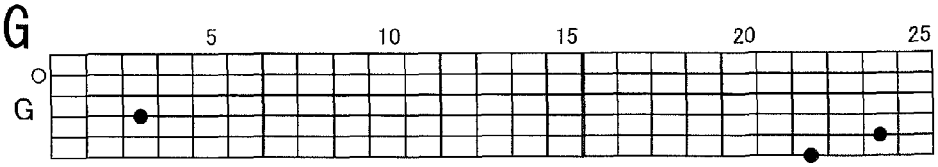
Figure 44H:
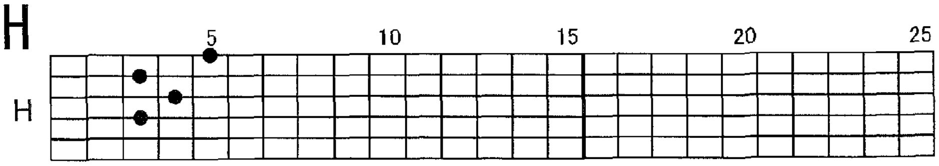
Figure 44I:
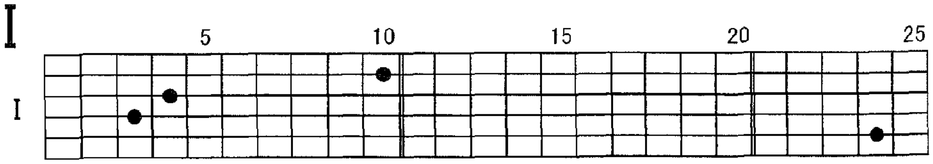
Figure 44J:
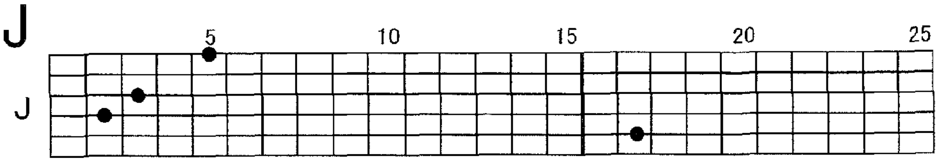
Figure 45A:
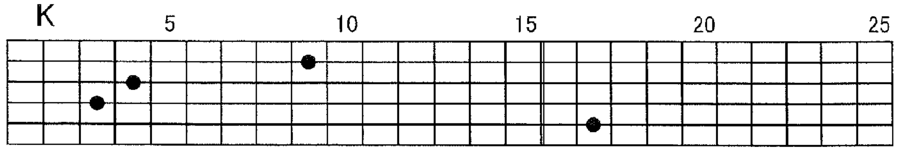
FIGS. 45A to 45J are diagrams illustrating 10 graphics corresponding to 10 sequences of K to T in the case of setting the third-fret $F_2$=22 to the root among the 94 diagrams created by the graphic converting means in Step S306 in accordance with the flowchart illustrated in FIG. 39.
Figure 45B:
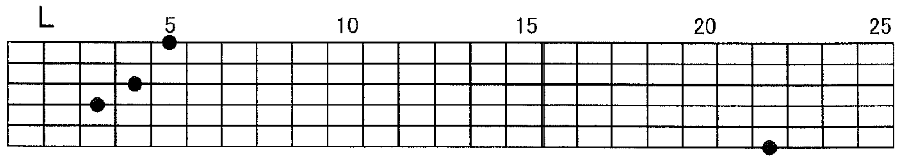
Figure 45C:
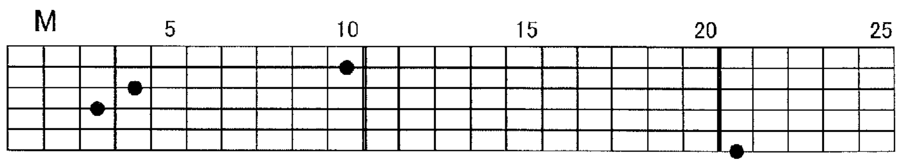
Figure 45D:
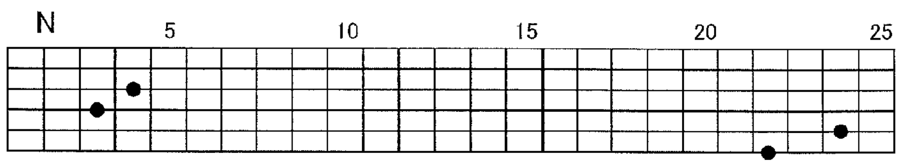
Figure 45E:
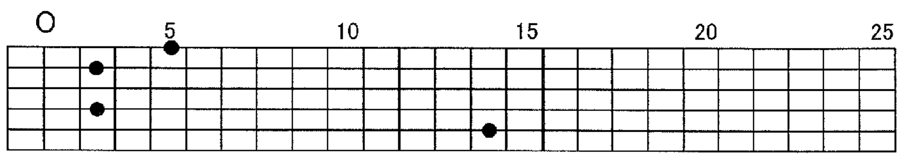
Figure 45F:
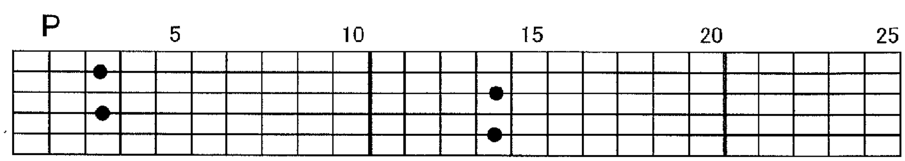
Figure 45G:
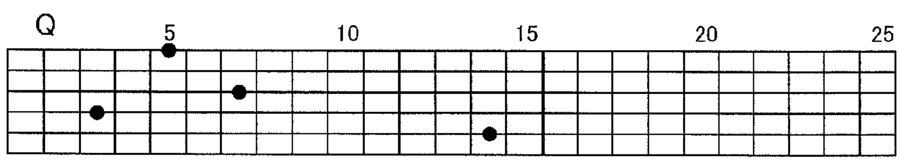
Figure 45H:
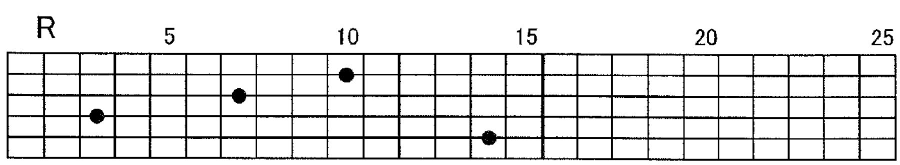
Figure 45I:
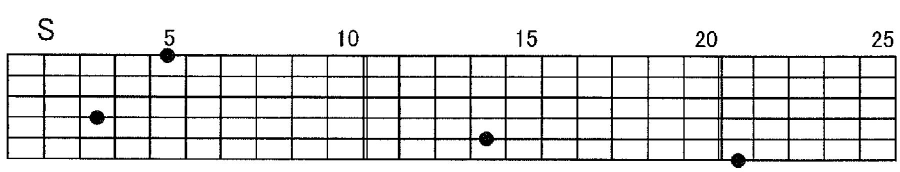
Figure 45J:
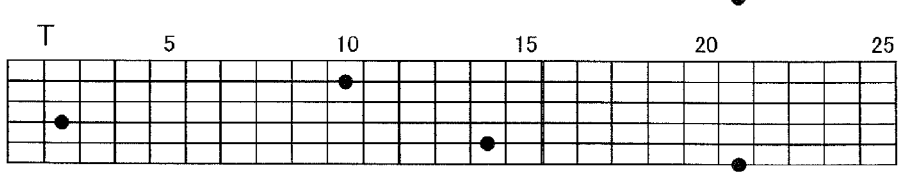
Figure 46A:
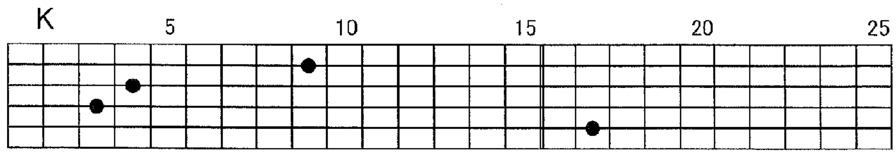
FIGS. 46A to 46J are diagrams illustrating 10 graphics corresponding to 10 sequences of U to Z and a to d in the case of setting the third-fret $F_2$=22 to the root among the 94 diagrams created by the graphic converting means in Step S306 in accordance with the flowchart illustrated in FIG. 39.
Figure 46B:
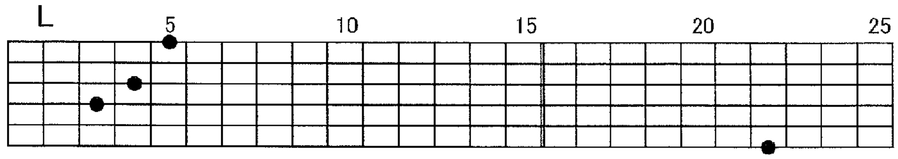
Figure 46C:
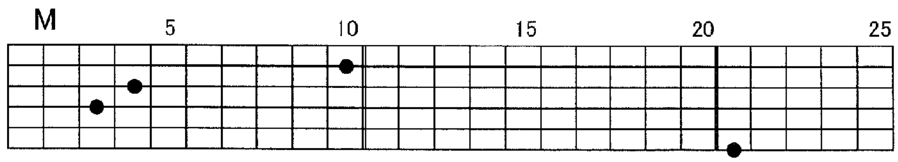
Figure 46D:
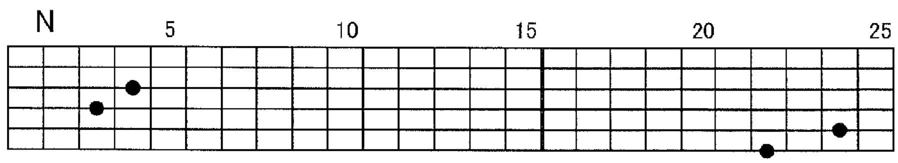
Figure 46E:
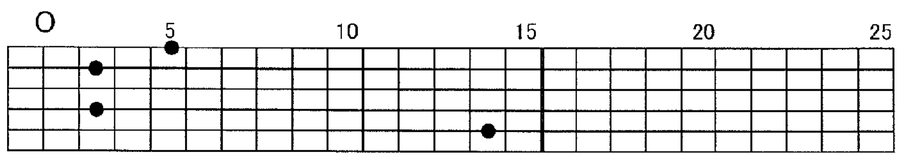
Figure 46F:
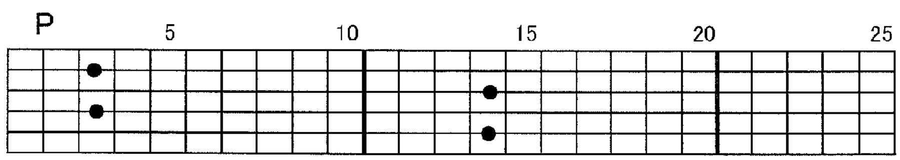
Figure 46G:
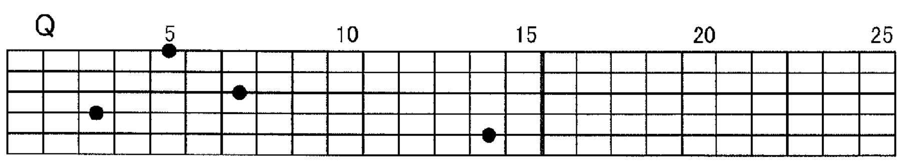
Figure 46H:
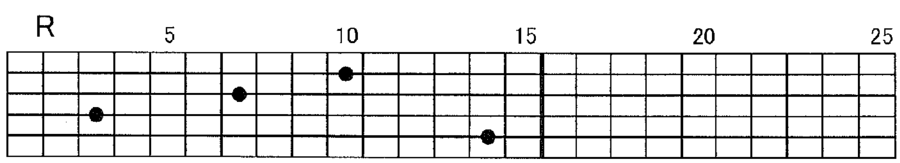
Figure 46I:
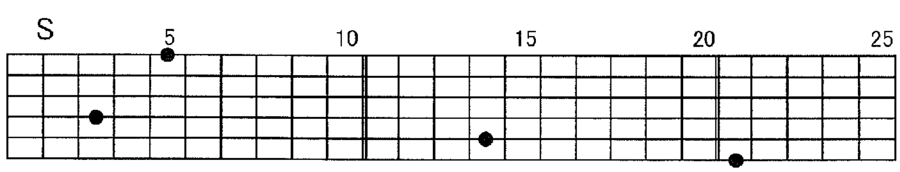
Figure 46J:
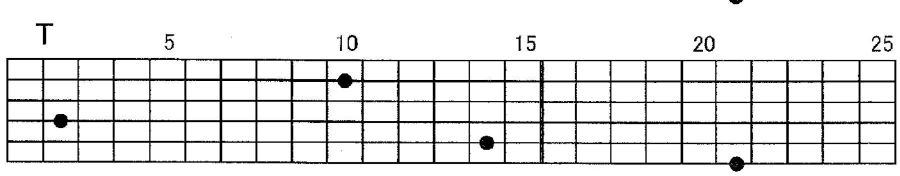

Meanwhile, varieties of input/output data and parameters, which are necessary for guitar teaching data creation, data under computation, and the like, can be stored in the data storage device. In the data storage device, there are also stored: data as illustrated in FIGS. 41A, 42A and 43A, which indicate sound positions on the fingerboard by the English letter display; data as illustrated in FIGS. 41B, 42B and 43B, in which the sound positions on the fingerboard are converted into the integer values of 1 to 156; data as illustrated in FIGS. 41C, 42C and 43C, in which the data converted into the integer values are listed to lateral sequences; and the like. Then, the guitar teaching data creation program according to the second embodiment of the present invention is stored in a computer-readable external recording medium, and the program storage device of the guitar teaching data creation device 22 is caused to read a content recorded in the external recording medium, whereby the guitar teaching data creation program concerned can execute a series of the processing of the guitar teaching data creation of the present invention. The guitar teaching data creation device 22 according to the second embodiment of the present invention is configurable of computer system such as a PC, and accordingly, illustration thereof is omitted. However, the guitar teaching data creation device 22 may further include input devices such as a PC keyboard, a mouse, and a light pen. This fact or other configurations such as the structure of the teaching-oriented guitar 11 are substantially similar to those of the guitar teaching system according to the first embodiment, and accordingly, a duplicate description is omitted.

In the case where the address of the sound of the voice part located above when viewed from BASS is located on the same string, then based on such distribution maps as illustrated in FIGS. 41A, 42A and 43A created by the distribution map creating means 222, the duplicate address excluding means 227 that composes the guitar teaching data creation device 22 of the guitar teaching system according to the second embodiment excludes the data of the sound of the duplicate address as below in accordance with a command of the guitar teaching data creation program, which is stored in the program storage device, and sequentially stores the extracted data in the data storage device. Note that the term "root" also appears in the following description; however, as already mentioned, strictly, should be described as "BASS". However, for sake of convenience, the description is made while using the term "root".

(a) First, from BASS 22, 53, 84 of the distribution map of FIG. 41A, that is, while taking the third-fret $F_2$=22, the eighth-fret $F_2$=53 and the 13th-fret $F_2$=84 as roots, TENOR $B_2$=2, 27, 58, 89, 120 are searched. First, in a case where the third-fret $F_2$=22 is taken as the root, then from lateral sequence lists of FIG. 41C, TENOR 58 is on the sequence list of D in the same way as BASS 22, and is arrayed on the same string as that of BASS 22, and accordingly, it is impossible to touch TENOR 58. Hence, TENOR 58 is deleted, and TENOR 2, 27, 89, 120 are extracted with respect to BASS 22. TENOR 2, 27, 89, 120, which are thus extracted, are stored in the data storage device connected to the guitar teaching data creation device 22. In a similar way, in a case where the eighth-fret $F_2$=53 is taken as the root, then from the lateral sequence lists of FIG. 41C, TENOR 89 is on the sequence list of E in the same way as BASS 53, and is arrayed on the same string as that of BASS 53, and accordingly, it is impossible to touch TENOR 89. Hence, TENOR 89 is deleted, and TENOR 2, 27, 58, 120 are extracted with respect to BASS 53. TENOR 2, 27, 58, 120, which are thus extracted, are stored in the data storage device connected to the guitar teaching data creation device 22. Moreover, in a case where the 13th-fret $F_2$=84 is taken as the root, then from the lateral sequence lists of FIG. 41C, TENOR 120 is on the sequence list of F in the same way as BASS 84, and is arrayed on the same string as that of BASS 84, and accordingly, it is impossible to touch TENOR 120. Hence, TENOR 120 is deleted, and TENOR 2, 27, 58, 89 are extracted with respect to BASS 84. TENOR 2, 27, 58, 89, which are thus extracted, are stored in the data storage device connected to the guitar teaching data creation device 22.

(b) Here, the processing returns to the case where TENOR 2, 27, 89, 120 are extracted while taking the third-fret $F_2$=22 as the root. That is to say, TENOR 2 is focused, and ALTO 20, 45, 76, 107, 138 are searched from TENOR 2 of the distribution map of FIG. 42A. From the lateral sequence lists of FIG. 42C, ALTO 20 is on the sequence list of B in the same way as TENOR 2, ALTO 76 is on the sequence list of D in the same way as BASS 22, and both of them are arrayed on the same strings as those of TENOR 2 and BASS 22, and accordingly, it is impossible to touch ALTO 20 and ALTO 76. Hence, ALTO 20 and 76 are deleted, and ALTO 45, 107, 138 are extracted with respect to TENOR 2 as shown in Table 1.

TABLE 1

| BASS | TENOR | ALTO |
|---|---|---|
| 22 | 2 | 45 |
| 22 | 2 | 107 |
| 22 | 2 | 138 |

ALTO 45, 107, 138 extracted as shown in Table 1 are stored in the data storage device connected to the guitar teaching data creation device 22. Moreover, the third-fret $F_2$=22 is taken as a root, TENOR 27 in a case where TENOR 2, 27, 89, 120 are extracted is focused, and ALTO 20, 45, 76, 107, 138 are searched from TENOR 27 of the distribution map of FIG. 42A. From the lateral sequence lists of FIG. 42C, ALTO 45 is on the sequence list of C in the same way as TENOR 27, ALTO 76 is on the sequence list of D in the same way as BASS 22, and both of them are arrayed on the same strings as those of TENOR 27 and BASS 22, and accordingly, it is impossible to touch ALTO 45 and ALTO 76. Hence, ALTO 45 and 76 are deleted, and ALTO 20, 107, 138 are extracted with respect to TENOR 27 as shown in Table 2.

TABLE 2

| BASS | TENOR | ALTO |
|---|---|---|
| 22 | 27 | 20 |
| 22 | 27 | 107 |
| 22 | 27 | 138 |

ALTO 20, 107, 138 extracted as shown in Table 2 are stored in the data storage device (not illustrated) connected to the guitar teaching data creation device 22. Moreover, the third-fret $F_2$=22 is taken as a root, TENOR 89 in the case where TENOR 2, 27, 89, 120 are extracted is focused, and ALTO 20, 45, 76, 107, 138 are searched from TENOR 89 of the distribution map of FIG. 42A. From the lateral sequence lists of FIG. 42C, ALTO 107 is on the sequence list of E in the same way as TENOR 89, ALTO 76 is on the sequence list of D in the same way as BASS 22, and both of them are arrayed on the same strings as those of TENOR 89 and BASS 22, and accordingly, it is impossible to touch ALTO 107 and ALTO 76. Hence, ALTO 107 and 76 are deleted, and ALTO 20, 45, 138 are extracted with respect to TENOR 89 as shown in Table 3.

TABLE 3

| BASS | TENOR | ALTO |
|---|---|---|
| 22 | 89 | 20 |
| 22 | 89 | 45 |
| 22 | 89 | 138 |

ALTO 20, 45, 138 extracted as shown in Table 3 are stored in the data storage device connected to the guitar teaching data creation device 22. Moreover, the third-fret F2=22 is taken as a root, TENOR 120 in the case where TENOR 2, 27, 89, 120 are extracted is focused, and ALTO 20, 45, 76, 107, 138 are searched from TENOR 120 of the distribution map of FIG. 42A. From the lateral sequence lists of FIG. 42C, ALTO 138 is on the sequence list of F in the same way as TENOR 120, ALTO 76 is on the sequence list of D in the same way as BASS 22, and both of them are arrayed on the same strings as those of TENOR 120 and BASS 22, and accordingly, it is impossible to touch ALTO 138 and ALTO 76. Hence, ALTO 138 and ALTO 76 are deleted, and ALTO 20, 45, 107 are extracted with respect to TENOR 120 as shown in Table 4.

TABLE 4

| BASS | TENOR | ALTO |
|---|---|---|
| 22 | 120 | 20 |
| 22 | 120 | 45 |
| 22 | 120 | 107 |

ALTO 20, 45, 107 extracted as shown in Table 4 are stored in the data storage device connected to the guitar teaching data creation device 22.

(c) Next, the third-fret F2=22 is taken as a root, TENOR 2, 27, 89, 120 are extracted, and moreover, the processing returns to the case where ALTO 45, 107, 138 are extracted with respect to TENOR 2 as shown in Table 1. First, ALTO 45 is focused, and SOPRANO 31, 62, 87, 118, 149 are searched from ALTO 45 of the distribution map of FIG. 43A. From the lateral sequence lists of FIG. 43C, SOPRANO 87 is on the sequence list of C in the same way as ALTO 45, SOPRANO 62 is on the sequence list of B in the same way as TENOR 2, SOPRANO 118 is on the sequence list of D in the same way as BASS 22, and all of them are arrayed on the same strings as those of ALTO 45, TENOR 2 and BASS 22, and accordingly, it is impossible to touch SOPRANO 62, 87, 118. Hence, SOPRANO 62, 87, 118 are deleted, and SOPRANO 31, 149 are extracted with respect to ALTO 45 as shown in Table 5.

TABLE 5

| BASS | TENOR | ALTO | SOPRANO |
|---|---|---|---|
| 22 | 2 | 45 | 31 |
| 22 | 2 | 45 | 149 |

SOPRANO 31, 149 extracted as shown in Table 5 are stored in the data storage device connected to the guitar teaching data creation device 22. Moreover, as shown in Table 1, ALTO 107 in the case where ALTO 45, 107, 138 are extracted with respect to TENOR 2 is focused, and SOPRANO 31, 62, 87, 118, 149 are searched from ALTO 107 of the distribution map of FIG. 43A. From the lateral sequence lists of FIG. 43C, SOPRANO 149 is on the sequence list of E in the same way as ALTO 107, SOPRANO 62 is on the sequence list of B in the same way as TENOR 2, SOPRANO 118 is on the sequence list of D in the same way as BASS 22, and all of them are arrayed on the same strings as those of ALTO 107, TENOR 2 and BASS 22, and accordingly, it is impossible to touch SOPRANO 149, 62, 118. Hence, SOPRANO 149, 62, 118 are deleted, and SOPRANO 31, 87 are extracted with respect to ALTO 107 as illustrated in Table 6.

TABLE 6

| BASS | TENOR | ALTO | SOPRANO |
|---|---|---|---|
| 22 | 2 | 107 | 31 |
| 22 | 2 | 107 | 87 |

SOPRANO 31, 87 extracted as shown in Table 6 are stored in the data storage device connected to the guitar teaching data creation device 22. Moreover, as shown in Table 1, ALTO 138 in the case where ALTO 45, 107, 138 are extracted with respect to TENOR 2 is focused, and SOPRANO 31, 62, 87, 118, 149 are searched from ALTO 138 of the distribution map of FIG. 43A. From the lateral sequence lists of FIG. 43C, SOPRANO 62 is on the sequence list of B in the same way as TENOR 2 SOPRANO 118 is on the sequence list of D in the same way as BASS 22, and both of them are arrayed on the same strings as those of TENOR 2 and BASS 22, and accordingly, it is impossible to touch SOPRANO 62, 118. Hence, SOPRANO 62, 118 are deleted, and SOPRANO 31, 87, 149 are extracted with respect to ALTO 138 as shown in Table 7.

TABLE 7

| BASS | TENOR | ALTO | SOPRANO |
|---|---|---|---|
| 22 | 2 | 138 | 31 |
| 22 | 2 | 138 | 87 |
| 22 | 2 | 138 | 149 |

ALTO 31, 87, 149 extracted as shown in Table 7 are stored in the data storage device connected to the guitar teaching data creation device 22. In an inside of the data storage device, the data of Tables 5 to 7 are automatically summarized, formed into such data as in Table 8, and are stored.

TABLE 8

| | BASS | TENOR | ALTO | SOPRANO |
|---|---|---|---|---|
| A | 22 | 2 | 45 | 31 |
| B | 22 | 2 | 45 | 149 |
| C | 22 | 2 | 107 | 31 |
| D | 22 | 2 | 107 | 87 |
| E | 22 | 2 | 138 | 31 |
| F | 22 | 2 | 138 | 87 |
| G | 22 | 2 | 138 | 149 |

(d) Next, the third-fret F2=22 is taken as a root, TENOR 2, 27, 89, 120 are extracted, and moreover, the processing returns to the case where ALTO 20, 107, 138 are extracted with respect to TENOR 27 as shown in Table 2. First, ALTO 20 is focused, and SOPRANO 31, 62, 87, 118, 149 are searched from ALTO 20 of the distribution map of FIG. 43A. From the lateral sequence lists of FIG. 43C, SOPRANO 62 is on the sequence list of B in the same way as ALTO 20, SOPRANO 87 is on the sequence list of C in the same way as TENOR 27, SOPRANO 118 is on the sequence list of D in the same way as BASS 22, and all of them are arrayed on the same strings as those of ALTO 20, TENOR 27 and BASS 22, and accordingly, it is impossible to touch SOPRANO 62, 87, 118. Hence, SOPRANO 62, 87, 118 are deleted, and SOPRANO 31, 149 are extracted with respect to ALTO 20 as shown in Table 9.

TABLE 9

| BASS | TENOR | ALTO | SOPRANO |
|---|---|---|---|
| 22 | 27 | 20 | 31 |
| 22 | 27 | 20 | 149 |

SOPRANO 31, 149 extracted as shown in Table 9 are stored in the data storage device connected to the guitar teaching data creation device 22. Moreover, as shown in Table 2, ALTO 107 in the case where ALTO 20, 107, 138 are extracted with respect to TENOR 27 is focused, and SOPRANO 31, 62, 87, 118, 149 are searched from ALTO 107 of the distribution map of FIG. 43A. From the lateral sequence lists of FIG. 43C, SOPRANO 149 is on the sequence list of B in the same way as ALTO 107, SOPRANO 87 is on the sequence list of C in the same way as TENOR 27 SOPRANO 118 is on the sequence list of D in the same way as BASS 22, and all of them are arrayed on the same strings as those of ALTO 107, TENOR 27 and BASS 22, and accordingly, it is impossible to touch SOPRANO 149, 87, 118. Hence, SOPRANO 149, 87, 118, are deleted, and SOPRANO 31, 62 are extracted with respect to ALTO 107 as shown in Table 10.

TABLE 10

| BASS | TENOR | ALTO | SOPRANO |
|---|---|---|---|
| 22 | 27 | 107 | 31 |
| 22 | 27 | 107 | 62 |

SOPRANO 31, 62 extracted as shown in Table 10 are stored in the data storage device connected to the guitar teaching data creation device 22. Moreover, as shown in Table 2, ALTO 138 in the case where ALTO 20, 107, 138 are extracted with respect to TENOR 28 is focused, and SOPRANO 31, 62, 87, 118, 149 are searched from ALTO 138 of the distribution map of FIG. 43A. From the lateral sequence lists of FIG. 43C, SOPRANO 87 is on the sequence list of C in the same way as TENOR 27, SOPRANO 118 is on the sequence list of D in the same way as BASS 22, and both of them are arrayed on the same strings as those of TENOR 27 and BASS 22, and accordingly, it is impossible to touch SOPRANO 87, 118. Hence, SOPRANO 87, 118 are deleted, and as shown in Table 11, SOPRANO 31, 62, 149 are extracted with respect to ALTO 138.

TABLE 11

| BASS | TENOR | ALTO | SOPRANO |
|---|---|---|---|
| 22 | 27 | 138 | 31 |
| 22 | 27 | 138 | 62 |
| 22 | 27 | 138 | 149 |

SOPRANO 31, 62, 149 extracted as shown in Table 11 are stored in the data storage device connected to the guitar teaching data creation device 22. In the inside of the data storage device, the data of Tables 9 to 11 are automatically summarized, formed into such data as in Table 12, and are stored.

TABLE 12

| | BASS | TENOR | ALTO | SOPRANO |
|---|---|---|---|---|
| H | 22 | 27 | 20 | 31 |
| I | 22 | 27 | 20 | 149 |
| J | 22 | 27 | 107 | 31 |
| K | 22 | 27 | 107 | 62 |
| L | 22 | 27 | 138 | 31 |
| M | 22 | 27 | 138 | 62 |
| N | 22 | 27 | 138 | 149 |

(e) Next, TENOR 2, 27, 89, 120 are extracted while taking the third-fret F2=22 as a root, and further, as shown in Table 3, the processing returns to the case where ALTO 20, 45, 138 are extracted with respect to TENOR 89. First, ALTO 20 is focused, and SOPRANO 31, 62, 87, 118, 149 are searched from ALTO 20 of the distribution map of FIG. 43A. From the lateral sequence lists of FIG. 43C, SOPRANO 62 is on the sequence list of B in the same way as ALTO 20, SOPRANO 149 is on the sequence list of E in the same way as TENOR 89, SOPRANO 118 is on the sequence list of D in the same way as BASS 22, and all of them are arrayed on the same strings as those of ALTO 20, TENOR 89 and BASS 22, and accordingly, it is impossible to touch SOPRANO 62, 149, 118. Hence, SOPRANO 62, 149, 118 are deleted, and as shown in Table 13, SOPRANO 31, 87 are extracted with respect to ALTO 20.

TABLE 13

| BASS | TENOR | ALTO | SOPRANO |
|---|---|---|---|
| 22 | 89 | 20 | 31 |
| 22 | 89 | 20 | 87 |

SOPRANO 31, 87 extracted as shown in Table 13 are stored in the data storage device connected to the guitar teaching data creation device 22. Moreover, as shown in Table 3, ALTO 45 in the case where ALTO 20, 45, 138 are extracted with respect to TENOR 89 is focused, and SOPRANO 31, 62, 87, 118, 149 are searched from ALTO 45 of the distribution map of FIG. 43A. From the lateral sequence lists of FIG. 43C, SOPRANO 87 is on the sequence list of C in the same way as ALTO 45, SOPRANO 149 is on the sequence list of E in the same way as TENOR 89, SOPRANO 118 is on the sequence list of D in the same way as BASS 22, and all of them are arrayed on the same strings as those of ALTO 45, TENOR 89 and BASS 22, and accordingly, it is impossible to touch SOPRANO 149, 87, 118. Hence, SOPRANO 149, 87, 118 are deleted, and as shown in Table 14, SOPRANO 31, 62 are extracted with respect to ALTO 45.

TABLE 14

| BASS | TENOR | ALTO | SOPRANO |
|---|---|---|---|
| 22 | 89 | 45 | 31 |
| 22 | 89 | 45 | 62 |

SOPRANO 31, 62 extracted as shown in Table 14 are stored in the data storage device connected to the guitar teaching data creation device 22. Moreover, as shown in Table 3, ALTO 138 in the case where ALTO 20, 45, 138 are extracted with respect to TENOR 89 is focused, and SOPRANO 31, 62, 87, 118, 149 are searched from ALTO 138 of the distribution map of FIG. 43A. From the lateral sequence lists of FIG. 43C, SOPRANO 149 is on the sequence list of E in the same way as TENOR 89, SOPRANO 118 is on the sequence list of D in the same way as BASS 22, and both of them are arrayed on the same strings as those of TENOR 89 and BASS 22, and accordingly, it is impossible to touch SOPRANO 149, 118. Hence, SOPRANO 149, 118 are deleted, and as shown in Table 15, SOPRANO 31, 62, 87 are extracted with respect to ALTO 138.

TABLE 15

| BASS | TENOR | ALTO | SOPRANO |
|---|---|---|---|
| 22 | 89 | 138 | 31 |
| 22 | 89 | 138 | 62 |
| 22 | 89 | 138 | 87 |

SOPRANO 31, 62, 87 extracted as shown in Table 15 are stored in the data storage device connected to the guitar teaching data creation device 22. In the inside of the data storage device, the data of Tables 13 to 15 are automatically summarized, formed into such data as in Table 16, and are stored.

TABLE 16

| | BASS | TENOR | ALTO | SOPRANO |
|---|---|---|---|---|
| O | 22 | 89 | 20 | 31 |
| P | 22 | 89 | 20 | 87 |
| Q | 22 | 89 | 107 | 31 |
| R | 22 | 89 | 107 | 62 |
| S | 22 | 89 | 138 | 31 |
| T | 22 | 89 | 138 | 62 |
| U | 22 | 89 | 138 | 87 |

(f) Next, TENOR 2, 27, 89, 120 are extracted while taking the third-fret F2=22 as a root, and further, as shown in Table 4, the processing returns to the case where ALTO 20, 45, 107 are extracted with respect to TENOR 120. First, ALTO 20 is focused, and SOPRANO, 62, 87, 118, 149 are searched from ALTO 20 of the distribution map of FIG. 43A. From the lateral sequence lists of FIG. 43C, SOPRANO 62 is on the sequence list of B in the same way as ALTO 20, SOPRANO 118 is on the sequence list of D in the same way as BASS 22, and both of them are arrayed on the same strings as those of ALTO 20 and BASS 22, and accordingly, it is impossible to touch SOPRANO 62, 118. Hence, SOPRANO 62, 118 are deleted, and as shown in Table 17, SOPRANO 31, 87, 149 are extracted with respect to ALTO 20.

TABLE 17

| BASS | TENOR | ALTO | SOPRANO |
|---|---|---|---|
| 22 | 120 | 20 | 31 |
| 22 | 120 | 20 | 87 |
| 22 | 120 | 20 | 149 |

SOPRANO 31, 87, 149 extracted as shown in Table 17 are stored in the data storage device connected to the guitar teaching data creation device 22. Moreover, as shown in Table 4, ALTO 45 in the case where ALTO 20, 45, 107 are extracted with respect to TENOR 120 is focused, and SOPRANO 31, 62, 87, 118, 149 are searched from ALTO 45 of the distribution map of FIG. 43A. From the lateral sequence lists of FIG. 43C, SOPRANO 87 is on the sequence list of C in the same way as ALTO 45, SOPRANO 118 is on the sequence list of D in the same way as BASS 22, and both of them are arrayed on the same strings as those of ALTO 45 and BASS 22, and accordingly, it is impossible to touch SOPRANO 87, 118. Hence, SOPRANO 87, 118 are deleted, and as shown in Table 18, SOPRANO 31, 62, 149 are extracted with respect to ALTO 45.

TABLE 18

| BASS | TENOR | ALTO | SOPRANO |
|---|---|---|---|
| 22 | 120 | 45 | 31 |
| 22 | 120 | 45 | 62 |
| 22 | 120 | 45 | 149 |

SOPRANO 31, 62, 149 extracted as shown in Table 18 are stored in the data storage device connected to the guitar teaching data creation device 22. Moreover, as shown in Table 4, ALTO 107 in the case where ALTO 20, 45, 107 are extracted with respect to TENOR 120 is focused, and SOPRANO 31, 62, 87, 118, 149 are searched from ALTO 107 of the distribution map of FIG. 43A. From the lateral sequence lists of FIG. 43C, SOPRANO 149 is on the sequence list of E in the same way as ALTO 107, SOPRANO 118 is on the sequence list of D in the same way as BASS 22, and both of them are arrayed on the same strings as those of ALTO 107 and BASS 22, and accordingly, it is impossible to touch SOPRANO 149, 118. Hence, SOPRANO 149, 118 are deleted, and as shown in Table 19, SOPRANO 31, 62, 87 are extracted with respect to ALTO 107.

TABLE 19

| BASS | TENOR | ALTO | SOPRANO |
|---|---|---|---|
| 22 | 120 | 107 | 31 |
| 22 | 120 | 107 | 62 |
| 22 | 120 | 107 | 87 |

SOPRANO 31, 62, 87 extracted as shown in Table 19 are stored in the data storage device connected to the guitar teaching data creation device 22. In the inside of the data storage device, the data of Tables 17 to 19 are automatically summarized, formed into such data as in Table 20, and are stored.

TABLE 20

| | BASS | TENOR | ALTO | SOPRANO |
|---|---|---|---|---|
| V | 22 | 120 | 20 | 31 |
| W | 22 | 120 | 20 | 87 |
| X | 22 | 120 | 20 | 149 |
| Y | 22 | 120 | 45 | 31 |
| Z | 22 | 120 | 45 | 62 |
| a | 22 | 120 | 45 | 149 |
| b | 22 | 120 | 107 | 31 |
| c | 22 | 120 | 107 | 62 |
| d | 22 | 120 | 107 | 87 |

Moreover, in the inside of the data storage device, the data of Tables 8, 12, 16, 20 are automatically summarized, and in the case where the third-fret F2=22 is taken as a root, are formed into such 30 data as in Table 21, and are stored.

TABLE 21

| | BASS | TENOR | ALTO | SOPRANO |
|---|---|---|---|---|
| A | 22 | 2 | 45 | 31 |
| B | 22 | 2 | 45 | 149 |
| C | 22 | 2 | 107 | 31 |
| D | 22 | 2 | 107 | 87 |
| E | 22 | 2 | 138 | 31 |
| F | 22 | 2 | 138 | 87 |
| G | 22 | 2 | 138 | 149 |
| H | 22 | 27 | 20 | 31 |
| I | 22 | 27 | 20 | 149 |
| J | 22 | 27 | 107 | 31 |
| K | 22 | 27 | 107 | 62 |
| L | 22 | 27 | 138 | 31 |
| M | 22 | 27 | 138 | 62 |
| N | 22 | 27 | 138 | 149 |
| O | 22 | 89 | 20 | 31 |
| P | 22 | 89 | 20 | 87 |
| Q | 22 | 89 | 107 | 31 |
| R | 22 | 89 | 107 | 62 |
| S | 22 | 89 | 138 | 31 |
| T | 22 | 89 | 138 | 62 |
| U | 22 | 89 | 138 | 87 |
| V | 22 | 120 | 20 | 31 |
| W | 22 | 120 | 20 | 87 |
| X | 22 | 120 | 20 | 149 |
| Y | 22 | 120 | 45 | 31 |
| Z | 22 | 120 | 45 | 62 |
| a | 22 | 120 | 45 | 149 |
| b | 22 | 120 | 107 | 31 |
| c | 22 | 120 | 107 | 62 |
| d | 22 | 120 | 107 | 87 |

In a similar way, in a case where the eighth-fret F2=53 is taken as a root, such 30 data as in Table 22 are stored in the inside of the data storage device.

TABLE 22

| | BASS | TENOR | ALTO | SOPRANO |
|---|---|---|---|---|
| A | 53 | 2 | 45 | 31 |
| B | 53 | 2 | 45 | 118 |
| C | 53 | 2 | 76 | 31 |
| D | 53 | 2 | 76 | 87 |
| E | 53 | 2 | 138 | 31 |
| F | 53 | 2 | 138 | 87 |
| G | 53 | 2 | 138 | 118 |
| H | 53 | 27 | 20 | 31 |
| I | 53 | 27 | 20 | 118 |
| J | 53 | 27 | 76 | 31 |
| K | 53 | 27 | 76 | 62 |
| L | 53 | 27 | 138 | 31 |
| M | 53 | 27 | 138 | 62 |
| N | 53 | 27 | 138 | 118 |
| O | 53 | 89 | 20 | 31 |
| P | 53 | 89 | 20 | 87 |
| Q | 53 | 89 | 45 | 31 |

TABLE 22-continued

| | BASS | TENOR | ALTO | SOPRANO |
|---|---|---|---|---|
| R | 53 | 89 | 45 | 62 |
| S | 53 | 89 | 138 | 31 |
| T | 53 | 89 | 138 | 62 |
| U | 53 | 89 | 138 | 87 |
| V | 53 | 120 | 20 | 31 |
| W | 53 | 120 | 20 | 87 |
| X | 53 | 120 | 20 | 118 |
| Y | 53 | 120 | 45 | 31 |
| Z | 53 | 120 | 45 | 62 |
| a | 53 | 120 | 45 | 118 |
| b | 53 | 120 | 76 | 31 |
| c | 53 | 120 | 76 | 62 |
| d | 53 | 120 | 76 | 87 |

Moreover, in a similar procedure, in a case where the 13th-fret F2=84 is taken as a root, such 34 data as in Table 23 are stored in the inside of the data storage device.

TABLE 23

| | BASS | TENOR | ALTO | SOPRANO |
|---|---|---|---|---|
| A | 84 | 2 | 45 | 31 |
| B | 84 | 2 | 45 | 118 |
| C | 84 | 2 | 45 | 149 |
| D | 84 | 2 | 76 | 31 |
| E | 84 | 2 | 76 | 87 |
| F | 84 | 2 | 76 | 149 |
| G | 84 | 2 | 107 | 31 |
| H | 84 | 2 | 107 | 87 |
| I | 84 | 2 | 107 | 118 |
| J | 84 | 27 | 20 | 31 |
| K | 84 | 27 | 20 | 87 |
| L | 84 | 27 | 20 | 118 |
| M | 84 | 27 | 20 | 149 |
| N | 84 | 27 | 76 | 31 |
| O | 84 | 27 | 76 | 62 |
| P | 84 | 27 | 76 | 149 |
| Q | 84 | 27 | 107 | 31 |
| R | 84 | 27 | 107 | 62 |
| S | 84 | 27 | 107 | 118 |
| T | 84 | 58 | 20 | 31 |
| U | 84 | 58 | 20 | 149 |
| V | 84 | 58 | 45 | 31 |
| W | 84 | 58 | 45 | 62 |
| X | 84 | 58 | 45 | 118 |
| Y | 84 | 58 | 45 | 149 |
| Z | 84 | 89 | 20 | 31 |
| a | 84 | 89 | 20 | 87 |
| b | 84 | 89 | 20 | 118 |
| c | 84 | 89 | 45 | 31 |
| d | 84 | 89 | 45 | 62 |
| e | 84 | 89 | 45 | 118 |
| f | 84 | 89 | 76 | 31 |
| g | 84 | 89 | 76 | 62 |
| h | 84 | 89 | 76 | 87 |

As described above, the duplicate address excluding means 227 that composes the guitar teaching data creation device 22 of the guitar teaching system according to the second embodiment functions as the internal structure of the sequence creating means 223, or operates in cooperation with the sequence creating means 223. Thereby, in the case where such addresses of the sounds of the voice parts located above when viewed from BASS are on the same strings, duplicate address excluding means 227 excludes the data of the sounds of the duplicate addresses based on the distribution map created by the distribution map creating means 222, and sequentially stores the data of the sounds of the extracted addresses in the data storage device. As a result, as a sum total of the data in the cases where the third-fret F2=22, the eighth-fret F2=53 and the 13th-fret F2=84 are taken as roots, data of 94 sequences (combinations of address data), which are as shown in Table 21 to Table 23, can be finally obtained.

<Guitar Teaching Data Creation Method>

Figure 39:
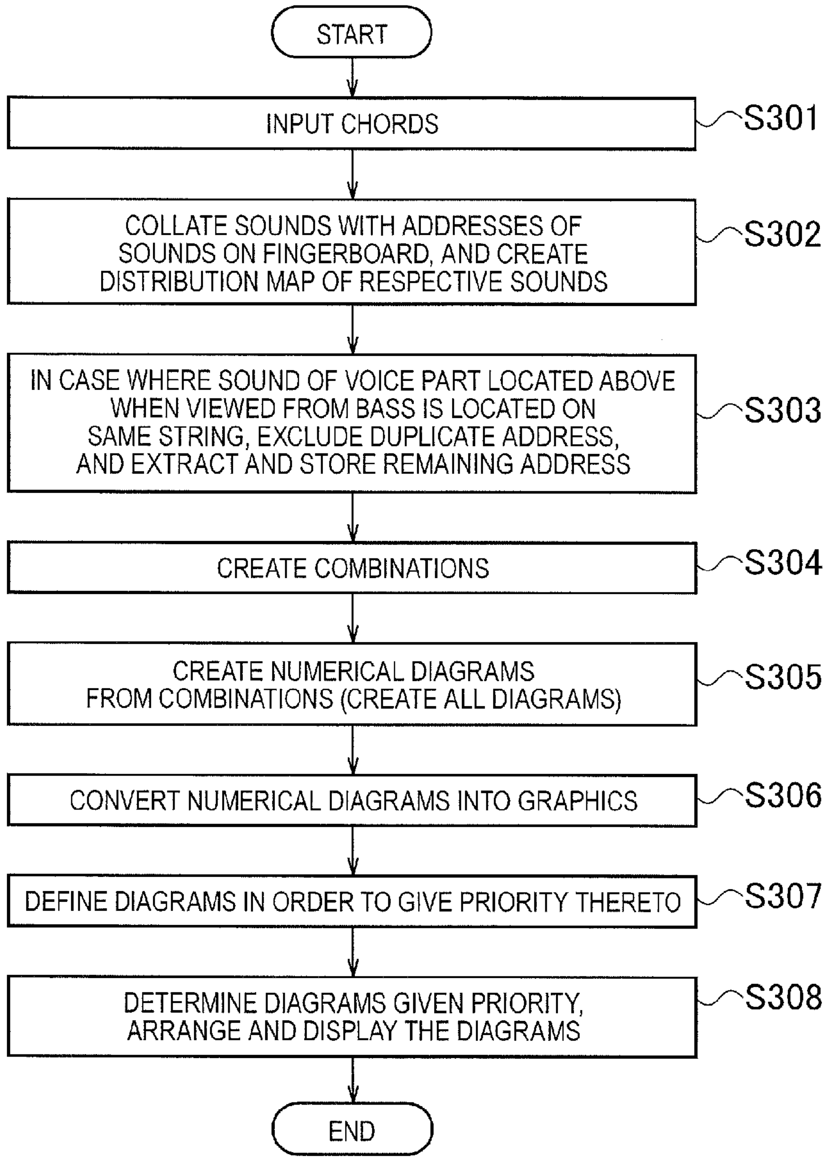
FIG. 39 is a flowchart explaining a guitar teaching data creation method according to the second embodiment.
Figure 40:
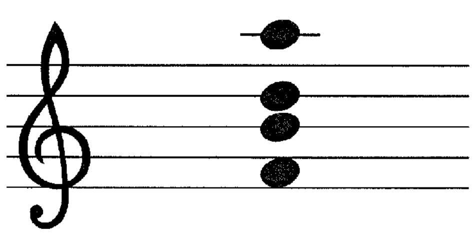
FIG. 40 is a diagram explaining an example of a chord, which chord inputting means inputs onto a staff notation displayed on a screen of a monitor, in order to explain the guitar teaching data creation method according to the second embodiment.
Figure 54A:
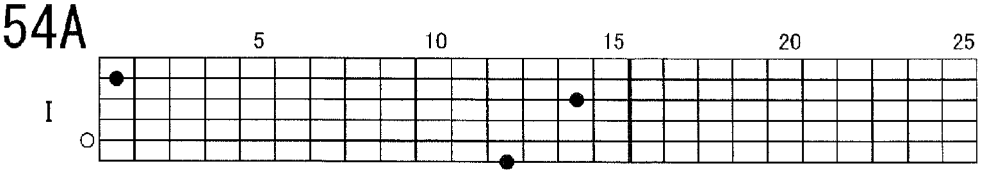
FIGS. 54A to 54H are diagrams illustrating eight graphics corresponding to remaining eight sequences of I to P in the 16 diagrams created by the graphic converting means in the case of setting the open string to BASS.
Figure 54B:
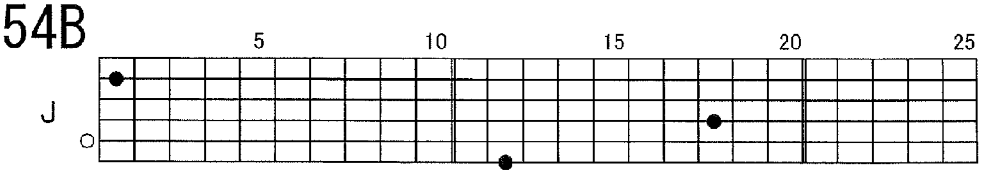
Figure 54C:
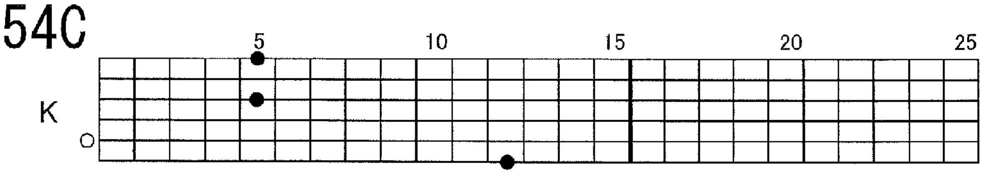
Figure 54D:
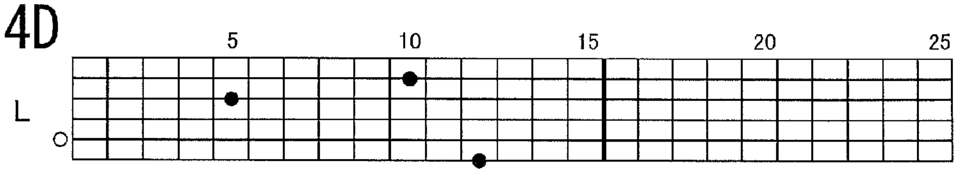
Figure 54E:
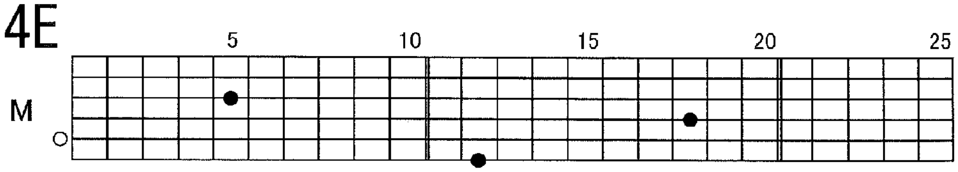
Figure 54F:
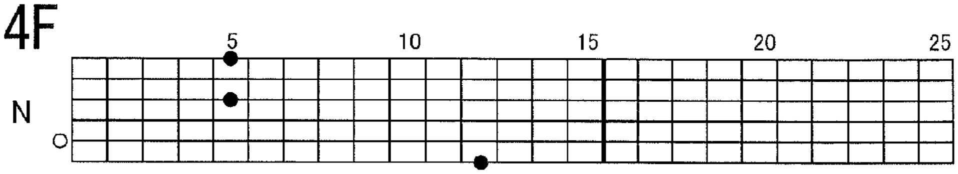
Figure 54G:
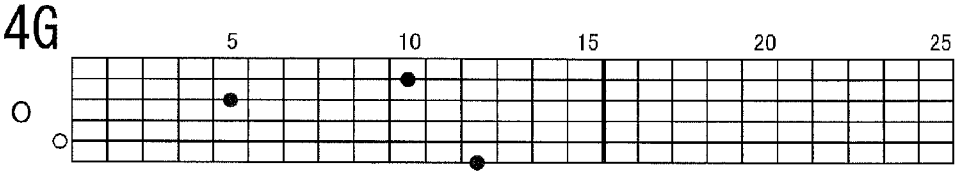
Figure 54H:
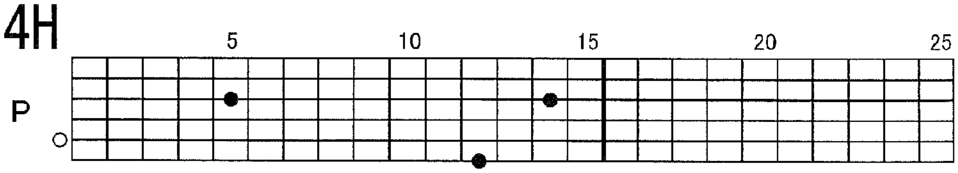

A description is made of a guitar teaching data creation method according to the second embodiment of the present invention by using the flowchart of FIG. 39 and using FIG. 40 and FIGS. 54A and 54H. Note that the guitar teaching data creation method to be described below is merely an example, and as a matter of course, is realizable by a variety of creation methods other than this method, the variety of creation methods including modification examples of this method.

(A) First, the guitar teaching data creation program stored in the program storage device connected to the guitar teaching data creation device 22 illustrated in FIG. 38 is started. Then, the guitar teaching data creation program drives the chord inputting means 221 of the CPU 220*c* that composes the guitar teaching data creation device 22 illustrated in FIG. 38, and receives the chords in Step S301. Here, in the guitar teaching data creation program stored in the program storage device, an application program that displays a staff notation similar to that in usual music production software is included. Hence, the staff notation is displayed on a screen of a monitor similar to the monitor illustrated in FIG. 1 by using the guitar teaching data creation program, and the guitar teaching data creation program causes the chord inputting means 221 to sequentially receive the chords as illustrated in FIG. 40 by using electrical signals generated by clicking the mouse to the staff notation on the screen of the monitor. The chords received by the chord inputting means 221 are stored in the data storage device connected to the guitar teaching data creation device 22.

(B) Next, in Step S302, the guitar teaching data creation program causes the distribution map creating means 222 of the CPU 220*c* illustrated in FIG. 38 to read out, from the data storage device, the data which are illustrated in FIGS. 41A, 42A and 43A and indicate the sound positions on the fingerboard by English letter display, and the chord received in Step S301. Then, the data of the addresses of the respective sounds of FIGS. 41A, 42A and 43A and the chords received by the chord inputting means 221 are collated with each other, and the distribution maps of the respective sounds are created on FIGS. 41A, 42A and 43A. In FIGS. 41A, 42A and 43A, as the distribution maps of the respective sounds, the addresses in the English letter display, which correspond to SOPRANO $A_3$=31, 62, 87, 118, 149, ALTO $D_2$=20, 45, 76, 107, 138, TENOR $B_2$=2, 27, 58, 89, 120, and BASS $F_2$=22, 53, 84, are illustrated while being encircled, and the other addresses in the English letter display are not illustrated for the purpose of making the distribution maps easy to see. The distribution maps as illustrated in FIGS. 41A, 42A and 43A, which are created by the distribution map creating means 222, are stored in the data storage device connected to the guitar teaching data creation device 22.

(c) Then, in Step S303, the guitar teaching data creation program causes the duplicate address excluding means 227 of the central processing unit 220*c* to read out, from the data storage device, the data as illustrated in FIGS. 41B, 42B and 43B, in which the sound positions on the fingerboard are converted into the integer values of 1 to 156, the data as illustrated in FIGS. 41C, 42C and 43C, in which the data converted into the integer values are listed to the lateral sequences, and the distribution maps created in Step S302. Then, the duplicate address excluding means 227 functions as the internal structure of the sequence creating means 223, or operates in cooperation with the sequence creating means 223. Thereby, in the case where the addresses of the sounds of the voice parts located above when viewed from BASS are on the same strings, the duplicate address excluding means 227 excludes the data of the sounds of the duplicate addresses, and performs the extraction. That is to say, in the case where the addresses of the sounds of the voice parts located above when viewed from BASS, the addresses being composed of the third-fret $F_2$=22, the eighth-fret $F_2$=53, and the 13th-fret $F_2$=84, are on the same string, then based on the distribution maps created by the distribution map creating means 222, the duplicate address excluding means 227 excludes the data of the sound of the duplicate address, and stores the data of the sounds of the extracted addresses sequentially in the data storage device, and can thereby store the data of the 94 sequences (combinations of address data), which are as shown in Table 21 to Table 23, finally in Step S304.

(D) Moreover, in Step S305, the guitar teaching data creation program causes the numerical diagram creating means 224 of the central processing unit 220*c* to read out the 94 sequences, which are created in Steps S303 and S304, from the data storage device, and by using the data of the integer values of 1 to 156, which are as illustrated in FIGS. 41B, 42B and 43B, converts (expresses) the 94 sequences, which are created by the duplicate address excluding means 227 and the sequence creating means 223, into 94 numerical diagrams, and creates the 94 numerical diagram (creates numerical diagrams similar to the numerical diagrams exemplified in FIGS. 23A to 23I and FIGS. 24J to 24Q). The 94 numerical diagrams created by the numerical diagram creating means 224 are stored in the data storage device connected to the guitar teaching data creation device 22.

(E) Moreover, in Step S306, the guitar teaching data creation program causes the graphic converting means 225 of the central processing unit 220*c* to read out data (refer to the first embodiment) for converting the respective positions of the numerical diagram into X-Y coordinates as illustrated in FIG. 10 and the 94 numerical diagrams, which are created in Step S305, from the data storage device. Then, by using the data for converting the numerical diagrams into the X-Y coordinates, which are similar to those illustrated in FIG. 10, the graphic converting means 225 converts the 94 numerical diagrams, which are created by the numerical diagram creating means 224, into graphics of diagrams composed of arrays of dots. The cases where the eighth-fret $F_2$=53 and the 13th-fret $F_2$=84 are taken as roots are not illustrated; however, in the case where the third-fret $F_2$=22 is taken as a root, the numerical diagrams are converted into 30 graphics of FIGS. 44A to 44J to FIGS. 46A to 46J in response to 30 sequences of A to Z and a to d. In this event, in a similar way to the first embodiment, a circle is filled in each region where the inequality of circle defined by Expression (1) prescribes the value of the X-Y coordinate=(a,b) of each numeral, the value being expressed in the numerical diagram, whereby the dot is drawn. That is to say, a circle, which takes the X-Y coordinate=(a,b) is as a center, is defined, and by such dots obtained by filling the circles, the numerical diagrams are expressed as the graphics of the diagrams composed of the arrays of the dots, which are as illustrated in FIGS. 44A to 44J to FIGS. 46A to 46J, whereby the diagrams are created. The graphics of the 94 diagrams, which are converted by the graphic converting means 225, are stored in the data storage device connected to the guitar teaching data creation device 22.

Figure 47A:
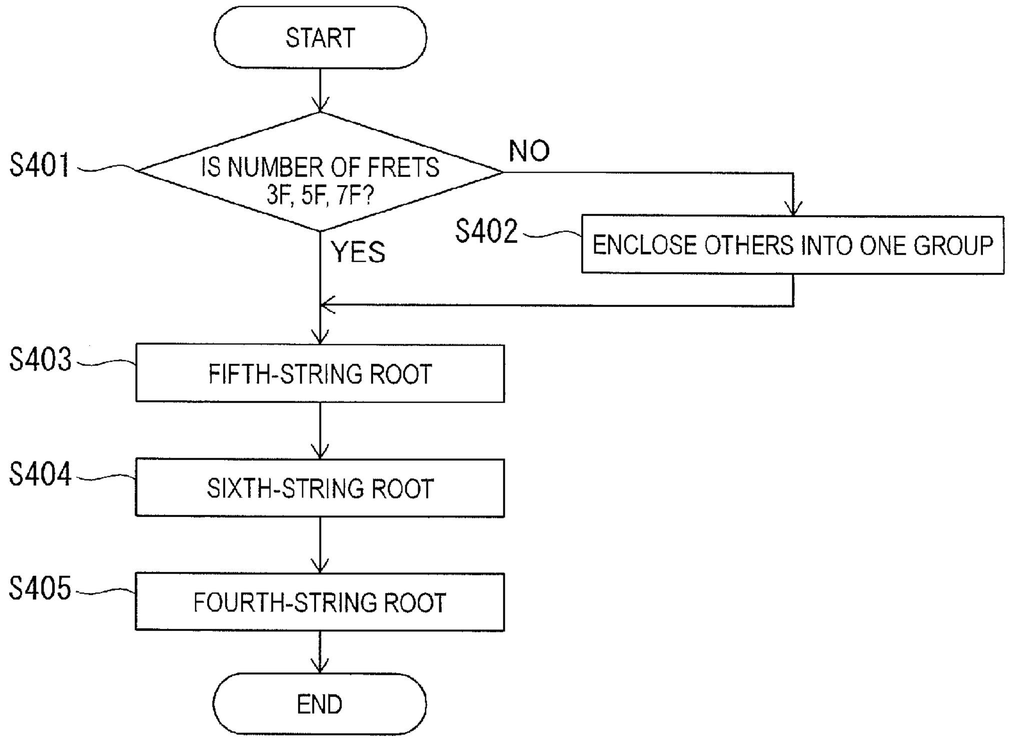
FIG. 47A is a diagram explaining a first bylaw to determine orders of priority after sieving by fret numbers in the guitar teaching data creation method according to the second embodiment.
Figure 47B:
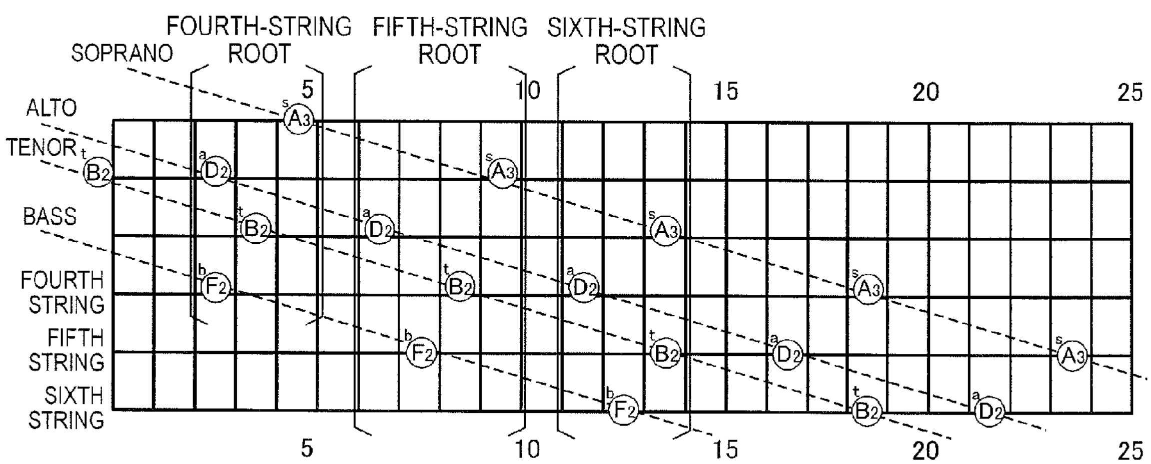
FIG. 47B is a diagram defining a fourth-string root in the case of setting the third-fret $F_2$=22 to the root, a fifth-string root in a case of setting an eighth-fret $F_2$=53 to the root, and a sixth-string root in the case of setting a 13th-fret $F_2$=84 to the root.
Figure 48A:
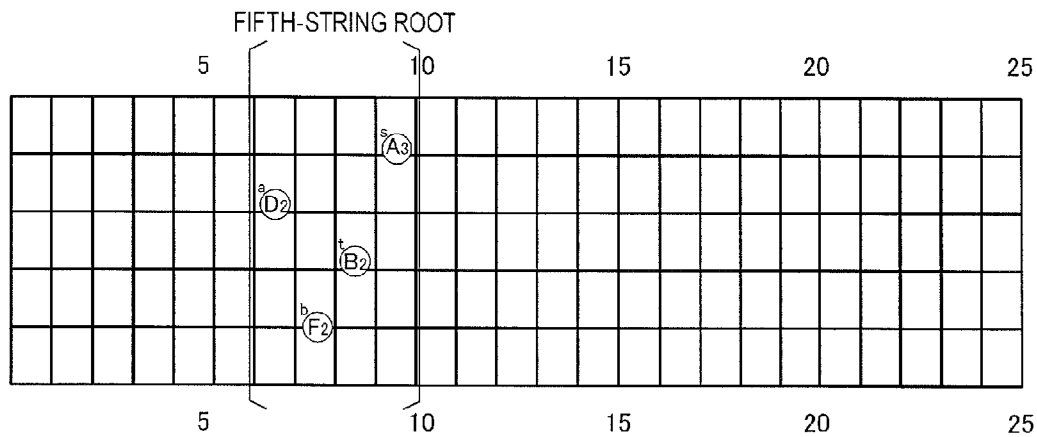
FIGS. 48A to 48C are diagrams illustrating data indicated by English letter display arrayed in order from “fifth-string root (FIG. 48A)” through “sixth-string root (FIG. 48B)” to “fourth-string root (FIG. 48C)” in accordance with the first bylaw to determine the orders of priority in the guitar teaching data creation method according to the second embodiment.
Figure 48B:
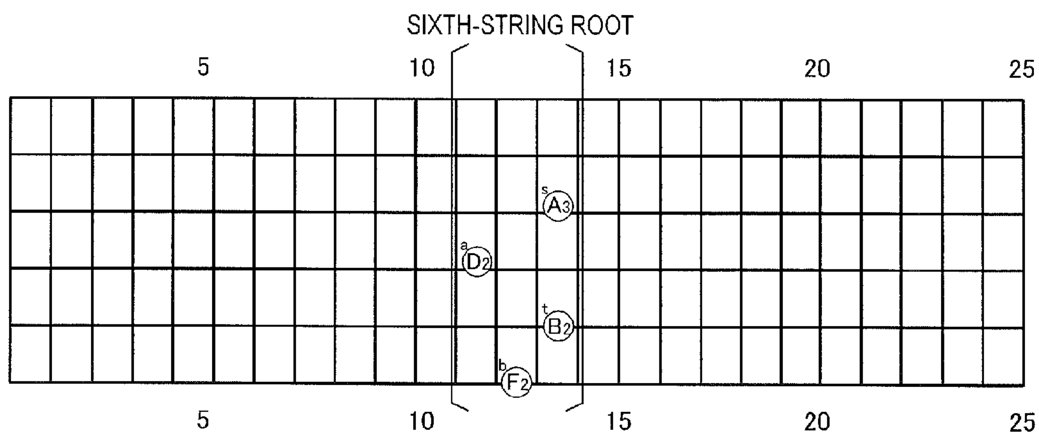
Figure 48C:
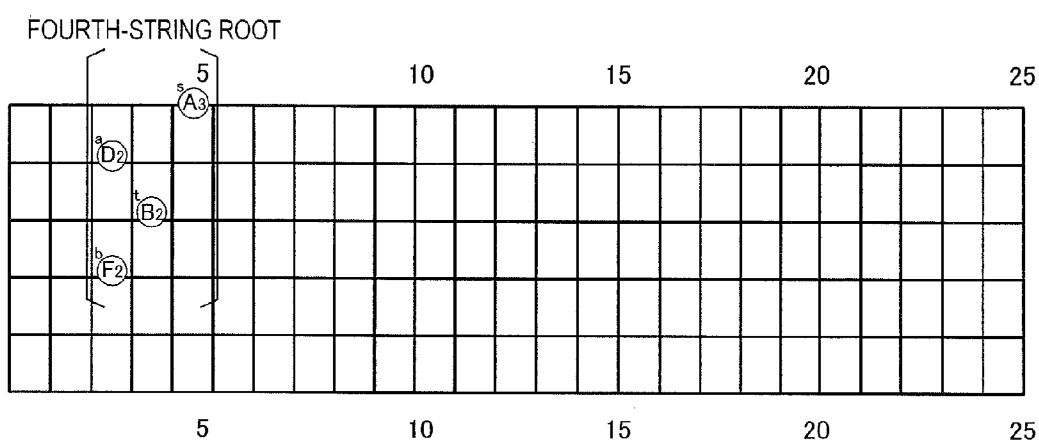

(F) In the case where the third-fret $F_2$=22 is taken as a root, then the fourth-string root is defined as illustrated in FIG. 47B. Moreover, in the case where the eighth-fret $F_2$=53 is taken as a root, then as illustrated in FIG. 47B, the fifth-string root is defined, and in the case where the 13th fret $F_2$=84 is taken as a root, the sixth-string root is defined. In Step S307, the guitar teaching data creation program causes the display means 226 of the CPU 220*c* to read out the graphics of the 94 diagrams, which are displayed by the arrays of the dots in Step S306, from the data storage device, and prioritizes all of the graphics (diagrams) converted by the graphic converting means 225. Such a determination of the orders of priority in Step S307 depends on eleven Sound ranges I to XI. Details of how to prioritize the graphics by Sound ranges I to XI will be described later (a specific description thereof is made in the last of the description of the second embodiment while illustrating eleven Sound ranges I to XI in FIGS. 55A and 55B to FIGS. 65A and 65B). Here, a case is exemplarily described, where, in accordance with Steps S401 and S402, which are illustrated in FIG. 47A, screening according to the number of frets is performed, priority is given to a case where the number of frets covers the third fret, the fifth fret and the seventh fret, and as a first bylaw, order of the roots are determined in such an order as "fifth-string root"→"sixth-string root"→"fourth-string root". That is to say, in Step S401, it is determined whether the number of frets is the third fret, the fifth fret and the seventh fret, and in a case where the number of frets is the third fret, the fifth fret and the seventh fret, the processing proceeds to Step S403. In a case where it is determined in Step S401 that the number of frets is not the third fret, the fifth fret and the seventh fret, the processing proceeds to Step S402. In such a way, in the case where the number of frets is not the third fret, the fifth fret and the seventh fret, the number of frets is enclosed into one group in Step S402. A reason for giving highest priority to the procedure of determining the fifth-string root in Step S403 in the procedure from Step S403 to S405 is that, for guitarists, it is a basis to cover four voice parts which are SOPRANO, ALTO, TENOR and BASS by four strings which are the firth string to the second string. Next, priority is given to the procedure of determining the sixth-string root in Step S404. In a case where there is a musical instrument that can emit BASS in an ensemble or the like, the fourth-string root in Step S405 is effective; however, the order of priority thereof is low in usual. When the orders of priority are determined in accordance with the first bylaw illustrated in Steps S403 to S405, then the roots are arrayed as illustrated in FIGS. 48A to 48C. A second bylaw by which the display means 226 determines the orders of priority is to array the roots in order where the number of frets is small. A third bylaw by which the display means 226 determines the orders of priority is to give priority to one in which strings for use are arranged from a low-tone side in a case where the number of frets for use is the same. A fourth bylaw by which the display means 226 determines the orders of priority is to display the number of displayed diagrams while limiting the number thereof, for example, five by five. In Step S308, in accordance with such orders of priority, which are determined by the first bylaw to the fourth bylaw, the signal to display the graphics of the diagrams on the screen of the monitor and the fingerboard on the upper surface of the neck 122 is transmitted. As a result, in Step S308, moreover, the graphics of the 94 diagrams are sequentially displayed on the screen of the monitor and the fingerboard in accordance with the orders of priority, which are determined by the display means 226.

<Case of Taking Open Strings as BASS>

Figure 49:
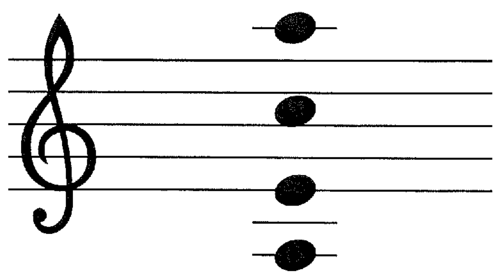
FIG. 49 is a diagram illustrating a chord, which the chord inputting means inputs onto the staff notation displayed on the screen of the monitor, in order to explain the guitar teaching data creation method according to the second embodiment in a case of setting open strings to the roots.

There is a case of using open strings (lowest note) $E_1$, $A_1$, $D_1$, $G_2$, $B_2$, $E_3$ on the 0 fret at a time of playing the guitar. The open strings have such features in sounding well when being used as BASS, being effective when being used as organ points, facilitating position movement when the movement is required in scale and arpeggio, enabling eccentric voicing of the chords, and the like. Frequently used open strings include "E, A, D, G, B, E" and "D, A, D, G, B, E", in which the string is tuned down by one note. Each of the chords is sometimes caused to omit a root thereof, and is displayed by NR in this case. In the case where a root is omitted, the sound over thereof is defined as a root. A description is made below on the assumption that the staff notation is displayed on a screen of a monitor similar to the monitor illustrated in FIG. 1, and the mouse is clicked to the staff notation on the screen of the monitor, and a chord that takes the open string $A_1$=5 as a root is inputted by the chord inputting means 221 as illustrated in FIG. 49.

Figure 50A:
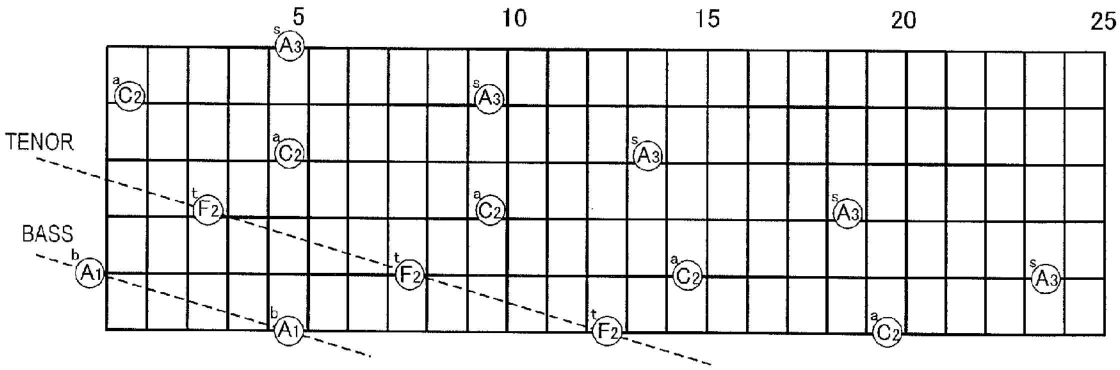
FIG. 50A is, as a distribution map of the respective sounds corresponding to the chord illustrated in FIG. 49, a diagram illustrating data indicated by English letter display of: SOPRANO $A_3$=31, 62, 87, 118, 149; ALTO $C_2$=8, 33, 64, 95, 126; TENOR $F_2$=16, 47, 78; and BASS $A_1$=5, 36, the data being created by the distribution map creating means, while focusing on TENOR $F_2$=16, 47, 78.

(a) First, TENOR $F_2$=16, 47, 78 are searched from BASS 5, 30 in a distribution map of FIG. 50A, that is, while taking $A_1$=5 of the open string of the 0 fret and $A_1$=30 of the fourth fret as roots. Here, in a case where the $A_1$=5 of the open string of the 0 fret is taken as a root, then from lateral sequence lists of FIG. 50C, TENOR 47 is on such a sequence list of E in the same way as BASS 5, and is arrayed on the same string as that of BASS 5, and accordingly, it is impossible to touch TENOR 47. Hence, TENOR 47 is deleted, and TENOR 16, 78 are extracted with respect to BASS 5.

Figure 51A:
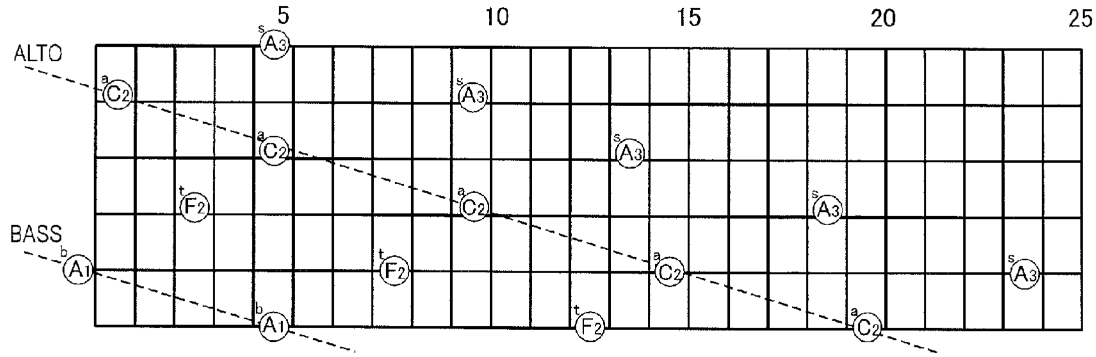
FIG. 51A is, as a distribution map of the respective sounds corresponding to the chord illustrated in FIG. 49, a diagram illustrating data indicated by English letter display of: SOPRANO $A_3$=31, 62, 87, 118, 149; ALTO $C_2$=8, 33, 64, 95, 126; TENOR $F_2$=16, 47, 78; and Bass $A_1$=5, 36, the data being created by the distribution map creating means, while focusing on ALTO $C_2$=8, 33, 64, 95, 126.

(b) Next, TENOR 16 is focused, and ALTO 8, 33, 64, 95, 126 are searched from TENOR 16 of the distribution map of FIG. 51A. From the lateral sequence lists of FIG. 51C, ALTO 64 is on the sequence list of D in the same way as TENOR 16, ALTO 95 is on the sequence list of E in the same way as BASS 5, and both of them are arrayed on the same strings as those of TENOR 16 and BASS 5, and accordingly, it is impossible to touch ALTO 64, 95. Hence, ALTO 64, 95 are deleted, and as shown in Table 24, ALTO 8, 33, 126 are extracted with respect to TENOR 16.

TABLE 24

| BASS | TENOR | ALTO |
|---|---|---|
| 5 | 16 | 8 |
| 5 | 16 | 33 |
| 5 | 16 | 126 |

ALTO 8, 33, 126 extracted as shown in Table 24 are stored in the data storage device connected to the guitar teaching data creation device 22. Moreover, TENOR 78 is focused, and ALTO 8, 33, 64, 95, 126 are searched from TENOR 78 of the distribution map of FIG. 51A. From the lateral sequence lists of FIG. 51C, ALTO 126 is on the sequence list of F in the same way as TENOR 78, ALTO 95 is on the sequence list of E in the same way as BASS 5, and both of them are arrayed on the same strings as those of TENOR 78 and BASS 5, and accordingly, it is impossible to touch ALTO 126, 95. Hence, ALTO 126, 95 are deleted, and as shown in Table 25, ALTO 8, 33, 64 are extracted with respect to TENOR 78.

TABLE 25

| BASS | TENOR | ALTO |
|---|---|---|
| 5 | 78 | 8 |
| 5 | 78 | 33 |
| 5 | 78 | 64 |

ALTO 8, 33, 64 extracted as shown in Table 25 are stored in the data storage device connected to the guitar teaching data creation device 22.

Figure 52A:
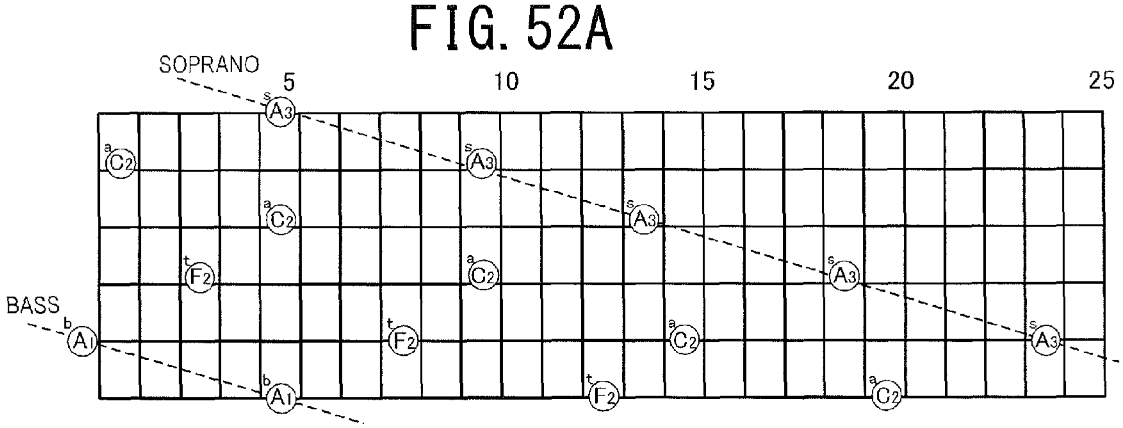
FIG. 52A is, as a distribution map of the respective sounds corresponding to the chord illustrated in FIG. 49, a diagram illustrating the data indicated by the English letter display of: SOPRANO $A_3$=31, 62, 87, 118, 149; ALTO $C_2$=8, 33, 64, 95, 126; TENOR $F_2$=16, 47, 78; and BASS $A_1$=5, 36, the data being created by the distribution map creating means, while focusing on SOPRANO $A_3$=31, 62, 87, 118, 149.

(c) Next, TENOR 16, 78 are extracted while taking the A1=5 of the open string on the 0 fret as a root, and further, as shown in Table 24, the processing returns to the case where ALTO 20, 33, 126 are extracted with respect to TENOR 16. First, ALTO 8 is focused, and SOPRANO 31, 62, 87, 118, 149 are searched from ALTO 8 of the distribution map of FIG. 52A. From the lateral sequence lists of FIG. 52C, SOPRANO 62 is on the sequence list of B in the same way as ALTO 8, SOPRANO 118 is on the sequence list of D in the same way as TENOR 16, SOPRANO 149 is on the sequence list of E in the same way as BASS 5, and all of them are arrayed on the same strings as those of ALTO 8, TENOR 16 and BASS 5, and accordingly, it is impossible to touch SOPRANO 62, 118, 149. Hence, SOPRANO 62, 118, 149 are deleted, and as shown in Table 26, SOPRANO 31, 87 are extracted with respect to ALTO 8.

TABLE 26

| BASS | TENOR | ALTO | SOPRANO |
|---|---|---|---|
| 5 | 16 | 8 | 31 |
| 5 | 16 | 8 | 87 |

SOPRANO 31, 87 extracted as shown in Table 26 are stored in the data storage device connected to the guitar teaching data creation device 22. Moreover, as shown in Table 24, ALTO 33 in the case where ALTO 8, 33, 126 are extracted with respect to TENOR 16 is focused, and SOPRANO 31, 62, 87, 118, 149 are searched from ALTO 33 of the distribution map of FIG. 52A. From the lateral sequence lists of FIG. 52C, SOPRANO 87 is on the sequence list of C in the same way as ALTO 33, SOPRANO 118 is on the sequence list of D in the same way as TENOR 16, SOPRANO 149 is on the sequence list of E in the same way as BASS 5, and all of them are arrayed on the same strings as those of ALTO 33, TENOR 16 and BASS 5, and accordingly, it is impossible to touch SOPRANO 87, 118, 149. Hence, SOPRANO 87, 118, 149 are deleted, and as shown in Table 27, SOPRANO 31, 62 are extracted with respect to ALTO 33.

TABLE 27

| BASS | TENOR | ALTO | SOPRANO |
|---|---|---|---|
| 5 | 16 | 33 | 31 |
| 5 | 16 | 33 | 62 |

SOPRANO 31, 62 extracted as shown in Table 27 are stored in the data storage device connected to the guitar teaching data creation device 22. Moreover, as shown in Table 24, ALTO 126 in the case where ALTO 8, 33, 126 are extracted with respect to TENOR 16 is focused, and SOPRANO 31, 62, 87, 118, 149 are searched from ALTO 126 of the distribution map of FIG. 52A. From the lateral sequence lists of FIG. 52C, SOPRANO 118 is on the sequence list of D in the same way as TENOR 16, SOPRANO 149 is on the sequence list of E in the same way as BASS 5, and both of them are arrayed on the same strings as those of TENOR 16 and BASS 5, and accordingly, it is impossible to touch SOPRANO 149, 118. Hence, SOPRANO 149, 118 are deleted, and as shown in Table 28, SOPRANO 31, 62, 87 are extracted with respect to ALTO 126.

TABLE 28

| BASS | TENOR | ALTO | SOPRANO |
|---|---|---|---|
| 5 | 16 | 126 | 31 |
| 5 | 16 | 126 | 62 |
| 5 | 16 | 126 | 87 |

SOPRANO 31, 62, 87 extracted as shown in Table 28 are stored in the data storage device connected to the guitar teaching data creation device 22. In the inside of the data storage device, the data of Tables 26 to 28 are automatically summarized, formed into such data as in Table 29, and are stored.

TABLE 29

| | BASS | TENOR | ALTO | SOPRANO |
|---|---|---|---|---|
| A | 5 | 16 | 8 | 31 |
| B | 5 | 16 | 8 | 87 |
| C | 5 | 16 | 33 | 31 |
| D | 5 | 16 | 33 | 62 |
| E | 5 | 16 | 126 | 31 |
| F | 5 | 16 | 126 | 62 |
| G | 5 | 16 | 126 | 87 |

(d) Next, TENOR 16, 78 are extracted while taking the A1=5 of the open string on the 0 fret as a root, and further, as shown in Table 25, the processing returns to the case where ALTO 8, 33, 64 are extracted with respect to TENOR 78. First, ALTO 8 is focused, and SOPRANO 31, 62, 87, 118, 149 are searched from ALTO 8 of the distribution map of FIG. 52A. From the lateral sequence lists of FIG. 52C, SOPRANO 62 is on the sequence list of B in the same way as ALTO 8, SOPRANO 149 is on the sequence list of E in the same way as BASS 5, and both of them are arrayed on the same strings as those of ALTO 8 and BASS 5, and accordingly, it is impossible to touch SOPRANO 62, 149. Hence, SOPRANO 62, 149 are deleted, and as shown in Table 30, SOPRANO 31, 87, 118 are extracted with respect to ALTO 8.

TABLE 30

| BASS | TENOR | ALTO | SOPRANO |
|---|---|---|---|
| 5 | 78 | 8 | 31 |
| 5 | 78 | 8 | 87 |
| 5 | 78 | 8 | 118 |

SOPRANO 31, 87, 118 extracted as shown in Table 30 are stored in the data storage device connected to the guitar teaching data creation device 22. Moreover, as shown in Table 25, ALTO 33 in the case where ALTO 8, 33, 64 are extracted with respect to TENOR 78 is focused, and SOPRANO 31, 62, 87, 118, 149 are searched from ALTO 33 of the distribution map of FIG. 52A. From the lateral sequence lists of FIG. 52C, SOPRANO 87 is on the sequence list of C in the same way as ALTO 87, SOPRANO 149 is on the sequence list of E in the same way as BASS 5, and both of them are arrayed on the same strings as those of ALTO 33 and BASS 5, and accordingly, it is impossible to touch SOPRANO 149, 87. Hence, SOPRANO 149, 87 are deleted, and as shown in Table 31, SOPRANO 31, 62, 118 are extracted with respect to ALTO 33.

TABLE 31

| BASS | TENOR | ALTO | SOPRANO |
|---|---|---|---|
| 5 | 78 | 33 | 31 |
| 5 | 78 | 33 | 62 |
| 5 | 78 | 33 | 118 |

SOPRANO 31, 62, 118 extracted as shown in Table 31 are stored in the data storage device connected to the guitar teaching data creation device 22. Moreover, as shown in Table 25, ALTO 64 in the case where ALTO 8, 33, 64 are extracted with respect to TENOR 78 is focused, and SOPRANO 31, 62, 87, 118, 149 are searched from ALTO 64 of the distribution map of FIG. 52A. From the lateral sequence lists of FIG. 52C, SOPRANO 118 is on the sequence list of D in the same way as ALTO 64, SOPRANO 149 is on the sequence list of E in the same way as BASS 5, and both of them are arrayed on the same strings as those of ALTO 64 and BASS 5, and accordingly, it is impossible to touch SOPRANO 118, 149. Hence, SOPRANO 149, 118 are deleted, and as shown in Table 32, SOPRANO 31, 62, 87 are extracted with respect to ALTO 64.

TABLE 32

| BASS | TENOR | ALTO | SOPRANO |
|---|---|---|---|
| 5 | 78 | 64 | 31 |
| 5 | 78 | 64 | 62 |
| 5 | 78 | 64 | 87 |

SOPRANO 31, 62, 87 extracted as shown in Table 32 are stored in the data storage device connected to the guitar teaching data creation device 22. In the inside of the data storage device, the data of Tables 30 to 32 are automatically summarized, formed into such data as in Table 33, and are stored.

TABLE 33

| | BASS | TENOR | ALTO | SOPRANO |
|---|---|---|---|---|
| H | 5 | 78 | 8 | 31 |
| I | 5 | 78 | 8 | 87 |
| J | 5 | 78 | 8 | 118 |
| K | 5 | 78 | 33 | 31 |
| L | 5 | 78 | 33 | 62 |
| M | 5 | 78 | 33 | 118 |
| N | 5 | 78 | 64 | 31 |
| O | 5 | 78 | 64 | 62 |
| P | 5 | 78 | 64 | 87 |

In the inside of the data storage device, the data of Tables 29 to 33 are automatically summarized, formed into such 16 data of A to P as in Table 34, and are stored.

TABLE 34

| | BASS | TENOR | ALTO | SOPRANO |
|---|---|---|---|---|
| A | 5 | 16 | 8 | 31 |
| B | 5 | 16 | 8 | 87 |
| C | 5 | 16 | 33 | 31 |
| D | 5 | 16 | 33 | 62 |
| E | 5 | 16 | 126 | 31 |
| F | 5 | 16 | 126 | 62 |
| G | 5 | 16 | 126 | 87 |
| H | 5 | 78 | 8 | 31 |
| I | 5 | 78 | 8 | 87 |
| J | 5 | 78 | 8 | 118 |
| K | 5 | 78 | 33 | 31 |
| L | 5 | 78 | 33 | 62 |
| M | 5 | 78 | 33 | 118 |
| N | 5 | 78 | 64 | 31 |
| O | 5 | 78 | 64 | 62 |
| P | 5 | 78 | 64 | 87 |

Figure 50B:
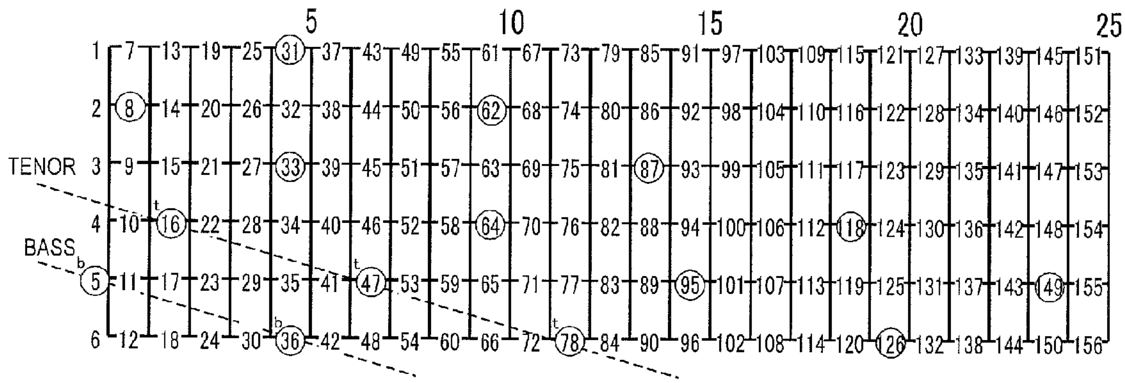
FIG. 50B is a diagram illustrating data indicating positions of sounds on the fingerboard, which correspond to those of FIG. 50A, by converting the positions concerned into the integer values of 1 to 156.
Figure 50C:
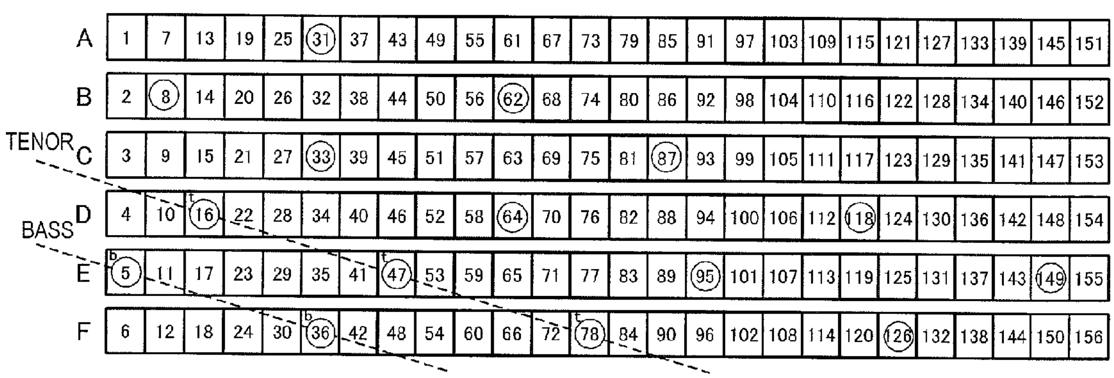
FIG. 50C is a diagram illustrating data in which such integer value data of FIG. 50B is listed into the lateral sequences of A, B, C, D, E and F.
Figure 51B:
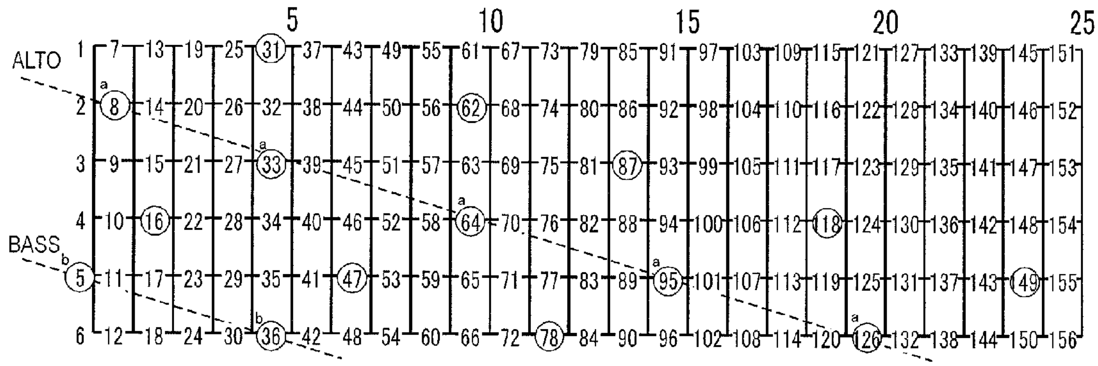
FIG. 51B is a diagram illustrating data indicating positions of sounds on the fingerboard, which correspond to those of FIG. 51A, by converting the positions concerned into the integer values of 1 to 156.
Figure 51C:
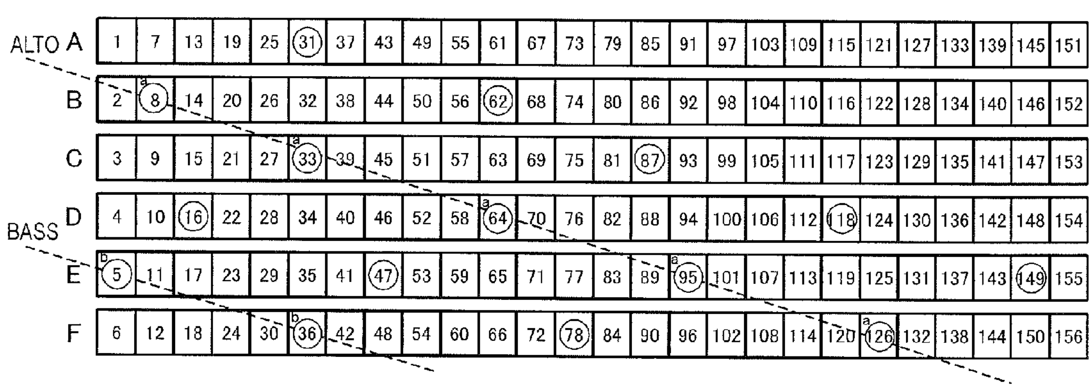
FIG. 51C is a diagram illustrating data in which such integer value data of FIG. 51B is listed into the lateral sequences of A, B, C, D, E and F.
Figure 52B:
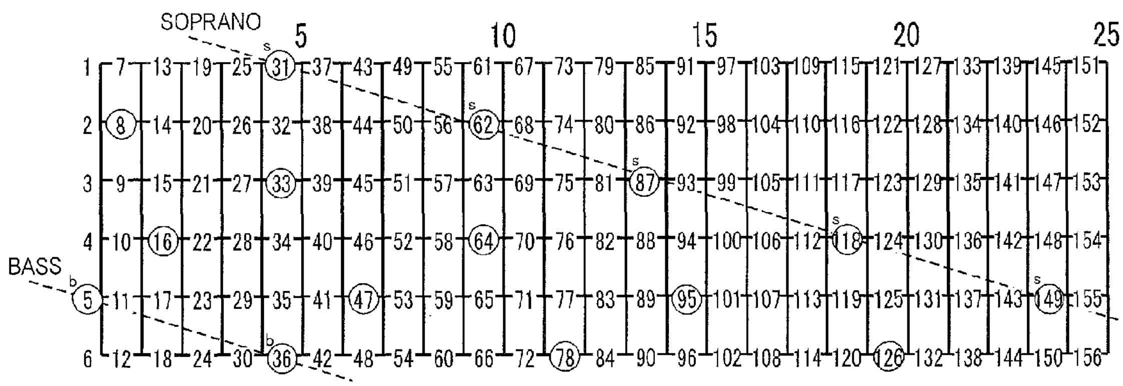
FIG. 52B is a diagram illustrating data indicating positions of sounds on the fingerboard, which correspond to those of FIG. 52A, by converting the positions concerned into the integer values of 1 to 156.
Figure 52C:
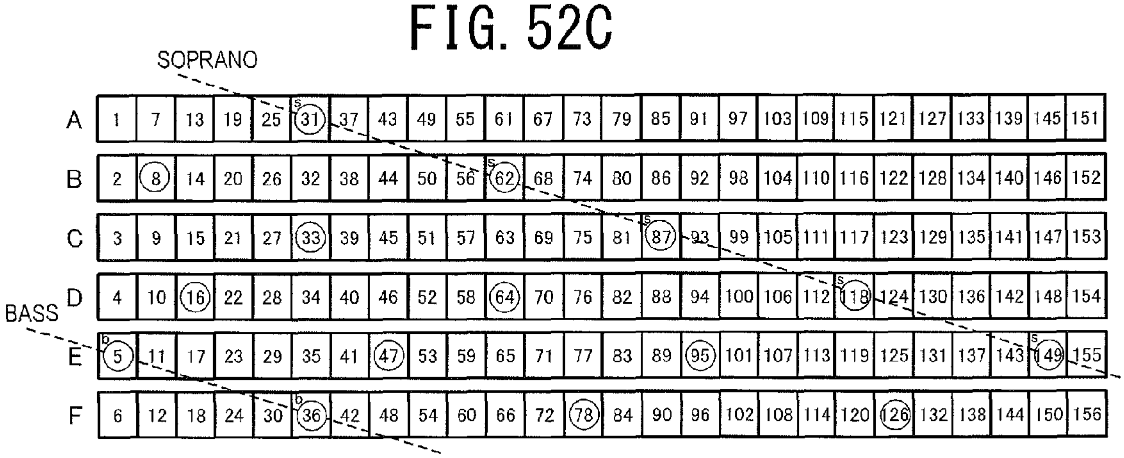
FIG. 52C is a diagram illustrating data in which such integer value data of FIG. 52B is listed into lateral sequences of A, B, C, D, E and F.
Figure 53A:
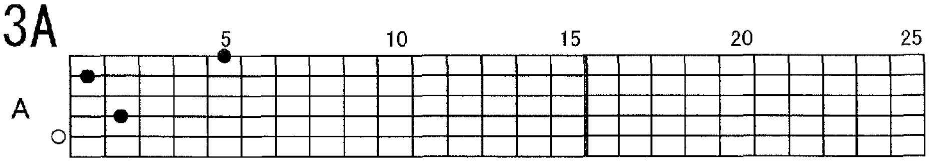
FIGS. 53A to 53H are diagrams illustrating eight graphics corresponding to eight sequences of A to H in 16 diagrams created by the graphic converting means in a case of setting the open string to BASS.
Figure 53B:
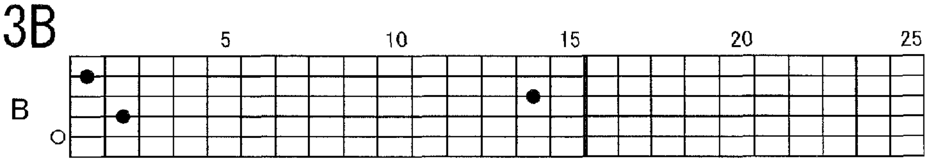
Figure 53C:
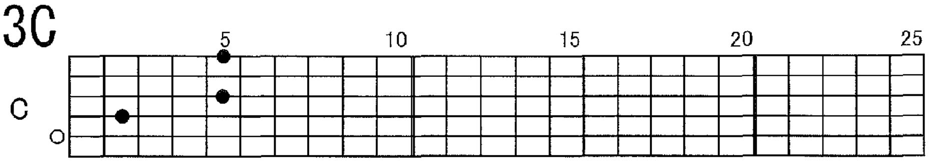
Figure 53D:
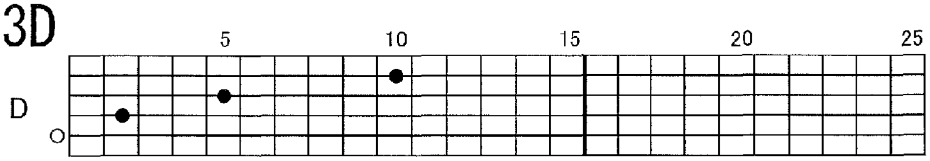
Figure 53E:
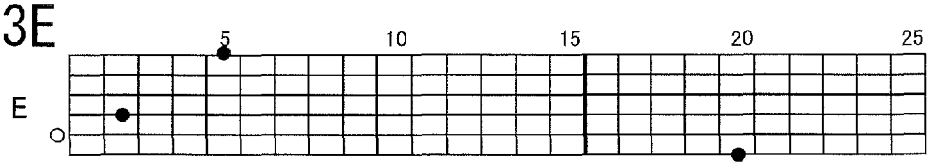
Figure 53F:
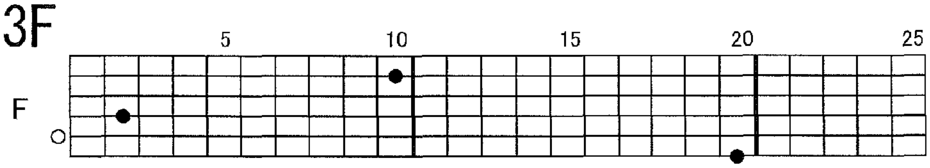
Figure 53G:
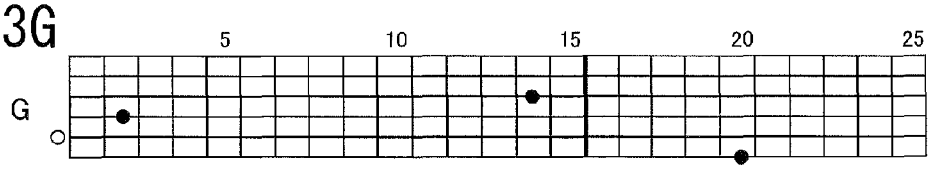
Figure 53H:
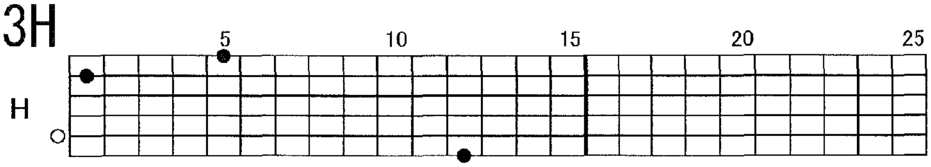

As described above, in the case where the addresses of the sounds of the voice parts located above when viewed from BASS, the addresses being composed of such a 0-fret open-string A1=5 and the 4th-fret A1=30, are on the same string, then based on the distribution maps created by the distribution map creating means 222, the duplicate address excluding means 227 excludes the data of the sound of the duplicate address, and stores the data of the sounds of the extracted addresses sequentially in the data storage device, and can thereby store the data of the 16 sequences finally. Thereafter, in Step S305 of the flowchart illustrated in FIG. 39, the numerical diagram creating means 224 of the CPU 220*c* reads out the 16 sequences from the data storage device, and by using the data of the integer values as illustrated in FIGS. 50B, 51B and 52B, converts (expresses) the 16 sequences into 16 numerical diagrams, and creates the 16 numerical diagram. The 16 numerical diagrams created by the numerical diagram creating means 224 are stored in the data storage device connected to the guitar teaching data creation device 22. Moreover, in Step S306 of the flowchart illustrated in FIG. 39, the graphic converting means 225 of the CPU 220*c* reads out data for converting the respective positions of the numerical diagram into X-Y coordinates as illustrated in FIG. 10 and the 16 numerical diagrams, which are created in Step S305, from the data storage device. Then, by using the data for converting the numerical diagrams, which indicate the positions of the sounds on the fingerboard, into the X-Y coordinates, the graphic converting means 225 converts the 16 numerical diagrams, which are created by the numerical diagram creating means 224, into graphics of diagrams composed of arrays of dots. That is to say, the numerical diagrams are converted into 16 graphics of FIGS. 53A to 53H and FIGS. 54A to 54H corresponding to the 16 sequences of A to P in Table 34. In this event, in a similar way to the first embodiment, each circle is filled in each region prescribed by the inequality of circle defined by Expression (1), whereby the dot is drawn. The graphics of the 16 diagrams, which are converted by the graphic converting means 225, are stored in the data storage device connected to the guitar teaching data creation device 22.

Then, in Step S307 of the flowchart illustrated in FIG. 39, the display means 226 of the CPU 220*c* reads out the graphics of the 16 diagrams, which are displayed by the arrays of the dots in Step S306, from the data storage device, and prioritizes all of the graphics (diagrams) converted by the graphic converting means 225. That is to say, in the case where the open string is a root, then in the determination of the orders of priority, it is a most important bylaw to array the graphics not in order of "fifth-string root"→"sixth-string root"→"fourth-string root" in the first bylaw but "in order where the number of frets for use is smaller" in the second bylaw. In the above-described example, both of Table 26 and Table 28 use frets up to the fifth fret, and orders of display are determined in order of Table 28→Table 27→Table 26 in accordance with the third bylaw "in the case where the number of frets for use is the same, priority is given to one in which the strings for use are arrayed from below". Then, in Step S308 of the flowchart illustrated in FIG. 39, the 16 graphics are displayed on the screen of the monitor and the fingerboard sequentially in order of Table 28→Table 27→Table 26.

Figure 55A:
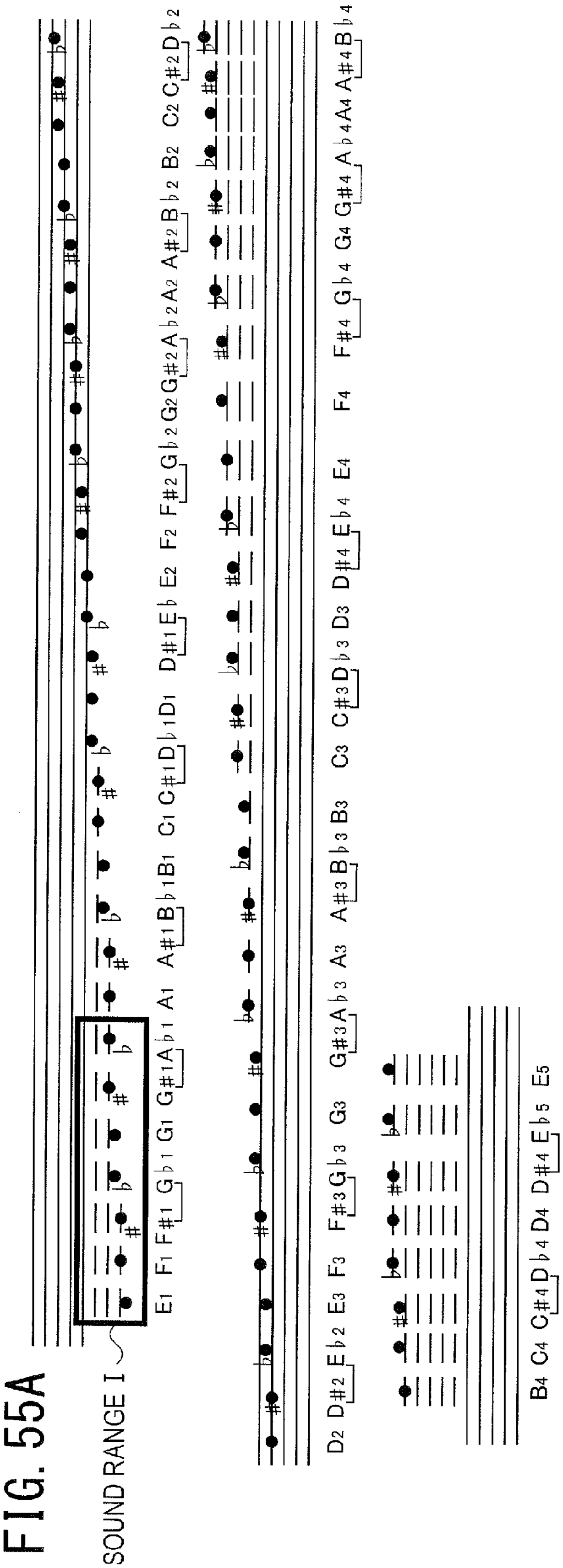
FIG. 55A is a diagram illustrating positions of sounds included in sound range I on the staff notation.
Figure 55B:
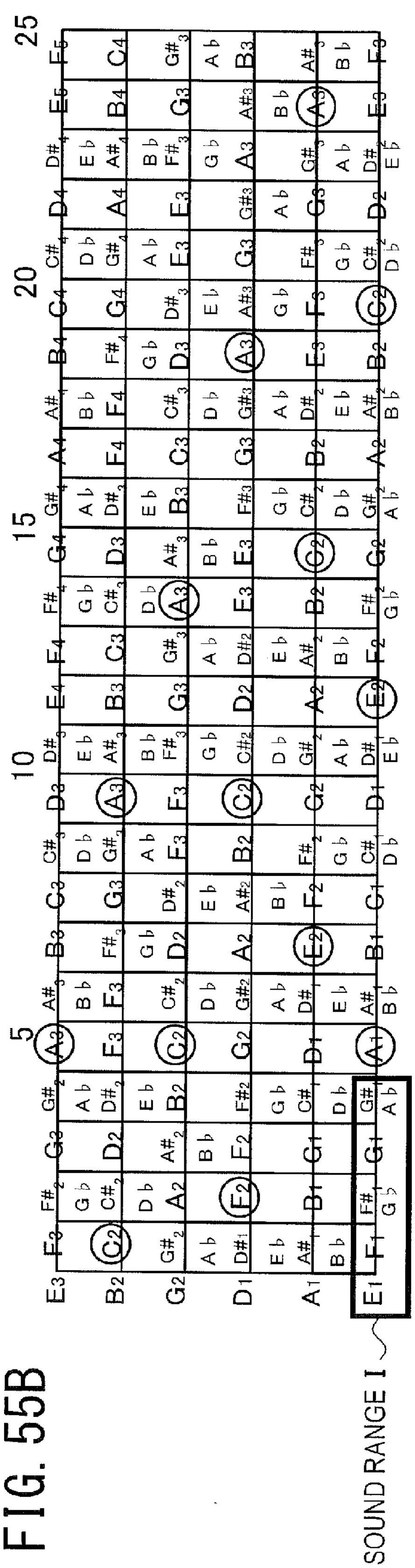
FIG. 55B is a diagram illustrating, as English letter display data, positions of sounds included in sound range I, the positions being indicated at one spot on the fingerboard of the six-string guitar.

Relationship Between Sound Range and Order of Priority (I) As illustrated on a staff notation of FIG. 55A, sounds of $E_1$ to $Ab_1$, which are surrounded by a bold solid line of FIGS. 55A and 55B, are defined as sounds included in "Sound range I". FIG. 55B is English letter display data in which the positions of the sounds on the fingerboard of the six-string guitar are converted into the integer values, wherein integer value conversion data of the sounds of $E_1$ to $Ab_1$, which are included in a sound range of one spot on the fingerboard, are surrounded by a bold solid line, whereby Sound range I is displayed.

TABLE 35

| SOUND RANGE | FIRST PRIORITY | | SECOND PRIORITY | | THIRD PRIORITY | | FOURTH PRIORITY |
|---|---|---|---|---|---|---|---|
| I | ONLY SIXTH-STRING ROOT | | | | | | |
| II | FIFTH-STRING ROOT | ⇒ | SIXTH-STRING ROOT | | | | |
| III | FIFTH-STRING ROOT | ⇒ | FOURTH-STRING ROOT | ⇒ | SIXTH-STRING ROOT | | |
| IV | FOURTH-STRING ROOT | ⇒ | FIFTH-STRING ROOT | ⇒ | THIRD-STRING ROOT | ⇒ | SIXTH-STRING ROOT |
| V | FOURTH-STRING ROOT | ⇒ | THIRD-STRING ROOT | ⇒ | FIFTH-STRING ROOT | ⇒ | SEVENTH-STRING ROOT |
| VI | FOURTH-STRING ROOT | ⇒ | THIRD-STRING ROOT | ⇒ | FIFTH-STRING ROOT | ⇒ | EIGHTH-STRING ROOT |
| VII | THIRD-STRING ROOT | ⇒ | FOURTH-STRING ROOT | ⇒ | FIFTH-STRING ROOT | | |
| VIII | THIRD-STRING ROOT | ⇒ | FOURTH-STRING ROOT | | | | |
| IX | ONLY THIRD-STRING ROOT | | | | | | |
| X | NONE | | | | | | |
| XI | NONE | | | | | | |

In Steps S307 and Step S308 in FIG. 39, an order of priority, by which Sound range I illustrated in FIG. 55 is displayed, takes only the sixth-string root as shown in Table 35 in the case of the three-part body. Moreover, also in the case of the four-part body, the order of priority, by which Sound range I as shown in Table 36 is displayed, takes only the sixth-string root.

| SOUND RANGE | FIRST PRIORITY | | SECOND PRIORITY | | THIRD PRIORITY |
|---|---|---|---|---|---|
| I | ONLY SIXTH-STRING ROOT | | | | |
| II | FIFTH-STRING ROOT | ⇒ | SIXTH-STRING ROOT | | |
| III | FIFTH-STRING ROOT | ⇒ | SIXTH-STRING ROOT | ⇒ | FOURTH-STRING ROOT |
| IV | FOURTH-STRING ROOT | ⇒ | FIFTH-STRING ROOT | ⇒ | SIXTH-STRING ROOT |
| V | FOURTH-STRING ROOT | ⇒ | FIFTH-STRING ROOT | ⇒ | SIXTH-STRING ROOT |
| VI | FOURTH-STRING ROOT | ⇒ | FIFTH-STRING ROOT | ⇒ | SIXTH-STRING ROOT |
| VII | FOURTH-STRING ROOT | ⇒ | FIFTH-STRING ROOT | | |
| VIII | ONLY FOURTH-STRING ROOT | ⇒ | | | |
| IX | NONE | | | | |
| X | NONE | | | | |
| XI | NONE | | | | |

Figure 56A:
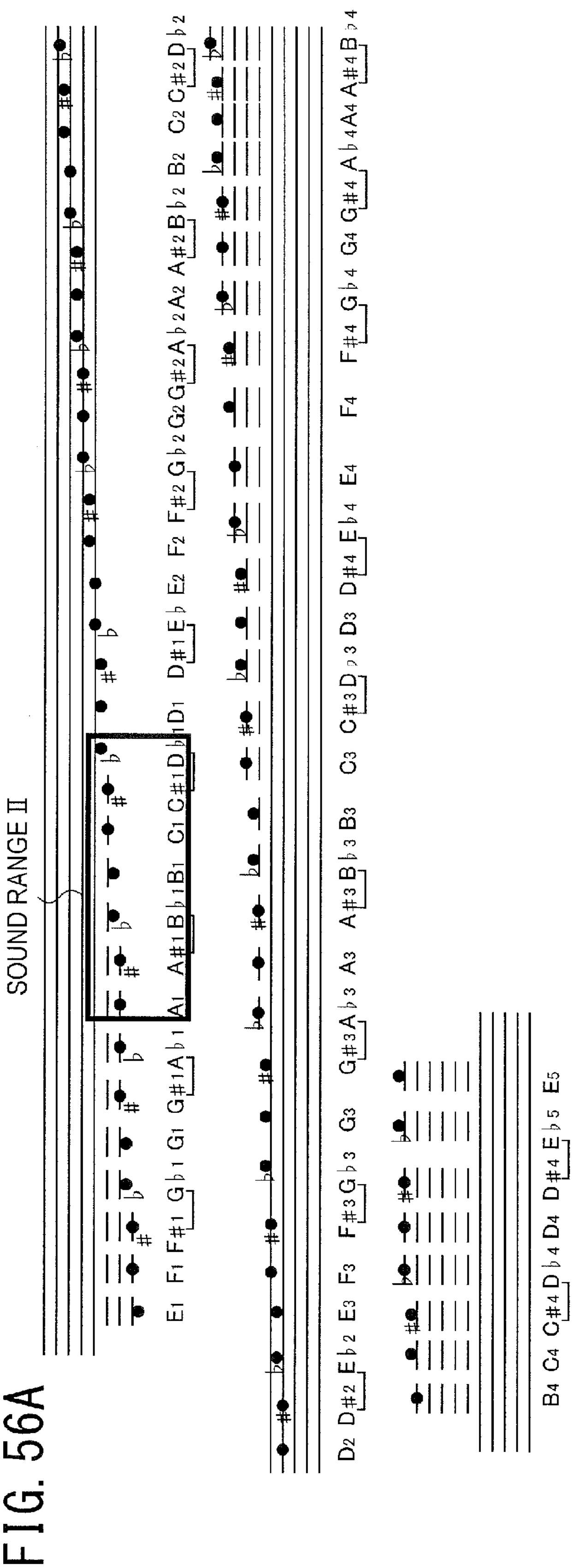
FIG. 56A is a diagram illustrating positions of sounds included in sound range II on the staff notation.
Figure 56B:
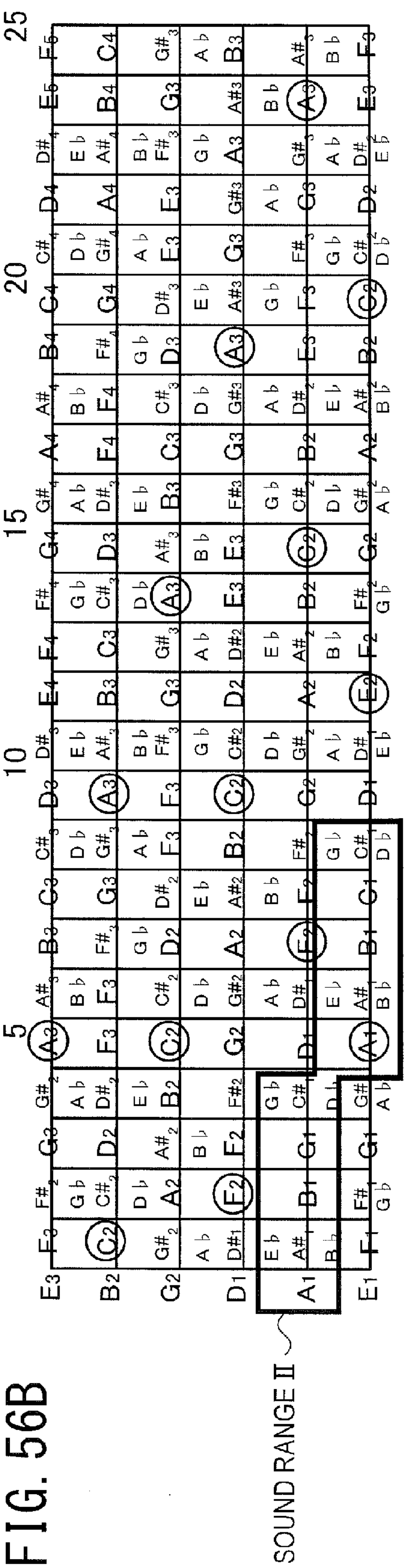
FIG. 56B is a diagram illustrating, as English letter display data, positions of the sounds included in sound range II, the positions being indicated at two spots on the fingerboard of the six-string guitar.

(II) As illustrated in FIG. 56A, Sound range II is a sound range adjacent to a right side (high-tone side) of "Sound range I" on a staff notation, and includes sounds of A1 to Db1, the sounds being surrounded by a bold solid line. In English letter display data converted into integer values of FIG. 56B, integer value conversion data of the sounds of A1 to Db1, which are individually included in the sound ranges at two spots on the fingerboard of the six-string guitar, are surrounded by a bold solid line, whereby Sound range II is illustrated. In Steps S307 and Step S308, an order of priority, by which Sound range II illustrated in FIGS. 56A and 56B is displayed, becomes an order of the fifth-string root→the sixth-string root as shown in Table 35 in the case of the three-part body. Moreover, also in the case of the four-part body, the order of priority, by which Sound range II as shown in Table 36 is displayed, becomes the order of the fifth-string root→the sixth-string root.

Figure 57A:
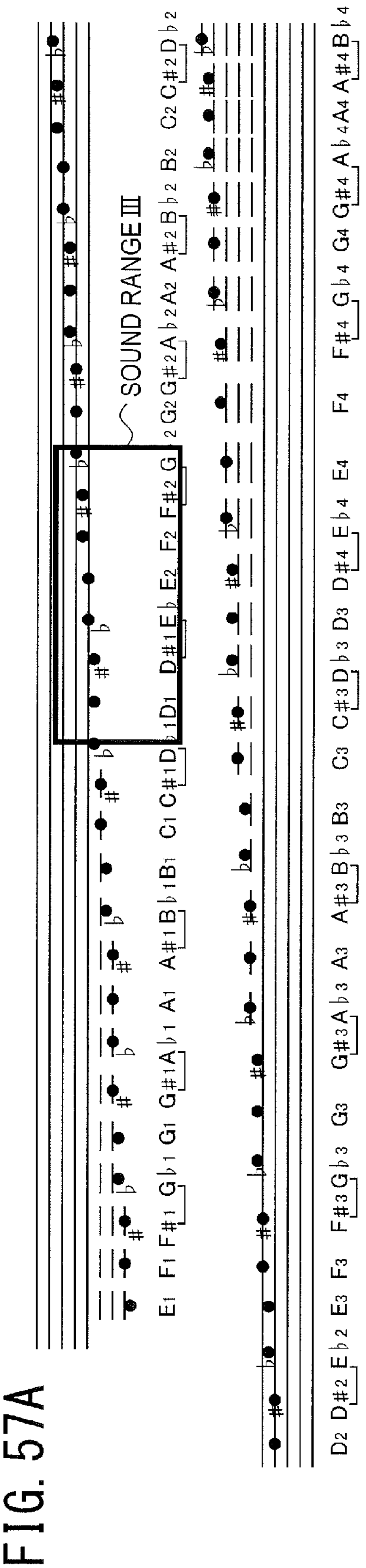
FIG. 57A is a diagram illustrating positions of sounds included in sound range III on the staff notation.
Figure 57B:
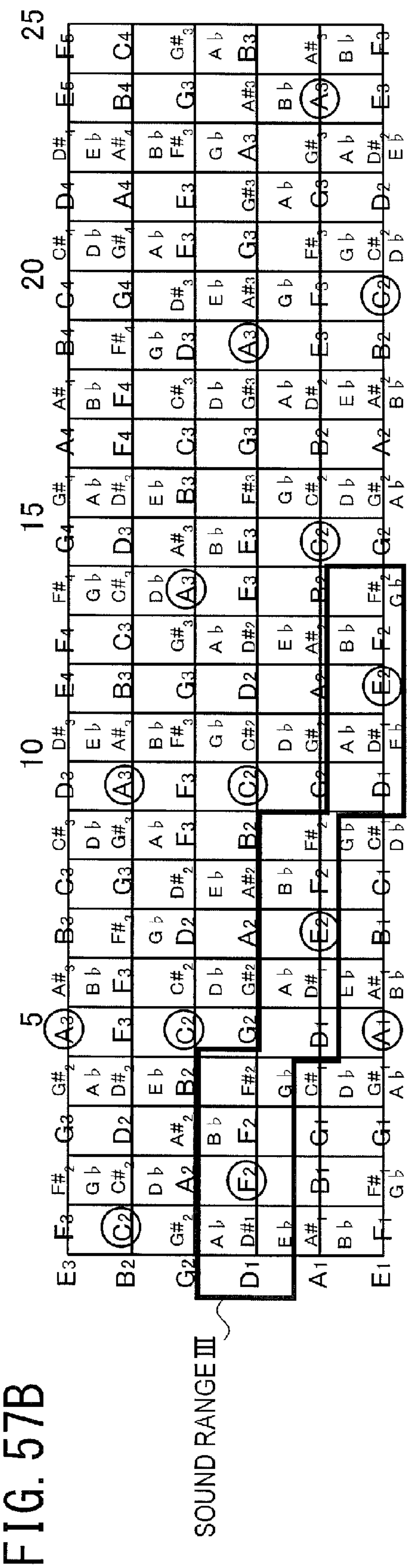
FIG. 57B is a diagram illustrating, as English letter display data, positions of the sounds included in sound range III, the positions being indicated at three spots on the fingerboard of the six-string guitar.

(III) As illustrated on a staff notation of FIG. 57A, "Sound range III" adjacent to a right side (high-tone side) of "Sound range II" is a sound range including sounds of D1 to Gb1, which are surrounded by a bold solid line. In English letter display data converted into integer values of FIG. 57B, integer value conversion data of the sounds of D1 to Gb1, which are individually included in the sound ranges at three spots on the fingerboard, are surrounded by a bold solid line, whereby Sound range III is illustrated. An order of priority, by which Sound range III illustrated in FIGS. 57A and 57B is displayed, becomes an order of the fifth-string root→the fourth-string root→the sixth-string root as shown in Table 35 in the case of the three-part body. Meanwhile, in the case of the four-part body, the order of priority, by which Sound range III as shown in Table 36 is displayed, becomes an order of the fifth-string root→the sixth-string root→the fourth-string root.

Figure 58A:
FIG. 58A is a diagram illustrating positions of sounds included in sound range IV on the staff notation.
Figure 58B:
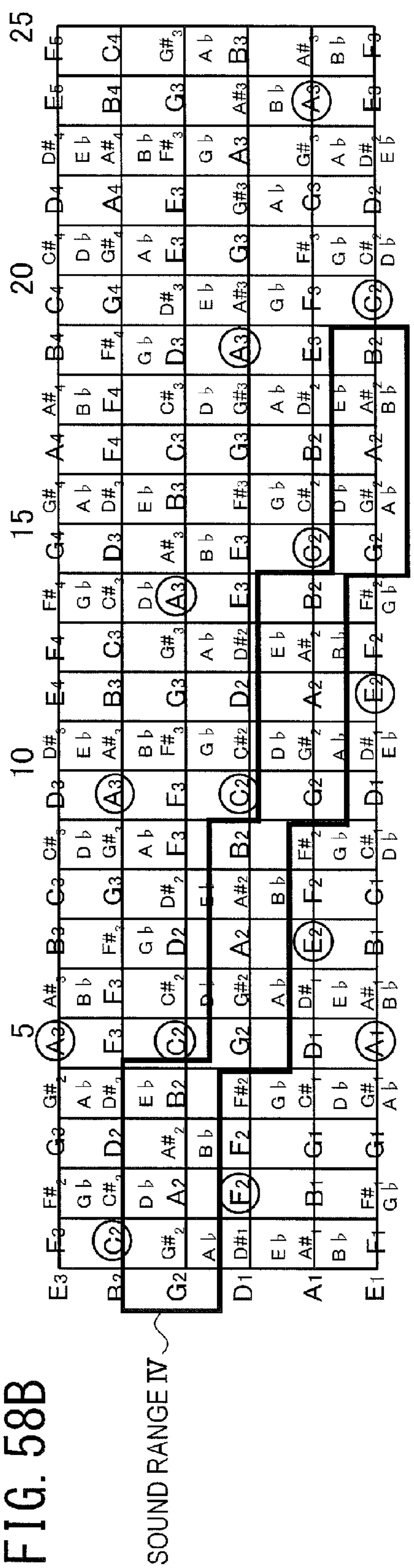
FIG. 58B is a diagram illustrating, as English letter display data, positions of the sounds included in sound range IV, the positions being indicated at four spots on the fingerboard of the six-string guitar.

(IV) As illustrated on a staff notation of FIG. 58A, "Sound range IV" adjacent to a high-tone side of "Sound range III" is a sound range including sounds of G2 to B2, which are surrounded by a bold solid line. In English letter display data converted into integer values of FIG. 58B, integer value conversion data of the sounds of G2 to B2, which are individually included in the sound ranges at four spots on the fingerboard, are surrounded by a bold solid line, whereby Sound range IV is illustrated. An order of priority, by which Sound range IV illustrated in FIGS. 58A and 58B is displayed, becomes an order of the fourth-string root→the fifth-string root→the third-string root→the sixth-string root as shown in Table 35 in the case of the three-part body. Meanwhile, in the case of the four-part body, the order of priority, by which Sound range IV as shown in Table 36 is displayed, becomes an order of the fourth-string root→the fifth-string root→the sixth-string root.

Figure 59A:
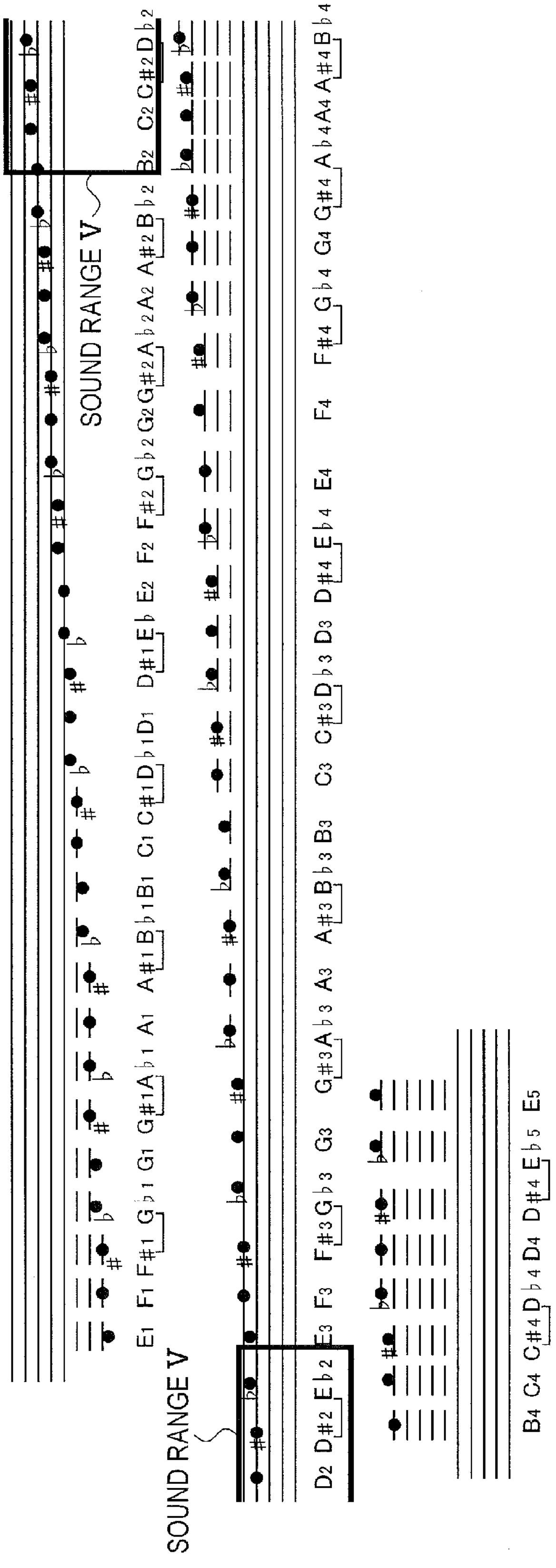
FIG. 59A is a diagram illustrating positions of sounds included in sound range V on the staff notation.
Figure 59B:
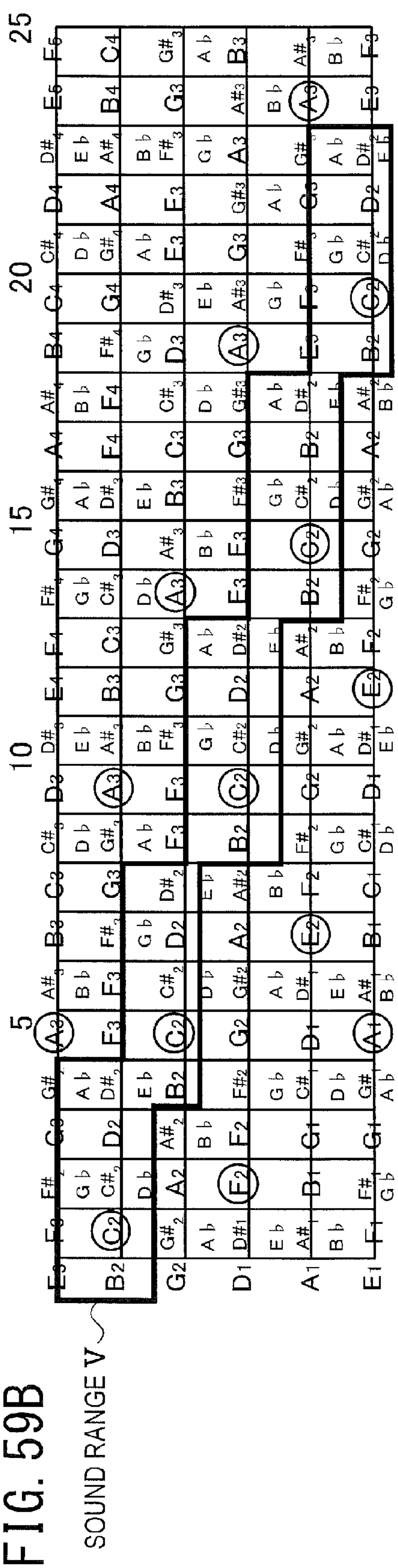
FIG. 59B is a diagram illustrating, as English letter display data, positions of the sounds included in sound range V, the positions being indicated at five spots on the fingerboard of the six-string guitar.

(V) As illustrated on a staff notation of FIG. 59A, "Sound range V" adjacent to a high-tone side of "Sound range IV" is a sound range including sounds of B2 to Eb2, which are surrounded by a bold solid line. In English letter display data converted into integer values of FIG. 59B, integer value conversion data of the sounds of B2 to Eb2, which are individually included in the sound ranges at five spots on the fingerboard, are surrounded by a bold solid line, whereby Sound range V is illustrated. An order of priority, by which Sound range V illustrated in FIGS. 59A and 59B is displayed, becomes an order of the fourth-string root→the third-string root→the fifth-string root→the sixth-string root as shown in Table 35 in the case of the three-part body. Meanwhile, in the case of the four-part body, the order of priority, by which Sound range V as shown in Table 36 is displayed, becomes an order of the fourth-string root→the fifth-string root→the sixth-string root.

Figure 60A:
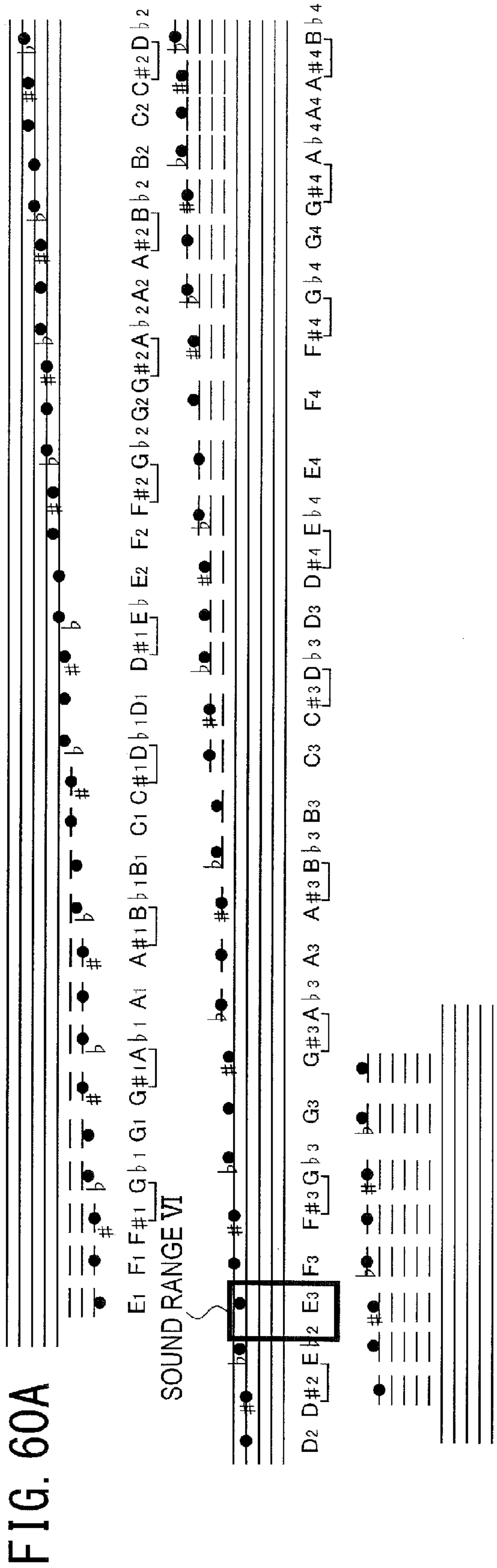
FIG. 60A is a diagram illustrating positions of sounds included in sound range VI on the staff notation.
Figure 60B:
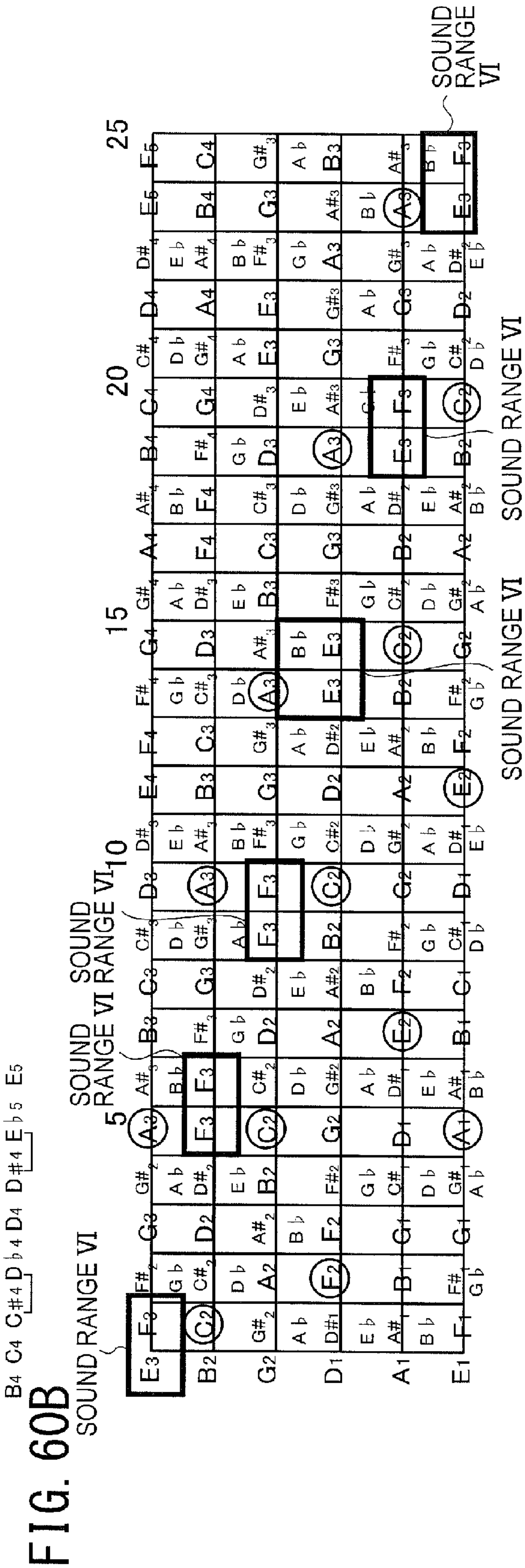
FIG. 60B is a diagram illustrating, as English letter display data, positions of the sounds included in sound range VI, the positions being indicated at six spots on the fingerboard of the six-string guitar.

(VI) As illustrated on a staff notation of FIG. 60A, "Sound range VI" adjacent to a high-tone side of "Sound range V" is a sound range including sounds of E3 to F3, which are surrounded by a bold solid line. In English letter display data converted into integer values of FIG. 60B, integer value conversion data of the sounds of E3 to F3, which are individually included in the sound ranges at six spots on the fingerboard, are surrounded by bold solid lines, whereby Sound range VI is illustrated. An order of priority, by which Sound range VI illustrated in FIGS. 60A and 60B is displayed, becomes an order of the fourth-string root→the third-string root→the fifth-string root→the sixth-string root as shown in Table 35 in the case of the three-part body. Meanwhile, in the case of the four-part body, the order of priority, by which Sound range VI as shown in Table 36 is displayed, becomes an order of the fourth-string root→the fifth-string root→the sixth-string root.

Figure 61A:
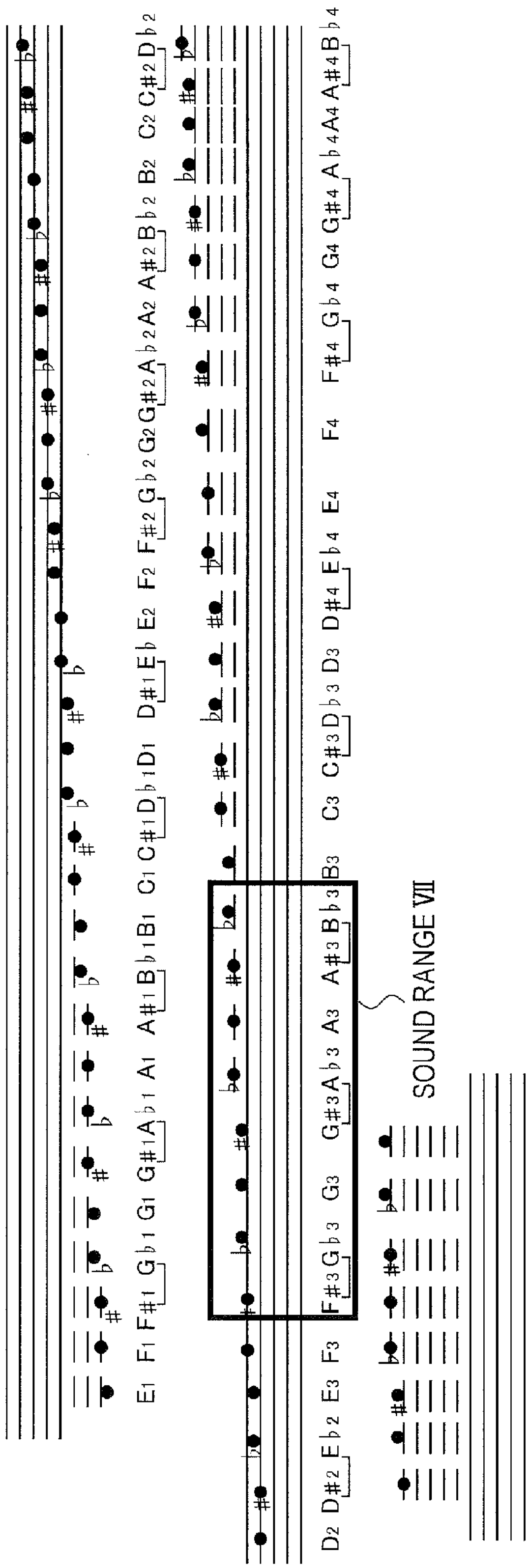
FIG. 61A is a diagram illustrating positions of sounds included in sound range VII on the staff notation.
Figure 61B:
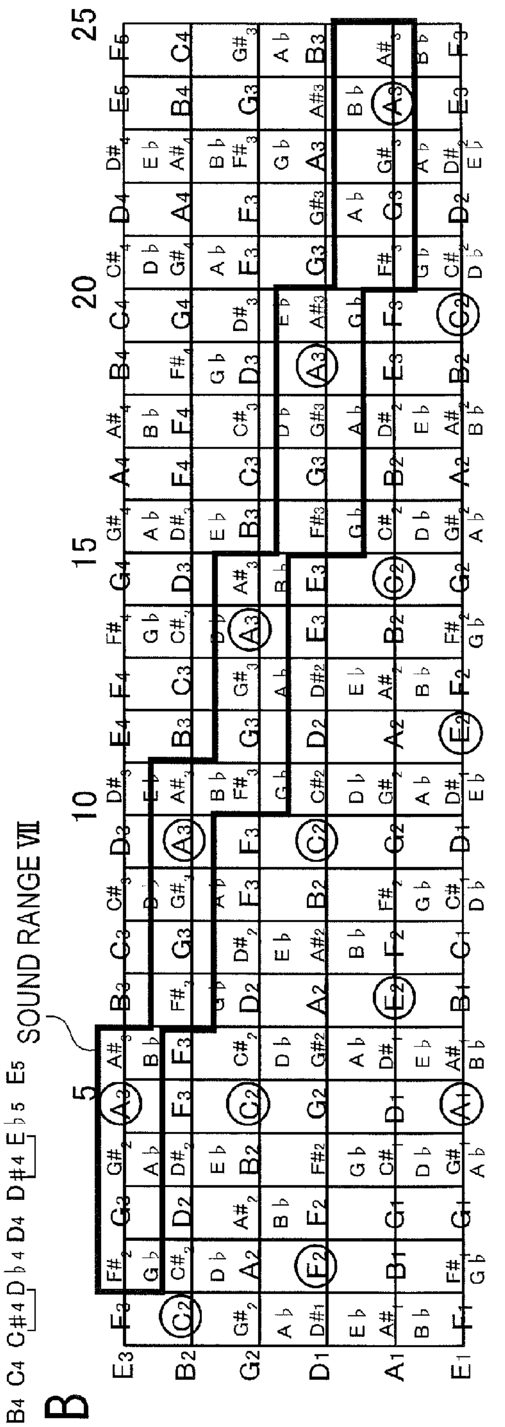
FIG. 61B is a diagram illustrating, as English letter display data, positions of the sounds included in sound range VII, the positions being indicated at five spots on the fingerboard of the six-string guitar.

As illustrated on a staff notation of FIG. 61A, "Sound range VII" adjacent to a high-tone side of "Sound range VI" is a sound range including sounds of F#3 to Bb3, which are surrounded by a bold solid line. In English letter display data converted into integer values of FIG. 61B, integer value conversion data of the sounds of F#3 to Bb3, which are individually included in the sound ranges at five spots on the fingerboard, are surrounded by a bold solid line, whereby Sound range VII is illustrated. An order of priority, by which Sound range VII illustrated in FIGS. 61A and 61B is displayed, becomes an order of the third-string root→the fourth-string root→the fifth-string root as shown in Table 35 in the case of the three-part body. Meanwhile, in the case of the four-part body, the order of priority, by which Sound range VII as shown in Table 36 is displayed, becomes an order of the fourth-string root→the fifth-string root.

Figure 62A:
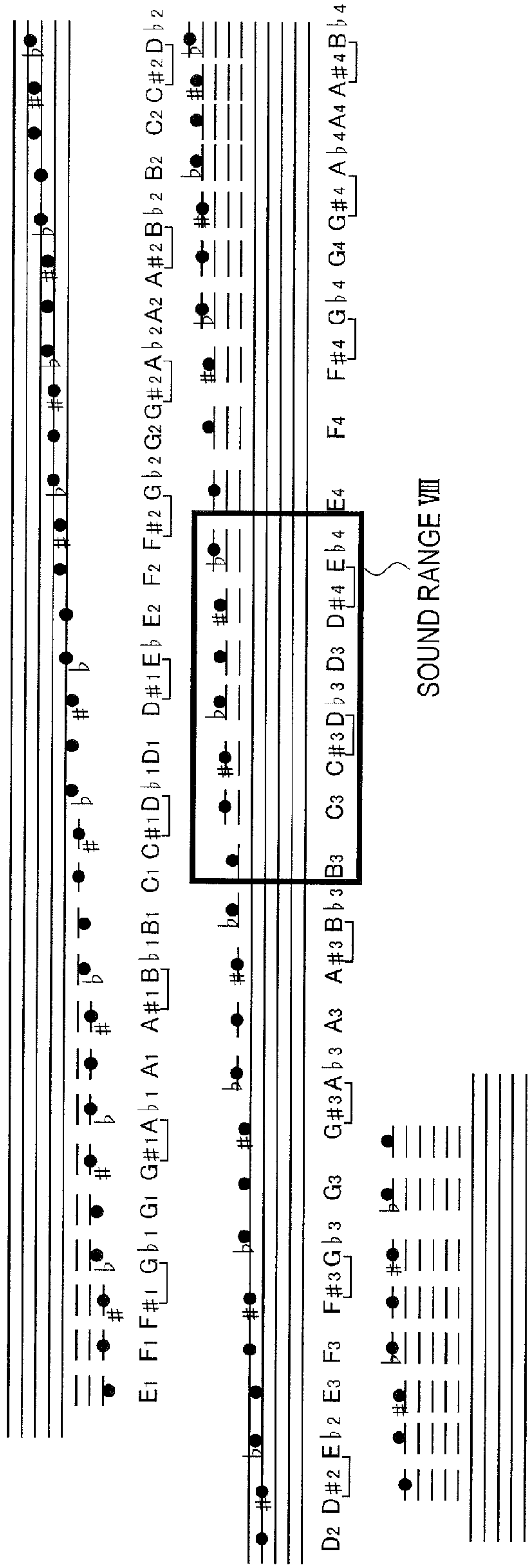
FIG. 62A is a diagram illustrating positions of sounds included in sound range VIII on the staff notation.
Figure 62B:
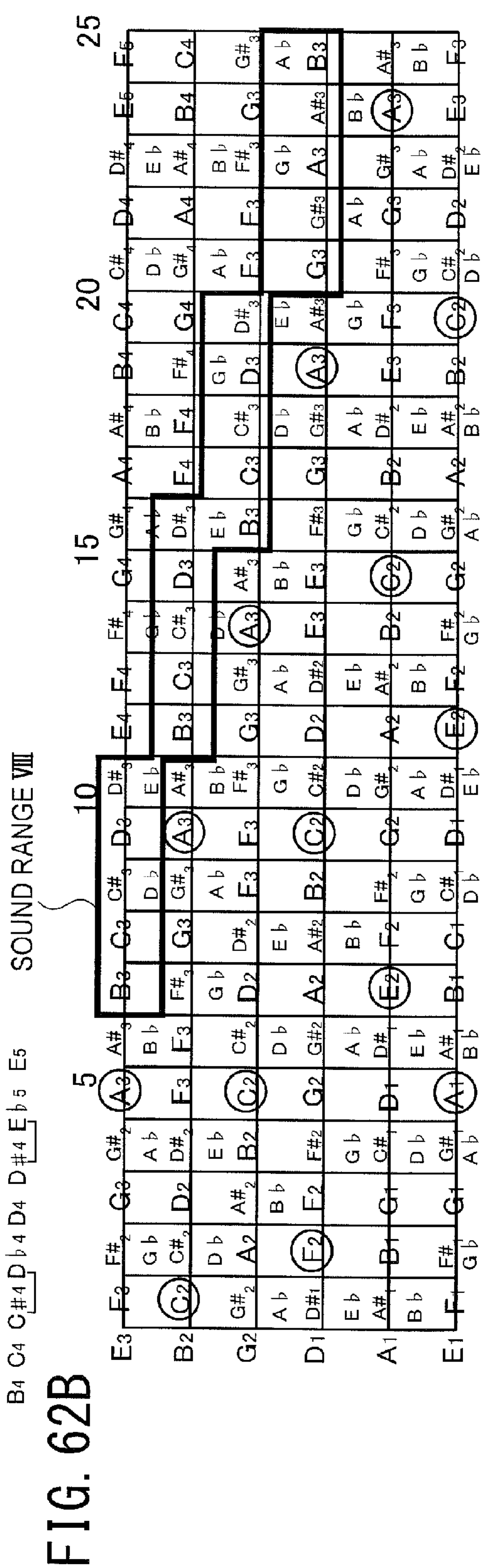
FIG. 62B is a diagram illustrating, as English letter display data, positions of the sounds included in sound range VIII, the positions being indicated at four spots on the fingerboard of the six-string guitar.

(VIII) As illustrated on a staff notation of FIG. 62A, "Sound range VIII" adjacent to a high-tone side of "Sound range VII" is a sound range including sounds of B3 to Eb4, which are surrounded by a bold solid line. In English letter display data converted into integer values of FIG. 62B, integer value conversion data of the sounds of B3 to Eb4, which are individually included in the sound ranges at four spots on the fingerboard, are surrounded by a bold solid line, whereby Sound range VIII is illustrated. An order of priority, by which Sound range VIII illustrated in FIGS. 62A and 62B is displayed, becomes an order of the third-string root→the fourth-string root as shown in Table 35 in the case of the three-part body. Meanwhile, in the case of the four-part body, the order of priority, by which Sound range VIII as shown in Table 36 is displayed, takes only the fourth-string root.

Figure 63A:
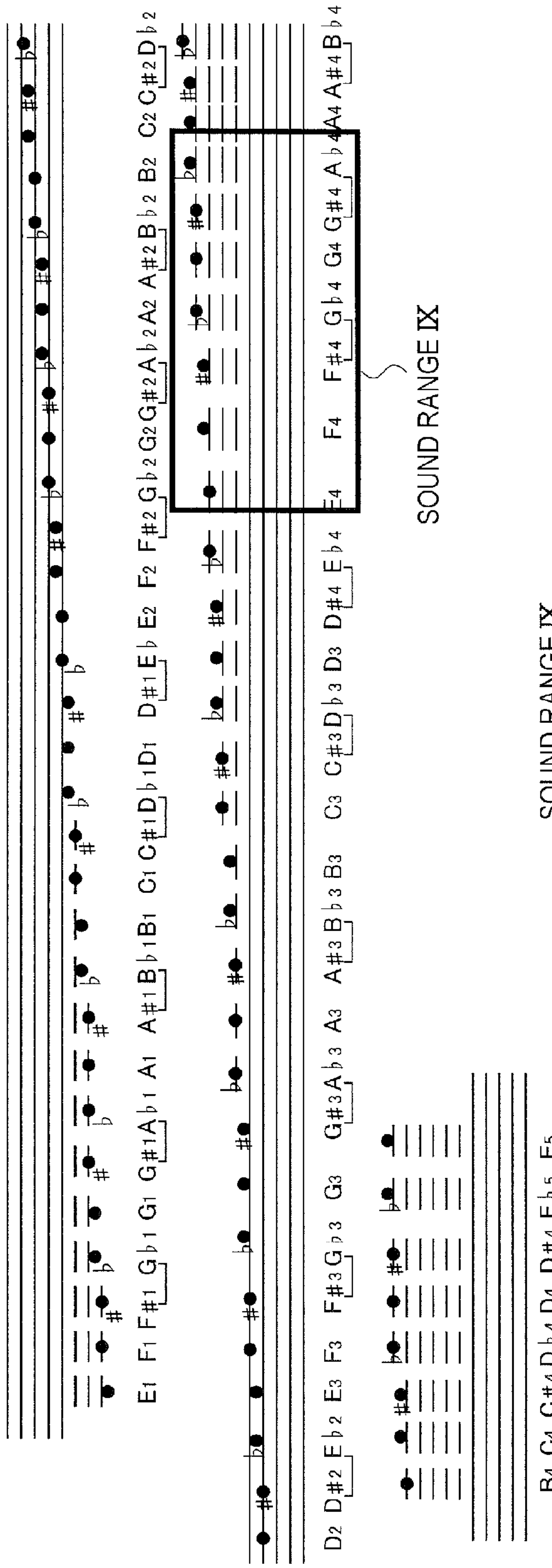
FIG. 63A is a diagram illustrating positions of sounds included in sound range IX on the staff notation.
Figure 63B:
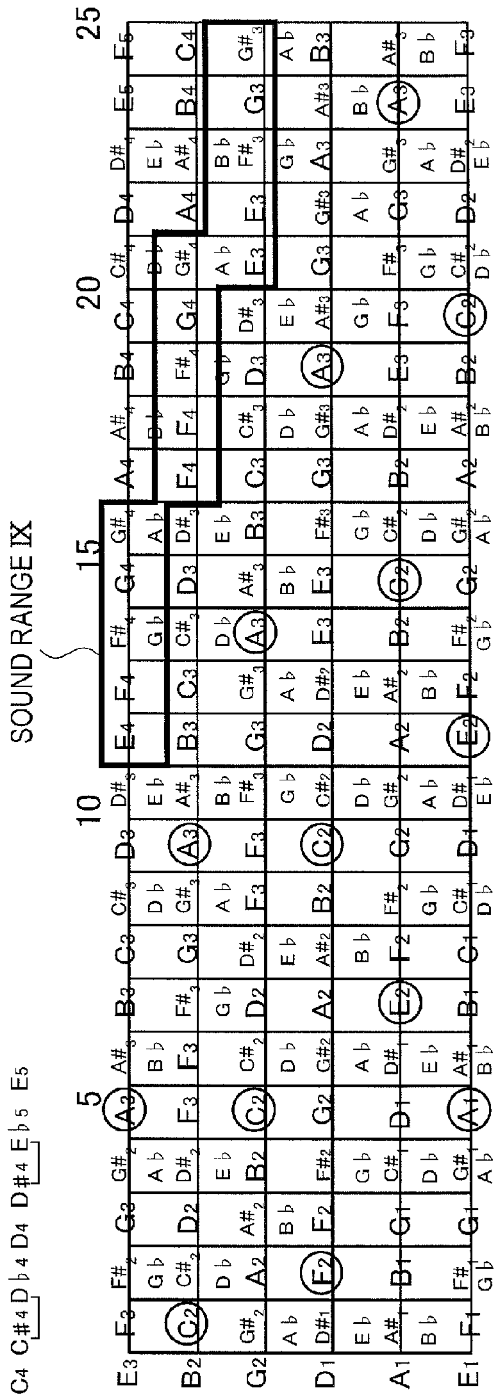
FIG. 63B is a diagram illustrating, as English letter display data, positions of the sounds included in sound range IX, the positions being indicated at three spots on the fingerboard of the six-string guitar.

(IX) As illustrated on a staff notation of FIG. 63A, "Sound range IX" adjacent to a high-tone side of "Sound range VIII" is a sound range including sounds of E4 to Ab4, which are surrounded by a bold solid line. In English letter display data converted into integer values of FIG. 63B, integer value conversion data of the sounds of E4 to Ab4, which are individually included in the sound ranges at three spots on the fingerboard, are surrounded by a bold solid line, whereby Sound range IX is illustrated. An order of priority, by which Sound range IX illustrated in FIGS. 63A and 63B is displayed, takes only the third-string root as shown in Table 35 in the case of the three-part body. However, in the case of the four-part body, there is no order of priority, by which Sound range IX is displayed as illustrated in Table 36.

(X) As illustrated on a staff notation of FIG. 63A, "Sound range X" adjacent to a high-tone side of "Sound range IX" is a sound range including sounds of A4 to C4, which are surrounded by a bold solid line. In English letter display data converted into integer values of FIG. 63B, integer value conversion data of the sounds of A4 to C4, which are individually included in the sound ranges at two spots on the fingerboard, are surrounded by a bold solid line, whereby Sound range X is illustrated. In the case of the three-part body illustrated in Table 35, and in the case of the four-part body illustrated in Table 36, there is no order of priority by which Sound range X is displayed.

Figure 64A:
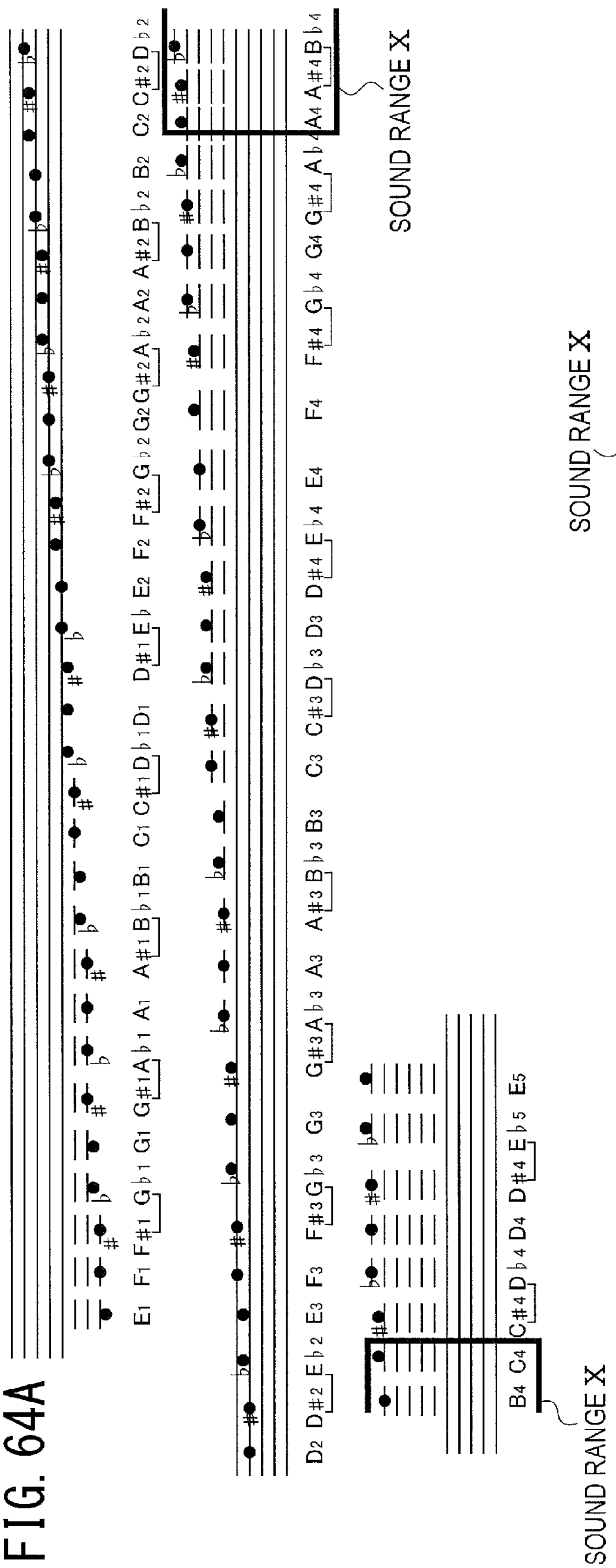
FIG. 64A is a diagram illustrating positions of sounds included in sound range X on the staff notation.
Figure 64B:
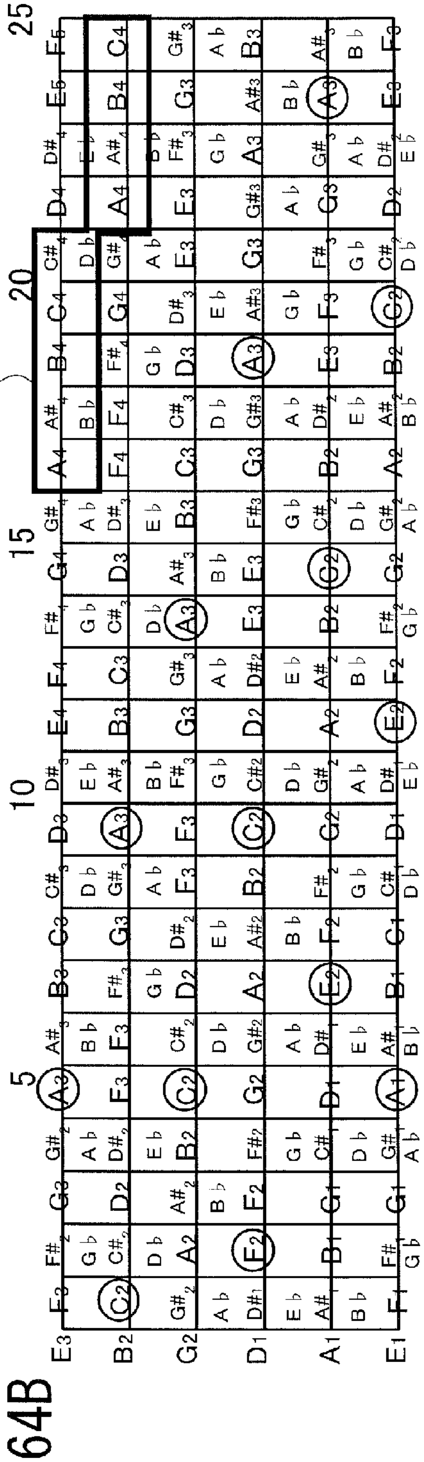
FIG. 64B is a diagram illustrating, as English letter display data, positions of the sounds included in sound range X, the positions being indicated at two spots on the fingerboard of the six-string guitar.
Figure 65A:
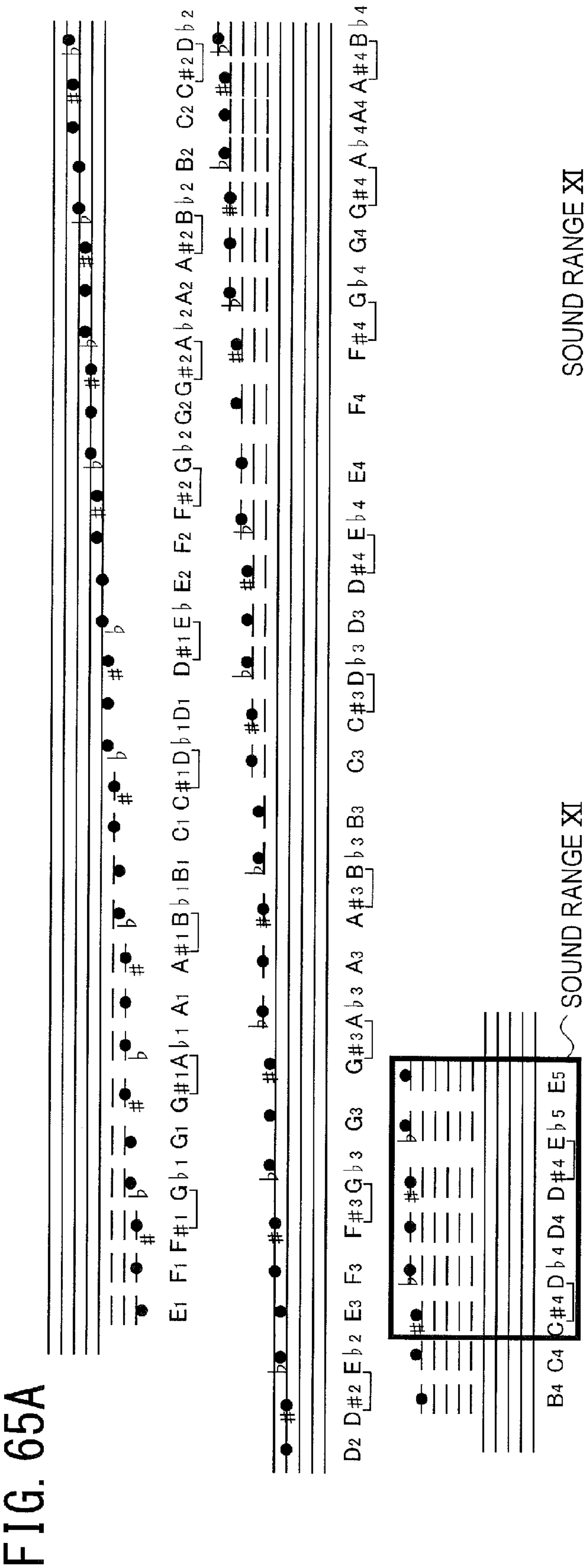
FIG. 65A is a diagram illustrating positions of sounds included in sound range XI on the staff notation.
Figure 65B:
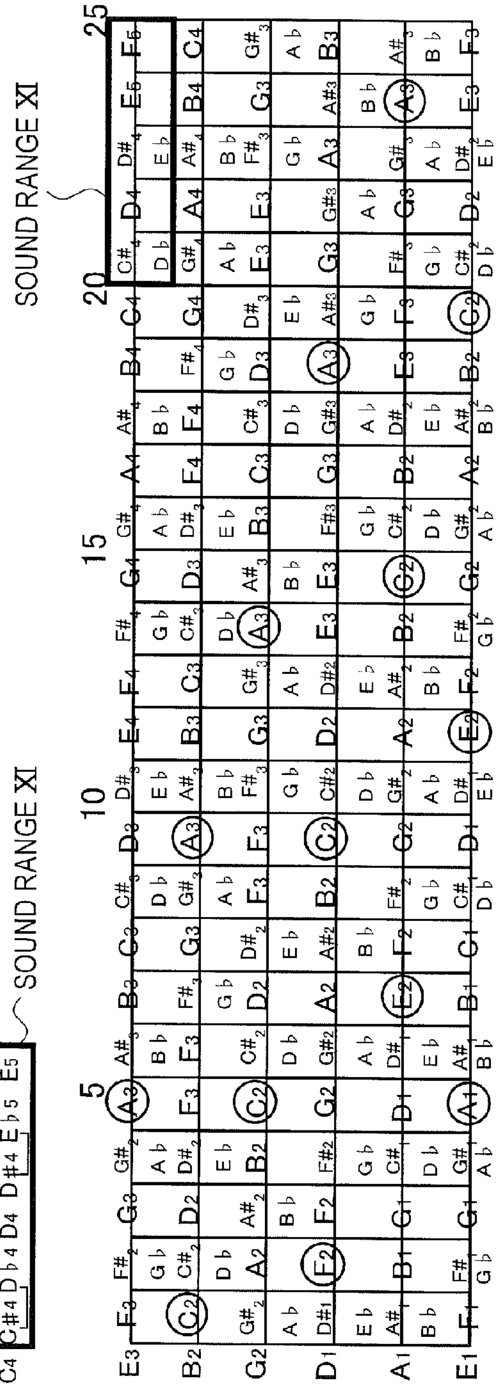
FIG. 65B is a diagram illustrating, as English letter display data, positions of the sounds included in sound range XI, the positions being indicated at one spot on the fingerboard of the six-string guitar.

(XI) As illustrated on a staff notation of FIG. 64A, "Sound range XI" adjacent to a high-tone side of "Sound range X" is a sound range including sounds of C#4 to E4, which are surrounded by a bold solid line. In English letter display data converted into integer values of FIG. 64B, integer value conversion data of the sounds of C#4 to E5, which are individually included in the sound range at one spots on the fingerboard, are surrounded by a bold solid line, whereby Sound range XI is illustrated. In the case of the three-part body illustrated in Table 35, and in the case of the four-part body illustrated in Table 36, there is no order of priority by which Sound range XI is displayed.

<Guitar Teaching Data Creation Program>

Such operations of a series of the guitar teaching data creation method illustrated in FIG. 39 can be executed by controlling the CPU 220*a*, which is illustrated in FIG. 38, by the guitar teaching data creation program with an algorithm equivalent to that of FIG. 39. As already mentioned, this guitar teaching data creation program just needs to be stored in the program storage device of the computer system that composes the CPU 220*c* according to the second embodiment. Moreover, the guitar teaching data creation program according to the second embodiment is stored in the computer-readable recording medium, and the program storage device of the CPU 220*c* is caused to read this recording medium, whereby a series of the processing of the guitar teaching data creation method according to the second embodiment can be executed. Furthermore, it is possible to store the guitar teaching data creation program in the program storage device via an information processing network such as the Internet.

As described above, in accordance with the guitar teaching data creation device 22 according to the second embodiment, the difficult-to-understand mechanism on the fingerboard can be grasped mathematically from bird's eyes, and such teaching-oriented data, which is necessary to enhance the skill for the fingering on the fingerboard, the fingering being the most difficult for guitarists, can be created. In such a way, there can be further provided: the guitar teaching system including the guitar teaching data creation device 22 according to the second embodiment; the guitar teaching data creation method using the guitar teaching data creation device 22 according to the second embodiment; and the guitar teaching data creation program for actuating the guitar teaching data creation device 22 according to the second embodiment.

(Third Embodiment)

Though the entire system is not illustrated again, in a substantially similar way to the configuration illustrated in FIG. 1, a teaching system according to a third embodiment of the present invention includes: a guitar for teaching (teaching-oriented guitar: training guitar) 11; an interface 21*a* connected to the teaching-oriented guitar 11 via a wire 32; a teaching data creation device 22 connected to the interface 21*a* via a wire 35; a monitor (display device) 23*a* connected to the teaching data creation device 22 via a wire 37; and a piano keyboard-type keyboard 15 such as a MIDI keyboard connected to the interface 21*a* via a wire 34. The teaching-oriented guitar 11 and the piano keyboard-type keyboard 15 are connected to each other via a wire 33. Moreover, a headphone 16*a* is connected to the teaching-oriented guitar 11 via a wire 31, and a headphone 16*b* is connected to the piano keyboard-type keyboard 15 via a wire 36 (refer to FIG. 1).

Figure 66:
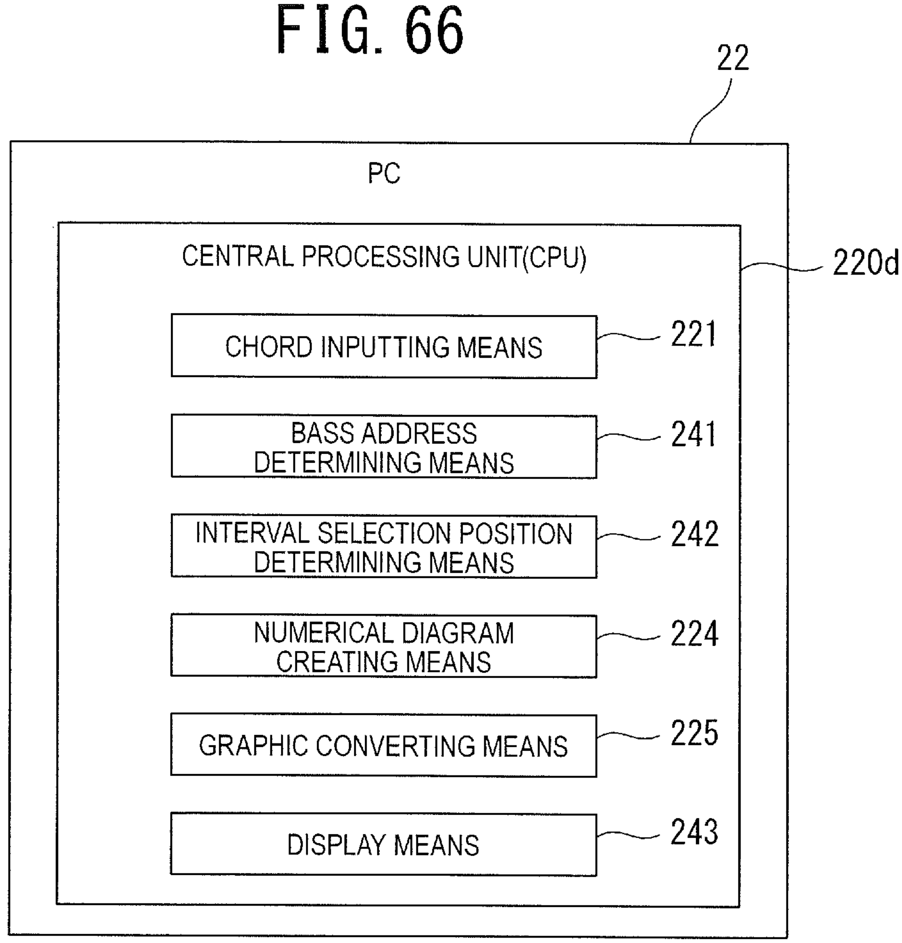
FIG. 66 is a block diagram explaining a logical configuration of hardware resources of a guitar teaching data creation device that composes a guitar teaching system according to a third embodiment of the present invention.
Figure 81:
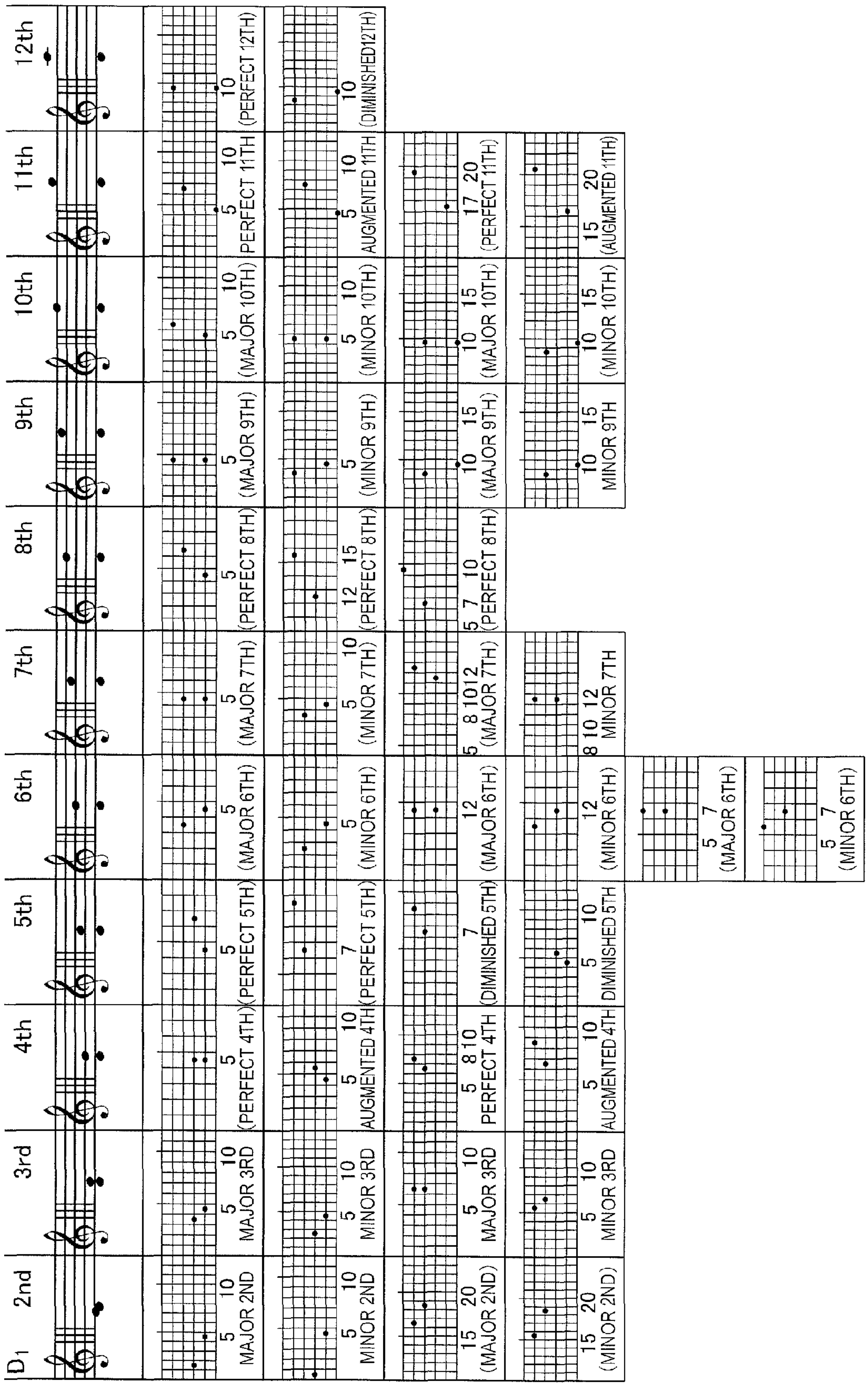
FIG. 81 is a diagram explaining a selection address table of the respective intervals serving as "Definition I" for use in the guitar teaching data creation method according to the third embodiment.

As illustrated in FIG. 66, the teaching data creation device 22 is a processor including a central processing unit (CPU) 220*d* having: chord inputting means 221 for receiving chords; BASS address determining means 241 for determining addresses of BASS in accordance with a sound range table; interval selection position determining means 242 for determining selection positions of respective intervals while taking selection address tables, which are illustrated in FIG. 81 and the like, as definitions; numerical diagram creating means 224 for creating numerical diagrams (address diagrams) from the selection positions of the respective intervals, which are determined by the interval selection position determining means 224; graphic converting means 225 for converting the numerical diagrams, which are created by the numerical diagram creating means 224, into graphics; and display means 243 for arranging the graphics, which are converted by the graphic converting means 225, for each BASS of the respective strings and displaying the arranged graphics.

In a similar way to the teaching systems according to the first and second embodiments, the teaching data creation device 22 according to the third embodiment can be realized by a computer system such as a PC. In a case where the teaching data creation device 22 is composed of a PC, the monitor 23*a* illustrated in FIG. 1 may be built in the teaching data creation device 22, or may be composed integrally with the teaching data creation device 22. Moreover, though not illustrated, in a similar way to the teaching systems according to the first and second embodiments, a program storage device and a data storage device are connected to or built in the teaching data creation device 22 of the third embodiment of the present invention. Hence, a teaching data creation program for drive-controlling the chord inputting means 221, the BASS address determining means 241, the interval selection position determining means 242, the numerical diagram creating means 224, the graphic converting means 225 and the display means 243, which are illustrated in FIG. 66, and causing these means to create teaching data for use in the teaching system according to the third embodiment just needs to be stored in a program storage device of a computer system that composes the teaching data creation device 22. Meanwhile, varieties of input/output data and parameters, which are necessary for teaching data creation, data under computation, and the like, can be stored in the data storage device.

Then, the teaching data creation program according to the third embodiment of the present invention is stored in a computer-readable external recording medium, and the program storage device of the teaching data creation device 22 is caused to read a content recorded in the external recording medium, whereby the teaching data creation program concerned can execute a series of processing of the teaching data creation of the present invention. The teaching data creation device 22 according to the third embodiment of the present invention is configurable in a PC or the like, and accordingly, illustration thereof is omitted; however, the teaching data creation device 22 may further include input devices such as a PC keyboard, a mouse, and a light pen. This fact or other configurations such as the structure of the teaching-oriented guitar 11 are substantially similar to those of the teaching system according to the first embodiment, and accordingly, a duplicate description is omitted.

<Teaching Data Creation Method>

Figure 67:
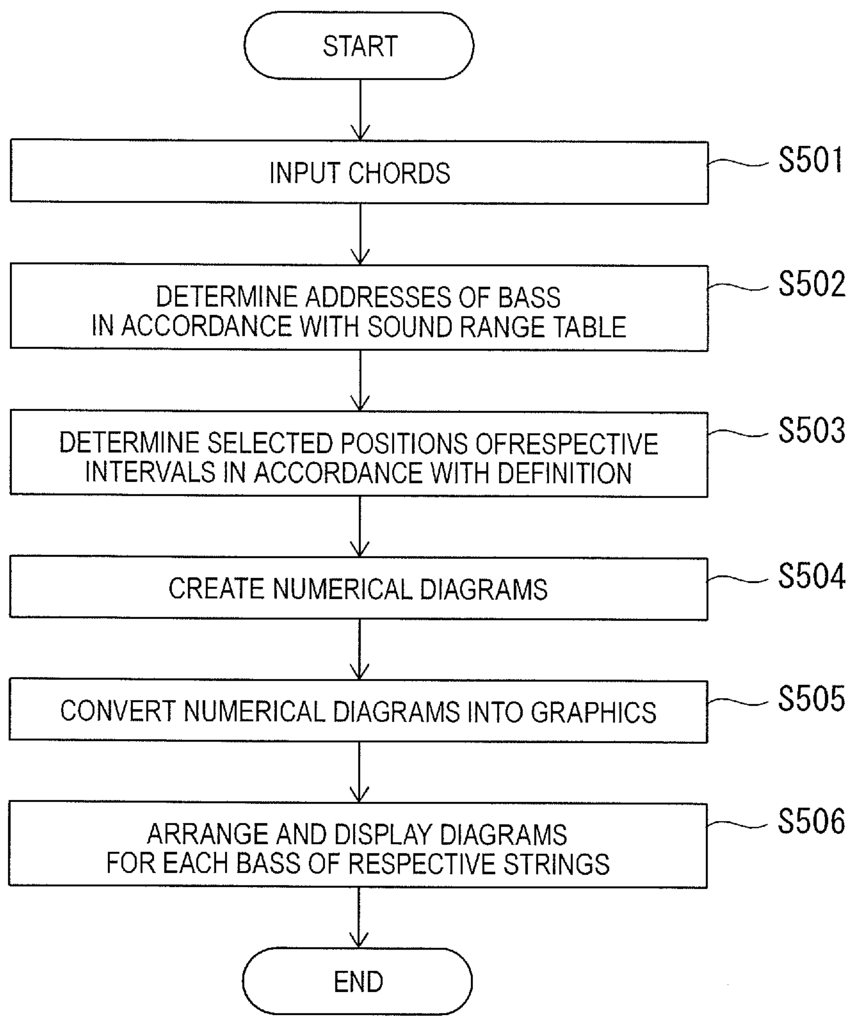
FIG. 67 is a flowchart explaining a guitar teaching data creation method according to the third embodiment.

A description is made of a teaching data creation method according to the third embodiment by using the flowchart of FIG. 67. Note that the teaching data creation method to be described below is merely an example, and as a matter of course, is realizable by a variety of creation methods other than this method, the variety of creation methods including modification examples of this method.

Figure 68:
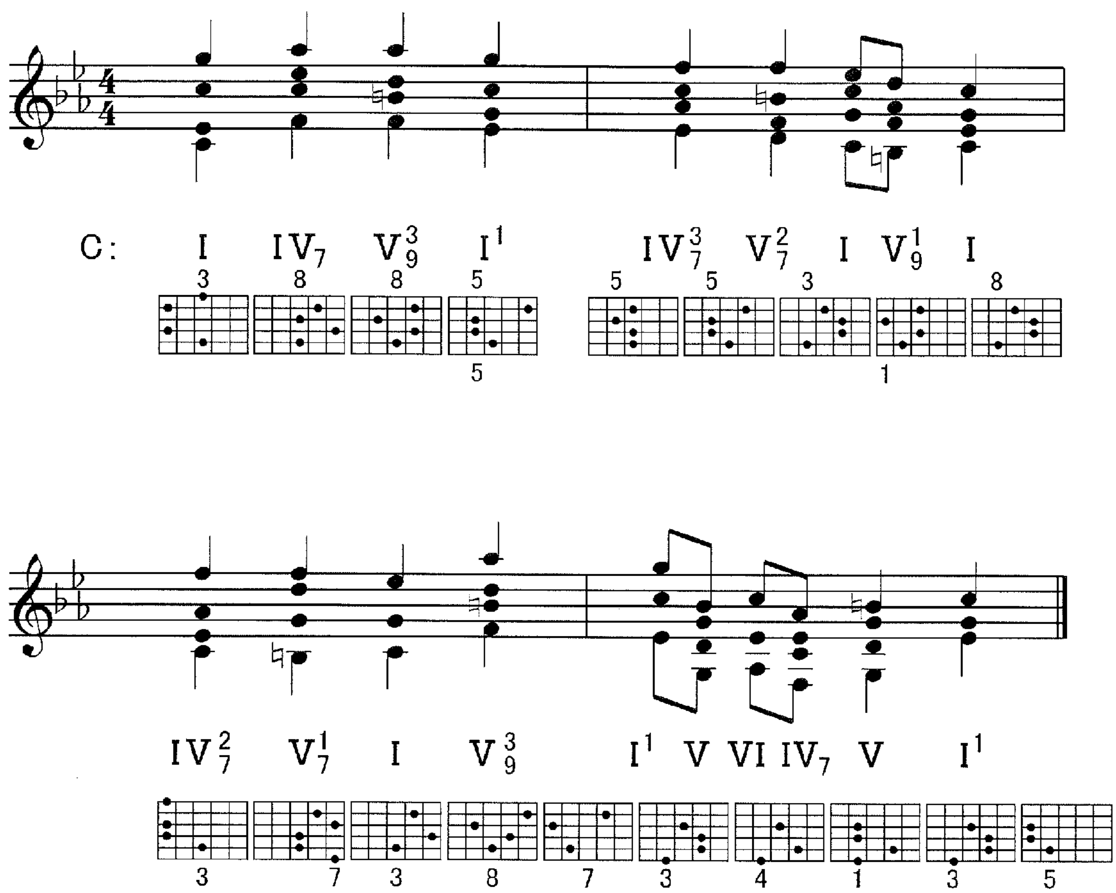
FIG. 68 is a diagram exemplarily illustrating inputted chords in order to explain the guitar teaching data creation method according to the third embodiment.

(A) First, the teaching data creation program stored in the program storage device connected to the teaching data creation device 22 illustrated in FIG. 66 is started. Then, the teaching data creation program drives the chord inputting means 221 of the CPU 220*d* that composes the teaching data creation device 22 illustrated in FIG. 66, and receives the chord in Step S501 via the input devices. Here, in the teaching data creation program stored in the program storage device, an application program that displays a staff notation similar to that in usual music production software is included. Hence, the staff notation is displayed on a screen of a monitor similar to the monitor illustrated in FIG. 1 by using the teaching data creation program, and the teaching data creation program causes the chord inputting means 221 to sequentially receive the chords by using electrical signals generated by clicking the mouse to the staff notation on the screen of the monitor. The chords received by the chord inputting means 221, for example, as illustrated in FIG. 68 are stored in the data storage device connected to the teaching data creation device 22.

(B) Next, in Step S502, the BASS address determining means 241 of the CPU 220*d* determines the addresses of BASS in accordance with sound range tables as illustrated in FIGS. 55A and 55B to FIGS. 65A and 65B. The addresses of BASS are stored in the data storage device connected to the teaching data creation device 22. Moreover, in Step S503, the interval selection position determining means 242 of the CPU 220*d* determines the selection positions of the respective intervals while taking the selection address tables, which are illustrated in FIG. 81 and the like, as definitions. The determined selection positions of the respective intervals are stored in the data storage device connected to the teaching data creation device 22. FIG. 81 is a selection address table in a case where D1 in Sound range III illustrated in FIGS. 57A and 57B is taken as the address of BASS.

(C) Thereafter, in Step S504, the numerical diagram creating means 224 of the CPU 220*d* creates the numerical diagrams (address diagrams) from the selected positions of the respective intervals, which are determined by the interval selection position determining means 242. The numerical diagrams are stored in the data storage device connected to the teaching data creation device 22. Moreover, in Step S505, the graphic converting means 225 of the CPU 220*d* converts the numerical diagrams, which are created by the numerical diagram creating means 224, into graphics illustrated in FIG. 84B, FIG. 84C, FIG. 85B, FIG. 86B, FIG. 87B, FIG. 88B, FIG. 89B, FIG. 90B, FIG. 91B, and the like. The converted graphics are stored in the data storage device connected to the teaching data creation device 22.

(D) Then, in Step S506, the display means 243 of the CPU 220*d* transmits the signal to arrange the graphics, which are converted by the graphic converting means 225, for each BASS of the respective strings, and to display the arranged graphics. As a result, in Step S506, the graphics are arranged for each BASS of the respective strings on the screen of the monitor similar to that illustrated in FIG. 1 and on the fingerboard, and are sequentially displayed thereon.

In accordance with the teaching data creation device 22 according to the third embodiment, the changes of the forms of the respective chords and the respective positions thereof can be clarified and displayed. As a result, guitarists can be assisted to arrange and grasp difficulty in understanding the harmonies and the mechanisms.

Figure 69:
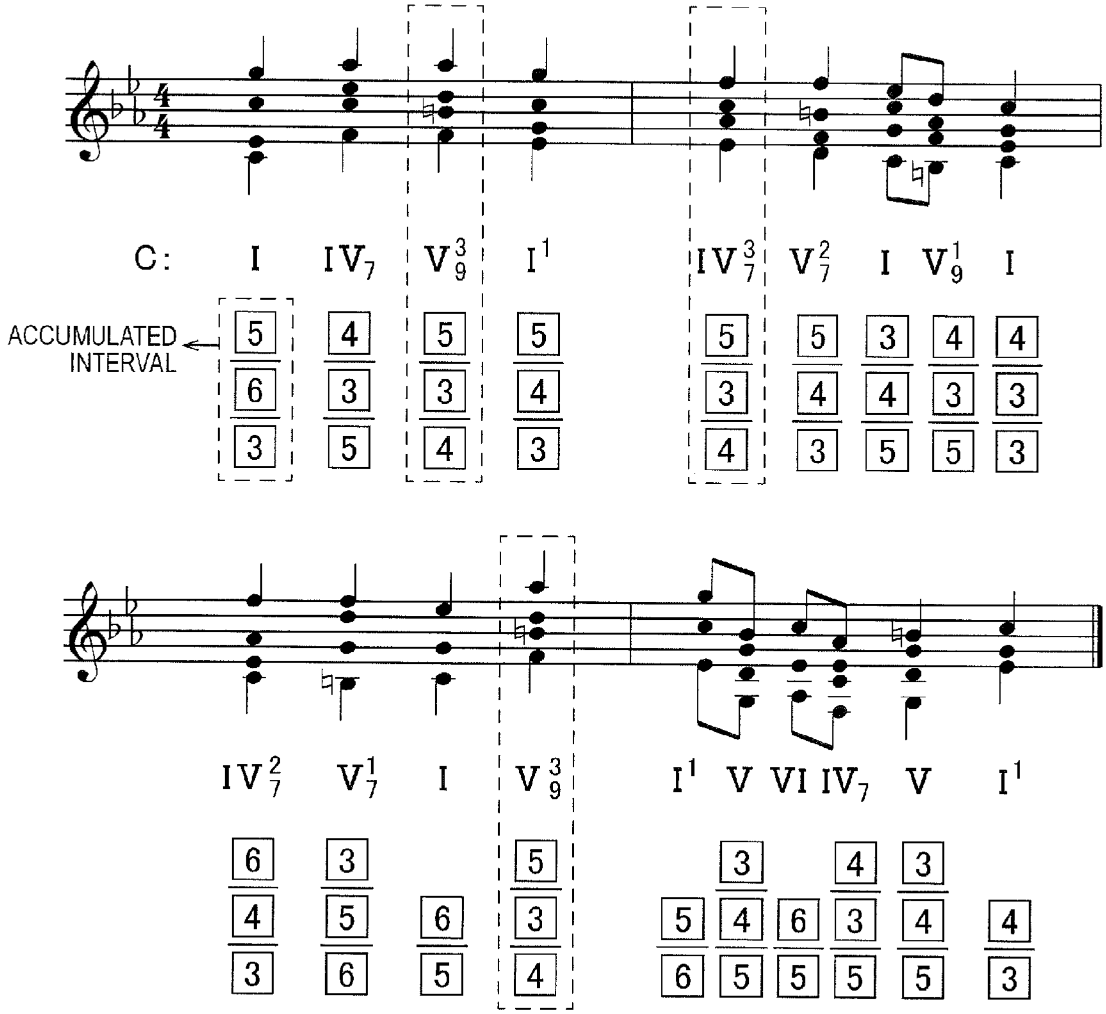
FIG. 69 is a diagram illustrating the chords of FIG. 68 by accumulated sound display in order to explain the guitar teaching data creation method according to the third embodiment.

The program for converting the inputted chords into the diagrams, the program including Step S502 to Step S504 in FIG. 67, is described by using FIG. 68 to FIGS. 82A to 82C. Intervals between sounds of the respective chords in such a score as illustrated in FIG. 68 are shown by accumulated sound display in which numbers are written individually into three blank squares which are as illustrated in FIG. 69, accumulated vertically. In FIG. 69, the numbers written individually into the three blank squares are the intervals between the sounds of the respective chords, that is, in each chord, are an interval between BASS and TENOR, an interval between TENOR and ALTO, and an interval between ALTO and SOPRANO. In FIG. 68 and FIG. 69, a key is determined by key signatures of E flat major/C minor, and in FIG. 70, a whole key signature composed of three vertical lines is illustrated on a side of a treble clef. The chord in FIG. 70 is that in a case where the interval between BASS and TENOR is 3rd, the interval between TENOR and ALTO is 3rd, and the interval between ALTO and SOPRANO is 3rd, and in the accumulated interval display, the number 3 is written individually into the three blank squares accumulated vertically.

Figure 70:
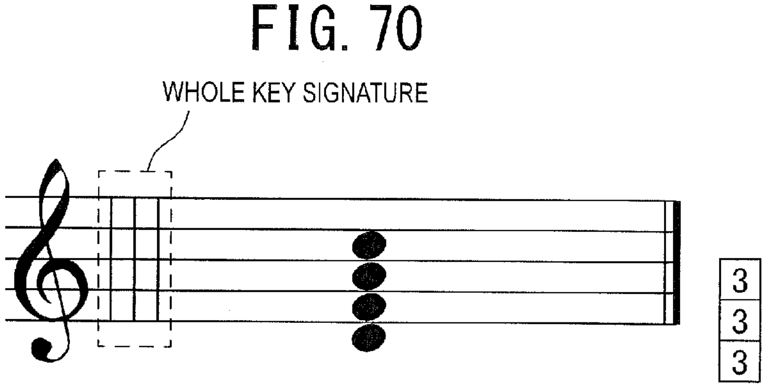
FIG. 70 is a diagram explaining a whole key signature for use in simplifying and explaining the guitar teaching data creation method according to the third embodiment.
Figures 71, 72A, 72B, 72C, 72D, 72E, 72F, 72G, 72H, 73:
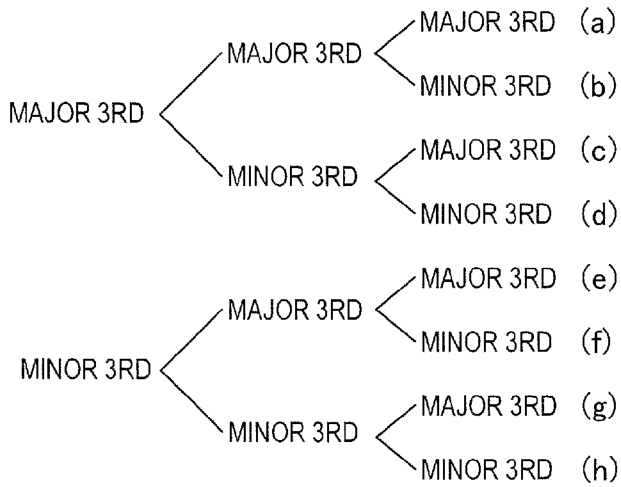
FIG. 71 is a diagram explaining structures of chords subjected to accumulated interval display in which an interval between BASS and TENOR is 3rd, an interval between TENOR and ALTO is 3rd, and an interval between ALTO and SOPRANO is 3rd.
FIGS. 72A to 72H are diagrams explaining that the chords subjected to the accumulated interval display in which the interval between BASS and TENOR is 3rd, the interval between TENOR and ALTO is 3rd, and the interval between ALTO and SOPRANO is 3rd, the chords being illustrated in FIG. 71, include eight types of chords.
FIG. 73 is a diagram explaining relationships between seven belonging keys and seven chord numbers corresponding thereto.

As illustrated in FIG. 71, the chord illustrated in FIG. 70 includes eight chords, which are major 3rd (a), minor 3rd (b), major 3rd (c), minor 3rd (d), major 3rd (e), minor 3rd (f), major 3rd (g), and minor 3rd (h). Each of the eight chords in FIG. 71, which are major 3rd (a), minor 3rd (b), major 3rd (c), minor 3rd (d), major 3rd (e), minor 3rd (f), major 3rd (g), and minor 3rd (h), has an accumulated interval structure illustrated in FIGS. 72A to 72H. Such chords with the accumulated structure, which are as exemplified in FIGS. 72A to 72H, are determined by the key signatures. For example, if the chords are major, the chords belong to seven parent keys as illustrated in FIG. 73, which are A, D, G, C, F, B flat and E flat. Chord numbers IV, I, V, II, VI, III, VII on a lower stage of FIG. 73 are determined in response to A, D, G, C, F, B flat and E flat, which are the seven parent keys on an upper stage of FIG. 73.

Chords other than those illustrated on the upper stage of FIG. 73 and that belong to the parent keys are altered chords such as a Doppel dominant, and are written on the score while being annexed with accidentals such as sharp and flat. "Doppel" stands for "double" in English, and the Doppel dominant stands for a sound having a dominant relationship with a dominant of a certain key. Those that belong to the key are referred to as "diatonic", and those other than "diatonic" are referred to as "non-diatonic". FIG. 83 illustrates relationships between changes on the respective written sounds on the diatonic scale (whole tone scale) that takes C as a keynote and substantial changes thereof in the case where the chords are major.

The program of the teaching data creation method according to the third embodiment is premised on such a program in which the lower structure (keyboard of piano) of the conventional music production software is shifted to the fingerboard of the guitar, and first receives the key signatures of the parent keys on the upper stage of FIG. 73 in a similar way to the conventional music production software. Hence, in the actual program of the teaching data creation method according to the third embodiment, the parent keys are determined by the key signatures as exemplified on the upper stage of FIG. 73. Moreover, such interval numbers between the sounds are also determined as "major", "minor", "perfect", "augmented", and "diminished". However, a description for each key signature becomes a complicated explanation, and accordingly, a description of a principle of the teaching data creation method according to the third embodiment is simplified by using the whole key signatures as illustrated in FIG. 74 to FIG. 81.

Figure 74:
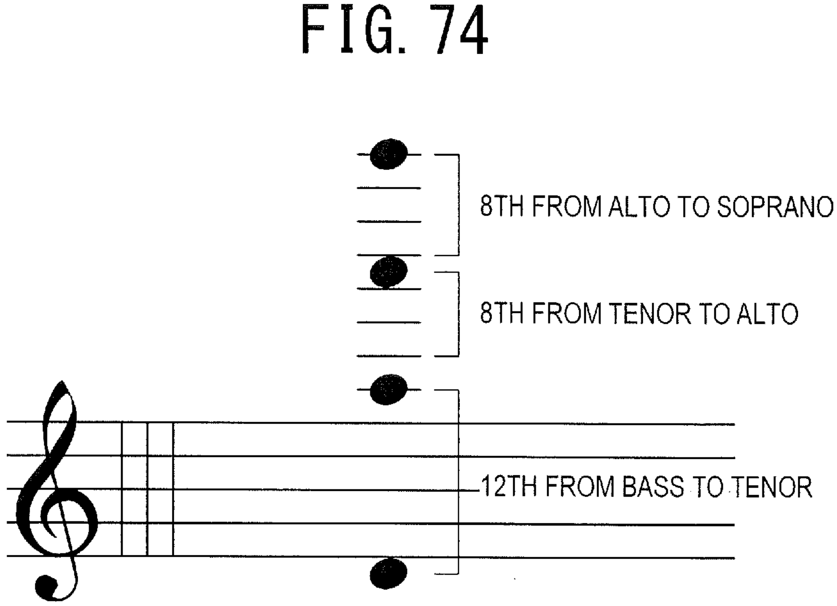
FIG. 74 is a diagram explaining "Definition Zero" for use in the guitar teaching data creation method according to the third embodiment.

A description is made of a score writing method in the teaching data creation method according to the third embodiment while taking D1 of Sound range III, which is illustrated in FIGS. 57A and 57B, as BASS. As illustrated in FIG. 74, the following description is premised on that the interval between BASS and TENOR is up to 12th, that the interval between TENOR and ALTO is up to 8th, and that the interval between ALTO and SOPRANO is up to 8th (Definition Zero). Note that there is also a treatise mentioning that the interval between BASS and TENOR may be up to 14th.

(i) First, D1 is taken as BASS, and TENOR sounds are individually accumulated thereon in order of the 2nd interval, the 3rd interval, the 4th interval, the 5th interval, the 6th interval, the 7th interval, the 8th interval, the 9th interval, the 10th interval, the 11th interval and the 12th interval. Two-part bodies are thereby created, and as illustrated in FIG. 75, a one-dimensional table is created in which the two-part bodies are arrayed laterally.

Figure 75:
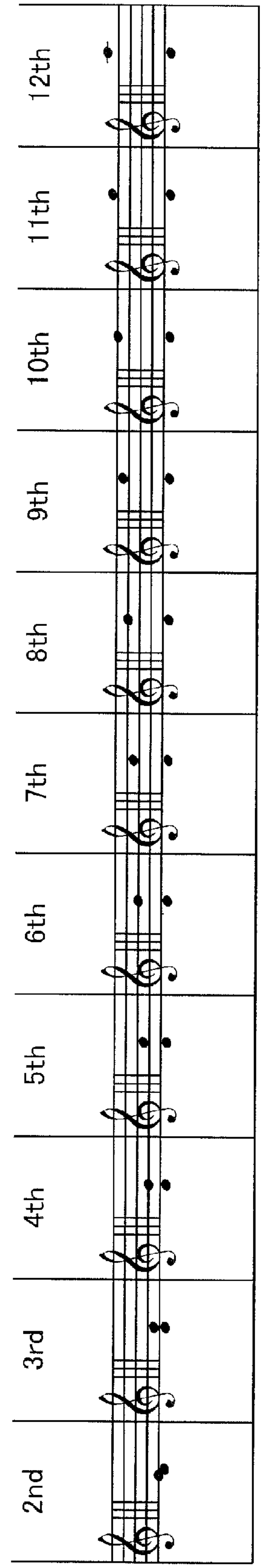
FIG. 75 is a diagram for explaining the guitar teaching data creation method according to the third embodiment, illustrating a diagram in which two-part bodies formed by individually accumulating TENOR sounds sequentially in order of a 2nd interval, a 3rd interval, a 4th interval, a 5th interval, a 6th interval, a 7th interval, an 8th interval, a 9th interval, a 10th interval, an 11th interval and a 12th interval while taking $D_1$ is taken as BASS.
Figure 76:
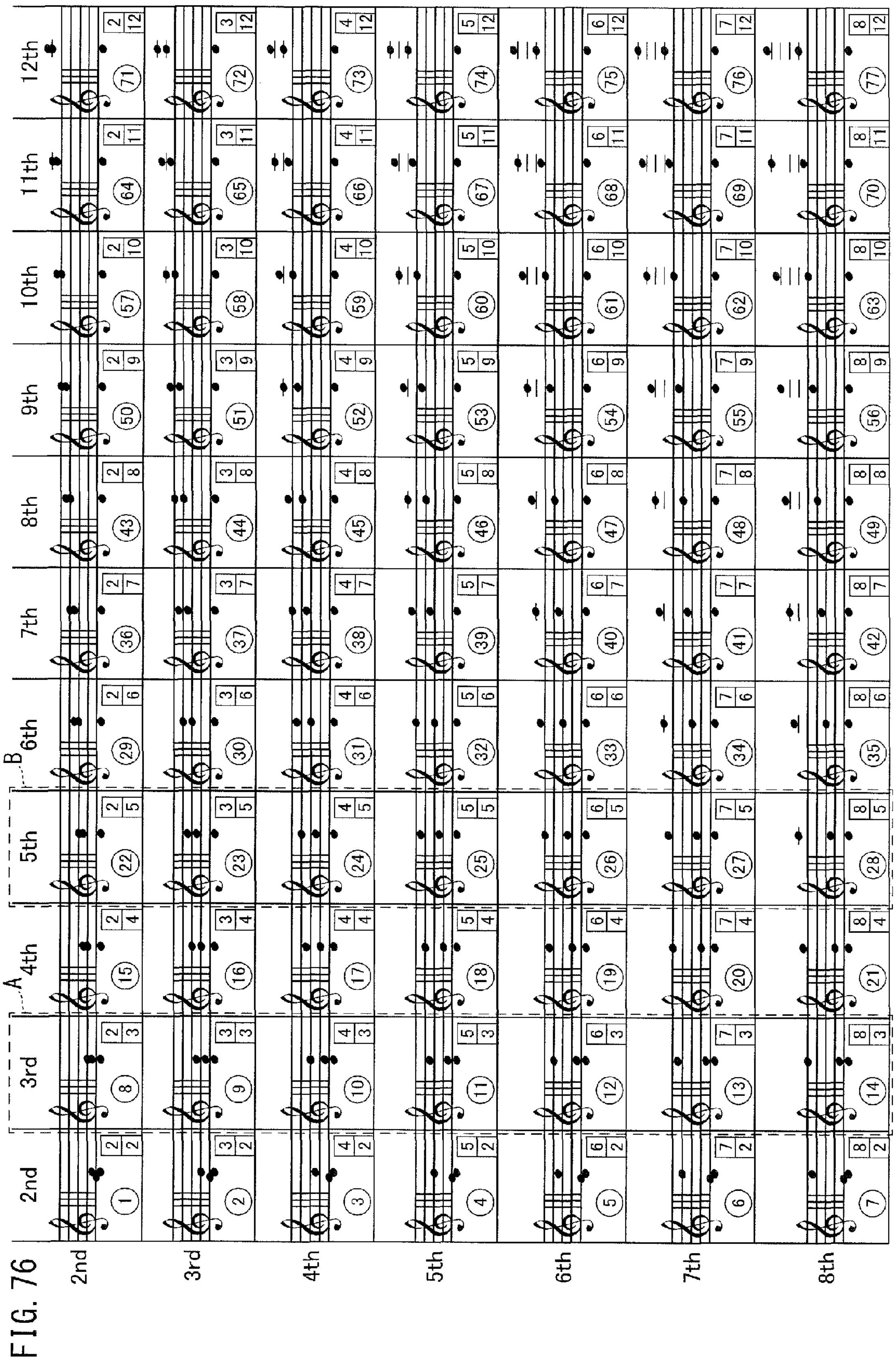
FIG. 76 is a diagram expressing, on a two-dimensional matrix, 77 types of three-part bodies formed by individually accumulating ALTO sounds sequentially on respective parts of the two-part bodies of FIG. 75 in order of the 2nd interval, the 3rd interval, the 4th interval, the 5th interval, the 6th interval, the 7th interval and the 8th interval.

(ii) Next, on the respective sounds of the two-part bodies on the one-dimensional table of FIG. 75, ALTO sounds are individually accumulated in order of the 2nd interval, the 3rd interval, the 4th interval, the 5th interval, the 6th interval, the 7th interval and the 8th interval. Three-part bodies are thereby created, and a two-dimensional matrix as illustrated in FIG. 76 is created. A row direction (lateral direction) of the two-dimensional matrix of FIG. 76 corresponds to the one-dimensional array of FIG. 75, and a column direction (longitudinal direction) of the two-dimensional matrix of FIG. 76 corresponds to such accumulation from the 2nd to 8th intervals of the ALTO sounds. On the two-dimensional matrix of FIG. 76, a total of 77 (=11×7) types of three-part bodies are displayed.

(iii) Next, on the respective sounds of the 77 types of three-part bodies of FIG. 76, SOPRANO sounds are individually accumulated in order of the 2nd interval, the 3rd interval, the 4th interval, the 5th interval, the 6th interval, the 7th interval and the 8th interval. Four-part bodies are thereby created, and then a three-dimensional matrix can be created. Among them, in FIG. 77, four-part bodies in a case where the SOPRANO sounds are individually accumulated in order of the 2nd interval, the 3rd interval, the 4th interval, the 5th interval, the 6th interval, the 7th interval and the 8th interval on the eighth to fourteenth three-part bodies indicated by circled numbers in the second column in the column direction of the two-dimensional matrix of FIG. 76 are partially displayed as a two-dimensional matrix. A row direction (lateral direction) of the two-dimensional matrix of FIG. 77 corresponds to an array in the second column in the column direction, which is surrounded by a broken-line rectangle assigned with Symbol A in FIG. 76, and a column direction (lateral direction) of the two-dimensional matrix of FIG. 77 corresponds to such accumulation from the 2nd to 8th intervals of the SOPRANO sounds. In a similar way, in FIG. 78, four-part bodies in a case where the SOPRANO sounds are individually accumulated in order of the 2nd interval, the 3rd interval, the 4th interval, the 5th interval, the 6th interval, the 7th interval and the 8th interval on the array of the three-part bodies on the fifth column in the column direction, which is surrounded by a broken-line rectangle assigned with Symbol B in the two-dimensional matrix, that is, on the twenty-second to twenty-eighth three-part bodies indicated by circled numbers in the fifth column, are partially displayed as a two-dimensional matrix.

Figure 77:
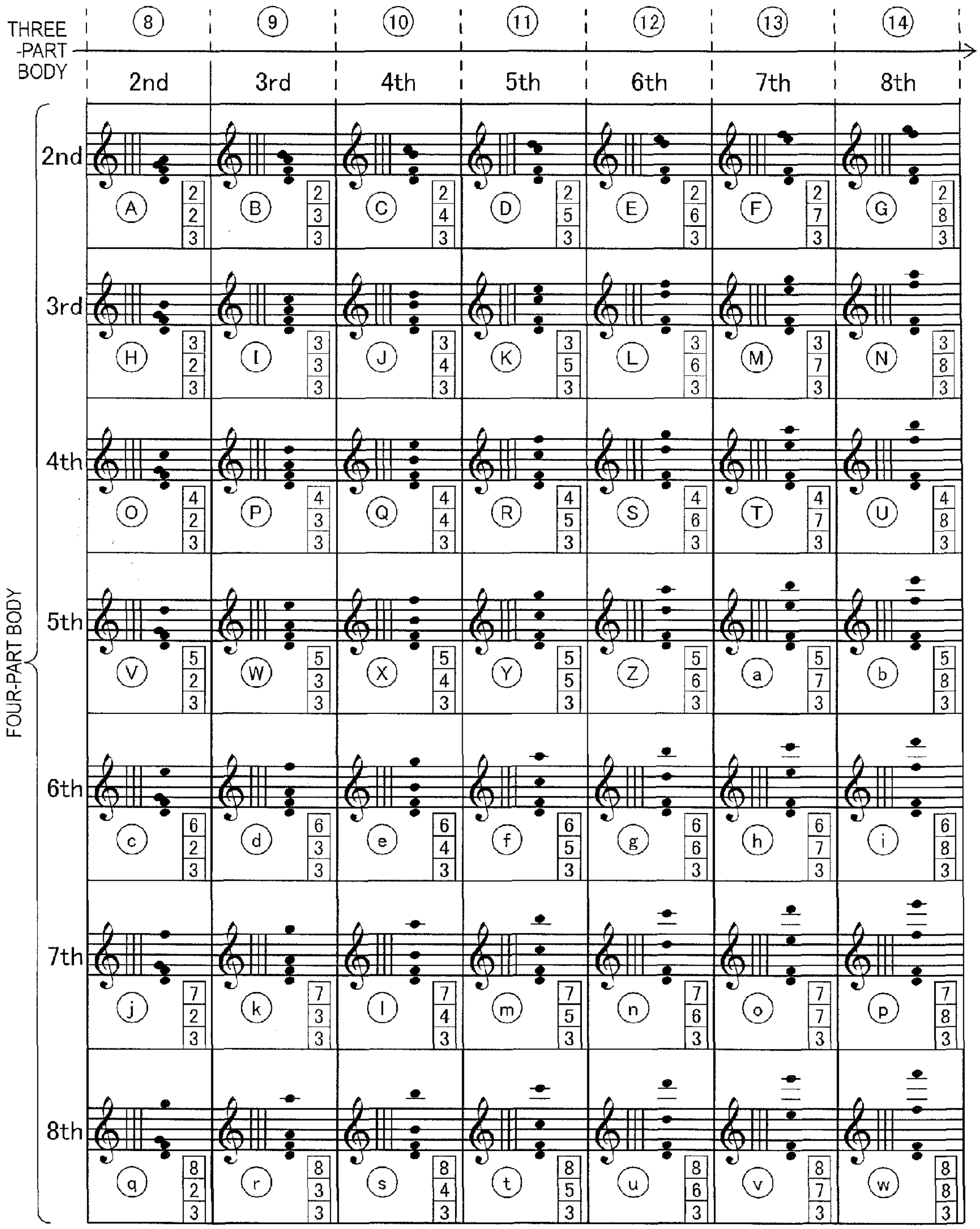
FIG. 77 is a diagram partially displaying, as a two-dimensional matrix, a part of four-part bodies formed by individually accumulating SOPRANO sounds sequentially on respective parts of the 77 types of the three-part bodies of FIG. 76 in order of the 2nd interval, the 3rd interval, the 4th interval, the 5th interval, the 6th interval, the 7th interval and the 8th interval (No. 1).
Figure 78:
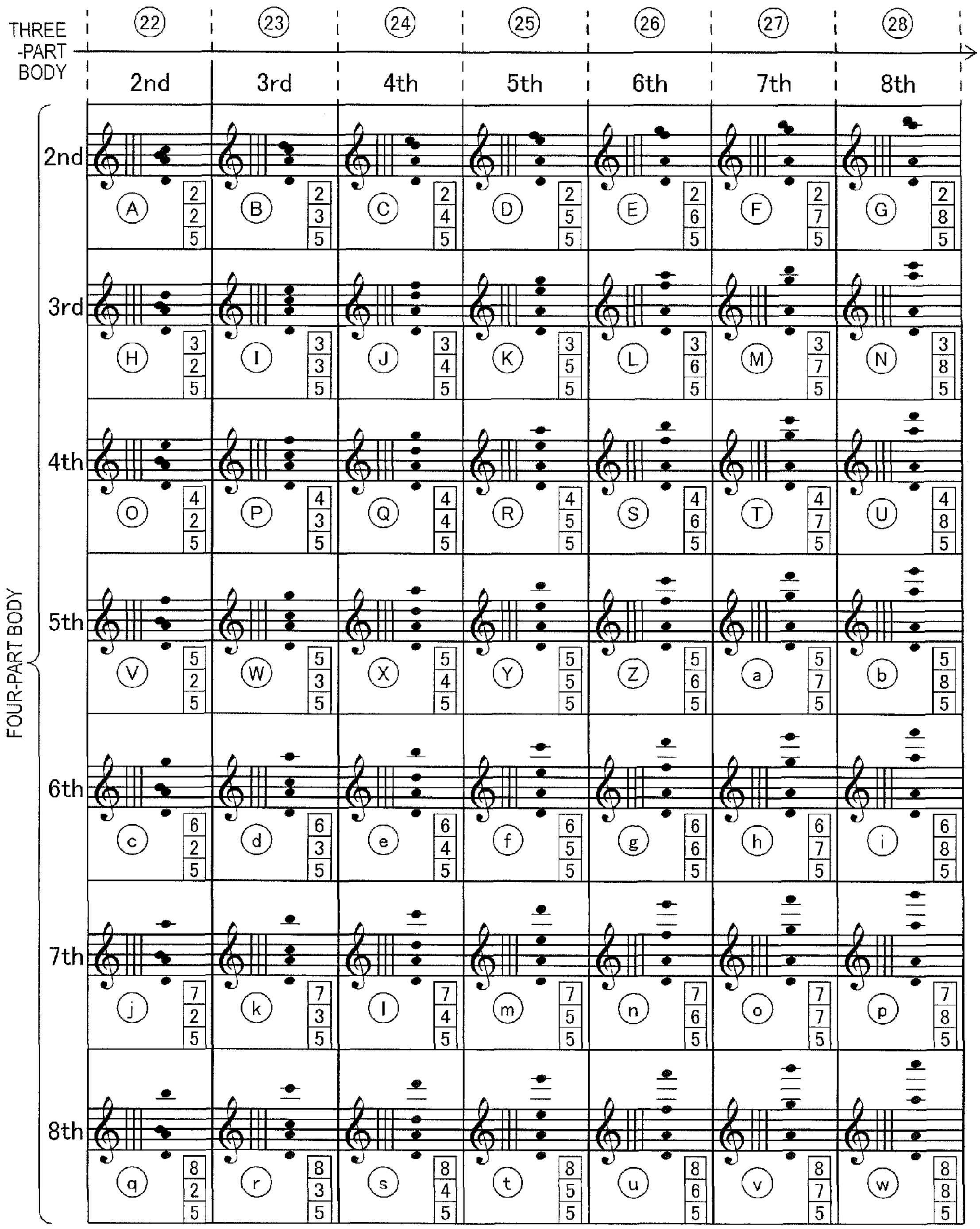
FIG. 78 is a diagram partially displaying, as a two-dimensional matrix similar to that of FIG. 77, another part of the four-part bodies formed by individually accumulating the SOPRANO sounds sequentially on the respective parts of the 77 types of the three-part bodies of FIG. 76 in order of the 2nd interval, the 3rd interval, the 4th interval, the 5th interval, the 6th interval, the 7th interval and the 8th interval (No. 2).

A row direction (lateral direction) of the two-dimensional matrix of FIG. 78 corresponds to the array of the fifth column in the column direction of FIG. 76, and a column direction (longitudinal direction) of the two-dimensional matrix of FIG. 78 corresponds to such accumulation from the 2nd to 8th intervals of the SOPRANO sounds. The two-dimensional matrix displays of FIG. 77 and FIG. 78 are those which partially illustrate the three-dimensional matrix, and in actual three-dimensional matrix display, a total of 539 (=11×7×7) types of the four-part bodies are displayed. If cases of accumulating the ALTO sound by the 1st interval and the SOPRANO sound by the 1st interval are included in accordance with the definition of FIG. 74, then in the three-dimensional matrix display, a total of 768 (=11×8×8) types of the four-part bodies are established.

In the partial display by the two-dimensional matrix of FIG. 77, the 77 (=11×7) types of the four-part bodies of A to Z and a to w, which are written in the blank circles, and these 77 types of the four-part bodies correspond to respective frames in a table that illustrates a part thereof by example in FIG. 79. Each of the frames represented by an upward left diagonal line in FIG. 79 indicates that no address is present, and indicates that the four-part body is not established. FIG. 79 is a number table that is based on Definition I of FIG. 81 for the case where the interval between BASS and TENOR is 3rd, the interval between TENOR and ALTO is 3rd, and the interval between ALTO and SOPRANO is 3rd, the case being located at an intersection of the second row and the second column in the table of FIG. 77. In FIGS. 57A and 57B, seven sounds of D1 to Gb2 are illustrated as Sound range III, and also in the table of FIG. 79, number tables which are based on Definition I are illustrated individually for the seven sounds of D1 to Gb2.

B, T, A, S, which are illustrated on an upper stage side of the table of FIG. 79, stand for BASS, TENOR, ALTO, SOPRANO, respectively. For example, with regard to the left-end sound D1, BASS 4, 35, 66 correspond as BASS of D1, and with regard to BASS 4, it is understood that address of TENOR, ALTO, SOPRANO are not present, and that the four-part body is not accordingly established. Meanwhile, with regard to BASS 35 of D1, it is understood that TENOR 28 and TENOR 22 are accumulated thereon, and that ALTO 21 and ALTO 15 are accumulated on TENOR 28. Moreover, it is understood that ALTO 15 and ALTO 9 are accumulated on TENOR 28. Moreover, it is understood that addresses of SOPRANO 20 and SOPRANO 14 are accumulated on ALTO 21 accumulated on TENOR 28, and that addresses of SOPRANO 14 and SOPRANO 8 are accumulated on ALTO 15 accumulated on TENOR 28. In a similar way, it is understood that addresses of SOPRANO 20 and SOPRANO 14 correspond to ALTO 21 accumulated on TENOR 22, and that addresses of SOPRANO 8 and SOPRANO 2 correspond to ALTO 9 accumulated on TENOR 22.

Moreover, with regard to BASS 66 of D1, it is understood that TENOR 59 and TENOR 53 are accumulated thereon, and that ALTO 52 and ALTO 46 are accumulated on TENOR 59. Furthermore, it is understood that ALTO 46 and ALTO 40 are accumulated on TENOR 53. Moreover, it is understood that addresses of SOPRANO 45 and SOPRANO 39 are accumulated on ALTO 52 accumulated on TENOR 59, and that addresses of SOPRANO 39 and SOPRANO 33 are accumulated on ALTO 46 accumulated on TENOR 59. In a similar way, it is understood that addresses of SOPRANO 39 and SOPRANO 33 correspond to ALTO 46 accumulated on TENOR 53, and that addresses of SOPRANO 33 and SOPRANO 27 correspond to ALTO 40 accumulated on TENOR 53.

Figure 80A:
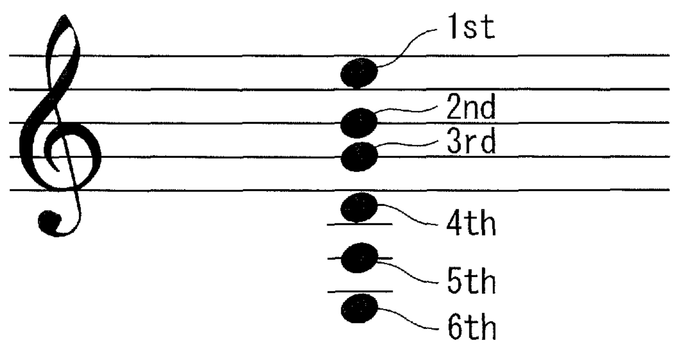
FIGS. 80A and 80B are diagrams explaining intervals between respective strings of the guitar, the intervals serving as a premise to explain the guitar teaching data creation method according to the third embodiment.
Figure 80B:
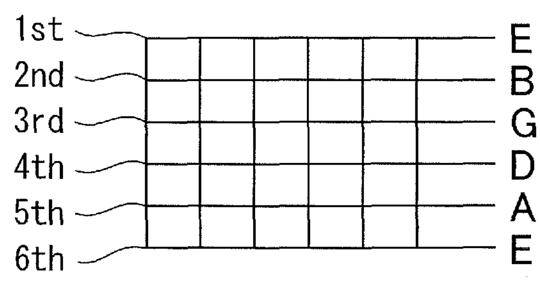

As illustrated in FIG. 80A, the intervals between the respective strings of the guitar are set so that the sounds of the respective strings which are the sixth string to the third string can have the perfect 4th interval, that the sounds of the respective strings which are the third string and the second string can have the major 3rd interval, and that the sounds of the respective strings which are the second string and the first string can have the perfect 4th interval. Transverse lines of FIG. 80B indicate the first to sixth strings from the above. Accordingly, it is understood that, in FIG. 80B, the intervals between the sixth string (E) and the fifth string (A), between the fifth string (A) and the fourth string (D), between the fourth string (D) and the third string (G), and between the second string (B) and the first string (E) are the perfect 4th intervals, and that only the interval between the third string (G) and the second string (B) is the major 3rd interval.

In each square (frame) of FIG. 81, six transverse lines indicate the first to sixth strings from the above, and vertical lines perpendicular to the transverse lines indicate frets. In an event of determining the selected positions of the respective intervals while taking, as the definition (Definition I), the selected address table illustrated in FIG. 81 and the like by the interval selection position determining means 242, the chord progresses by one square in the right direction in the case of sharp, and is retreated by one square in the left direction in the case of flat (Definition II). In the case of double sharp, the chord progresses by two squares in the right direction, and in the case of double flat, is retreated by one square in the left direction.

As described by using FIG. 74, in Definition Zero, the description is premised in that the interval between BASS and TENOR is up to 12th, that the interval between TENOR and ALTO is up to 8th, and that the interval between ALTO and SOPRANO is up to 8th. From the accumulated sound display in which the interval between BASS and TENOR is 6th, the interval between TENOR and ALTO is 6th, and the interval between ALTO and SOPRANO is 6th, with regard to the chord up to the accumulated sound display in which the interval between BASS and TENOR is 8th, the interval between TENOR and ALTO is 8th, and the interval between ALTO and SOPRANO is 8th, BASS selects an address thereof on the sixth string, and SOPRANO selects a position thereof on the sixth string (Definition III).

Figure 82A:
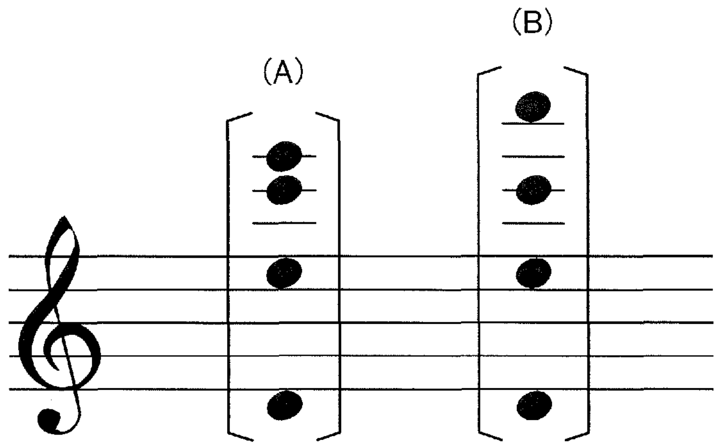
FIGS. 82A to 82C are diagrams explaining "Definition II" for use in the guitar teaching data creation method according to the third embodiment.
Figure 82B:
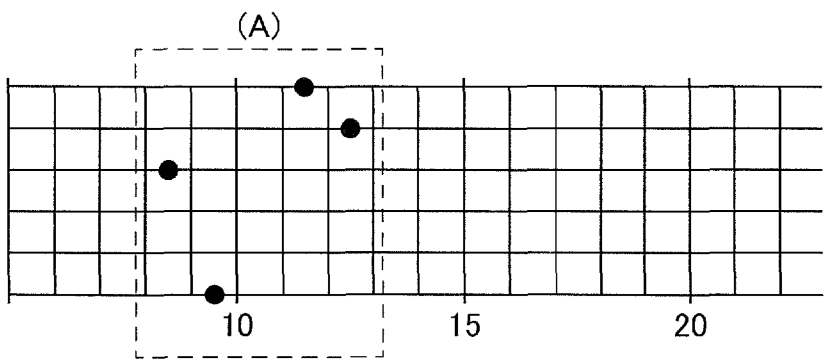
Figure 82C:
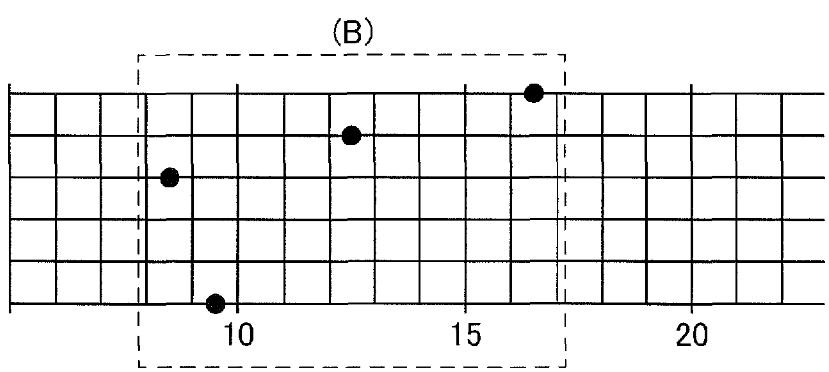

Moreover, in this case, as a chord annexed with Symbol (B) on a right side of FIG. 82A, from the accumulated sound display in which the interval between BASS and TENOR is 9th, the interval between TENOR and ALTO is 6th, and the interval between ALTO and SOPRANO is 6th, with regard to the chord up to the accumulated sound display in which the interval between BASS and TENOR is 12th, the interval between TENOR and ALTO is 8th, and the interval between ALTO and SOPRANO is 8th, BASS selects the address thereof on the sixth string, ALTO selects an address thereof on the second string, and SOPRANO selects the address thereof on the first string (Definition III). Note that, on a left side of FIG. 82A, a chord annexed with Symbol (A) corresponds to accumulated sound display in which the interval between BASS and TENOR is 6th, the interval between TENOR and ALTO is 6th, and the interval between ALTO and SOPRANO is 6th; however, in a case where the interval between ALTO and SOPRANO is 3rd, SOPRANO is necessarily located on the sixth string, and accordingly, this case is not covered by Definition III.

Figure 84A:
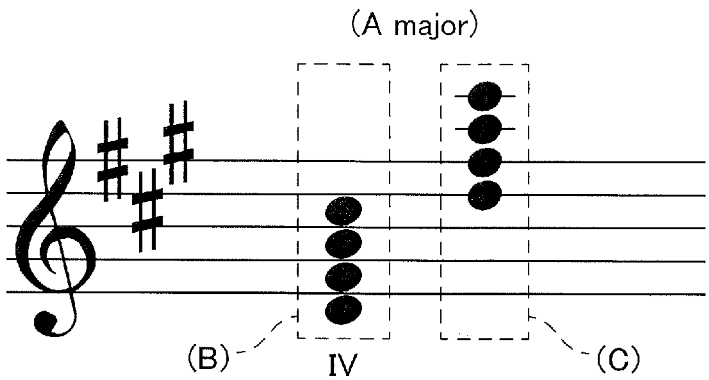
FIGS. 84A to 84C are diagrams illustrating example forms obtained by the teaching data creation method according to the third embodiment (No. 1).
Figure 84B:
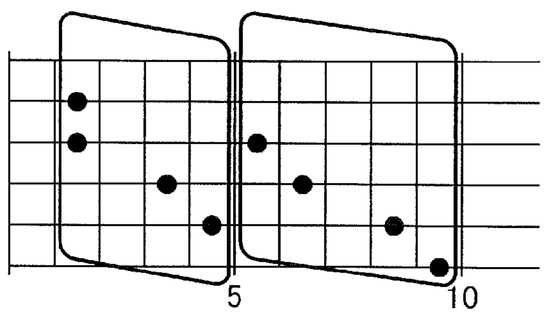
Figure 84C:
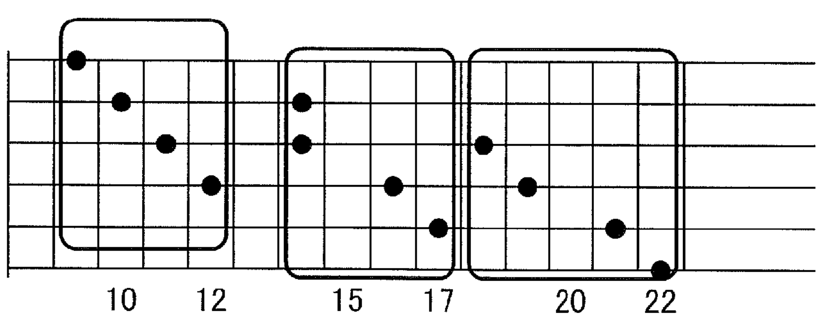
Figure 85A:
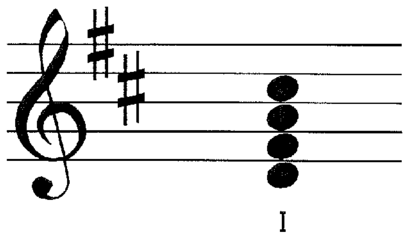
FIGS. 85A and 85B are diagrams illustrating example forms obtained by the teaching data creation method according to the third embodiment (No. 2).
Figure 85B:
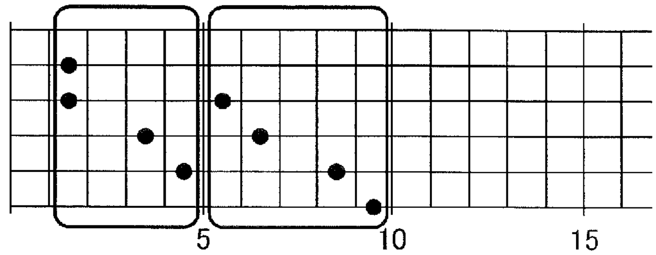
Figure 86A:
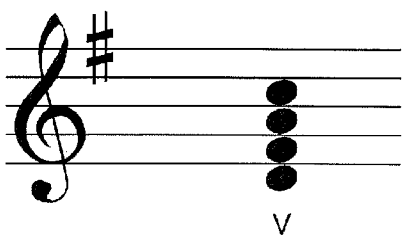
FIGS. 86A and 86B are diagrams illustrating example forms obtained by the teaching data creation method according to the third embodiment (No. 3).
Figure 86B:
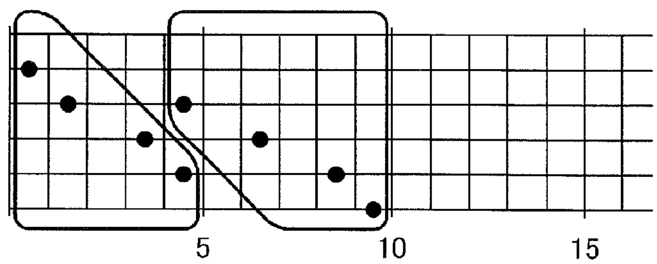

FIG. 84B exemplarily illustrates two types of forms obtained by the teaching data creation method according to the third embodiment. That is to say, the forms that correspond to a chord of A major of the chord number IV are illustrated on a portion (B) on the left side of FIG. 84A, and it is indicated that two types of forms in a case of taking the fifth string as BASS and a case of taking the sixth string as BASS are established. FIG. 84C illustrates three types of forms in a case of individually taking, as BASS, the fourth string, the fifth string and the sixth string, the forms corresponding to a chord of A major of the chord number IV illustrated on a portion (C) on the right side of FIG. 84A. Moreover, FIG. 85B illustrates two types of formed in a case of taking, as BASS, the fifth string and the sixth string, the forms corresponding to a chord of the chord number I illustrated in FIG. 85A, and FIG. 86B illustrates two types of formed in a case of taking, as BASS, the fifth string and the sixth string, the forms corresponding to a chord of the chord number V illustrated in FIG. 86A.

Figure 87A:
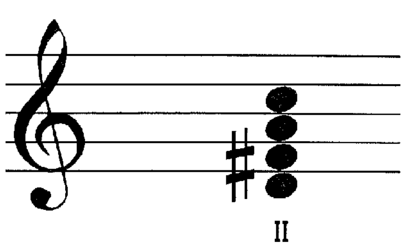
FIGS. 87A and 87B are diagrams illustrating example forms obtained by the teaching data creation method according to the third embodiment (No. 4).
Figure 87B:
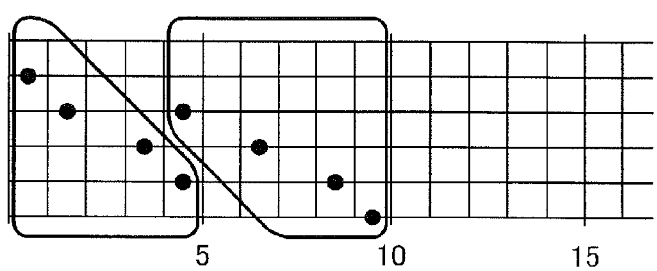
Figure 88A:
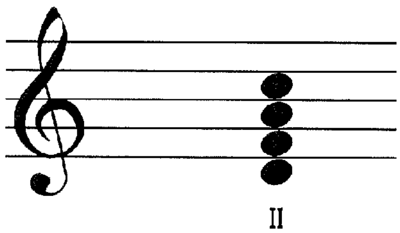
FIGS. 88A and 88B are diagrams illustrating example forms obtained by the teaching data creation method according to the third embodiment (No. 5).
Figure 88B:
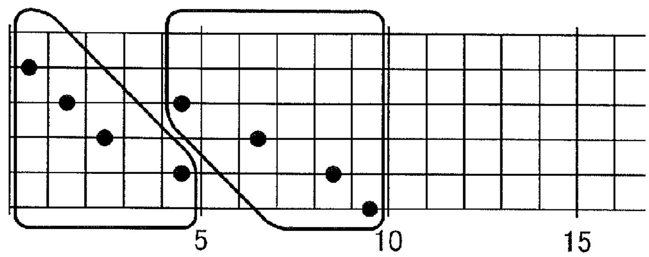
Figure 89A:
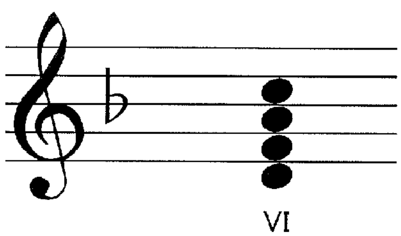
FIGS. 89A and 89B are diagrams illustrating example forms obtained by the teaching data creation method according to the third embodiment (No. 6).
Figure 89B:
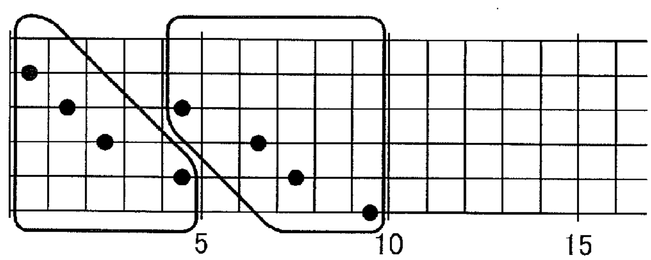
Figure 90A:
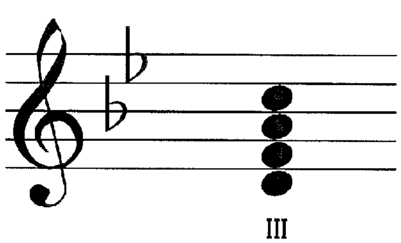
FIGS. 90A and 90B are diagrams illustrating example forms obtained by the teaching data creation method according to the third embodiment (No. 7).
Figure 90B:
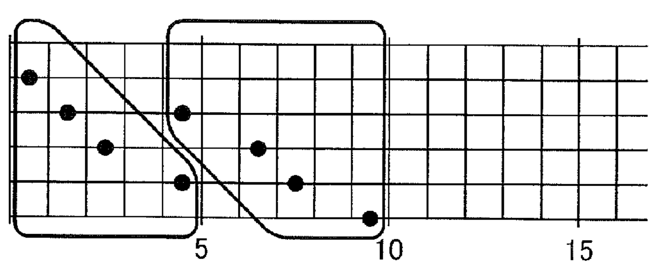
Figure 91A:
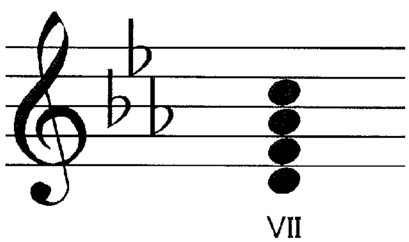
FIGS. 91A and 91B are diagrams illustrating example forms obtained by the teaching data creation method according to the third embodiment (No. 8).
Figure 91B:
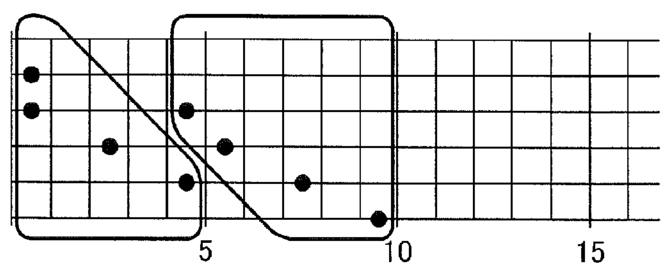

In a similar way, FIG. 87B is a diagram illustrating an example of a result obtained by the teaching data creation method according to the third embodiment, and illustrates two types of forms that correspond to the Doppel dominant chord of the chord number II illustrated in FIG. 87A, that is, two types of forms in the case of taking the fifth string as BASS and taking the sixth string as BASS. Moreover, FIG. 88B illustrates two types of formed in a case of taking, as BASS, the fifth string and the sixth string, the forms corresponding to a chord of the chord number II illustrated in FIG. 88A. Furthermore, FIG. 89B illustrates two types of formed in a case of taking, as BASS, the fifth string and the sixth string, the forms corresponding to a chord of the chord number VI illustrated in FIG. 89A, FIG. 90B illustrates two types of formed in a case of taking, as BASS, the fifth string and the sixth string, the forms corresponding to a chord of the chord number III illustrated in FIG. 90A, and FIG. 91B illustrates two types of formed in a case of taking, as BASS, the fifth string and the sixth string, the forms corresponding to a chord of the chord number VII illustrated in FIG. 91A. The forms (graphics) illustrated in FIG. 84B, FIG. 84C, FIG. 85B, FIG. 86B, FIG. 87B, FIG. 88B, FIG. 89B, FIG. 90B, FIG. 91B and the like, are arranged for each BASS of each string on the screen of the monitor similar to that illustrated in FIG. 1 and the fingerboard, and are sequentially displayed.

As described above, according to the teaching data creation device 22 according to the third embodiment, the changes of the forms of the respective chords and the positions of the sounds thereof for each chord in FIG. 84B, FIG. 84C, FIG. 85B, FIG. 86B, FIG. 87B, FIG. 88B, FIG. 89B, FIG. 80B, FIG. 91B or the like, can be clarified and displayed. As a result, the teaching data creation device 22 of the third embodiment can assist the guitarist to arrange and grasp the difficulty in understanding the harmonies and the mechanisms.

(Fourth Embodiment)

A guitar teaching system according to a fourth embodiment of the present invention is substantially similar to the configuration of the guitar teaching system according to a first embodiment. As shown in FIG. 1, a guitar teaching system according to the fourth embodiment of the present invention includes: a guitar for teaching (teaching-oriented guitar: training guitar) 11; an interface 21_a_ connected to the teaching-oriented guitar 11 via a wire 32; a guitar teaching data creation device 22 connected to the interface 21_a_ via a wire 35; a monitor (display device) 23_a_ connected to the guitar teaching data creation device 22 via a wire 37; and a piano keyboard-type keyboard 15 such as a MIDI keyboard connected to the interface 21_a_ via a wire 34. The teaching-oriented guitar 11 and the piano keyboard-type keyboard 15 are connected to each other via a wire 33. Moreover, a headphone 16_a_ is connected to the teaching-oriented guitar 11 via a wire 31, and a headphone 16*b* is connected to the piano keyboard-type keyboard 15 via a wire 36.

The guitar teaching data creation device 22 is a processor including a central processing unit (CPU) 220*a* having: chord inputting means 221 for executing processing for receiving chords; distribution map creating means 222 for creating a distribution map of respective sounds of the chords, which are received by the chord inputting means 221, by collating the respective sounds with sound addresses on a fingerboard of the teaching-oriented guitar 11; sequence creating means 223 for creating sequences (combinations) from the distribution map created by the distribution map creating means 222; numerical diagram creating means 224 for creating numerical diagrams (address diagrams) of respective combinations from the sequences created by the sequence creating means 223; graphic converting means 225 for converting the numerical diagrams, which are created by the numerical diagram creating means 224, into graphics; and display means 226 for giving a definition to prioritize all of the numerical diagrams converted into the graphics by the graphic converting means 225, determining highest-priority diagrams, and transmitting a signal to display the highest-priority diagrams while arranging the highest-priority diagrams.

In a similar way to the guitar teaching system according to the first to third embodiments, the guitar teaching data creation device 22 according to the fourth embodiment can be realized by a computer system such as a PC. In a case where the guitar teaching data creation device 22 is composed of a PC, the monitor 23*a* illustrated in FIG. 1 may be built in the guitar teaching data creation device 22, or may be composed integrally with the guitar teaching data creation device 22. Moreover, though not illustrated, in a similar way to the guitar teaching system according to the first to third embodiments, a program storage device and a data storage device are connected to or built in the guitar teaching data creation device 22 according to the fourth embodiment of the present invention. Hence, a guitar teaching data creation program for drive-controlling the chord inputting means 221, the distribution map creating means 222, the sequence creating means 223, the numerical diagram creating means 224, the graphic converting means 225, and the display means 226, which are illustrated in FIG. 1, and causing these means to create guitar teaching data for use in the guitar teaching system according to the fourth embodiment just needs to be stored in a program storage device of a computer system that composes the guitar teaching data creation device 22.

Figure 95:
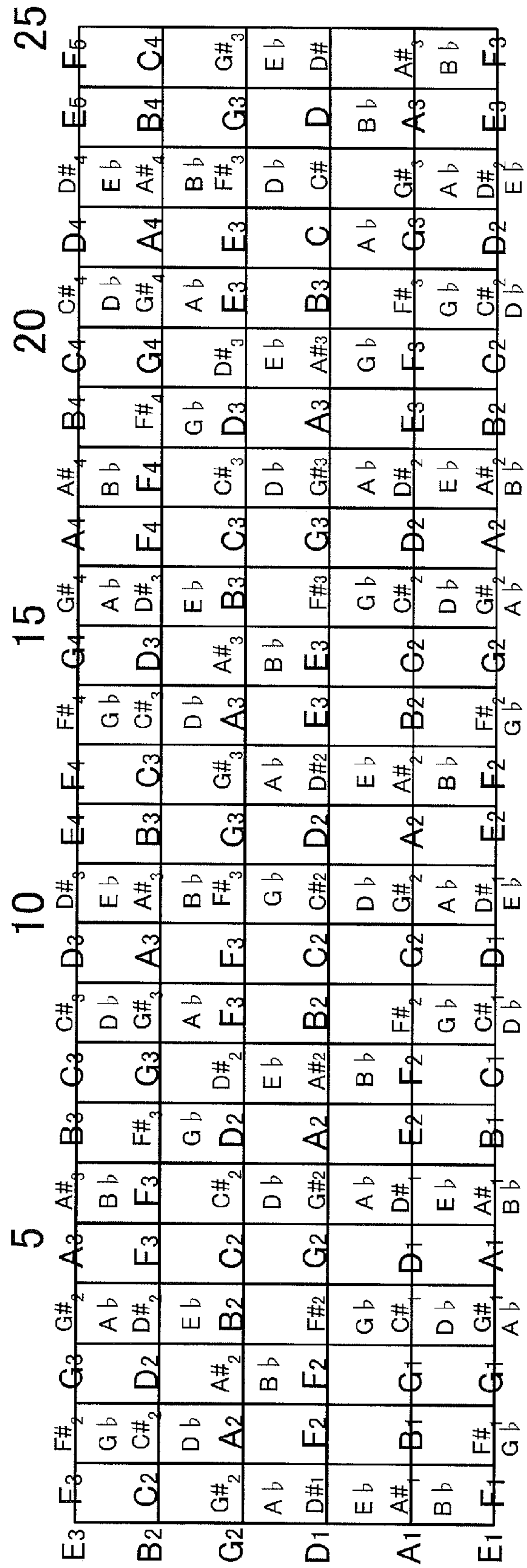
FIG. 95 is a diagram illustrating, by English letter display, data which indicate positions of sounds on the fingerboard.
Figure 96A:
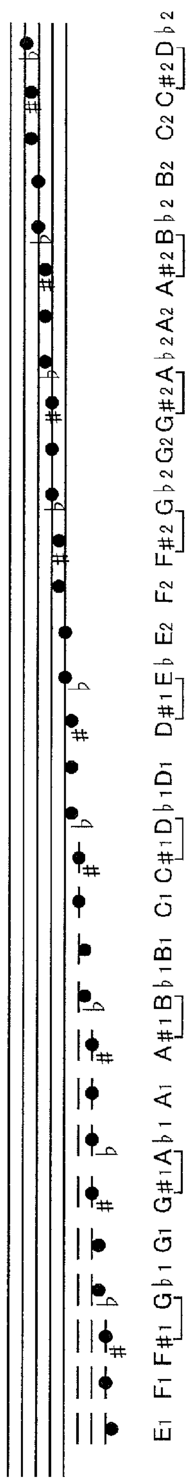
FIGS. 96A to 96C are diagrams illustrating data which indicate positions of sounds on a staff notation, which correspond to those in FIG. 95.
Figure 96B:
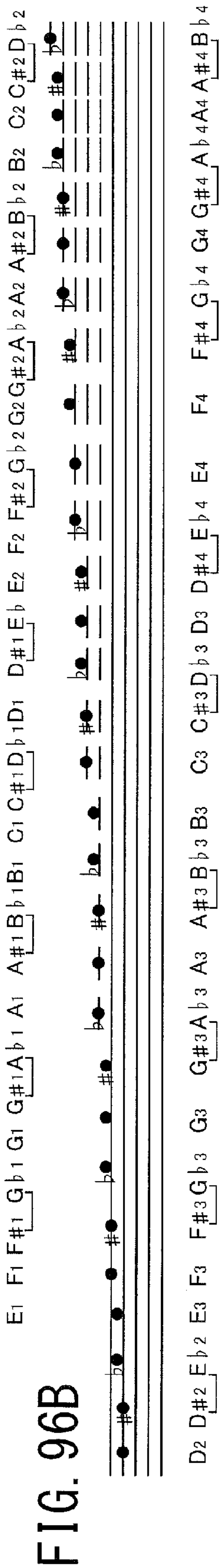
Figure 96C:
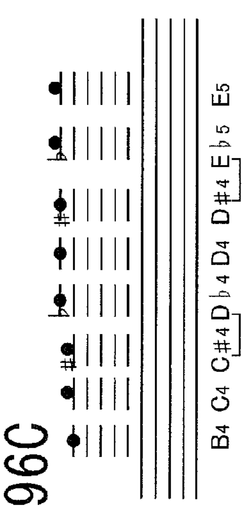
Figure 97:
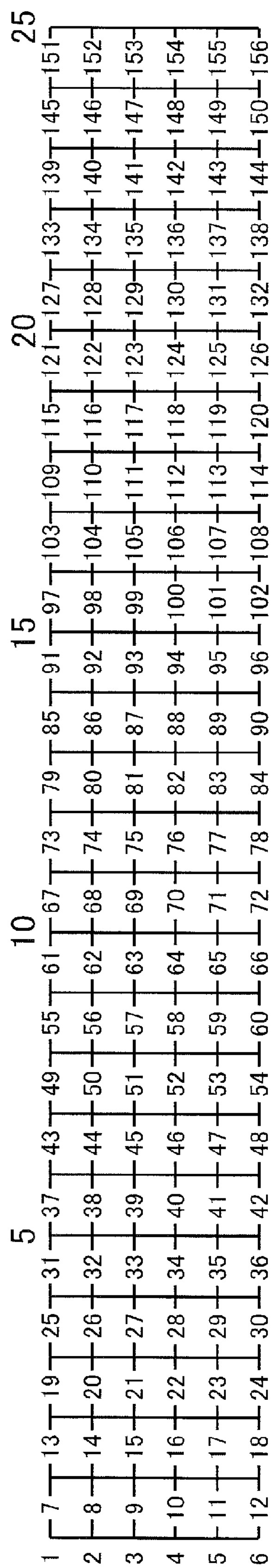
FIG. 97 is a diagram illustrating data in which the positions of the sounds on the fingerboard, which are illustrated in FIG. 95, are converted into integer values of 1 to 156.
Figure 99:
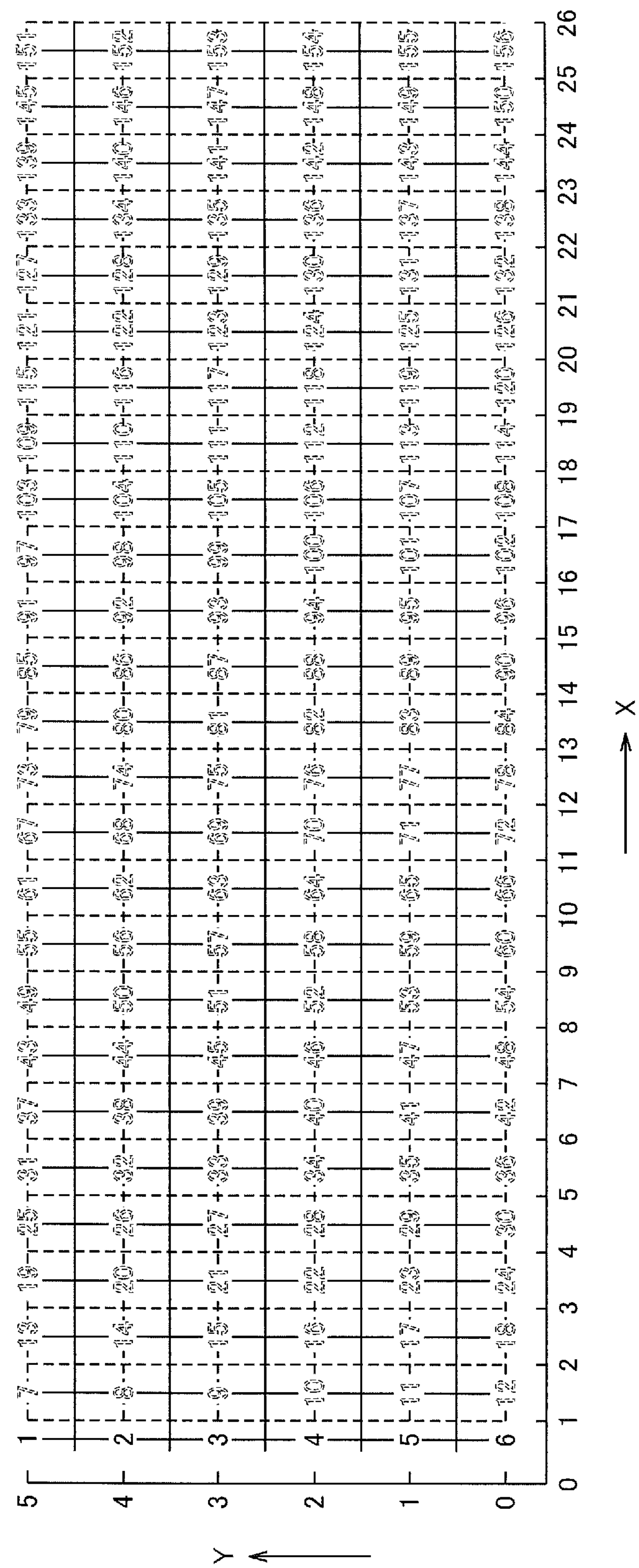
FIG. 99 is a diagram illustrating data in which a numerical diagram indicating the positions of the sounds on the fingerboard is converted into an X-Y coordinate.
Figure 101A:
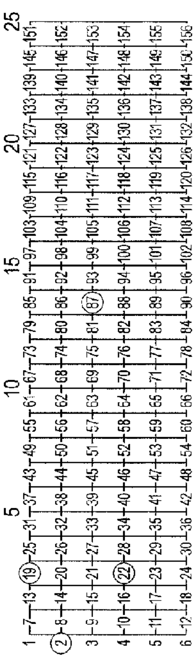
FIGS. 101A to 101J are diagrams illustrating first to tenth numerical diagrams which numerical diagram creating means create so as to correspond to sequences of first to tenth sequences.
Figure 101B:
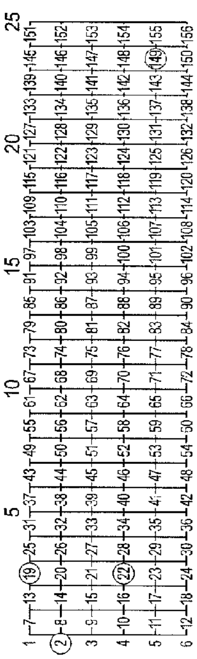
Figure 101C:
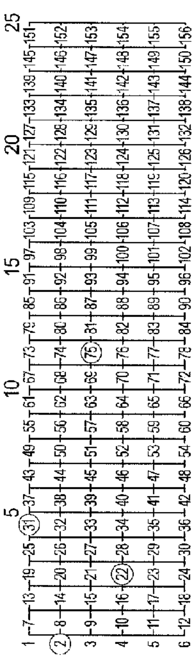
Figure 101D:
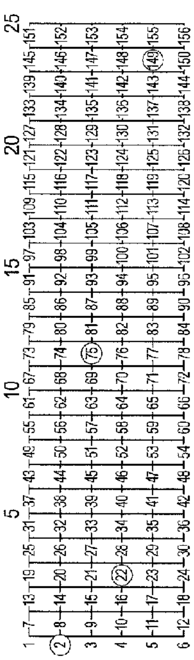
Figure 101E:
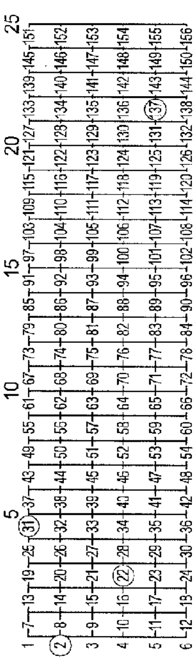
Figure 101F:
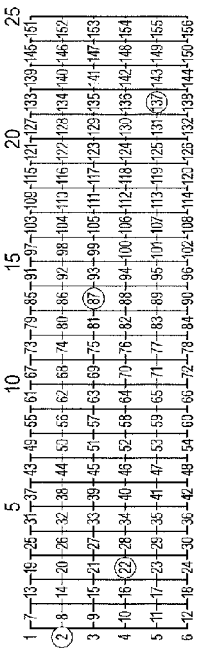
Figure 101G:
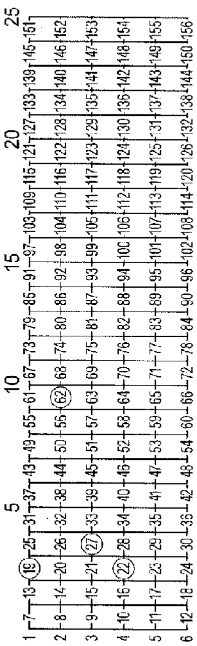
Figure 101H:
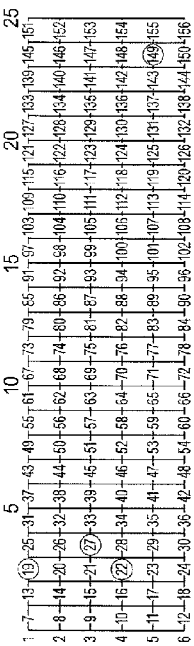
Figure 101I:
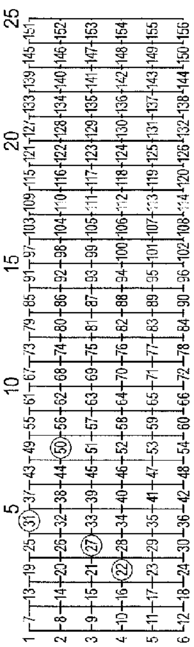
Figure 101J:
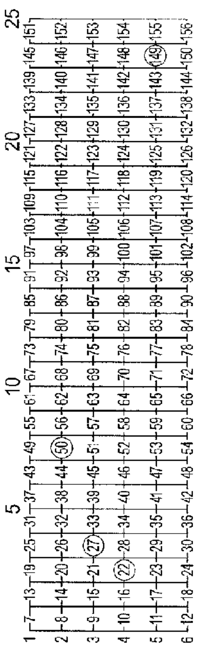
Figure 102A:
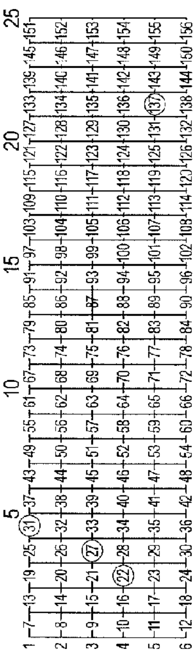
FIGS. 102A to 102J are diagrams illustrating 11th to 20th numerical diagrams which the numerical diagram creating means create so as to correspond to sequences of 11th to 20th sequences.
Figure 102B:
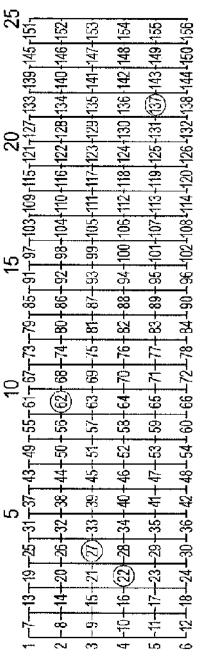
Figure 102C:
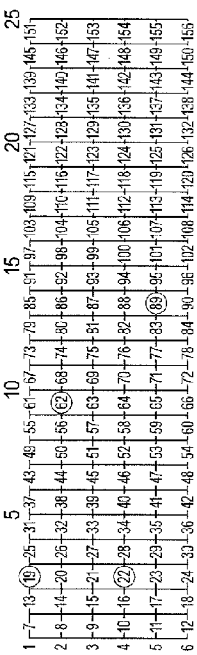
Figure 102D:
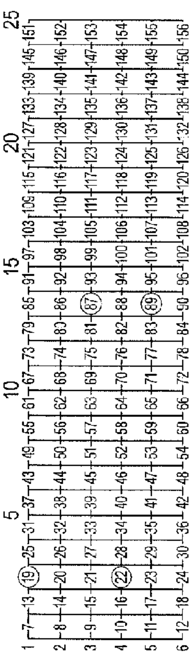
Figure 102E:
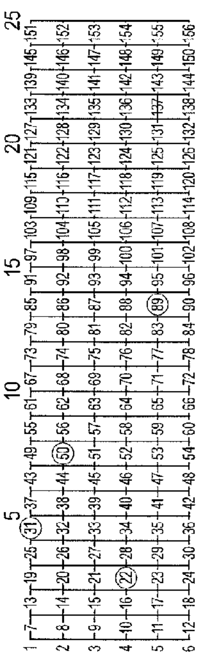
Figure 102F:
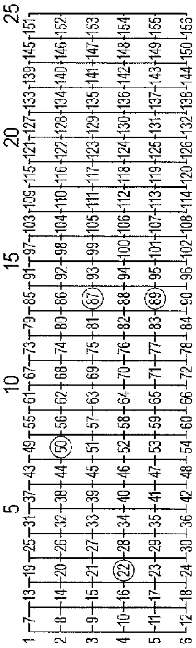
Figure 102G:
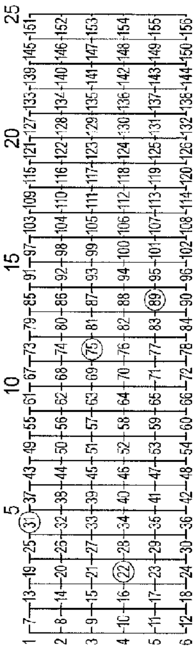
Figure 102H:
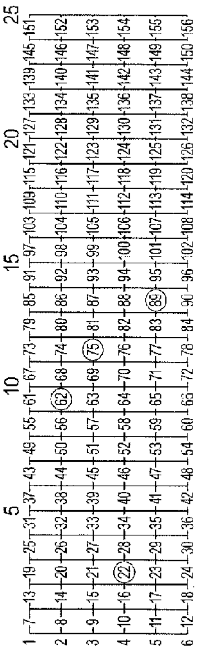
Figure 102I:
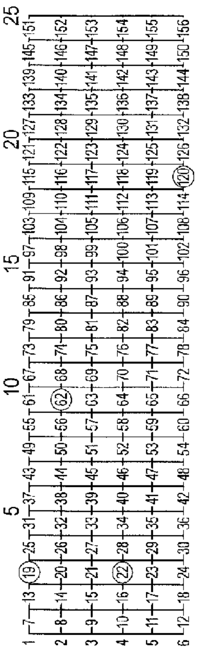
Figure 102J:
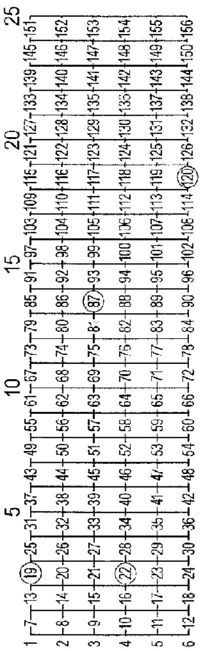
Figure 103A:
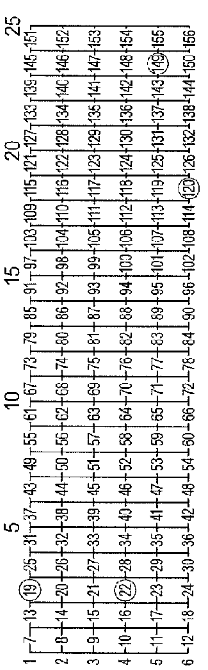
FIGS. 103A to 103J are diagrams illustrating 21st to 30th numerical diagrams which the numerical diagram creating means create so as to correspond to sequences of 21st to 30th sequences.
Figure 103B:
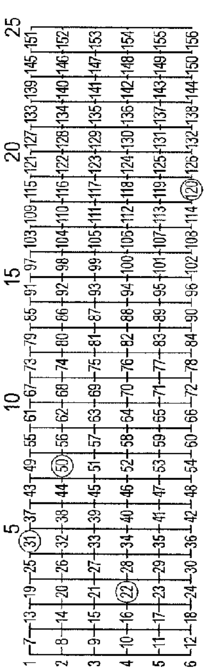
Figure 103C:
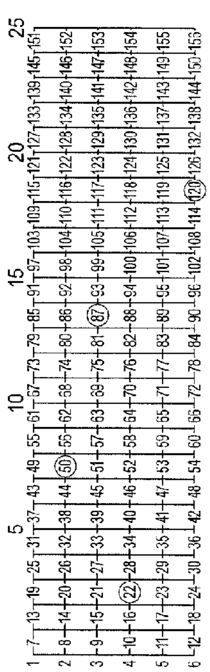
Figure 103D:
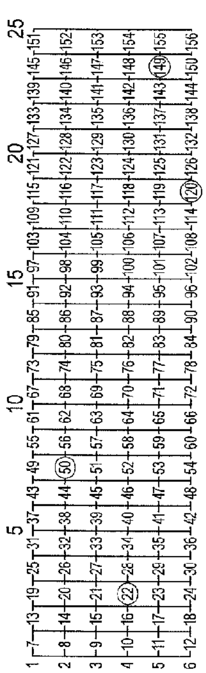
Figure 103E:
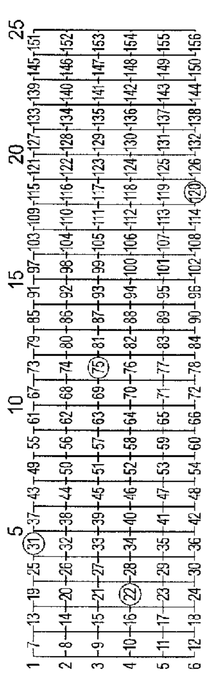
Figure 103F:
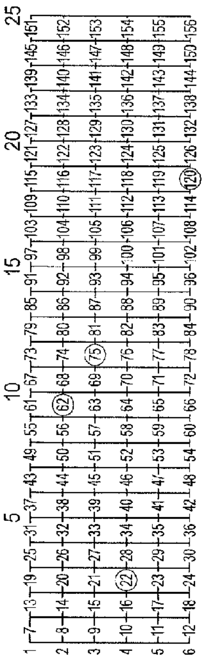
Figure 103G:
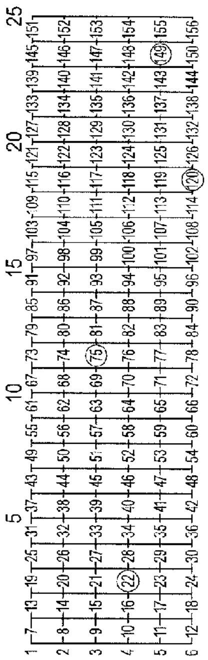
Figure 103H:
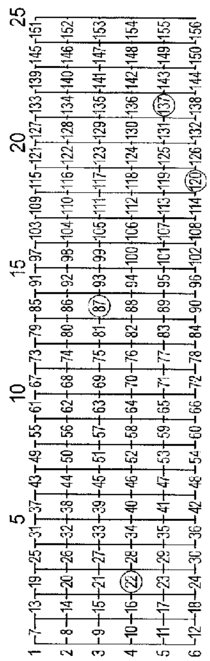
Figure 103I:
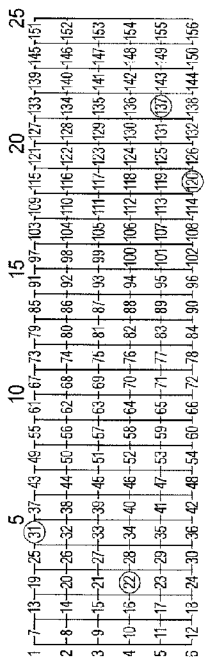
Figure 103J:
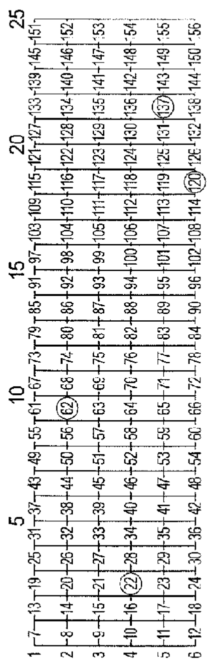
Figure 104A:
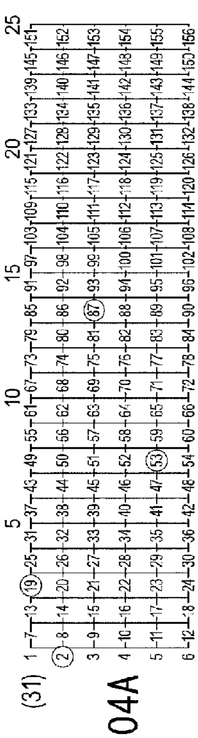
Figure 104B:
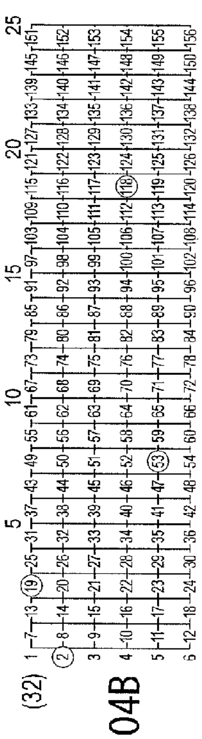
Figure 104C:
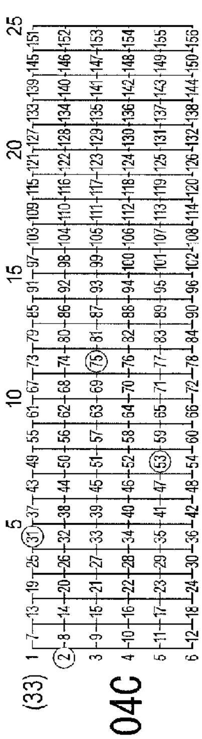
Figure 104D:
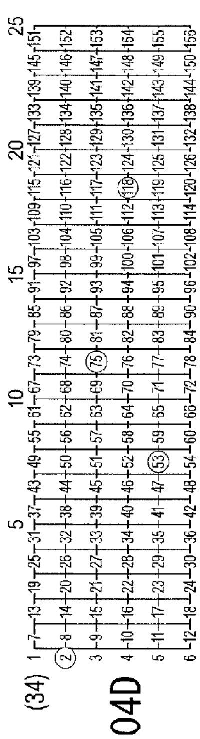
Figure 104E:
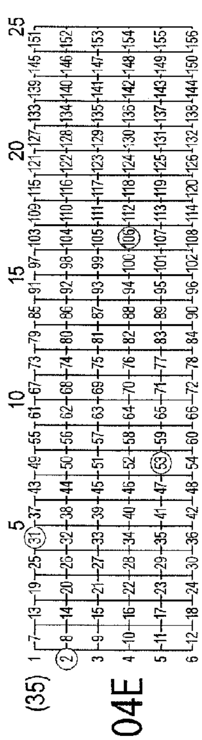
Figure 104F:
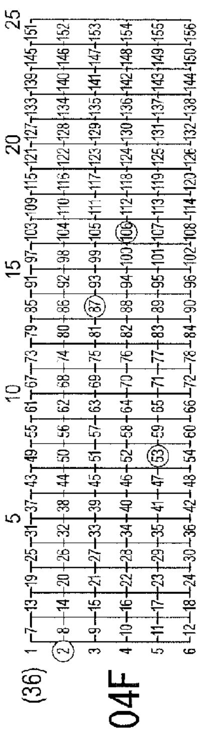
Figure 104G:
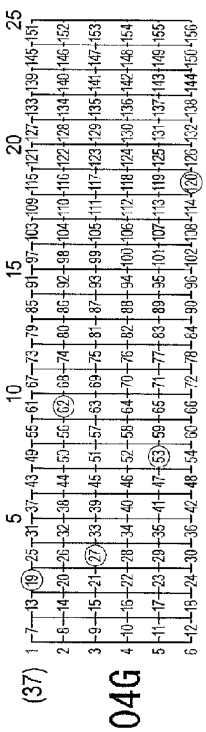
Figure 104H:
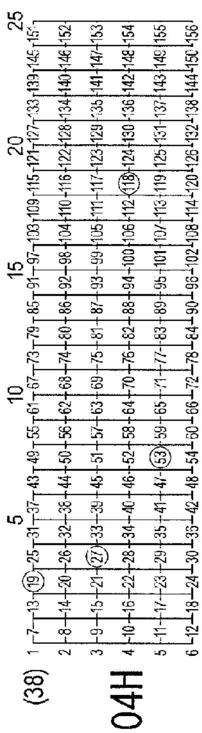
Figure 104I:
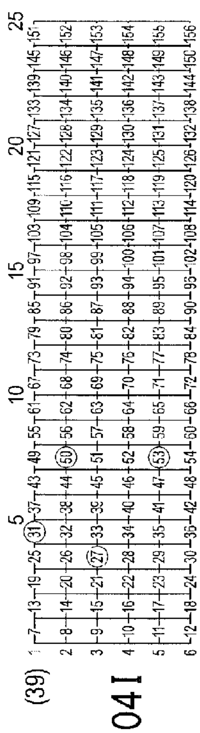
Figure 104J:
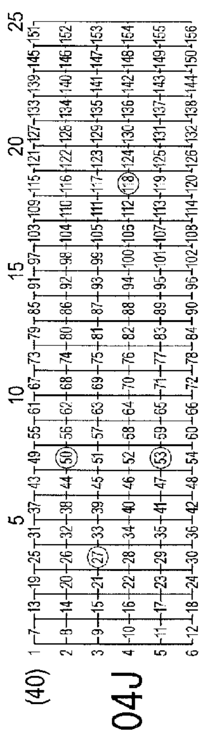
Figure 105A:
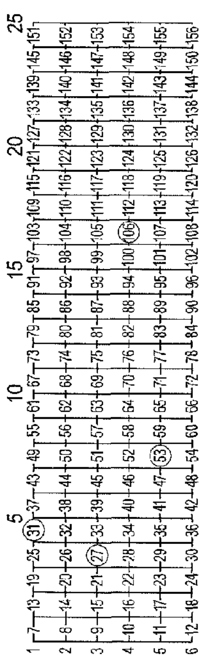
Figure 105B:
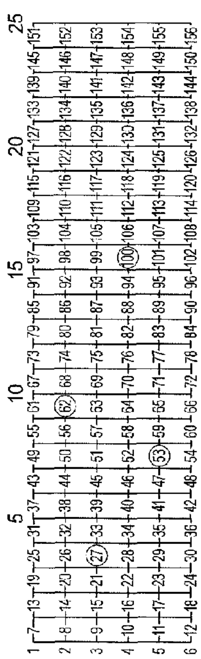
Figure 105C:
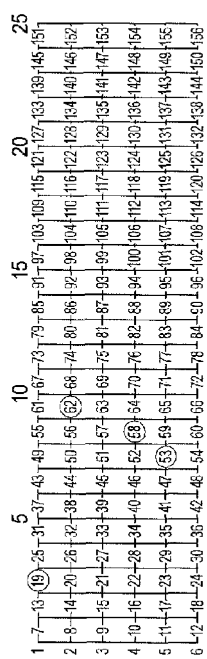
Figure 105D:
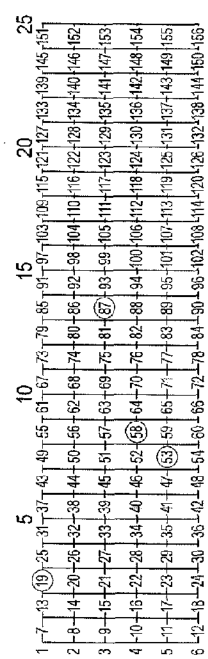
Figure 105E:
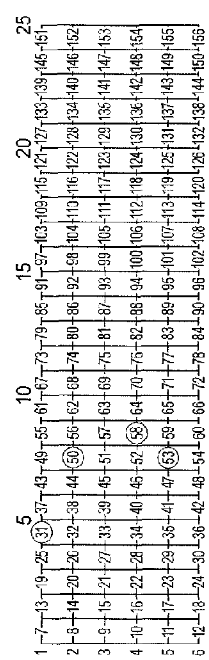
Figure 105F:
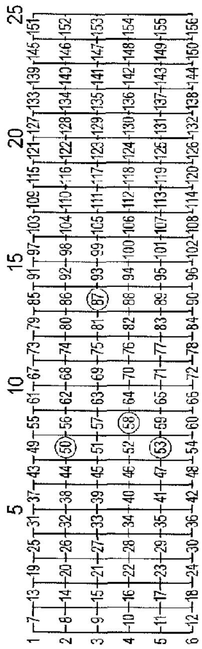
Figure 105G:
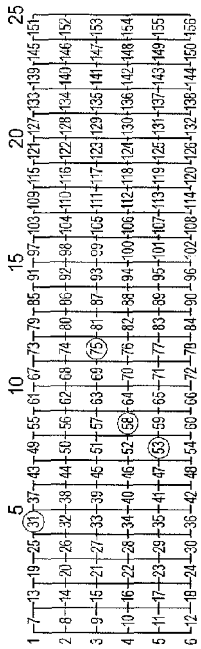
Figure 105H:
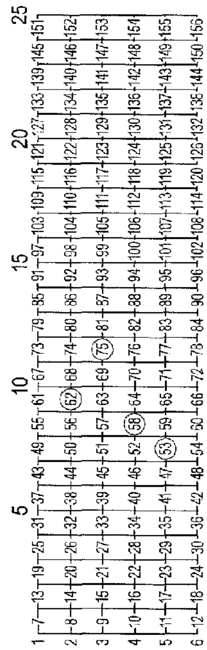
Figure 105I:
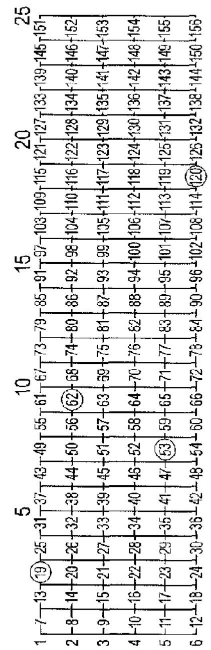
Figure 105J:
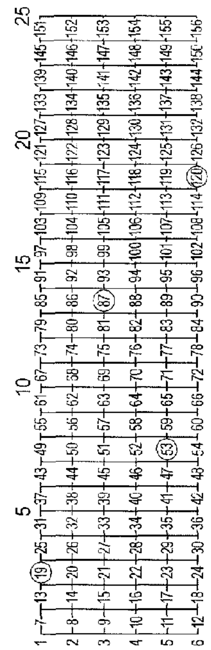
Figure 106A:
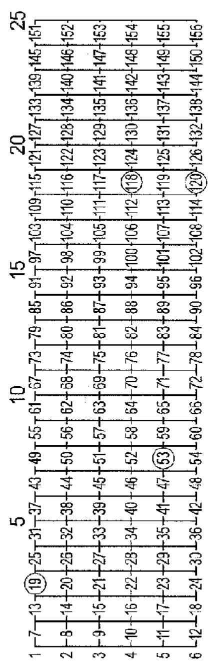
Figure 106B:
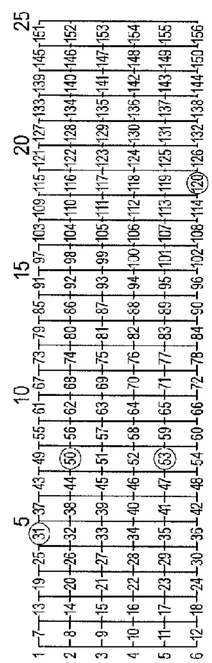
Figure 106C:
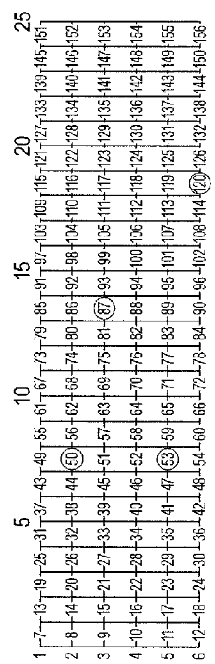
Figure 106D:
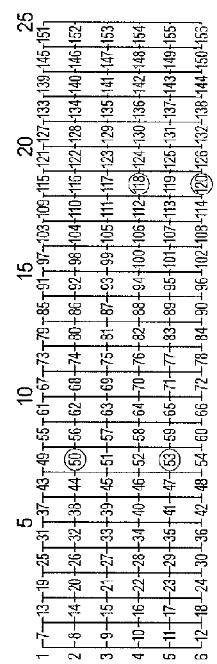
Figure 106E:
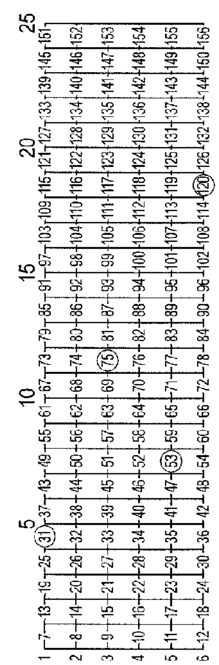
Figure 106F:
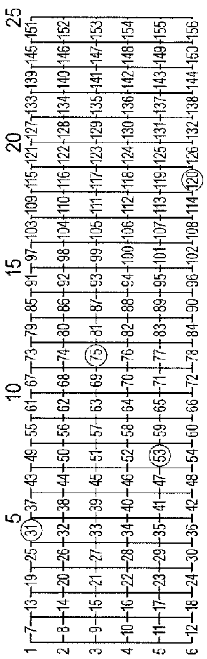
Figure 106G:
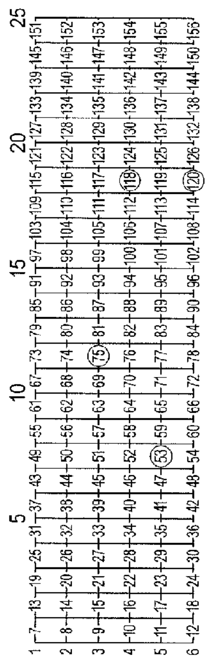
Figure 106H:
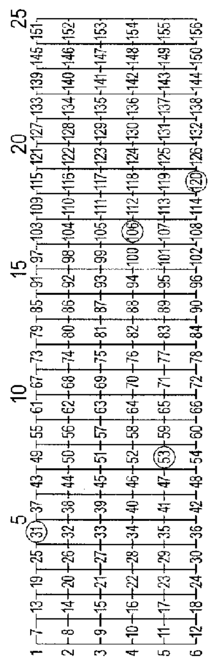
Figure 106I:
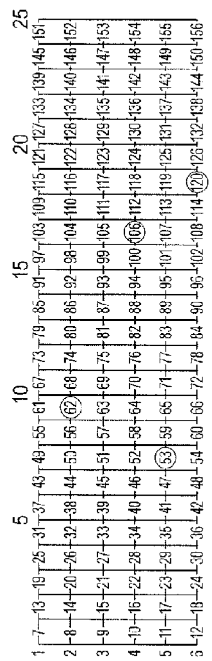
Figure 106J:
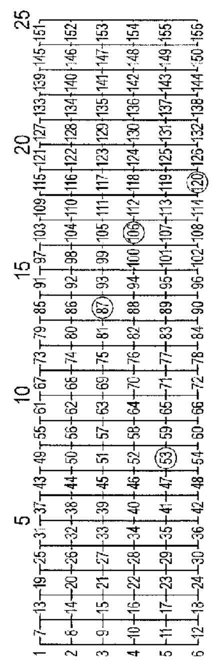
Figure 107A:
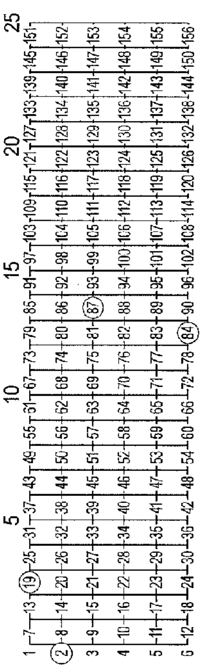
Figure 107B:
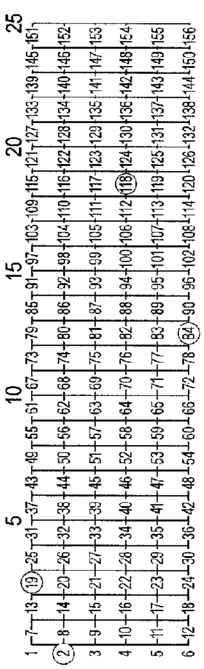
Figure 107C:
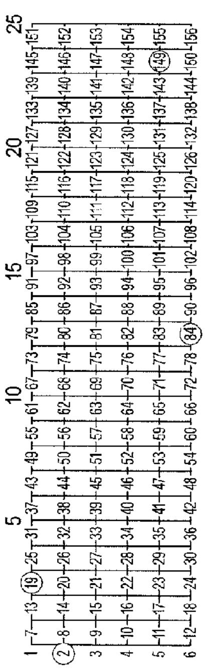
Figure 107D:
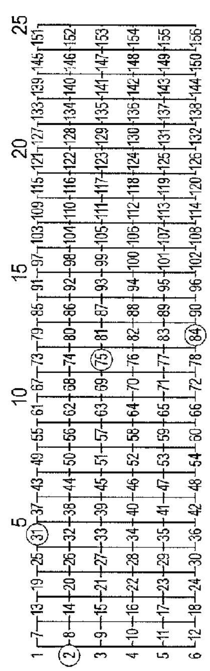
Figure 107E:
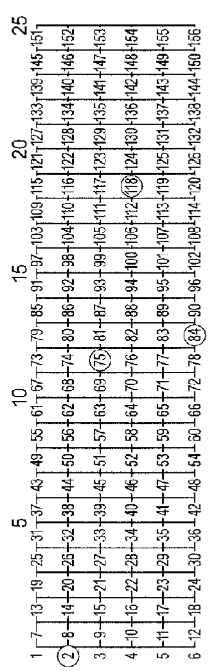
Figure 107F:
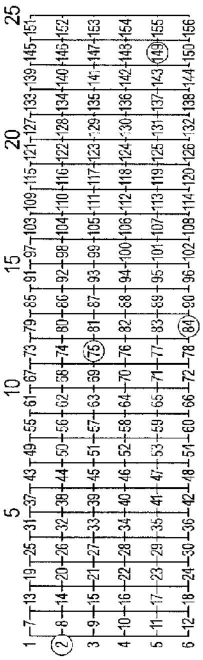
Figure 107G:
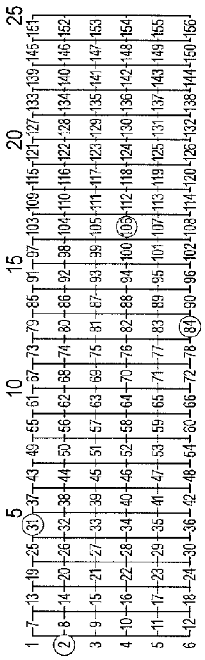
Figure 107H:
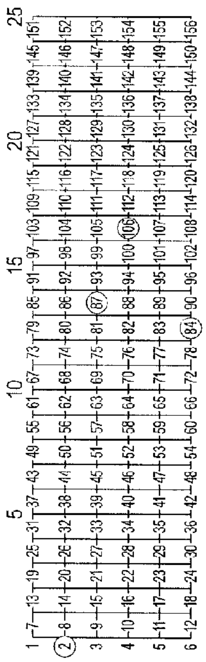
Figure 107I:
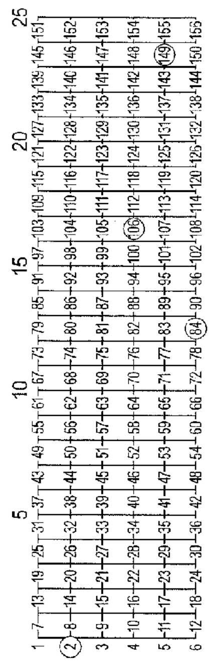
Figure 107J:
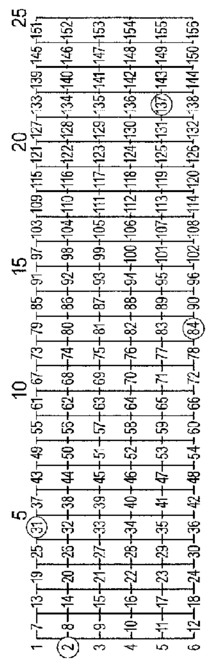
Figure 108A:
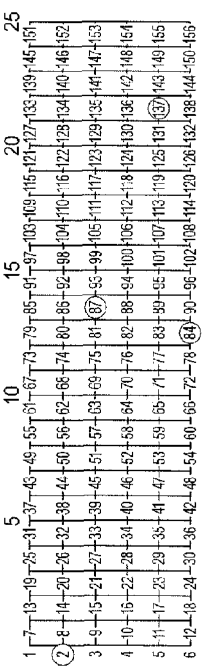
Figure 108B:
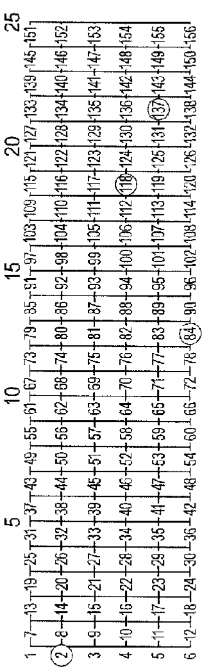
Figure 108C:
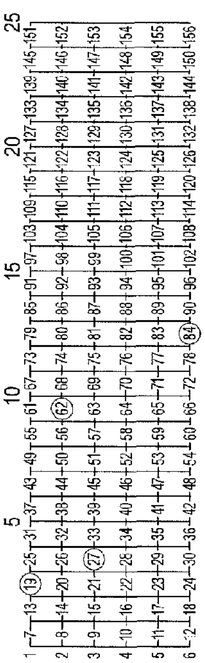
Figure 108D:
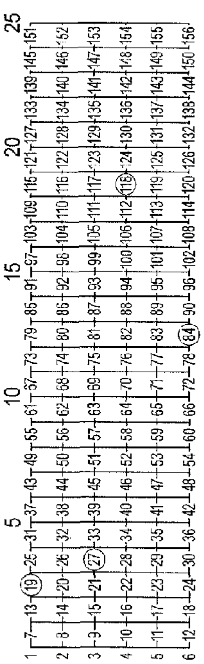
Figure 108E:
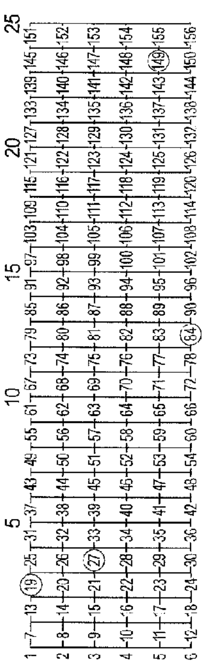
Figure 108F:
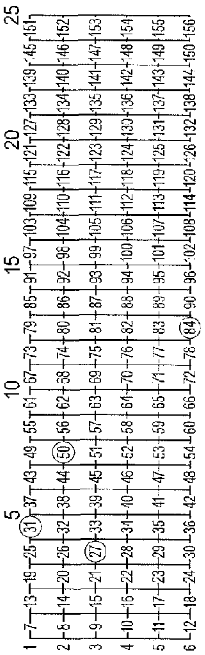
Figure 108G:
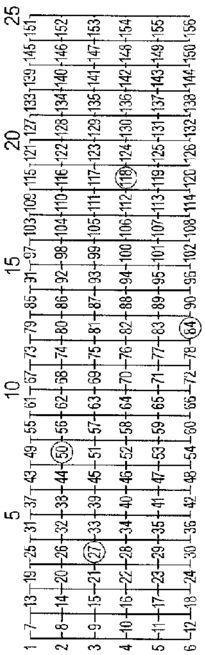
Figure 108H:
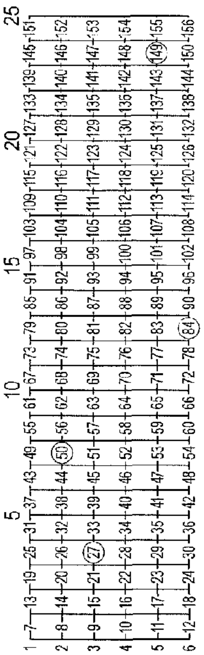
Figure 108I:
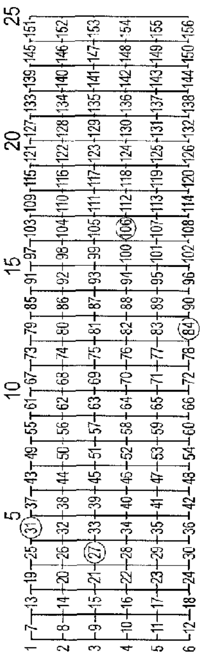
Figure 108J:
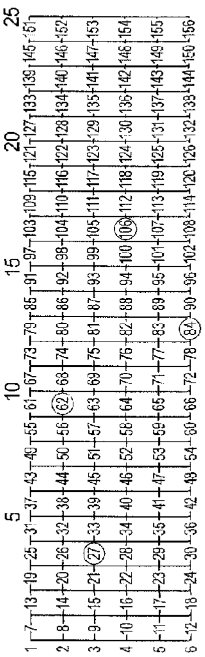
Figure 109A:
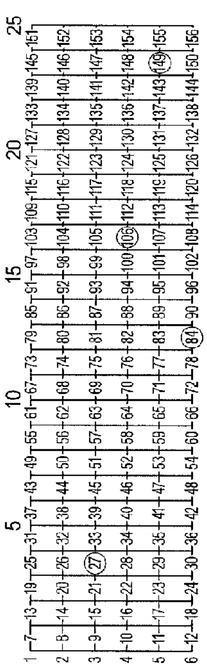
Figure 109B:
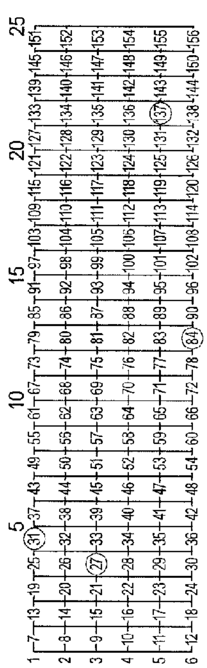
Figure 109C:
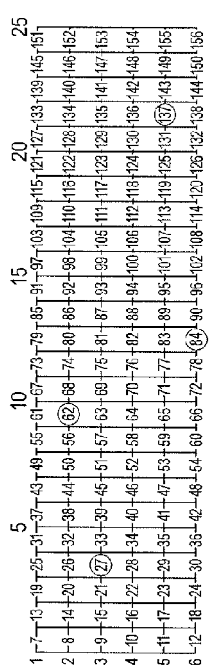
Figure 109D:
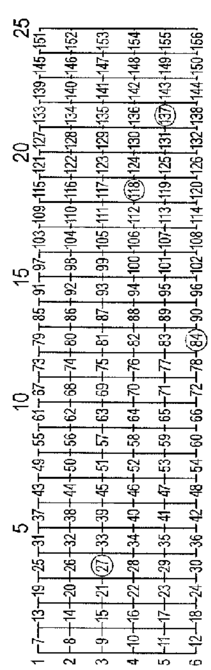
Figure 109E:
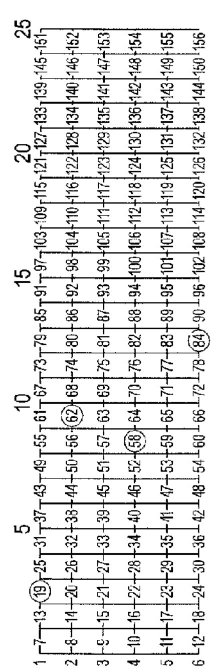
Figure 109F:
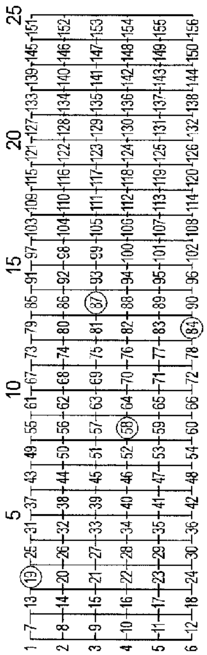
Figure 109G:
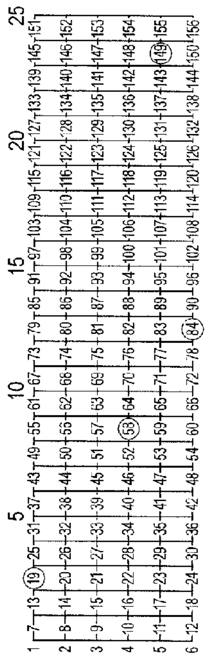
Figure 109H:
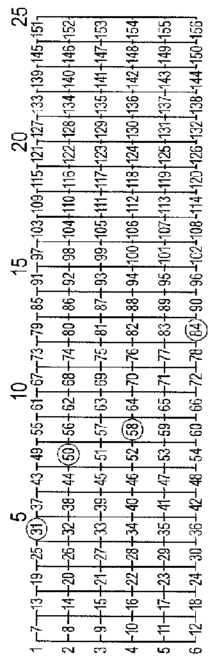
Figure 109I:
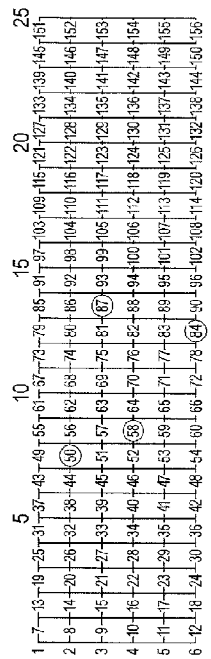
Figure 109J:
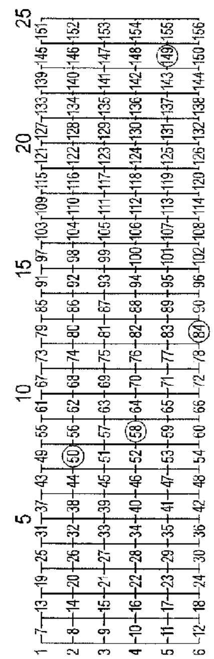
Figure 110A:
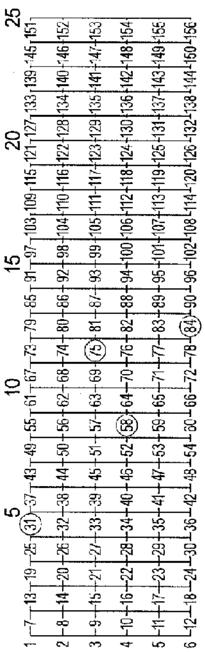
Figure 110B:
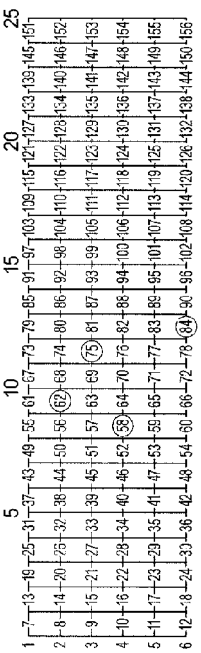
Figure 110C:
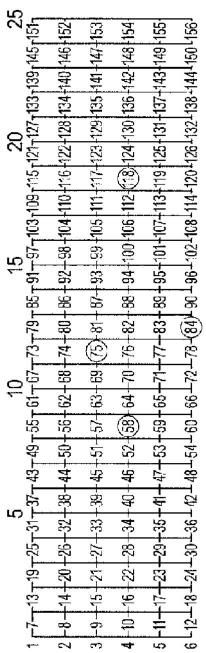
Figure 110D:
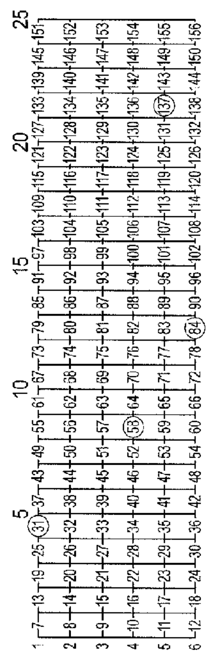
Figure 110E:
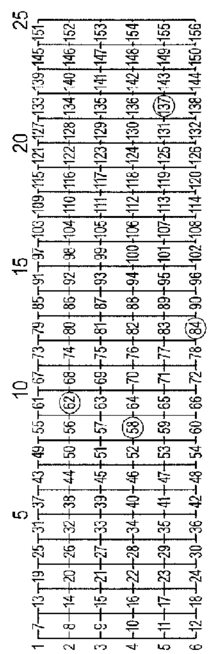
Figure 110F:
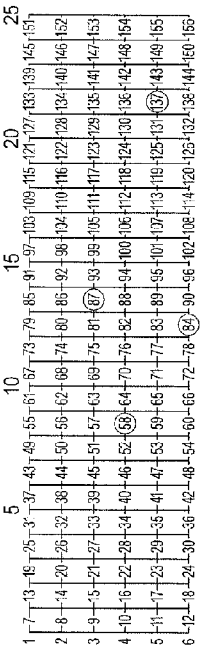
Figure 110G:
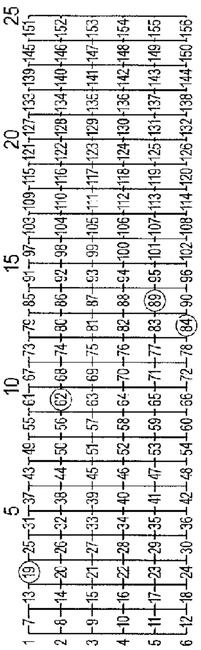
Figure 110H:
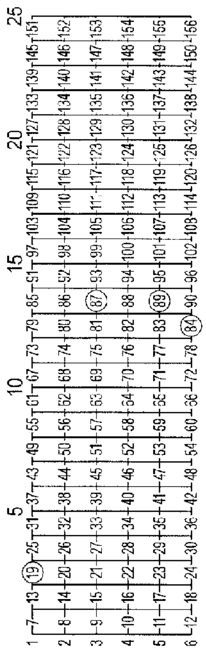
Figure 110I:
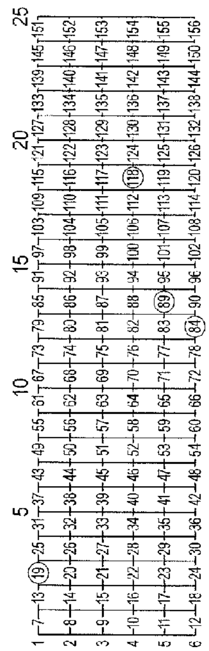
Figure 110J:
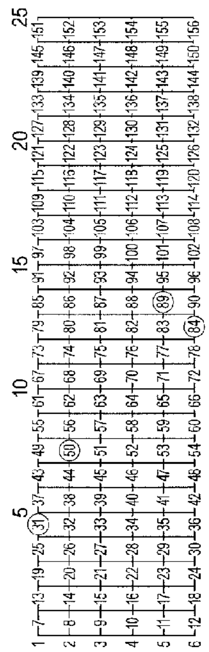
Figure 111A:
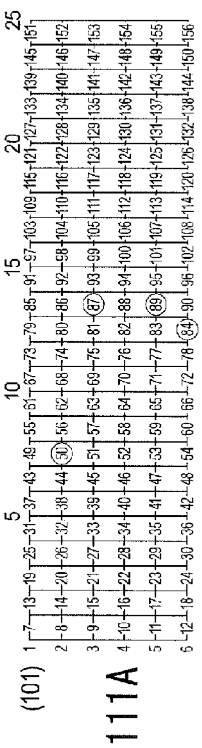
Figure 111B:
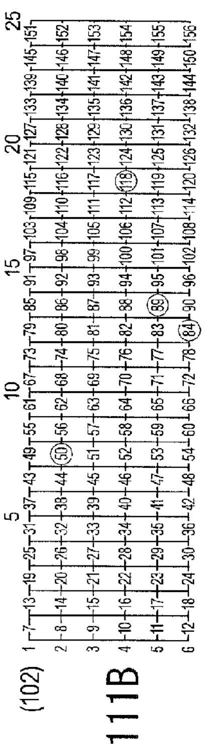
Figure 111C:
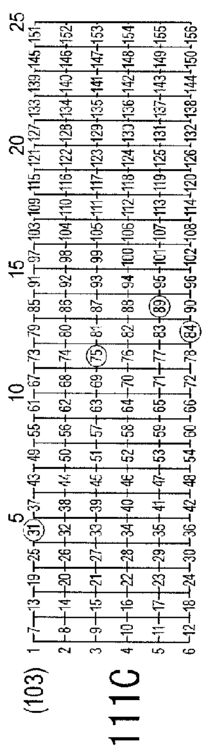
Figure 111D:
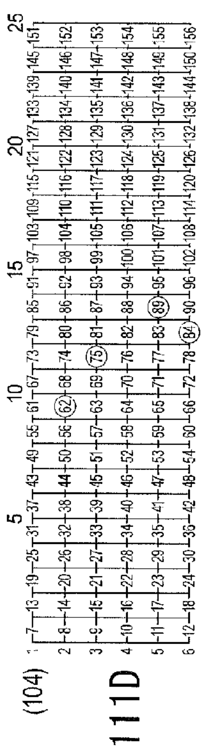
Figure 111E:
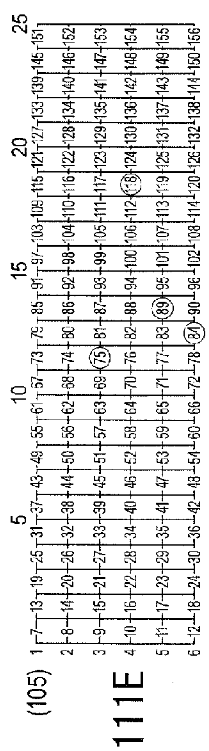
Figure 111F:
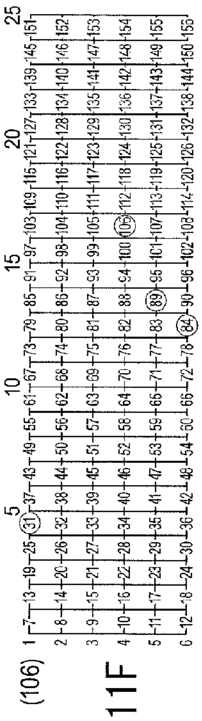
Figure 111G:
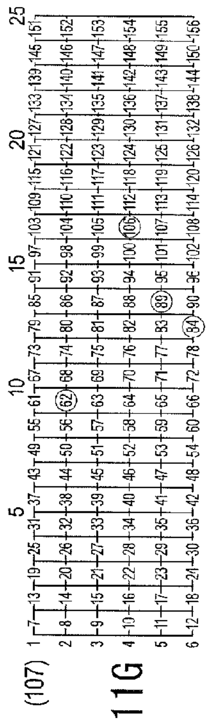
Figure 111H:
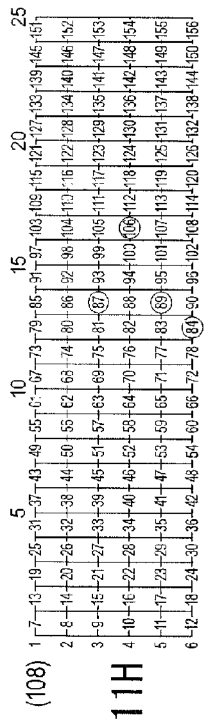
Figure 111I:
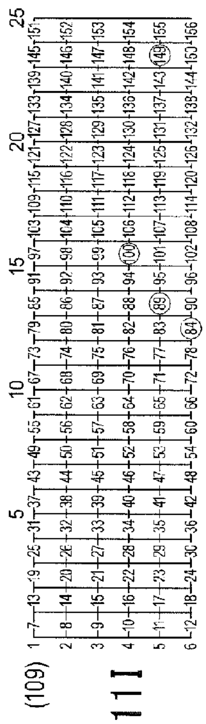
Figure 112A:
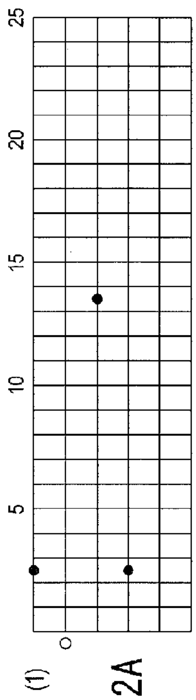
Figure 112B:
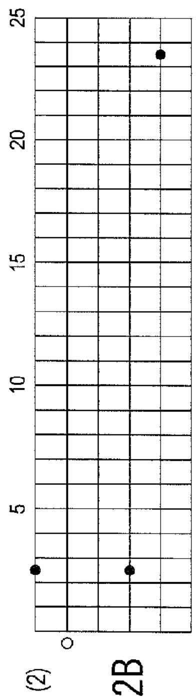
Figure 112C:
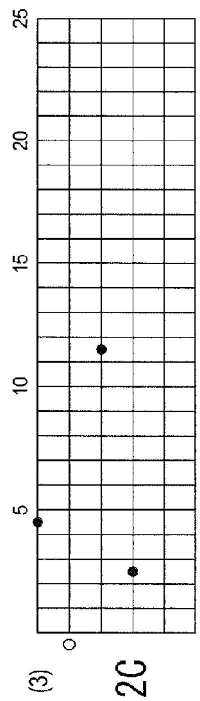
Figure 112D:
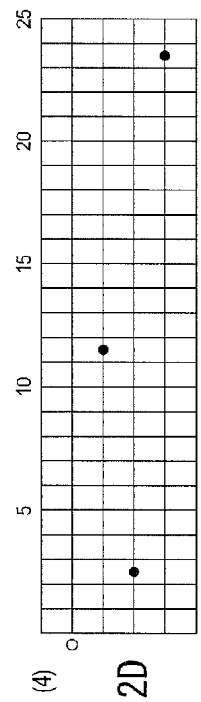
Figure 112E:
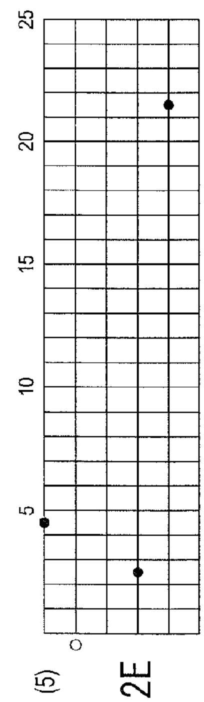
Figure 112F:
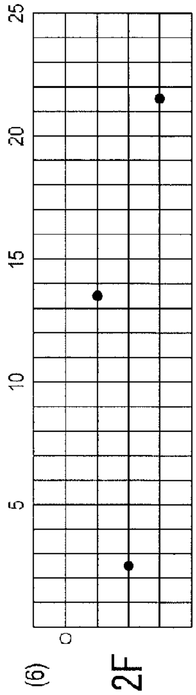
Figure 112G:
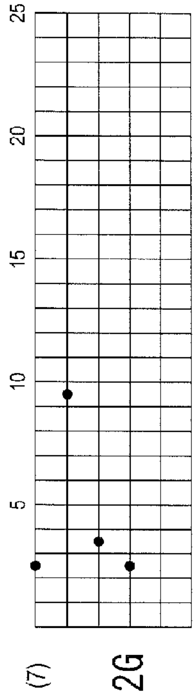
Figure 112H:
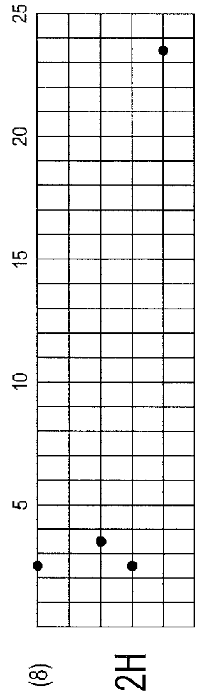
Figure 112I:
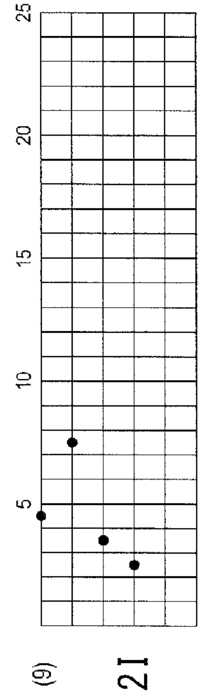
Figure 112J:
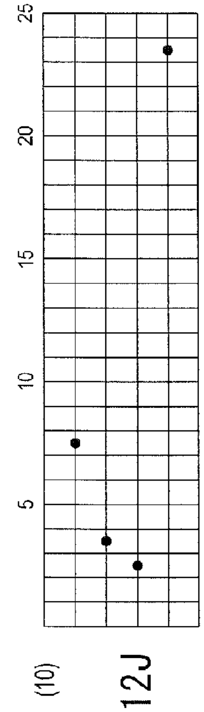
Figure 113A:
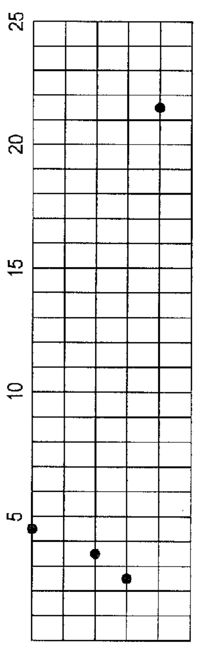
Figure 113B:
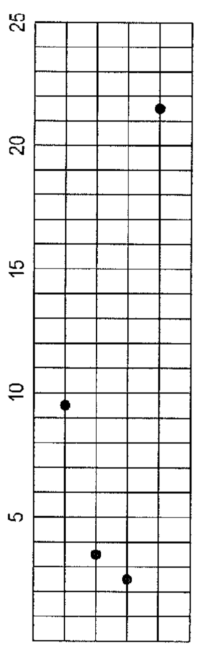
Figure 113C:
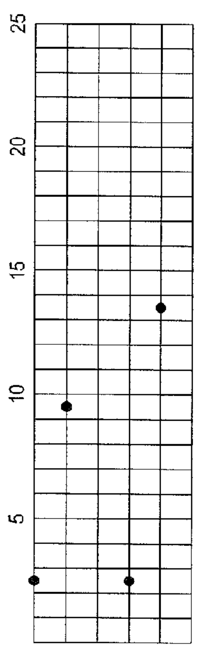
Figure 113D:
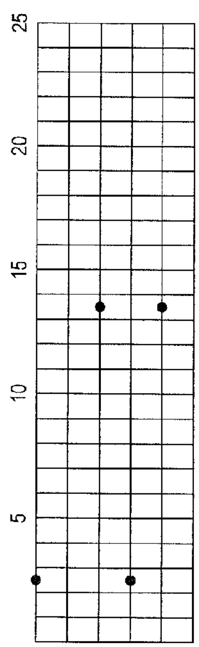
Figure 113E:
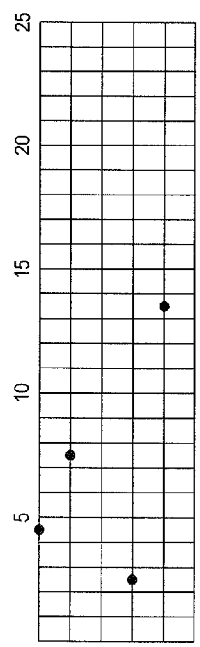
Figure 113F:
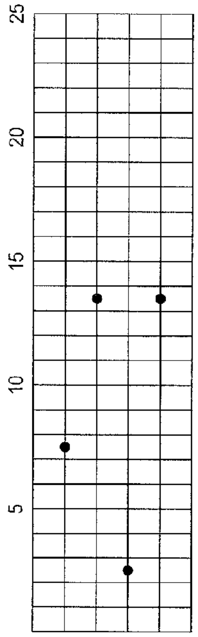
Figure 113G:
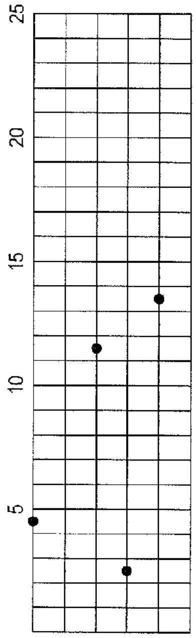
Figure 113H:
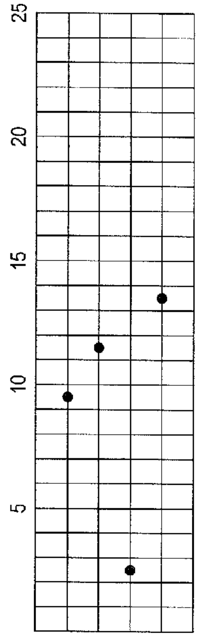
Figure 113I:
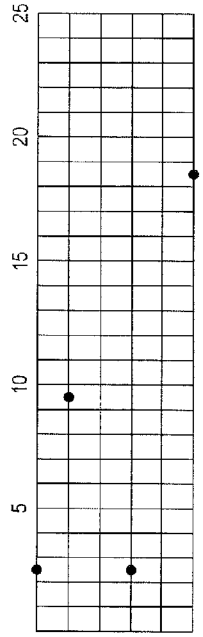
Figure 113J:
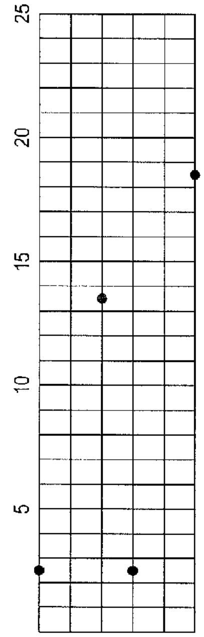
Figure 115A:
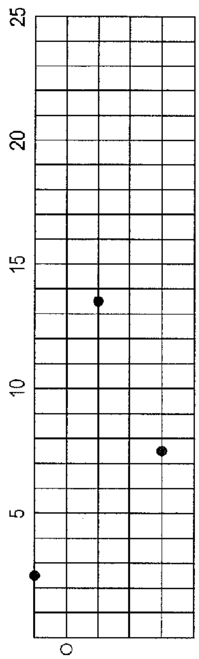
Figure 115B:
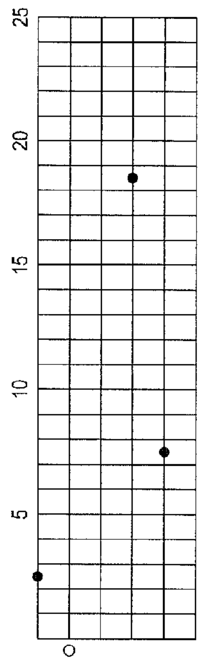
Figure 115C:
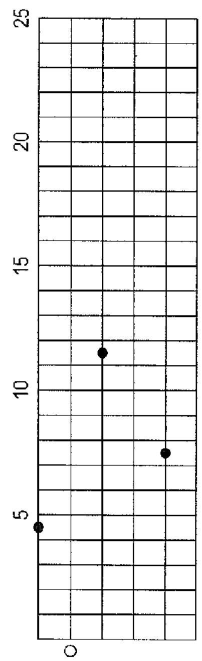
Figure 115D:
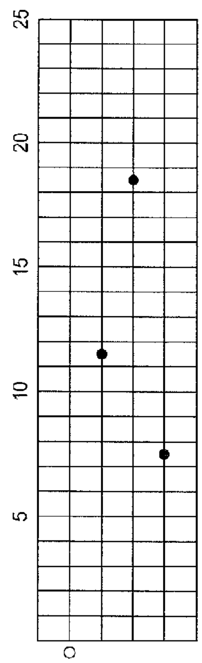
Figure 115E:
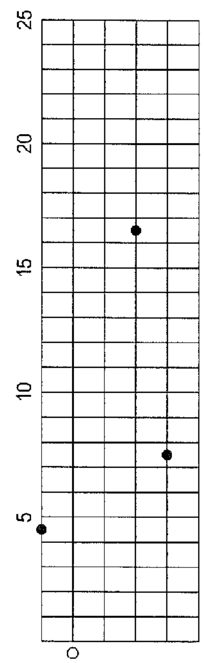
Figure 115F:
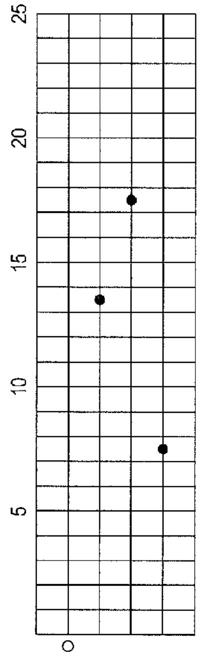
Figure 115G:
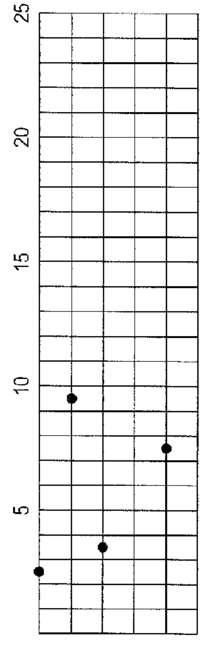
Figure 115H:
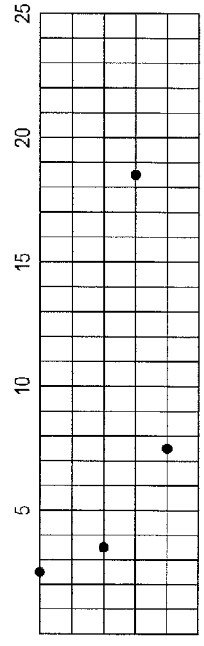
Figure 115I:
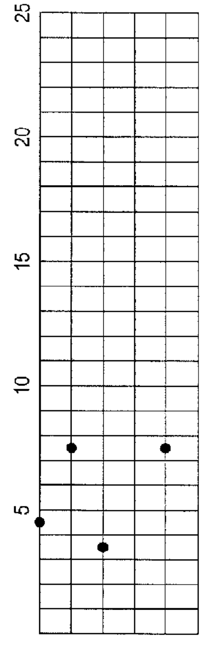
Figure 115J:
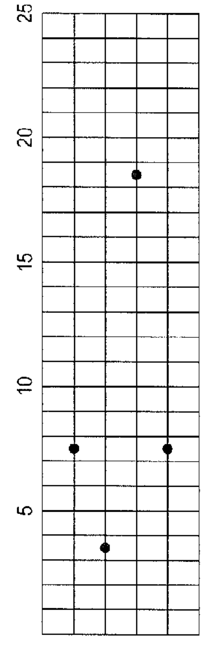
Figure 117A:
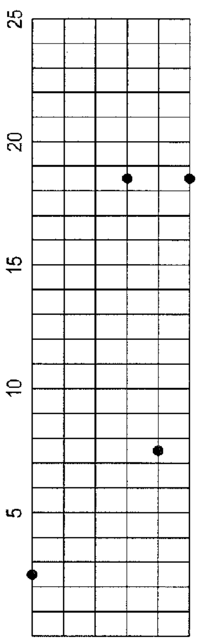
Figure 117B:
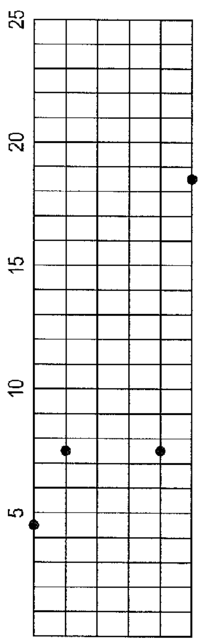
Figure 117C:
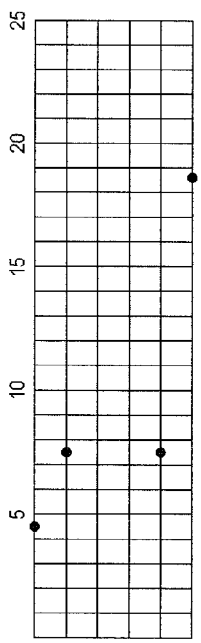
Figure 117D:
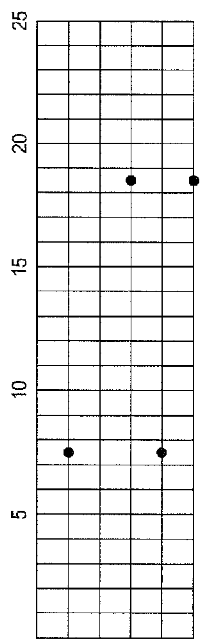
Figure 117E:
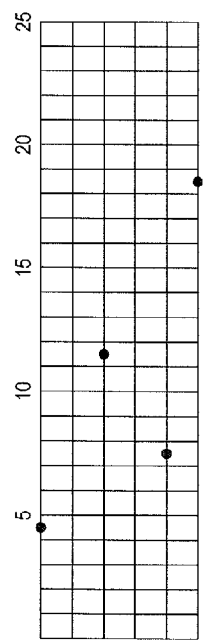
Figure 117F:
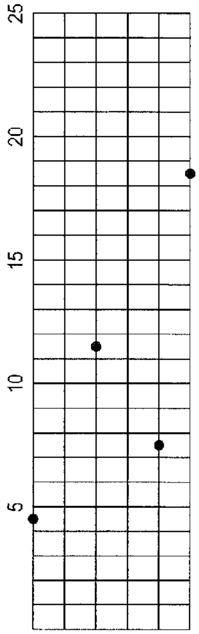
Figure 117G:
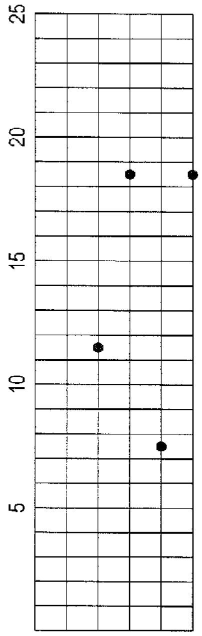
Figure 117H:
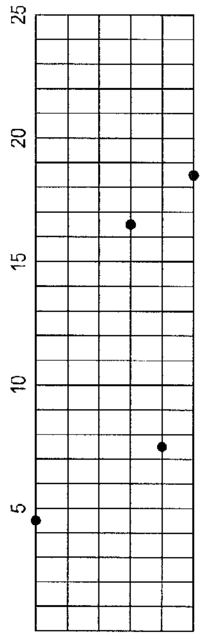
Figure 117I:
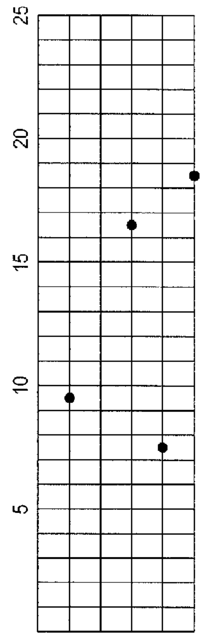
Figure 117J:
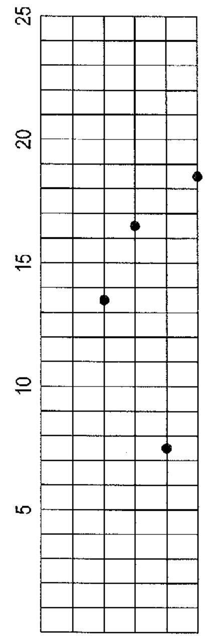
Figure 118A:
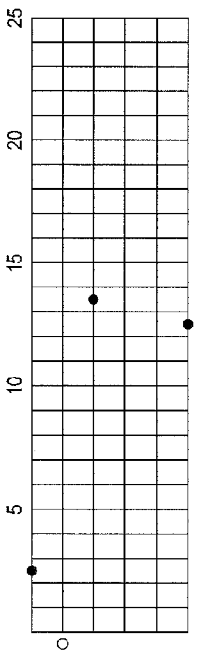
Figure 118B:
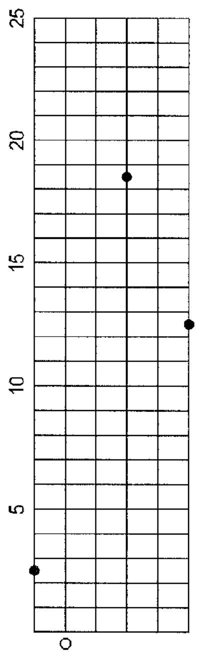
Figure 118C:
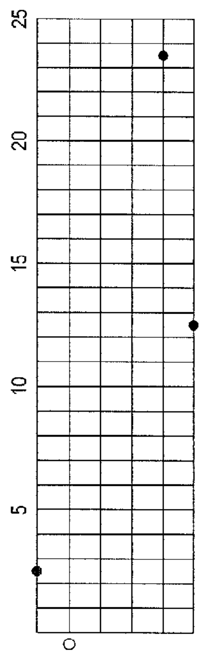
Figure 118D:
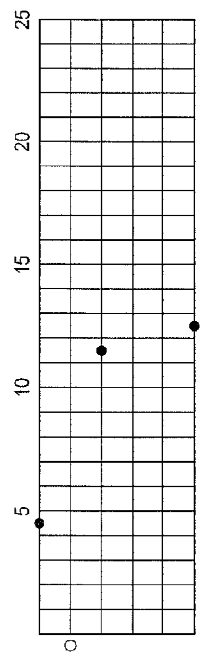
Figure 118E:
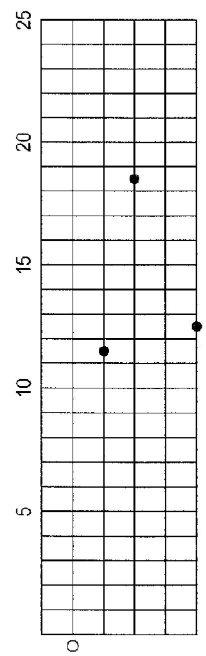
Figure 118F:
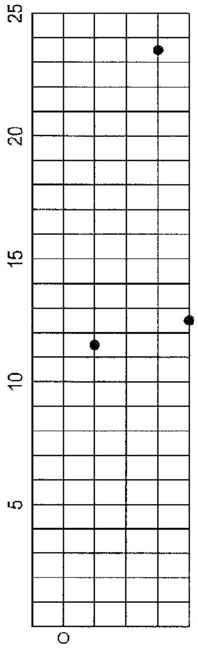
Figure 118G:
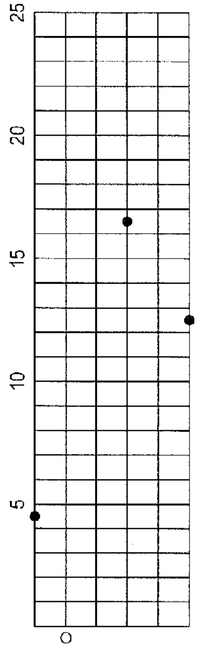
Figure 118H:
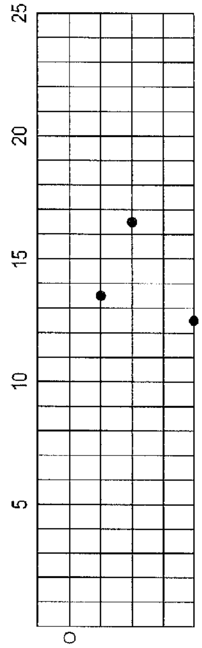
Figure 118I:
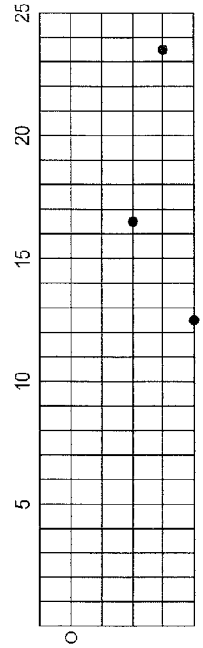
Figure 118J:
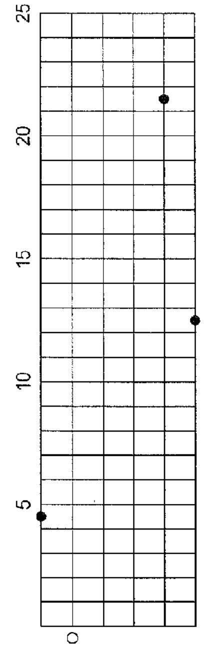
Figure 119A:
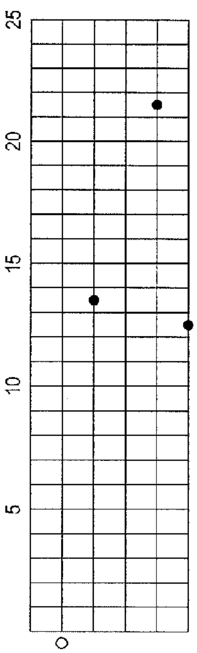
Figure 119B:
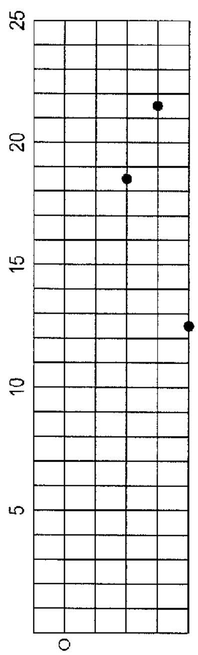
Figure 119C:
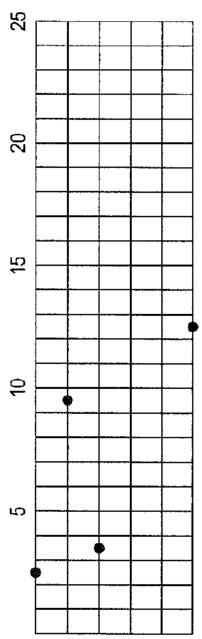
Figure 119D:
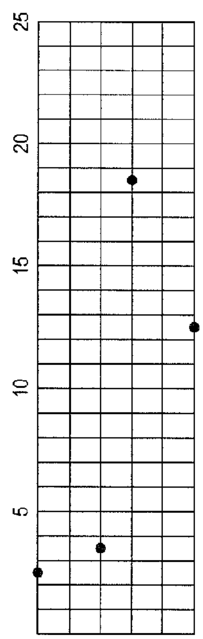
Figure 119E:
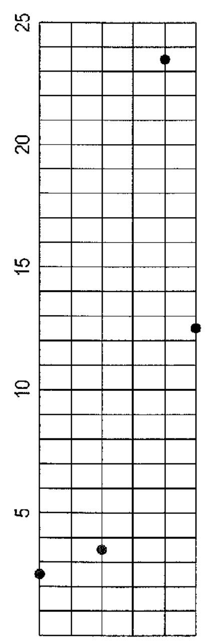
Figure 119F:
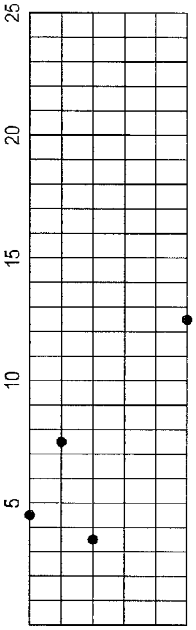
Figure 119G:
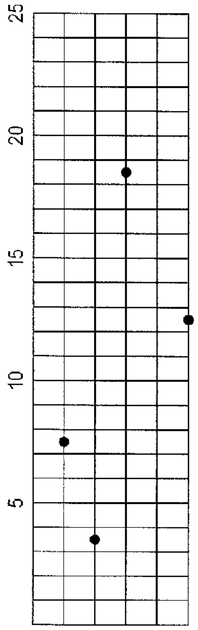
Figure 119H:
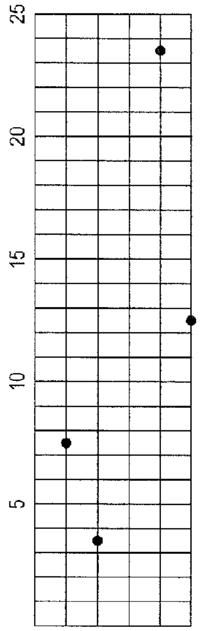
Figure 119I:
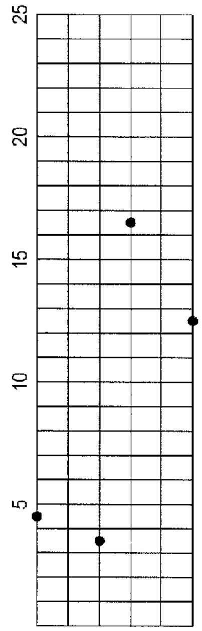
Figure 119J:
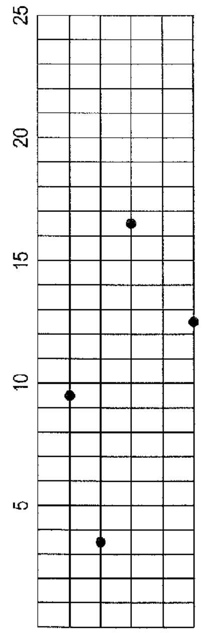
Figure 120A:
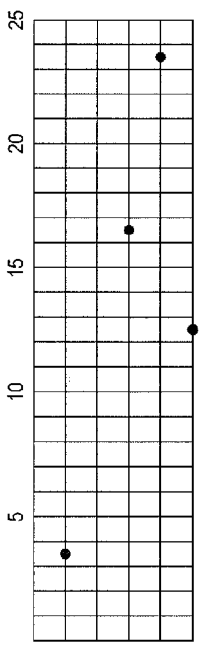
Figure 120B:
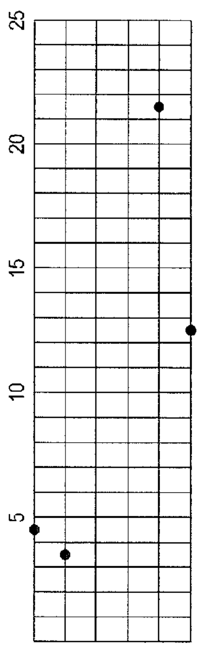
Figure 120C:
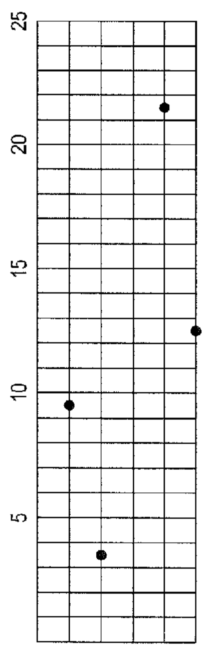
Figure 120D:
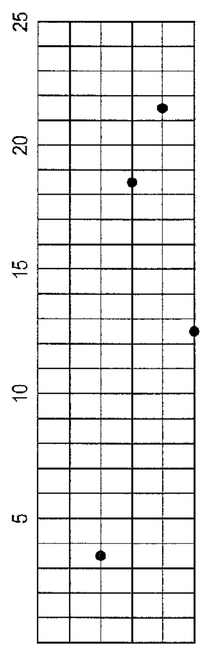
Figure 120E:
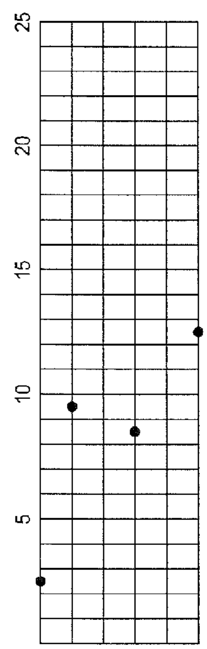
Figure 120F:
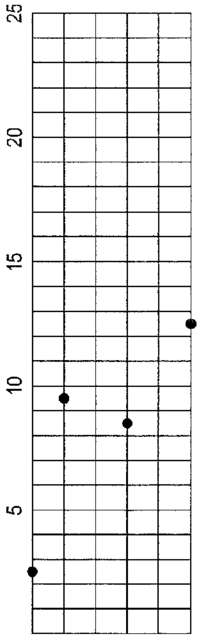
Figure 120G:
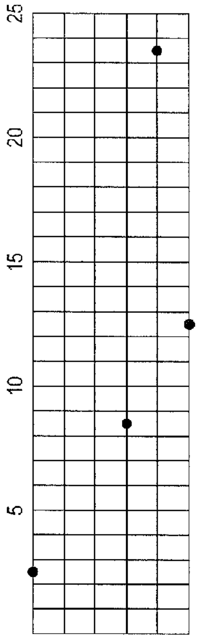
Figure 120H:
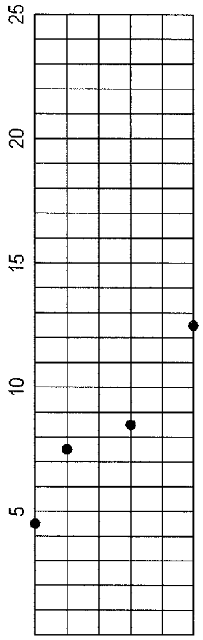
Figure 120I:
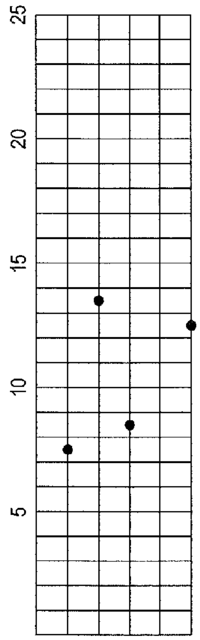
Figure 120J:
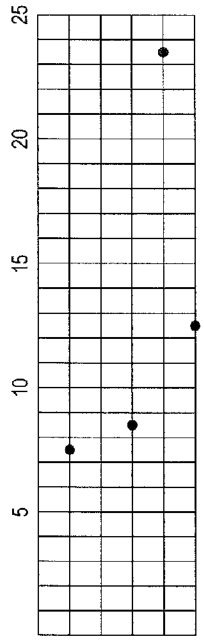
Figure 121A:
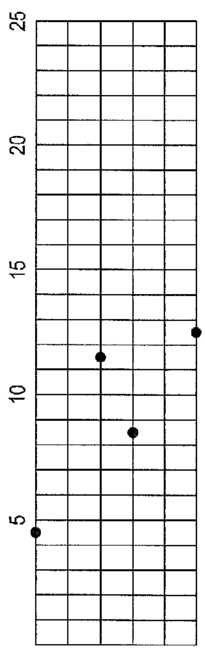
Figure 121B:
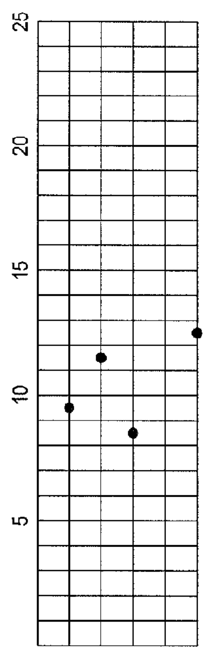
Figure 121C:
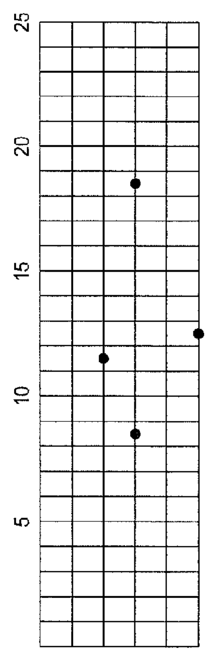
Figure 121D:
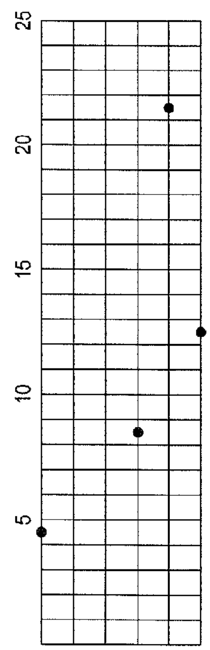
Figure 121E:
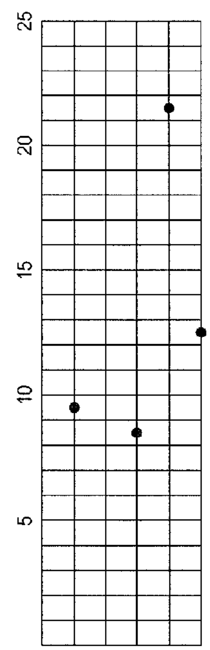
Figure 121F:
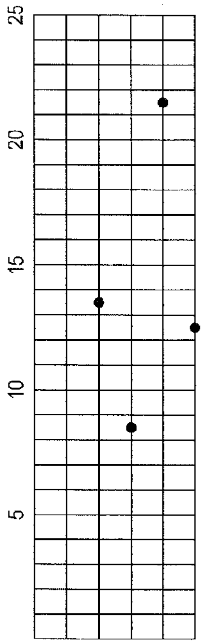
Figure 121G:
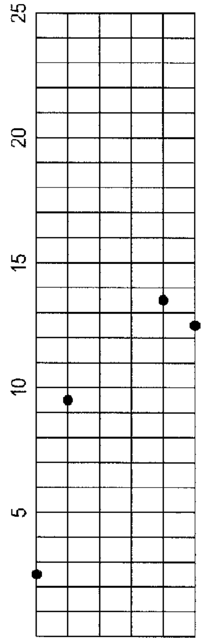
Figure 121H:
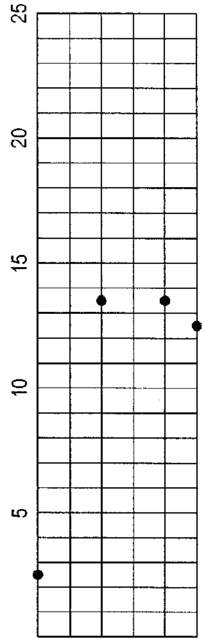
Figure 121I:
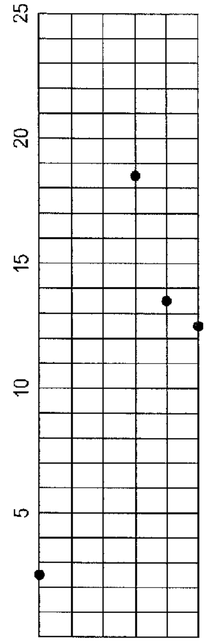
Figure 121J:
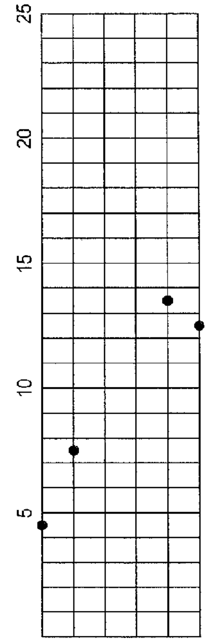
Figure 122A:
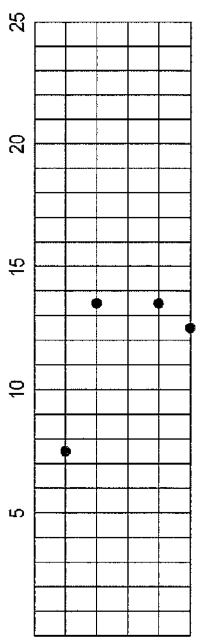
Figure 122B:
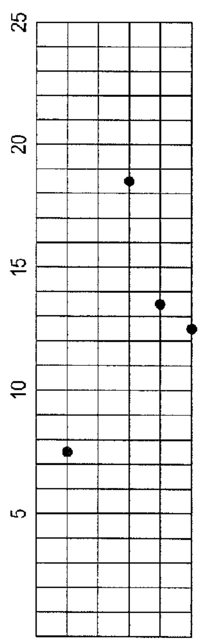
Figure 122C:
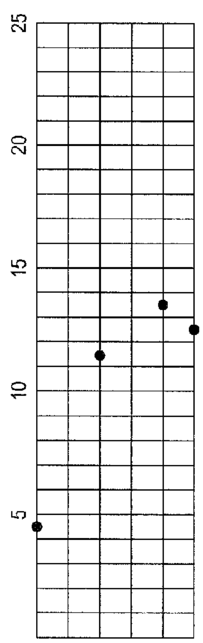
Figure 122D:
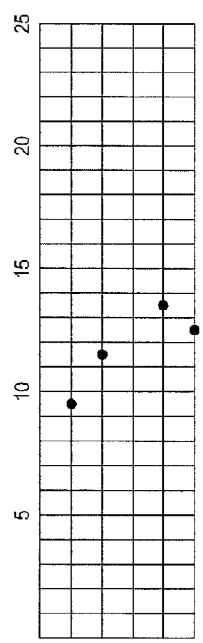
Figure 122E:
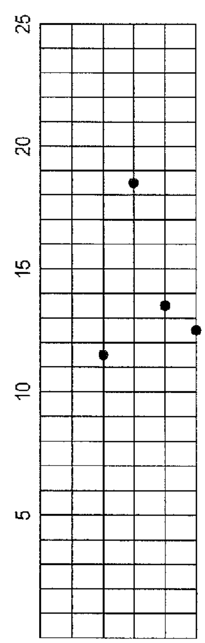
Figure 122F:
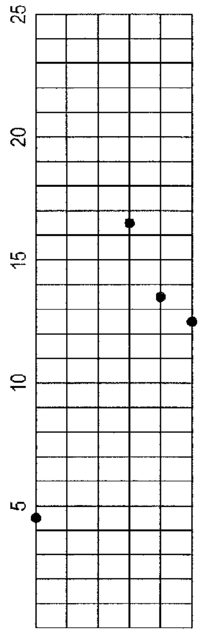
Figure 122G:
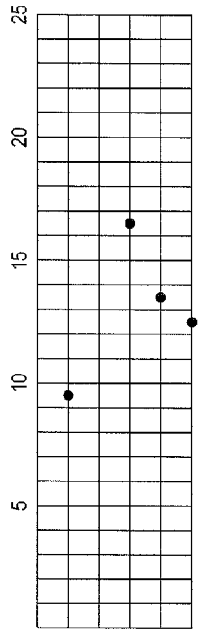
Figure 122H:
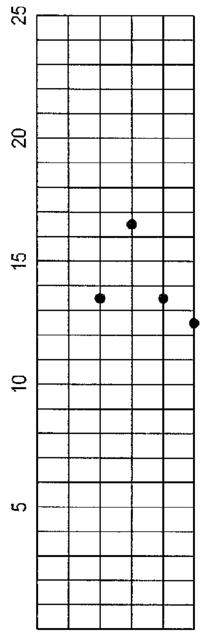
Figure 122I:
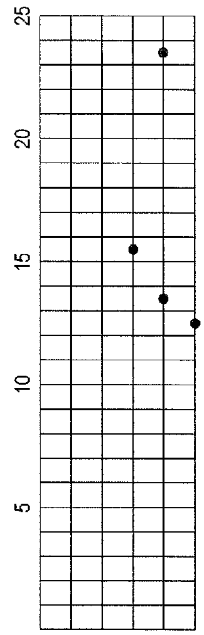

Meanwhile, varieties of input/output data and parameters, which are necessary for guitar teaching data creation, data under computation, and the like, can be stored in the data storage device. In the data storage device, there are also stored: data as illustrated in FIG. 95, which indicate sound positions on the fingerboard by the English letter display; data as illustrated in FIGS. 96A to 96C, which indicate sound positions on the staff notation corresponding to the data illustrated in FIG. 95; data as illustrated in FIG. 97, in which the sound positions on the fingerboard are converted into the integer values of 1 to 156; data as illustrated in FIG. 98, in which the data converted into the integer values are listed to lateral sequences; data as illustrated in FIG. 99, in which respective positions of a numeric diagram are converted into X-Y coordinates; data of above Expression (1); and the like.

Then, the guitar teaching data creation program according to the fourth embodiment of the present invention is stored in a computer-readable external recording medium, and the program storage device of the guitar teaching data creation device 22 is caused to read a content recorded in the external recording medium, whereby the guitar teaching data creation program concerned can execute a series of the processing of the guitar teaching data creation of the present invention. The guitar teaching data creation device 22 according to the fourth embodiment of the present invention is configurable of computer system such as a PC, and accordingly, illustration thereof is omitted. However, the guitar teaching data creation device 22 may further include input devices such as a PC keyboard, a mouse, and a light pen. This fact or other configurations such as the structure of the teaching-oriented guitar 11 are substantially similar to those of the guitar teaching system according to the first embodiment, and accordingly, a duplicate description is omitted.

<Method for Creating Conversion Data of Chord onto Fingerboard in Guitar>

Figure 92:
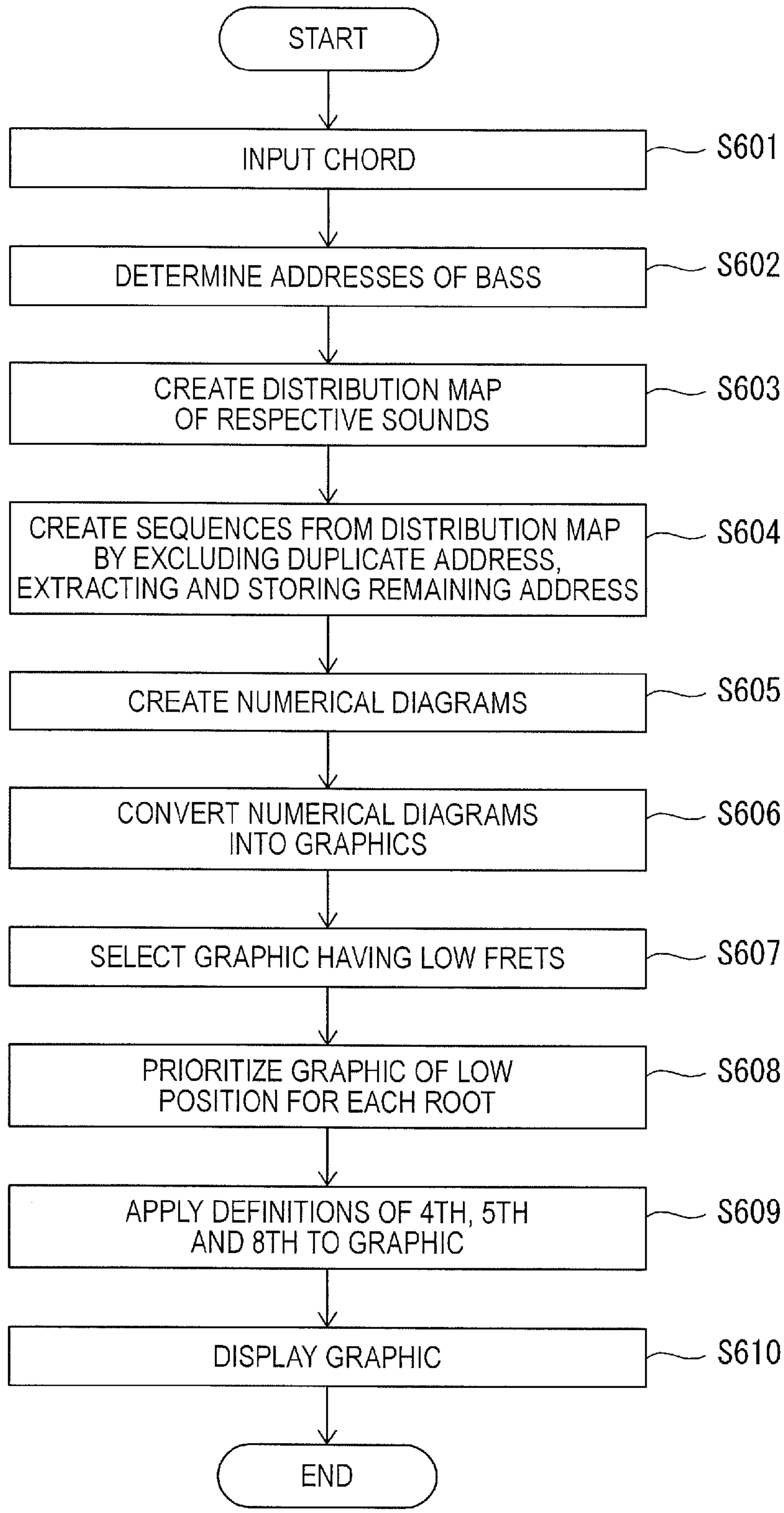
FIG. 92 is a flowchart explaining a method for creating conversion data (diagram) of a chord onto a fingerboard in a guitar according to a fourth embodiment of the present invention.

A description is made of a method for creating conversion data of a chord onto the fingerboard in the guitar according to fourth embodiment of the present invention by using a flowchart of FIG. 92. Note that the guitar teaching data creation method to be described below is merely an example, and as a matter of course, is realizable by a variety of creation methods other than this method, the variety of creation methods including modification examples of this method.

First, FIG. 93 illustrates a definition to follow on the assumption when diagrams are displayed on the screen of the monitor 23*a* and the fingerboard. In view of ease of playing a guitar, in the case that a chord is three-part bodies, diagrams are defined to display in order of three-string root, fourth-string root, fifth-string root and sixth-string root sequentially on the screen of the monitor 23*a* and the fingerboard. In the case that a chord is four-part bodies, diagrams are defined to display in order of the fifth-string root, sixth-string root and fourth-string root sequentially on the screen of the monitor 23*a* and the fingerboard. In the case that a chord is five-part bodies, diagrams are defined to display in order of fifth-string root and sixth-string root sequentially on the screen of the monitor 23*a* and the fingerboard. In the case that a chord is six-part bodies, a diagram of only sixth-string root is defined to display on the screen of the monitor 23*a* and the fingerboard.

Figure 94B:
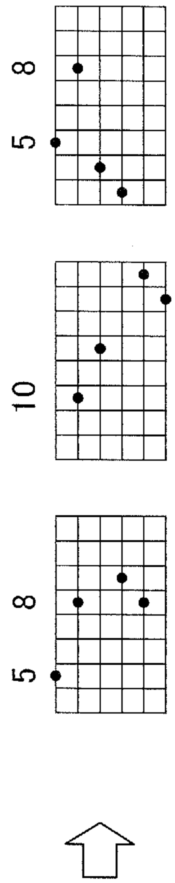
FIG. 94B is a diagram illustrating an example of a diagram which is eventually displayed based on the inputted chord.
Figure 94A:
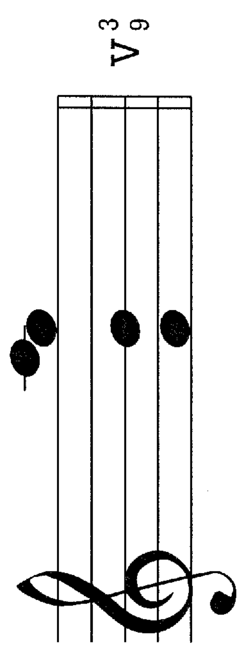
FIG. 94A is a diagram illustrating an example of an inputted chord.
Figure 94C:
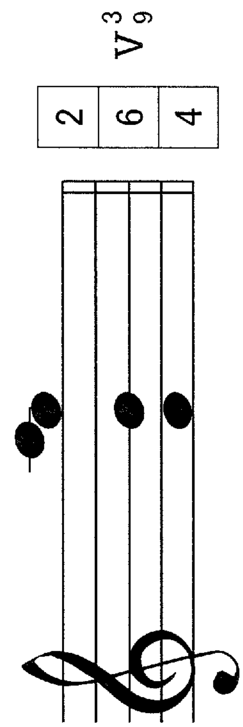
FIG. 94C is a diagram explaining an example of an accumulated interval display of the inputted chord (hereafter, a description is made using four-part bodies, which is a basic form).

(A) In Step S601 of FIG. 92, the guitar teaching data creation program stored in the program storage device connected to the guitar teaching data creation device 22 illustrated in FIG. 1 is started. Then, the guitar teaching data creation program drives the chord inputting means 221 of the central processing unit 220*a* that composes the guitar teaching data creation device 22 illustrated in FIG. 1, and receives the chords. A description is made below on the assumption that the staff notation is displayed on the screen of the monitor illustrated in FIG. 1, and the mouse is clicked to the staff notation on the screen of the monitor, and a chord of a cord symbol V93 (key of C, third inverted form of a dominant 9th chord) as illustrated in FIG. 94A is received by the chord inputting means 221. Note that, by processing based on the chord illustrated in FIG. 94A, diagrams (graphics) are eventually obtained as shown in FIG. 94B. The chord illustrated in FIG. 94A is indicated by accumulated interval display in which 4th, 6th, 2nd are accumulated from the bottom, as shown in FIG. 94C. The chords received by the chord inputting means 221 are stored in the data storage device connected to the guitar teaching data creation device 22.

(B) Next, in Step S602, the guitar teaching data creation program causes the distribution map creating means 222 of the CPU 220*a* illustrated in FIG. 1 to read out, from the data storage device, the data which are illustrated in FIG. 95 and indicate the sound positions on the fingerboard by English letter display, and the chord received in Step S601. Then, the data of the addresses of the respective sounds of FIG. 95 and the chords received by the chord inputting means 221 are collated with each other, and addresses of BASS F2=22,53,84 are determined as shown in FIG. 100A. Moreover, in Step S603, as shown in FIG. 100A, addresses of TENOR B2=2, 27, 58, 89, 120, addresses of ALTO G3=19, 50, 75, 106, 137 and addresses of SOPRANO A3=31, 62, 87, 118, 149 of voice parts located above when viewed from BASS are determined, and thereby a distribution map of respective sounds is created. The distribution maps as illustrated in FIG. 100A, which are created by the distribution map creating means 222, are stored in the data storage device connected to the guitar teaching data creation device 22.

(C) Next, in Step S604, the guitar teaching data creation program causes the sequence creating means 223 of the central processing unit 220*a* to read out, from the data storage device, the data as illustrated in FIG. 100B, in which the sound positions on the fingerboard are converted into the integer values of 1 to 156, the data as illustrated in FIG. 100C, in which the data converted into the integer values are listed to the lateral sequences, and the distribution maps created in Step S602. Then, in the case where the addresses of the sounds of the voice parts located above when viewed from BASS are on the same strings, the sequence creating means 223 excludes the data of the sounds of the duplicate addresses, and extracts data of remaining addresses of sounds. The extracted data is stored in the data storage device.

In particular, the sequence creating means 223 takes third-fret F2=22 of the distribution map illustrated in FIG. 100A as BASS, and selects and extracts TENOR 2 with respect to BASS 22 as shown in Table 37.

TABLE 37

| BASS | TENOR |
|---|---|
| 22 | 2 |

The extracted combination of BASS 22 and TENOR 2 are stored in the data storage device connected to the guitar teaching data creation device 22.

Next, the sequence creating means 223 focuses the combination of BASS 22 and TENOR 2, and searches ALTO 19, 50, 75, 106, 137 from the distribution map as shown in FIG. 100A. From the lateral sequence lists of FIG. 100C, ALTO 50 is on the sequence lists of B in the same way as TENOR 2, ALTO 106 is on the sequence lists of D in the same way as BASS 22, and both of them are arrayed on the same strings as those of TENOR 2 and BASS 22, and accordingly, it is impossible to touch ALTO 50, 106. Hence, ALTO 50, 106 are deleted, and as shown in Table 38, ALTO 19, 75, 137 are extracted with respect to TENOR 2.

TABLE 38

| BASS | TENOR | ALTO |
|---|---|---|
| 22 | 2 | 19 |
| 22 | 2 | 75 |
| 22 | 2 | 137 |

The combination of BASS 22, TENOR 2 and ALTO 19, the combination of BASS 22, TENOR 2 and ALTO 75, and the combination of BASS 22, TENOR 2 and ALTO 137, which are extracted as shown in Table 38, are stored in the data storage device connected to the guitar teaching data creation device 22.

Next, the sequence creating means 223 focuses the combination of BASS 22, TENOR 2 and ALTO 19, and searches SOPRANO 31, 62, 87, 118, 149 from the distribution map as shown in FIG. 100A. From the lateral sequence lists of FIG. 100C, SOPRANO 31 is on the sequence lists of A in the same way as ALTO 19, SOPRANO 62 is on the sequence lists of B in the same way as TENOR 2, SOPRANO 118 is on the sequence lists of D in the same way as BASS 22, and all of them are arrayed on the same strings as those of ALTO 19, TENOR 2 and BASS 22. Accordingly, it is impossible to touch SOPRANO 31, 62, 118. Hence, SOPRANO 31, 62, 118 are deleted, and SOPRANO 87, 149 are extracted with respect to ALTO 19. As a result, as shown in Table 39, combinations of four-part bodies are extracted.

TABLE 39

| | BASS | TENOR | ALTO | SOPRANO |
|---|---|---|---|---|
| 1 | 22 | 2 | 19 | 87 |
| 2 | 22 | 2 | 19 | 149 |

Note that, numbers of "1" and "2" described in the left side column in Table 39 indicate that an order of combinations of four-part bodies is "first" and "second" (the same applies to the following Tables). The first and second combinations (sequences) of four-part bodies extracted as shown in Table 39 are stored in the data storage device connected to the guitar teaching data creation device 22.

Next, the sequence creating means 223 focuses BASS 22, TENOR 2 and ALTO 75, and searches SOPRANO 31, 62, 87, 118, 149 from the distribution map illustrated in FIG. 100A. From the lateral sequence lists of FIG. 100C, SOPRANO 62 is on the sequence lists of B in the same way as TENOR 2, SOPRANO 87 is on the sequence lists of C in the same way as ALTO 7 , SOPRANO 118 is on the sequence lists of D in the same way as BASS 22, and all of them are arrayed on the same strings as those of TENOR 2, ALTO 75 and BASS 22, and accordingly, it is impossible to touch SOPRANO 62, 87, 118. Hence, SOPRANO 62, 87, 118 are deleted, and SOPRANO 31, 149 are extracted with respect to ALTO 19. As a result, as shown in Table 40, third and fourth combinations of four-part bodies are extracted.

TABLE 40

| | BASS | TENOR | ALTO | SOPRANO |
|---|---|---|---|---|
| 3 | 22 | 2 | 75 | 31 |
| 4 | 22 | 2 | 75 | 149 |

The third and fourth combinations (sequences) of four-part bodies, which are extracted as shown in Table 40, are stored in the data storage device connected to the guitar teaching data creation device 22.

Next, the sequence creating means 223 focuses BASS 22, TENOR 2 and ALTO 19, and searches SOPRANO 31, 62, 87, 118, 149 from the distribution map illustrated in FIG. 100A. From the lateral sequence lists of FIG. 100C, SOPRANO 62 is on the sequence lists of B in the same way as TENOR 2, SOPRANO 118 is on the sequence lists of D in the same way as BASS 22, SOPRANO 149 is on the sequence lists of E in the same way as ALTO 137, and all of them are arrayed on the same strings as those of TENOR 2, BASS 22 and ALTO 137, and accordingly, it is impossible to touch SOPRANO 62, 118, 149. Hence, SOPRANO 62, 118, 149 are deleted, and remaining SOPRANO 31, 87 are extracted. As a result, as shown in Table 41, fifth and sixth combinations of four-part bodies are extracted.

TABLE 41

| | BASS | TENOR | ALTO | SOPRANO |
|---|---|---|---|---|
| 5 | 22 | 2 | 137 | 31 |
| 6 | 22 | 2 | 137 | 87 |

The fifth and sixth combinations (sequences) of four-part bodies, which are extracted as shown in Table 41, are stored in the data storage device connected to the guitar teaching data creation device 22.

Next, the sequence creating means 223 takes third-fret F2=22 of the distribution map illustrated in FIG. 100A as BASS, and selects and extracts TENOR 27 with respect to BASS 22, as shown in Table 42.

TABLE 42

| BASS | TENOR |
|---|---|
| 22 | 27 |

The extracted combination of BASS 22 and TENOR 27 are stored in the data storage device connected to the guitar teaching data creation device 22.

Next, the sequence creating means 223 focuses the combination of BASS 22 and TENOR 27, and searches ALTO 19, 50, 75, 106, 137 from the distribution map illustrated in FIG. 100A. From the lateral sequence lists of FIG. 100C, ALTO 75 is on the sequence lists of C in the same way as TENOR 27, ALTO 106 is on the sequence lists of D in the same way as BASS 22, and both of them are arrayed on the same strings as those of TENOR 27 and BASS 22, and accordingly, it is impossible to touch ALTO 75, 106. Hence, ALTO 75, 106 are deleted, and ALTO 19, 50, 137 are extracted as shown in Table 43.

TABLE 43

| BASS | TENOR | ALTO |
|---|---|---|
| 22 | 27 | 19 |
| 22 | 27 | 50 |
| 22 | 27 | 137 |

The combination of BASS 22, TENOR 27 and ALTO 19, the combination of BASS 22, TENOR 27 and ALTO 50, and the combination of BASS 22, TENOR 27 and ALTO 137, which are extracted as shown in Table 43, are stored in the data storage device connected to the guitar teaching data creation device 22.

Next, the sequence creating means 223 focuses the combination of BASS 22, TENOR 27 and ALTO 19, and searches SOPRANO 31, 62, 87, 118, 149 from the distribution map illustrated in FIG. 100A. From the lateral sequence lists of FIG. 100C, SOPRANO 31 is on the sequence lists of A in the same way as ALTO 19, SOPRANO 87 is on the sequence lists of C in the same way as TENOR 27, SOPRANO 118 is on the sequence lists of D in the same way as BASS 22, and all of them are arrayed on the same strings as those of ALTO 19, TENOR 27 and BASS 22, and accordingly, it is impossible to touch SOPRANO 31, 87, 118. Hence, SOPRANO 31, 87, 118 are deleted, and SOPRANO 62, 149 are extracted with respect to ALTO 19. As a result, as shown in Table 44, 7th and 8th combinations of four-part bodies are extracted.

TABLE 44

| | BASS | TENOR | ALTO | SOPRANO |
|---|---|---|---|---|
| 7 | 22 | 27 | 19 | 62 |
| 8 | 22 | 27 | 19 | 149 |

The seventh and eighth combinations (sequences) of four-part bodies, which are extracted as shown in Table 44, are stored in the data storage device connected to the guitar teaching data creation device 22.

Next, the sequence creating means 223 focuses the combination of BASS 22, TENOR 27 and ALTO 50, and searches SOPRANO 31, 62, 87, 118, 149 from the distribution map illustrated in FIG. 100A. From the lateral sequence lists of FIG. 100C, SOPRANO 62 is on the sequence lists of B in the same way as ALTO 50, SOPRANO 87 is on the sequence lists of C in the same way as TENOR 27, SOPRANO 118 is on the sequence lists of D in the same way as BASS 22, and all of them are arrayed on the same strings as those of ALTO 50, TENOR 27 and BASS 22, and accordingly, it is impossible to touch SOPRANO 62, 87, 118. Hence, SOPRANO 62, 87, 118 are deleted, and SOPRANO 31, 149 are extracted with respect to ALTO 50. As a result, as shown in Table 45, 9th and 10th combinations of four-part bodies are extracted.

TABLE 45

| | BASS | TENOR | ALTO | SOPRANO |
|---|---|---|---|---|
| 9 | 22 | 27 | 50 | 31 |
| 10 | 22 | 27 | 50 | 149 |

The ninth and tenth combinations (sequences) of four-part bodies, which are extracted as shown in Table 45, are stored in the data storage device connected to the guitar teaching data creation device 22.

Next, the sequence creating means 223 focuses the combination of BASS 22, TENOR 27 and ALTO 137, and searches SOPRANO 31, 62, 87, 118, 149 from the distribution map illustrated in FIG. 100A. From the lateral sequence lists of FIG. 100C, SOPRANO 87 is on the sequence lists of C in the same way as TENOR 27, SOPRANO 118 is on the sequence lists of D in the same way as BASS 22, SOPRANO 149 is on the sequence lists of E in the same way as ALTO 137, and all of them are arrayed on the same strings as those of TENOR 27, BASS 22 and ALTO 137, and accordingly, it is impossible to touch SOPRANO 87, 118, 149. Hence, SOPRANO 87, 118, 149 are deleted, and SOPRANO 31, 62 are extracted with respect to ALTO 137. As a result, as shown in Table 46, 11th and 12nd combinations of four-part bodies are extracted.

TABLE 46

| | BASS | TENOR | ALTO | SOPRANO |
|---|---|---|---|---|
| 11 | 22 | 27 | 137 | 31 |
| 12 | 22 | 27 | 137 | 62 |

The 11th and 12nd combinations (sequences) of four-part bodies, which are extracted as shown in Table 46, are stored in the data storage device connected to the guitar teaching data creation device 22.

Next, the sequence creating means 223 takes third-fret F2=22 of the distribution map illustrated in FIG. 100A as BASS, and select and extract TENOR 89 with respect to BASS 22, as shown in Table 47.

TABLE 47

| BASS | TENOR |
|---|---|
| 22 | 89 |

The extracted combination of BASS 22 and TENOR 89 are stored in the data storage device connected to the guitar teaching data creation device 22.

Next, the sequence creating means 223 focuses the combination of BASS 22 and TENOR 89, and searches ALTO 19, 50, 75, 106, 137 from the distribution map illustrated in FIG. 100A. From the lateral sequence lists of FIG. 100C, ALTO 106 is on the sequence lists of D in the same way as BASS 22, ALTO 137 is on the sequence lists of C in the same way as TENOR 89, and both of them are arrayed on the same strings as those of BASS 22 and TENOR 89, and accordingly, it is impossible to touch ALTO 106, 137. Hence, ALTO 106, 137 are deleted, and ALTO 19, 50, 75 are extracted as shown in Table 48.

TABLE 48

| BASS | TENOR | ALTO |
|---|---|---|
| 22 | 89 | 19 |
| 22 | 89 | 50 |
| 22 | 89 | 75 |

The combination of BASS 22, TENOR 89 and ALTO 19, the combination of BASS 22, TENOR 89 and ALTO 50, and the combination of BASS 22, TENOR 89 and ALTO 75, which are extracted as shown in Table 48, are stored in the data storage device connected to the guitar teaching data creation device 22.

Next, the sequence creating means 223 focuses the combination of BASS 22, TENOR 89 and ALTO 19, and searches SOPRANO 31, 62, 87, 118, 149 from the distribution map illustrated in FIG. 100A. From the lateral sequence lists of FIG. 100C, SOPRANO 31 is on the sequence lists of A in the same way as ALTO 19, SOPRANO 118 is on the sequence lists of D in the same way as BASS 22, SOPRANO 149 is on the sequence lists of E in the same way as ALTO 137, and all of them are arrayed on the same strings as those of ALTO 19, BASS 22 and ALTO 137, and accordingly, it is impossible to touch SOPRANO 31, 118, 149. Hence, SOPRANO 31, 118, 149 are deleted, and remaining SOPRANO 62, 87 are extracted. As a result, as shown in Table 49, 13th and 14th combinations of four-part bodies are extracted.

TABLE 49

| | BASS | TENOR | ALTO | SOPRANO |
|---|---|---|---|---|
| 13 | 22 | 89 | 19 | 62 |
| 14 | 22 | 89 | 19 | 87 |

The 13th and 14th combinations (sequences) of four-part bodies, which are extracted as shown in Table 49, are stored in the data storage device connected to the guitar teaching data creation device 22.

Next, the sequence creating means 223 focuses the combination of BASS 22, TENOR 89 and ALTO 50, and searches SOPRANO 31, 62, 87, 118, 149 from the distribution map illustrated in FIG. 100A. From the lateral sequence lists of FIG. 100C, SOPRANO 62 is on the sequence lists of B in the same way as ALTO 50, SOPRANO 118 is on the sequence lists of D in the same way as BASS 22, SOPRANO 149 is on the sequence lists of E in the same way as TENOR 89, and all of them are arrayed on the same strings as those of ALTO 50, BASS 22 and TENOR 89, and accordingly, it is impossible to touch SOPRANO 62, 118, 149. Hence, SOPRANO 62, 118, 149 are deleted, and remaining SOPRANO 31, 87 are extracted. As a result, as shown in Table 50, 15th and 16th combinations of four-part bodies are extracted.

TABLE 50

| | BASS | TENOR | ALTO | SOPRANO |
|---|---|---|---|---|
| 15 | 22 | 89 | 50 | 31 |
| 16 | 22 | 89 | 50 | 87 |

The 15th and 16th combinations (sequences) of four-part bodies, which are extracted as shown in Table 50, are stored in the data storage device connected to the guitar teaching data creation device 22.

Next, the sequence creating means 223 focuses the combination of BASS 22, TENOR 89 and ALTO 75, and searches SOPRANO 31, 62, 87, 118, 149 from the distribution illustrated in FIG. 100A. From the lateral sequence lists of FIG. 100C, SOPRANO 87 is on the sequence lists of C in the same way as ALTO 75, SOPRANO 118 is on the sequence lists of D in the same way as BASS 22, SOPRANO 149 is on the sequence lists of E in the same way as TENOR 89, and all of them are arrayed on the same strings as those of ALTO 75, BASS 22 and TENOR 89, and accordingly, it is impossible to touch SOPRANO 87, 118, 149. Hence, SOPRANO 87, 118, 149 are deleted, and remaining SOPRANO 31, 62 are extracted. As a result, as shown in Table 51, 17th and 18th combinations of four-part bodies are extracted.

TABLE 51

| | BASS | TENOR | ALTO | SOPRANO |
|---|---|---|---|---|
| 17 | 22 | 89 | 75 | 31 |
| 18 | 22 | 89 | 75 | 62 |

The 17th and 18th combinations (sequences) of four-part bodies, which are extracted as shown in Table 51, are stored in the data storage device connected to the guitar teaching data creation device 22.

Next, the sequence creating means 223 takes third-fret F2=22 of the distribution map illustrated in FIG. 100A as BASS, and selects and extracts TENOR 120 with respect to BASS 22, as shown in Table 52.

TABLE 52

| BASS | TENOR |
|---|---|
| 22 | 120 |

The extracted combination of BASS 22 and TENOR 120 are stored in the data storage device connected to the guitar teaching data creation device 22.

Next, the sequence creating means 223 focuses the combination of BASS 22 and TENOR 120, and searches ALTO 19, 50, 75, 106, 137 from the distribution map illustrated in FIG. 100A. From the lateral sequence lists of FIG. 100C, ALTO 106 is on the sequence lists of D in the same way as BASS 22, and ALTO 106 are arrayed on the same strings as ALTO 75, and accordingly, it is impossible to touch ALTO 106. Hence, ALTO 106 is deleted, and ALTO 19, 50, 75, 137 are extracted as shown in Table 53.

TABLE 53

| BASS | TENOR | ALTO |
|---|---|---|
| 22 | 120 | 19 |
| 22 | 120 | 50 |
| 22 | 120 | 75 |
| 22 | 120 | 137 |

The combination of BASS 22, TENOR 120 and ALTO 19, the combination of BASS 22, TENOR 120 and ALTO 50, the combination of BASS 22, TENOR 120 and ALTO 75, and the combination of BASS 22, TENOR 120 and ALTO 137, which are extracted as shown in Table 53, are stored in the data storage device connected to the guitar teaching data creation device 22.

Next, the sequence creating means 223 focuses the combination of BASS 22, TENOR 120 and ALTO 19, and searches SOPRANO 31, 62, 87, 118, 149 from the distribution map illustrated in FIG. 100A. From the lateral sequence lists of FIG. 100C, SOPRANO 31 is on the sequence lists of A in the same way as ALTO 19, SOPRANO 118 is on the sequence lists of D in the same way as BASS 22, and both of them are arrayed on the same strings as those of ALTO 19 and BASS 22, and accordingly, it is impossible to touch SOPRANO 31, 118. Hence, SOPRANO 31, 118 are deleted, and remaining SOPRANO 62, 87, 149 are extracted. As a result, as shown in Table 54, 19th to 21st combinations of four-part bodies are extracted.

TABLE 54

| | BASS | TENOR | ALTO | SOPRANO |
|---|---|---|---|---|
| 19 | 22 | 120 | 19 | 62 |
| 20 | 22 | 120 | 19 | 87 |
| 21 | 22 | 120 | 19 | 149 |

The 19th to 21st combinations (sequences) of four-part bodies, which are extracted as shown in Table 54, are stored in the data storage device connected to the guitar teaching data creation device 22.

Next, the sequence creating means 223 focuses the combination of BASS 22, TENOR 120 and ALTO 50, and searches SOPRANO 31, 62, 87, 118, 149 from the distribution map illustrated in FIG. 100A. From the lateral sequence lists of FIG. 100C, SOPRANO 62 is on the sequence lists of B in the same way as ALTO 50, SOPRANO 118 is on the sequence lists of D in the same way as BASS 22, and both of them are arrayed on the same strings as those of ALTO 50 and BASS 22, and accordingly, it is impossible to touch SOPRANO 62, 118. Hence, SOPRANO 62, 118 are deleted, and remaining SOPRANO 31, 87, 149 are extracted. As a result, as shown in Table 55, 22nd to 24th combinations of four-part bodies are extracted.

TABLE 55

| | BASS | TENOR | ALTO | SOPRANO |
|---|---|---|---|---|
| 22 | 22 | 120 | 50 | 31 |
| 23 | 22 | 120 | 50 | 87 |
| 24 | 22 | 120 | 50 | 149 |

The 22nd to 24th combinations (sequences) of four-part bodies, which are extracted as shown in Table 55, are stored in the data storage device connected to the guitar teaching data creation device 22.

Next, the sequence creating means 223 focuses the combination of BASS 22, TENOR 120 and ALTO 75, and searches SOPRANO 31, 62, 87, 118, 149 from the distribution map illustrated in FIG. 100A. From the lateral sequence lists of FIG. 100C, SOPRANO 87 is on the sequence lists of C in the same way as ALTO 75, SOPRANO 118 is on the sequence lists of D in the same way as BASS 22, and both of them are arrayed on the same strings as those of ALTO 75 and BASS 22, and accordingly, it is impossible to touch SOPRANO 87, 118. Hence, SOPRANO 87, 118 are deleted, and remaining SOPRANO 31, 62, 149 are extracted. As a result, as shown in Table 56, 25th to 27th combinations of four-part bodies are extracted.

TABLE 56

| | BASS | TENOR | ALTO | SOPRANO |
|---|---|---|---|---|
| 25 | 22 | 120 | 75 | 31 |
| 26 | 22 | 120 | 75 | 62 |
| 27 | 22 | 120 | 75 | 149 |

The 22nd to 24th combinations (sequences) of four-part bodies, which are extracted as shown in Table 56, are stored in the data storage device connected to the guitar teaching data creation device 22.

Next, the sequence creating means 223 focuses the combination of BASS 22, TENOR 120 and ALTO 137, and searches SOPRANO 31, 62, 87, 118, 149 from the distribution map illustrated in FIG. 100A. From the lateral sequence lists of FIG. 100C, SOPRANO 118 is on the sequence lists of D in the same way as BASS 22, SOPRANO 149 is on the sequence lists of E in the same way as ALTO 137, and both of them are arrayed on the same strings as those of BASS 22 and ALTO 137, and accordingly, it is impossible to touch SOPRANO 118, 149. Hence, SOPRANO 118, 149 are deleted, and remaining SOPRANO 31, 62, 87 are extracted. As a result, as shown in Table 57, 28th to 30th combinations of four-part bodies are extracted.

TABLE 57

| | BASS | TENOR | ALTO | SOPRANO |
|---|---|---|---|---|
| 28 | 22 | 120 | 137 | 31 |
| 29 | 22 | 120 | 137 | 62 |
| 30 | 22 | 120 | 137 | 87 |

The 28th to 30th combinations (sequences) of four-part bodies, which are extracted as shown in Table 57, are stored in the data storage device connected to the guitar teaching data creation device 22.

In a similar way to the sequence of extracting the combinations of four-part bodies with focusing BASS 22 as already mentioned, the sequence creating means 223 focuses BASS 53 and extracts combinations of four-part bodies. As a result, as shown in Table 58, 31st to 60th combinations of four-part bodies are extracted.

TABLE 58

| | BASS | TENOR | ALTO | SOPRANO |
|---|---|---|---|---|
| 31 | 53 | 2 | 19 | 87 |
| 32 | 53 | 2 | 19 | 118 |
| 33 | 53 | 2 | 75 | 31 |
| 34 | 53 | 2 | 75 | 118 |
| 35 | 53 | 2 | 106 | 31 |
| 36 | 53 | 2 | 106 | 87 |

TABLE 58-continued

| | BASS | TENOR | ALTO | SOPRANO |
|---|---|---|---|---|
| 37 | 53 | 27 | 19 | 62 |
| 38 | 53 | 27 | 19 | 118 |
| 39 | 53 | 27 | 50 | 31 |
| 40 | 53 | 27 | 50 | 118 |
| 41 | 53 | 27 | 106 | 31 |
| 42 | 53 | 27 | 106 | 62 |
| 43 | 53 | 58 | 19 | 62 |
| 44 | 53 | 58 | 19 | 87 |
| 45 | 53 | 58 | 50 | 31 |
| 46 | 53 | 58 | 50 | 87 |
| 47 | 53 | 58 | 75 | 31 |
| 48 | 53 | 58 | 75 | 62 |
| 49 | 53 | 120 | 19 | 62 |
| 50 | 53 | 120 | 19 | 87 |
| 51 | 53 | 120 | 19 | 118 |
| 52 | 53 | 120 | 50 | 31 |
| 53 | 53 | 120 | 50 | 62 |
| 54 | 53 | 120 | 50 | 118 |
| 55 | 53 | 120 | 75 | 31 |
| 56 | 53 | 120 | 75 | 62 |
| 57 | 53 | 120 | 75 | 118 |
| 58 | 53 | 120 | 106 | 31 |
| 59 | 53 | 120 | 106 | 62 |
| 60 | 53 | 120 | 106 | 87 |

The 31st to 60th combinations (sequences) of four-part bodies, which are extracted as shown in Table 58, are stored in the data storage device connected to the guitar teaching data creation device 22.

In a similar way, the sequence creating means 223 focuses BASS 84 and extracts combinations of four-part bodies. As a result, as shown in Table 59 and Table 60, 61st to 109th combinations of four-part bodies are extracted.

TABLE 59

| | BASS | TENOR | ALTO | SOPRANO |
|---|---|---|---|---|
| 61 | 84 | 2 | 19 | 87 |
| 62 | 84 | 2 | 19 | 118 |
| 63 | 84 | 2 | 19 | 149 |
| 64 | 84 | 2 | 75 | 31 |
| 65 | 84 | 2 | 75 | 118 |
| 66 | 84 | 2 | 75 | 149 |
| 67 | 84 | 2 | 106 | 31 |
| 68 | 84 | 2 | 106 | 87 |
| 69 | 84 | 2 | 106 | 149 |
| 70 | 84 | 2 | 137 | 31 |
| 71 | 84 | 2 | 137 | 87 |
| 72 | 84 | 2 | 137 | 118 |
| 73 | 84 | 27 | 19 | 62 |
| 74 | 84 | 27 | 19 | 118 |
| 75 | 84 | 27 | 19 | 149 |
| 76 | 84 | 27 | 50 | 31 |
| 77 | 84 | 27 | 50 | 118 |
| 78 | 84 | 27 | 50 | 149 |
| 79 | 84 | 27 | 106 | 31 |
| 80 | 84 | 27 | 106 | 62 |
| 81 | 84 | 27 | 106 | 149 |
| 82 | 84 | 27 | 137 | 31 |
| 83 | 84 | 27 | 137 | 62 |
| 84 | 84 | 27 | 137 | 118 |
| 85 | 84 | 58 | 19 | 62 |
| 86 | 84 | 58 | 19 | 87 |
| 87 | 84 | 58 | 19 | 149 |
| 88 | 84 | 58 | 50 | 31 |
| 89 | 84 | 58 | 50 | 87 |
| 90 | 84 | 58 | 50 | 149 |

TABLE 60

| | BASS | TENOR | ALTO | SOPRANO |
|---|---|---|---|---|
| 91 | 84 | 58 | 75 | 31 |
| 92 | 84 | 58 | 75 | 62 |
| 93 | 84 | 58 | 75 | 149 |
| 94 | 84 | 58 | 137 | 31 |
| 95 | 84 | 58 | 137 | 62 |
| 96 | 84 | 58 | 137 | 87 |
| 97 | 84 | 89 | 19 | 62 |
| 98 | 84 | 89 | 19 | 87 |
| 99 | 84 | 89 | 19 | 118 |
| 100 | 84 | 89 | 50 | 31 |
| 101 | 84 | 89 | 50 | 87 |
| 102 | 84 | 89 | 50 | 118 |
| 103 | 84 | 89 | 75 | 31 |
| 104 | 84 | 89 | 75 | 62 |
| 105 | 84 | 89 | 75 | 118 |
| 106 | 84 | 89 | 106 | 31 |
| 107 | 84 | 89 | 106 | 62 |
| 108 | 84 | 89 | 106 | 87 |
| 109 | 84 | 89 | 106 | 149 |

The 61st to 109th combinations (sequences) of four-part bodies, which are extracted as shown in Table 59 and Table 60, are stored in the data storage device connected to the guitar teaching data creation device 22.

(D) In Step S605 of FIG. 92, the guitar teaching data creation program causes the numerical diagram creating means 224 of the CPU 220*a* to read out the first to 109th (109) sequences, which are created in Step S604, from the data storage device. Then, by using the data of the integer values of 1 to 156, which are as illustrated in FIG. 100B, the numerical diagram creating means 224 converts (expresses) the 109 sequences, which are created by the sequence creating means 223, into 109 numerical diagrams, and creates the first to 109th numerical diagram as shown in FIG. 101A to FIG. 111I. The first to 109th (109) numerical diagrams created by the numerical diagram creating means 224 are stored in the data storage device connected to the guitar teaching data creation device 22.

(E) Moreover, in Step S606, the guitar teaching data creation program causes the graphic converting means 225 of the CPU 220*a* to read out data (refer to the first embodiment) for converting the respective positions of the numerical diagram into X-Y coordinates as illustrated in FIG. 99 and the first to 109th (109) numerical diagrams, which are created in Step S605, from the data storage device. Then, by using the data for converting the numerical diagrams into the X-Y coordinates illustrated in FIG. 99, the graphic converting means 225 converts the first to 109th (109) numerical diagrams, which are created by the numerical diagram creating means 224, into graphics of diagrams composed of arrays of dots, as shown in FIG. 112A to FIG. 122I.

In this event, in a similar way to the first embodiment, a circle is filled in each region where the inequality of circle defined by Expression (1) prescribes the value of the X-Y coordinate=(a,b) of each numeral, the value being expressed in the numerical diagram, whereby the dot is drawn. That is to say, a circle, which takes the X-Y coordinate=(a,b) as a center, is defined, and by such dots obtained by filling the circles, the numerical diagrams are expressed as the graphics of the diagrams composed of the arrays of the dots, which are as illustrated in FIG. 112A to FIG. 122I, whereby the diagrams are created. The graphics of the first to 109th (109) diagrams, which are converted by the graphic converting means 225, are stored in the data storage device connected to the guitar teaching data creation device 22.

(F) In Step S607, the guitar teaching data creation program causes the display means 226 of the central processing unit 220*a* to read out the first to 109th diagrams (graphics) illustrated in FIG. 112A to FIG. 122I from the data storage device, and screens the diagrams in accordance with fret number. For example, the display means 226 selects and extracts a diagram extending over three frets, a diagram extending over four frets, a diagram extending over five frets, a diagram extending over six frets, a diagram extending over seven frets, a diagram extending over eight frets, a diagram extending over nine frets, a diagram extending over ten frets, a diagram extending over eleven frets, and a diagram extending over twelve frets, sequentially. Meanwhile, the diagrams may be screened for each a plurality of frets. For example, the display means 226 may select and extract diagrams every two frets, such that diagrams extend over one or two fret, diagrams extend over three or four fret, diagrams extend over five or six fret, diagrams extend over seven or eight fret, diagrams extend over nine or ten fret, or diagrams extend over eleven or twelve fret.

In the case of first to 109th diagrams illustrated in FIG. 112A to FIG. 122I, no diagram within four frets is presented and extracted. As shown in FIG. 123A, the 39th, 45th, 48th, 92nd, 104th and 108th diagrams are extracted as a diagram extending over five frets and stored in the data storage device connected to the guitar teaching data creation device 22. As shown in FIG. 123B, a 9th diagram is extracted as a diagram extending over six frets, and stored in the data storage device connected to the guitar teaching data creation device 22. As shown in FIG. 123C, the 46th, 89th and 101st diagrams are extracted as diagrams extending over seven frets, are stored in the data storage device connected to the guitar teaching data creation device 22. As shown in FIG. 123D, the 37th, 43rd, 47th, 105th and 107th diagrams are extracted as diagrams extending over eight frets, are stored in the data storage device connected to the guitar teaching data creation device 22.

Then, the display means 226 preferentially extracts diagrams extending over lower frets from the 109 diagrams stored in the data storage device connected to the guitar teaching data creation device 22, since a diagram extending over lower frets is easier to touch the strings. For example, diagrams within six frets, that is, the 39th, 45th, 48th, 92nd, 104th and 108th diagrams extend over five frets illustrated in FIG. 123A, and the 9th diagram extend over six frets illustrated in FIG. 123B.

(G) Next, in Step S608, the display means 226 determines root string of the 9th, 39th, 45th, 48th, 92nd, 104th and 108th diagrams, and arranges them in order of the 39th, 45th and 48th diagrams having the fifth-string root, the 92nd, 104th and 108th diagrams having the sixth-string root, and the 9th diagram having the fourth-string root. At this timing, the diagrams are arranged arbitrarily for each string root. Then, the diagrams are prioritized so as to place higher priority on a lower position for each string root so the diagrams are arranged in order of the priority for each string root. As a result, as shown in FIG. 124A, the priority is given in order of the 39th, 45th and 48th diagrams in the fifth-string root. Meanwhile, the priority is given in order of the 92nd, 104th and 108th diagrams in the sixth-string root.

(H) Next, in Step S609, the display means 226 reads out definitions of fourth, fifth and eighth from the data storage device connected to the guitar teaching data creation device 22, and determines whether addresses of respective voice parts of the diagrams comply with the fourth, fifth and eighth definitions, and excludes a diagram from a highest-priority diagram when the diagram does not comply with the fourth, fifth and eighth definitions (the fourth, fifth and eighth definitions will hereinafter be described in detail). Here, the 39th diagram of fifth-string root does not comply with the fourth definition among the fourth, fifth and eighth definitions, and therefore the 39th diagram is extruded from the highest-priority diagram. Moreover, the 92nd diagram of the sixth-string root does not comply with the fourth definition among the fourth, fifth and eighth definitions, and therefore the 92nd diagram is extruded from the highest-priority diagram. As a result, as shown in FIG. 124B, the 45th diagram is determined as the highest-priority diagram in the fifth-string root, and the 104th diagram is determined as the highest-priority diagram in the sixth-string root. Moreover, as shown in FIG. 124C, the 45th diagram, the 92nd-diagram and the 9th diagram are extracted as the highest-priority diagrams each for the fifth-string root, the sixth-string root and the fourth-string root.

(I) In Step S610, since the diagrams illustrated in FIG. 124C are four-part bodies, the display means 226 sequentially displays the 45th diagram of the fifth-string root, the 92nd-diagram of the sixth-string root, and the 9th diagram of the fourth-string root on the screen of the monitor 23*a* and the fingerboard, by following the definition illustrated in FIG. 93. On the screen of the monitor (display device) 23*a*, for example as shown in FIG. 125A, a musical score and a tab score are displayed, and diagrams having highest-priority are also displayed between the musical score and the tab score. Although a single note is determined (recognized) easily by displaying the TAB score, a chord is determined (recognized) difficulty. Here, it is possible to determine (recognize) a chord easily by displaying the diagrams. Then, diagrams as shown in FIG. 125B are sequentially displayed in order of priority in accordance with the definition illustrated in FIG. 93 at every clicking tab A of an arbitrary diagram and chord on the musical score via a mouse or the like.

<About Fourth, Fifth and Eighth Definitions>

Next, a description is made of the fourth, fifth and eighth definitions, which are used for prioritizing the diagrams in Step S609 of FIG. 92, in a method for creating conversion data (diagram) of a chord onto a guitar fingerboard, according to the fourth embodiment of the present invention. As mentioned above, a diagram is excluded from the highest-priority diagram when the diagram does not comply with the fourth, fifth and eighth definitions. Note that, as shown in FIG. 126, the 4th interval of the 4th scale as a root in a diatonic scale forms an augmented 4th. On the other hand, the other 4th intervals form perfect 4th, and shift between respective strings as shown in lower stage of the 8th scale of FIG. 126. As shown in FIG. 128, the 5th interval of the 7th scale in a diatonic scale forms a diminished 5th. On the other hand, the other 5th intervals form perfect 5th, and shift between respective strings as shown in lower stage of the first scale of FIG. 128. As shown in FIG. 130, all of the 8th intervals in the first to eight scales in a diatonic scale forms perfect 8th.

FIG. 126 illustrates the definition of address of 4th interval with the whole key signature. The 4th intervals in the first to third, 5th to 8th scales form perfect 4th, and the 4th interval in the 4th scale forms an augmented 4th. In the perfect 4th of the 8th scale, the address is defined that one address is positioned upper one string from BASS, as shown in FIG. 127A. In similar way, in the augmented 4th of the 4th scale, the address is defined that one address is positioned upper one string from BASS, as shown in FIG. 127B.

In the case of the perfect 4th and the augmented 4th, when one address is positioned upper two-strings from BASS, the addresses are within 5 frets from BASS and forms lower position. However, in this case, the basic from of the diagram is collapsed, and therefore it is possible to cause confusion.

FIG. 128 illustrates the definition of addresses of the 5th interval with the whole key signature. The 5th intervals in the first to 6th and 8th scales form perfect 5th. Meanwhile, the 5th interval in the 7th scale forms a diminished 5th. In the case of the perfect 5th of the first scale, the sound address is defined as shown in FIG. 129A. The diminished 5th of the 7th scale, the sound address is defined as shown in FIG. 129B.

In the case of the perfect 5th and the diminished 5th, when one address is positioned upper two-strings from BASS, the addresses are within 5 frets from BASS and forms lower position. However, in this case, the basic from of the diagram is collapsed, and therefore it is possible to cause confusion.

FIG. 130 illustrates the definition of addresses of the 8th interval with the whole key signature. All of eighth intervals in the first to 8th scales form perfect eighths. In the case of the perfect eighth in the 8th scale, the highest-priority address is defined that one address is positioned upper two-strings from BASS, as shown in FIG. 131A. Moreover, the second priority address is defined that one address is positioned upper one-string from BASS, as shown in FIG. 131B.

As described above, in accordance with the guitar teaching data creation device 22 according to the fourth embodiment, the difficult-to-understand mechanism on the fingerboard can be grasped mathematically from bird's eyes, and such data, which is necessary to enhance the skill for ability to convert chords onto the fingerboard, the conversion being the most difficult for guitarists, can be created. In such a way, there can be further provided: the guitar teaching system including the guitar teaching data creation device 22 according to the fourth embodiment; the guitar teaching data creation method using the guitar teaching data creation device 22 according to the fourth embodiment; and the guitar teaching data creation program for actuating the guitar teaching data creation device 22 according to the fourth embodiment.

(Other Embodiments)

As above, the present invention is described by the first to fourth embodiments; however, it should not be understood that the description and the drawings, which from a part of this disclosure, limit the present invention. From this disclosure, a variety of alternative embodiments, examples and operation technologies will be obvious for those skilled in the art in view of the teachings herein.

For example, in the first embodiment, the configuration of the guitar teaching system is explained by example as illustrated in FIG. 1, the guitar teaching system including: the teaching-oriented guitar 11; the interface 21*a* connected to the teaching-oriented guitar 11 via the wire 32; the guitar teaching data creation device 22 connected to the interface 21*a* via the wire 35; the monitor 23*a* connected to the guitar teaching data creation device 22 via the wire 37; and the piano keyboard-type keyboard 15 such as a MIDI keyboard connected to the interface 21*a* via the wire 34. However, the guitar teaching system of the present invention is not limited to the configuration illustrated in FIG. 1, and the piano keyboard-type keyboard 15 and the headphone 16*b* connected to the piano keyboard-type keyboard 15 may be omitted.

Figure 36:
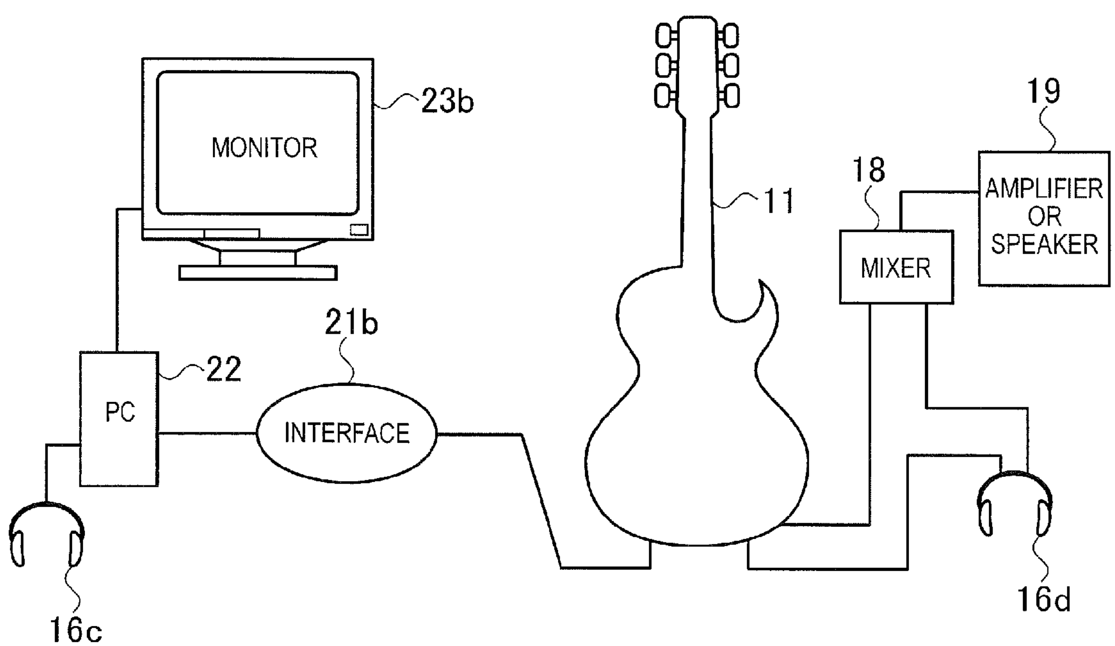
FIG. 36 is a schematic block diagram illustrating a schematic configuration of principal portions of a guitar teaching system according to another embodiment of the present invention.

Alternatively, the piano keyboard-type keyboard 15 may be omitted, and as illustrated in FIG. 36, in place thereof, a mixer 18 may be connected to the teaching-oriented guitar 11, and an amplifier or speaker 19 may be connected to this mixer 18. In FIG. 36, a headphone 16*d* is connected to the teaching-oriented guitar 11 and the mixer 18, and a headphone 16*c* is connected to the guitar teaching data creation device 22. Such a configuration illustrated in FIG. 36 is effective in a case where there is a sound source similar to that of the usual music production software in application software of the guitar teaching data creation program of the present invention. Besides, the configuration is a configuration in which the teaching-oriented guitar 11 is connected to an interface 21*b*, the guitar teaching data creation device (PC) 22 is connected to the interface 21*b*, and a monitor 23*b* and the headphone 16*c* are connected to the guitar teaching data creation device (PC) 22. Accordingly, this is basically a configuration similar to that of the guitar teaching system according to the first embodiment, and the interface 21*b* functions to synchronize the training program for selectively lighting, at the predetermined positions, the arbitrary luminous bodies Lij in the LED dot matrix provided in the CPU 113 built in the body 123 of the teaching-oriented guitar 11, the CPU 113 being illustrated in FIG. 3, and the guitar teaching data creation program of the present invention with each other.

Figure 37:
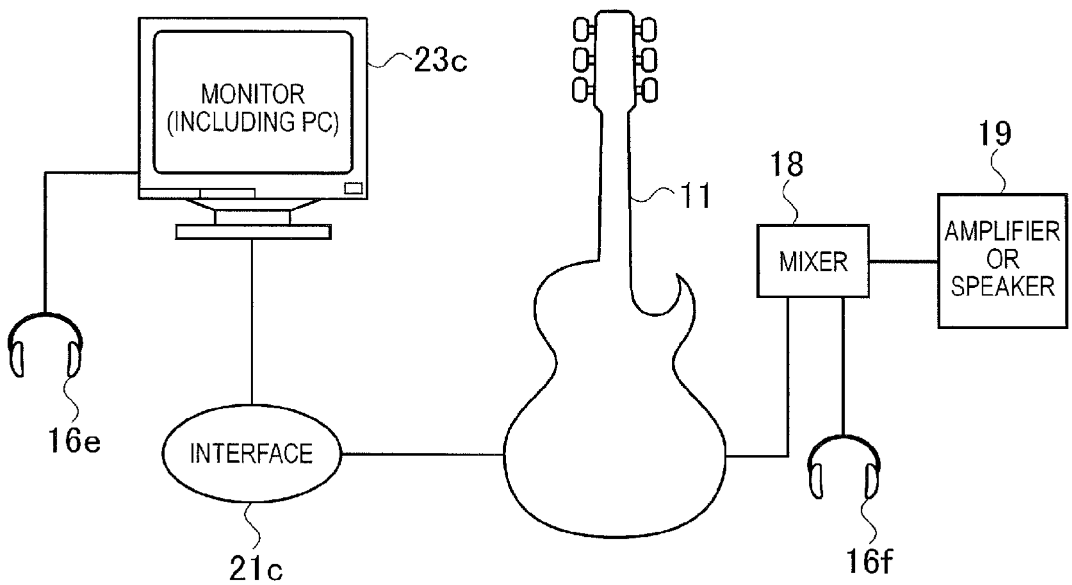
FIG. 37 is a schematic block diagram illustrating a schematic configuration of principal portions of a guitar teaching system according to another embodiment of the present invention.

Alternatively, as illustrated in FIG. 37, a configuration in which the guitar teaching data creation device (PC) is built in a monitor 23*c* may be employed. In FIG. 37, such features that the mixer 18 is connected to the teaching-oriented guitar 11, and that the amplifier or speaker 19 is connected to this mixer 18 are similar to those of FIG. 36. In FIG. 37, a headphone 16*f* is connected to the mixer 18, and a headphone 16*e* is connected to the monitor 23*c*. Such a configuration illustrated in FIG. 37 is also effective in the case where there is a sound source similar to that of the usual music production software in the application software of the guitar teaching data creation program of the present invention, and a sound can be outputted from the sound source via the mixer 18 and the amplifier or speaker 19. Also in FIG. 37, the interface 21*c* functions to synchronize the training program for selectively lighting, at the predetermined positions, the arbitrary luminous bodies Lij in the LED dot matrix provided in the CPU 113 built in the body 123 of the teaching-oriented guitar 11, the CPU 113 being illustrated in FIG. 3, and the guitar teaching data creation program of the present invention with each other.

In FIG. 37, such a configuration in which the guitar teaching data creation device (PC) is built in the monitor 23*c* is illustrated. However, the touch panel 114 illustrated in FIG. 2 may be integrated with the monitor 23*c*. That is to say, for example, a point device is provided, which forms an electric field on an entire surface of the monitor 23*c* composed of a liquid crystal display (LCD) or a plasma display (PDP), catches a change of a surface charge of a touch portion, and performs position detection of an electrostatic capacitance mode, whereby a function of an input device equivalent to the touch panel 114 may be provided on the surface of the monitor 23*c*. Alternatively, a pointing device of a resistance film mode is provided, which applies a voltage to a glass surface or film surface of the monitor 23*c*, and performs position detection for a pushed position, the detection being made by conduction of a touched portion, whereby the function of the input device equivalent to the touch panel 114 may be provided on the surface concerned. In either case, as illustrated in FIG. 2, the monitor having the function of the touch panel on the surface may be embedded in a part of the top plate 125 of the body 123 of the teaching-oriented guitar 11, or may be formed into a thin display of a tablet type or the like, which is mountable on a music stand, and may be configured separately from the teaching-oriented guitar 11. In the case of embedding the monitor, which has the function of the touch panel on the surface, in an part of the top plate 125 of the teaching-oriented guitar 11, if the function of the guitar teaching data creation device (PC) 22 illustrated in FIG. 1 is assembled into the CPU 113 illustrated in FIG. 3, then a compact configuration can be realized.

Moreover, in the above-described first to fourth embodiments, the description has been made of the case where the staff notation is displayed on the screen of the monitor 23*a* by using the guitar teaching data creation program, and the chord is inputted by clicking the mouse on the staff notation on the screen of the monitor 23*a*. However, without using the mouse, a finger, a pen tip and the like may be caused to directly touch the staff notation to input the chord after the staff notation is displayed on the monitor 23*a*, 23*b* or 23*c*, each of which has the function of the touch panel.

Furthermore, such diagrams (forms) as illustrated in FIG. 133B, FIG. 134B, FIG. 135B, FIG. 136B and FIG. 137B are stored in a database in advance together with the chords illustrated in FIG. 133A, FIG. 134A, FIG. 135A, FIG. 136A and FIG. 137A, and the diagrams may be searched from the database by inputting the chords. Though not illustrated, a variety of main storage devices or auxiliary storage devices, which are similar to those of the usual computer system, each just need to be used as a data storage device that stores the database. The data storage device can be composed of semiconductor memories, magnetic disks, optical disks, magneto-optical disks, magnetic tapes, and the like.

That is to say, as illustrated in a flowchart of FIG. 132, in Step S601, the diagram inputting means of the central processing unit is driven, and the chords and the diagrams (forms), which are illustrated in FIGS. 133A to 137B, are inputted in advance via the input device to the database provided in the data storage device. Then, in Step S602, chord inputting means of the central processing unit just needs to be driven, and the chords just need to be received via the input device, and in Step S603, diagram searching means of the central processing unit just needs to be caused to search the diagrams from the database, which is provided in the data storage device, by using the received chords. Then, in Step S604, by using a search result of Step S603, diagram determining means of the central processing unit just needs to be caused to determine the diagrams. Thereafter, in a similar way to the teaching data creation device according to the first to fourth embodiments, by using the display means of the central processing unit, the determined graphics just needs to be arranged for each BASS of the respective strings on the screen of the monitor similar to that illustrated in FIG. 1 and on the fingerboard, and just needs to be sequentially displayed thereon.

Also in such a procedure as illustrated in the flowchart of FIG. 132, the changes of the forms of the respective chords and the positions of the sounds thereof can be clarified and displayed, and accordingly, guitarists can arrange and grasp the difficulty in understanding the harmonies and the mechanisms. That is to say, as a matter of course, the present invention incorporates a variety of embodiments and the like, which are not described herein. Hence, the technical scope of the present invention is determined by invention specifying items according to the scope of claims reasonable from the above description.

The present invention is usable for the fields which include the industry such as the manufacturing of the electronic musical instrument, and the service industry such as guitar teaching.

What is claimed is:

1. A guitar teaching data creation device comprising a central processing unit including:

chord inputting means configured to execute processing for receiving chords;

distribution map creating means configured to collate respective sounds of the chords received by the chord inputting means with addresses of sounds on a fingerboard of a teaching-oriented guitar, and create a distribution map of the respective sounds;

sequence creating means configured to create sequences from the distribution map created by the distribution map creating means;

numerical diagram creating means configured to create numerical diagrams from the sequences created by the sequence creating means;

graphic converting means configured to convert the numerical diagrams created by the numerical diagram creating means into graphics; and display means configured to prioritize the graphics converted by the graphic converting means, and transmit a signal to arrange and display the graphics.

2. A guitar teaching system comprising a teaching-oriented guitar in which a light emitting source composed of a dot matrix is embedded in a finger board and a central processing unit connected to the teaching-oriented guitar, wherein the central processing unit includes:

chord inputting means configured to execute processing for receiving chords;

distribution map creating means configured to collate respective sounds of the chords received by the chord inputting means with addresses of sounds on a fingerboard of a teaching-oriented guitar, and create a distribution map of the respective sounds;

sequence creating means configured to create sequences from the distribution map created by the distribution map creating means;

numerical diagram creating means configured to create numerical diagrams from the sequences created by the sequence creating means;

graphic converting means configured to convert the numerical diagrams created by the numerical diagram creating means into graphics; and display means configured to prioritize the graphics converted by the graphic converting means and transmit a signal to arrange and display the graphics on the dot matrix.

3. The guitar teaching system according to claim 2, wherein a monitor configured to displays the graphics converted by the graphic converting means is further connected to the central processing unit.

4. A guitar teaching data creation method comprising:

executing, by chord inputting means of a central processing unit, processing for receiving chords;

collating, by distribution map creating means of the central processing unit, respective sounds of the chords received by the chord inputting means with addresses of sounds on a fingerboard of a teaching-oriented guitar, and creating, by the distribution map creating means, a distribution map of the respective sounds;

creating, by sequence creating means of the central processing unit, sequences from the distribution map created by the distribution map creating means;

creating, by numerical diagram creating means of the central processing unit, numerical diagrams from the sequences created by the sequence creating means;

converting, by graphic converting means of the central processing unit, the numerical diagrams created by the numerical diagram creating means into graphics; and prioritizing, by display means of the central processing unit, the graphics converted by the graphic converting means, and transmitting, by the display means, a signal to arrange and display the graphics, wherein the central processing unit creates guitar teaching data.

5. A computer-readable storage medium storing a guitar teaching data creation program for causing a computer to execute a process for creating guitar teaching data, the process comprising:

executing processing for receiving chords;

collating respective sounds of the received chords with addresses of sounds on a fingerboard of a teaching-oriented guitar, and creating a distribution map of the respective sounds;

creating sequences from the created distribution map;

creating numerical diagrams from the created sequences;

converting the created numerical diagrams into graphics; and prioritizing the converted graphics, and transmitting a signal to arrange and display the graphics.

* * * * *